(12) United States Patent
Duescher

(10) Patent No.: US 7,632,434 B2
(45) Date of Patent: Dec. 15, 2009

(54) ABRASIVE AGGLOMERATE COATED RAISED ISLAND ARTICLES

(75) Inventor: Wayne O. Duescher, 951 County Rd., C2 W., Roseville, MN (US) 55113

(73) Assignee: Wayne O. Duescher, Roseville, MN (US)

(*) Notice: Subject to any disclaimer, the term of this patent is extended or adjusted under 35 U.S.C. 154(b) by 1136 days.

(21) Appl. No.: 10/824,107

(22) Filed: Apr. 14, 2004

(65) Prior Publication Data

US 2004/0235406 A1 Nov. 25, 2004

Related U.S. Application Data

(63) Continuation-in-part of application No. 10/816,275, filed on Apr. 1, 2004, which is a continuation-in-part of application No. 10/418,257, filed on Apr. 16, 2003, now abandoned, which is a continuation-in-part of application No. 09/715,448, filed on Nov. 17, 2000.

(51) Int. Cl.
- B29B 9/00 (2006.01)
- B29B 9/08 (2006.01)
- B29B 11/16 (2006.01)

(52) U.S. Cl. ............... 264/12; 264/11; 264/13; 264/15

(58) Field of Classification Search ............ 451/527; 51/300; 65/21.1, 21.4
See application file for complete search history.

(56) References Cited

U.S. PATENT DOCUMENTS

| | | | |
|---|---|---|---|
| 794,495 A | 7/1905 | Gorton et al. | 451/529 |
| 1,657,784 A | 1/1928 | Bergstrom | 51/295 |
| 1,896,946 A | 2/1933 | Gauss | 451/527 |
| 1,924,597 A | 8/1933 | Drake | 451/550 |
| 1,941,962 A | 1/1934 | Tone | 5/295 |
| 2,001,911 A | 5/1935 | Wooddell et al. | 451/529 |
| 2,108,645 A | 2/1938 | Bryant | 427/204 |

(Continued)

FOREIGN PATENT DOCUMENTS

WO  WO 95/00295  1/1995

OTHER PUBLICATIONS

Cai, Shu-Hui et al., "Atomic scale mechanism of the transformtion of gamma-alumina to theta-alumina", Phys. Rev. Lett., 2002; 89 (23):235501.*

(Continued)

Primary Examiner—Jason L. Lazorcik
(74) Attorney, Agent, or Firm—Mark A. Litman & Associates, P.A.

(57) ABSTRACT

Abrasive disk sheet articles having raised islands coated with spherical abrasive agglomerates that can provide both precision flat and smooth workpiece surfaces by high speed lapping are described. These disks also provide high material removal rates and low surface pick-out of soft metallic or non-metallic materials embedded in hard workpieces. A method of producing equal-sized spherical shaped composite abrasive agglomerate beads containing small diamond abrasive particles is described. These beads can be bonded directly on the flat surface of a flexible backing or bonded onto raised island surfaces. Simple and inexpensive apparatus devices and process techniques are described that allow efficient low-volume batch or continuous web manufacturing of precision thickness, large diameter abrasive disk or rectangular sheet abrasive articles.

20 Claims, 72 Drawing Sheets

U.S. PATENT DOCUMENTS

| | | | |
|---|---|---|---|
| 2,115,897 A | 5/1938 | Wooddell et al. | 451/529 |
| 2,216,728 A | 10/1940 | Benner et al. | 51/298 |
| 2,242,877 A | 5/1941 | Albertson | 451/527 |
| 2,252,683 A | 8/1941 | Albertson | 51/298 |
| 2,292,261 A | 8/1942 | Albertson | 451/527 |
| 2,755,607 A | 7/1956 | Haywood | 451/527 |
| 2,820,746 A | 1/1958 | Keeleric | 205/114 |
| 2,838,890 A | 6/1958 | McIntyre | 451/527 |
| 2,907,146 A | 10/1959 | Dyar | 451/529 |
| 3,048,482 A | 8/1962 | Hurst | 51/298 |
| 3,121,298 A | 2/1964 | Mellon | 451/539 |
| 3,246,430 A | 4/1966 | Hurst | 451/534 |
| 3,423,489 A | 1/1969 | Arens et al. | 264/4 |
| 3,495,362 A | 2/1970 | Hillenbrand | 451/527 |
| 3,498,010 A | 3/1970 | Hagihara | 451/527 |
| 3,517,466 A | 6/1970 | Bouvier | 451/466 |
| 3,605,349 A | 9/1971 | Anthon | 451/534 |
| 3,702,043 A | 11/1972 | Welbourn et al. | 451/213 |
| 3,709,706 A | 1/1973 | Sowman | 501/103 |
| 3,711,025 A | 1/1973 | Miller | 239/222.11 |
| 3,838,998 A * | 10/1974 | Matthews et al. | 65/21.2 |
| 3,859,407 A | 1/1975 | Blanding et al. | 241/3 |
| 3,916,584 A | 11/1975 | Howard et al. | 51/308 |
| 3,921,342 A | 11/1975 | Day | 451/550 |
| 3,933,679 A | 1/1976 | Weitzel et al. | 252/301.1 |
| 3,991,527 A | 11/1976 | Maran | 451/529 |
| 4,018,576 A | 4/1977 | Lowder et al. | 51/309 |
| 4,038,046 A | 7/1977 | Supkis | 51/295 |
| 4,111,666 A | 9/1978 | Kalbow | 51/295 |
| 4,112,631 A | 9/1978 | Howard et al. | 51/295 |
| 4,225,322 A | 9/1980 | Knemeyer | 51/295 |
| 4,251,408 A | 2/1981 | Hesse et al. | 524/541 |
| 4,256,467 A | 3/1981 | Gorsuch | 51/295 |
| 4,272,926 A | 6/1981 | Tamulevich | 51/216 |
| 4,311,489 A | 1/1982 | Kressner | 51/298 |
| 4,314,827 A | 2/1982 | Leitheiser et al. | 51/298 |
| 4,315,720 A | 2/1982 | Ueda et al. | 425/8 |
| 4,327,156 A | 4/1982 | Dillon et al. | 428/568 |
| 4,341,439 A | 7/1982 | Hodge | 350/96.22 |
| 4,364,746 A | 12/1982 | Bitzer et al. | 51/298 |
| 4,373,672 A | 2/1983 | Morishita et al. | 239/703 |
| 4,393,021 A | 7/1983 | Eisenberg et al. | 264/143 |
| 4,421,562 A | 12/1983 | Sands | 106/603 |
| 4,426,484 A | 1/1984 | Saeki et al. | 524/541 |
| 4,541,566 A | 9/1985 | Kijima et al. | 239/224 |
| 4,541,842 A | 9/1985 | Rostoker | 51/296 |
| 4,586,292 A | 5/1986 | Carroll et al. | 451/329 |
| 4,652,275 A | 3/1987 | Bloecher et al. | 51/298 |
| 4,710,406 A | 12/1987 | Fugier et al. | 427/389.8 |
| 4,773,599 A | 9/1988 | Lynch et al. | 241/69 |
| 4,776,862 A | 10/1988 | Wigand | 51/293 |
| 4,799,939 A | 1/1989 | Bloecher | 51/293 |
| 4,863,573 A | 9/1989 | Moore et al. | 205/50 |
| 4,903,440 A | 2/1990 | Kirk et al. | 51/298 |
| 4,918,874 A | 4/1990 | Tiefenbach, Jr. | 51/293 |
| 4,930,266 A | 6/1990 | Calhoun et al. | 51/293 |
| 4,931,414 A | 6/1990 | Woode et al. | 501/103 |
| 4,974,373 A | 12/1990 | Kawashima et al. | 51/295 |
| 5,015,266 A | 5/1991 | Yamamoto | 51/293 |
| 5,020,283 A | 6/1991 | Tuttle | 451/550 |
| 5,090,968 A | 2/1992 | Pellow | 51/293 |
| 5,107,626 A | 4/1992 | Mucci | 451/28 |
| 5,108,463 A | 4/1992 | Buchanan | 51/295 |
| 5,110,659 A | 5/1992 | Yamakawa et al. | 428/141 |
| 5,127,197 A | 7/1992 | Brukvoort et al. | 51/204 |
| 5,137,542 A | 8/1992 | Buchanan et al. | 51/295 |
| 5,142,829 A | 9/1992 | Germain | 451/537 |
| 5,152,917 A | 10/1992 | Pieper et al. | 51/295 |
| 5,175,133 A | 12/1992 | Smith et al. | 501/127 |
| 5,190,568 A | 3/1993 | Tselesin | 51/293 |
| 5,199,227 A | 4/1993 | Ohishi | 451/527 |
| 5,201,916 A | 4/1993 | Berg | 51/293 |
| 5,219,462 A | 6/1993 | Bruxvoort et al. | 51/293 |
| 5,221,291 A | 6/1993 | Imatani et al. | 51/293 |
| 5,232,470 A | 8/1993 | Wiand | 51/295 |
| 5,251,802 A | 10/1993 | Bruxvoort et al. | 228/121 |
| 5,273,805 A | 12/1993 | Calhoun | 428/156 |
| 5,297,364 A | 3/1994 | Tuttle | 451/527 |
| 5,304,225 A | 4/1994 | Gardziella et al. | 51/298 |
| 5,318,604 A | 6/1994 | Gorsuch et al. | 51/293 |
| 5,368,618 A | 11/1994 | Masmar et al. | 51/295 |
| 5,397,369 A | 3/1995 | Ohishi | 51/295 |
| 5,437,754 A | 8/1995 | Calhoun | 156/231 |
| 5,489,204 A | 2/1996 | Conwell et al. | 432/153 |
| 5,496,386 A | 3/1996 | Broberg et al. | 51/293 |
| 5,549,961 A | 8/1996 | Haas et al. | 428/143 |
| 5,549,962 A | 8/1996 | Holmes et al. | 428/144 |
| 5,551,961 A | 9/1996 | Engen et al. | 51/298 |
| 5,611,825 A | 3/1997 | Engen et al. | 51/295 |
| 5,674,122 A | 10/1997 | Krech | 451/536 |
| 5,733,175 A | 3/1998 | Leach | 451/41 |
| 5,820,450 A | 10/1998 | Calhoun | 451/530 |
| 5,834,569 A * | 11/1998 | Ramanath et al. | 525/480 |
| 5,888,121 A | 3/1999 | Kirchner et al. | 451/41 |
| 5,888,548 A | 3/1999 | Wongsuragrai et al. | 424/489 |
| 5,910,041 A | 6/1999 | Duescher | 451/28 |
| 5,910,471 A | 6/1999 | Christianson et al. | 51/295 |
| 5,924,917 A | 7/1999 | Benedict et al. | 451/526 |
| 5,967,882 A | 10/1999 | Duescher | 451/57 |
| 5,975,988 A | 11/1999 | Christianson | 451/28 |
| 5,984,988 A * | 11/1999 | Berg et al. | 51/293 |
| 5,993,298 A | 11/1999 | Duescher | 451/56 |
| 6,017,265 A | 1/2000 | Cook et al. | 451/41 |
| 6,048,254 A | 4/2000 | Duescher | 451/28 |
| 6,080,215 A | 6/2000 | Stubbs et al. | 51/295 |
| 6,099,390 A | 8/2000 | Nishio et al. | 451/36 |
| 6,102,777 A | 8/2000 | Duescher et al. | 451/36 |
| 6,120,352 A | 9/2000 | Duescher | 451/41 |
| 6,149,506 A | 11/2000 | Duescher | 451/59 |
| 6,168,508 B1 | 1/2001 | Nagahara et al. | 451/527 |
| 6,186,866 B1 | 2/2001 | Gagliardi | 451/28 |
| 6,217,413 B1 | 4/2001 | Christianson | 451/28 |
| 6,228,133 B1 | 5/2001 | Thurber et al. | 51/295 |
| 6,231,629 B1 | 5/2001 | Christianson et al. | 51/295 |
| 6,277,160 B1 | 8/2001 | Stubbs et al. | 51/295 |
| 6,299,508 B1 | 10/2001 | Galiardi et al. | 451/28 |
| 6,319,108 B1 | 11/2001 | Adefris et al. | 451/533 |
| 6,371,842 B1 | 4/2002 | Romero | 451/540 |
| 6,521,004 B1 | 2/2003 | Culler et al. | 51/298 |
| 6,537,140 B1 | 3/2003 | Miller et al. | 451/259 |
| 6,540,597 B1 | 4/2003 | Ohmori | 451/443 |
| 6,551,366 B1 | 4/2003 | D'Souza et al. | 51/309 |
| 6,602,439 B1 | 8/2003 | Hampden-Smith et al. | 252/79.1 |
| 6,613,113 B2 | 9/2003 | Minick et al. | 51/298 |
| 6,620,214 B2 | 9/2003 | McArdle et al. | 51/298 |
| 6,645,624 B2 | 11/2003 | Adefris et al. | 428/402 |
| 6,766,817 B2 | 7/2004 | da Silva | 137/1 |
| 2002/0003225 A1 | 1/2002 | Hampden-Smith et al. | 252/79.1 |
| 2003/0143938 A1 | 7/2003 | Braunschweig et al. | 451/533 |
| 2003/0207659 A1 | 11/2003 | Annen et al. | 45/526 |

OTHER PUBLICATIONS

Quadro Enginnering Incorporated Quadro Comi product description (http://www.quadro.com/3_milling/3_applications.asp) Accessed Jul. 6, 2006.*

Zhai et. al., "influence of rheological behavior of aqueous Al2O3/Nano-TiO2 Slurry on the characteristics of powders prepared by spray pelletization", Materials Science and Engineering A 392 (2005) 1-7.*

"Superabrasives and Microfinishing Systems" Product Guide. 3M, 1994, 60-4400-4692-2 (104.3) JR.

* cited by examiner

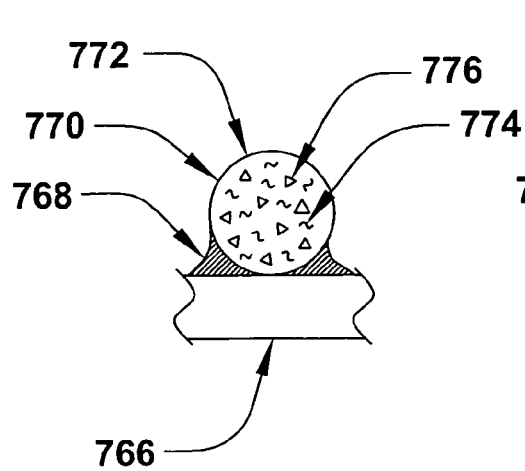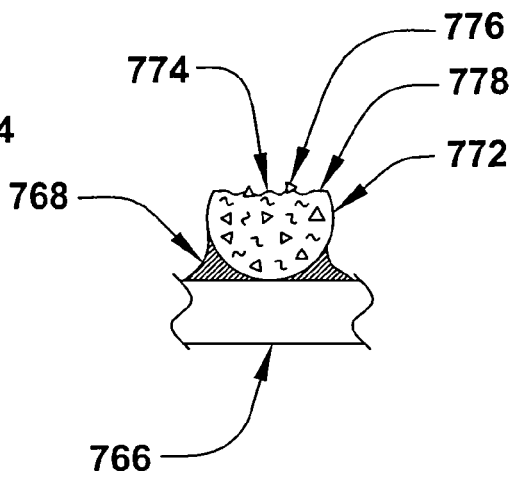
*Fig. 60 A*     *Fig. 60 B*
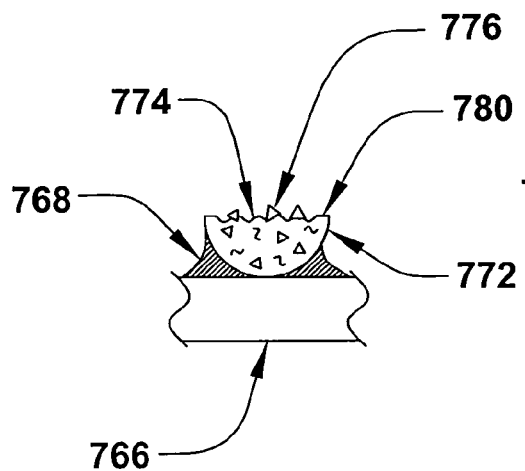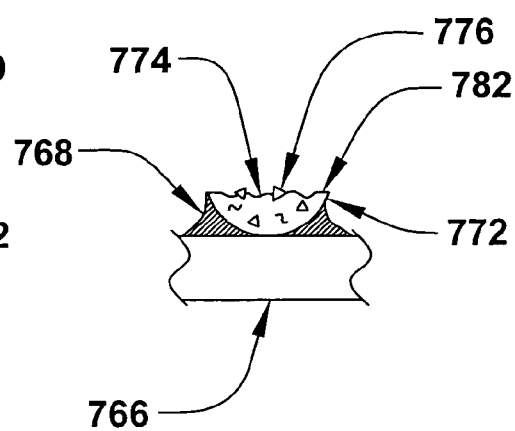
*Fig. 60 C*     *Fig. 60 D*

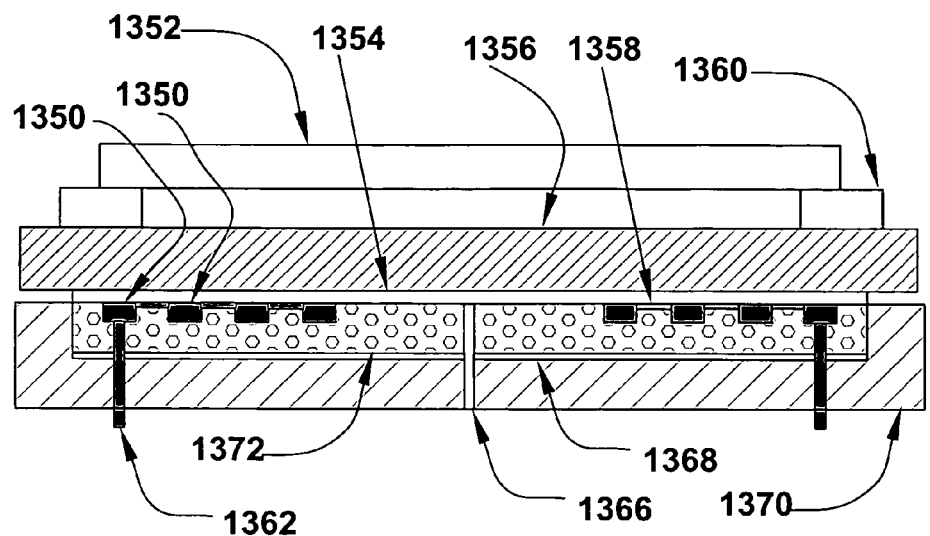
Fig. 90
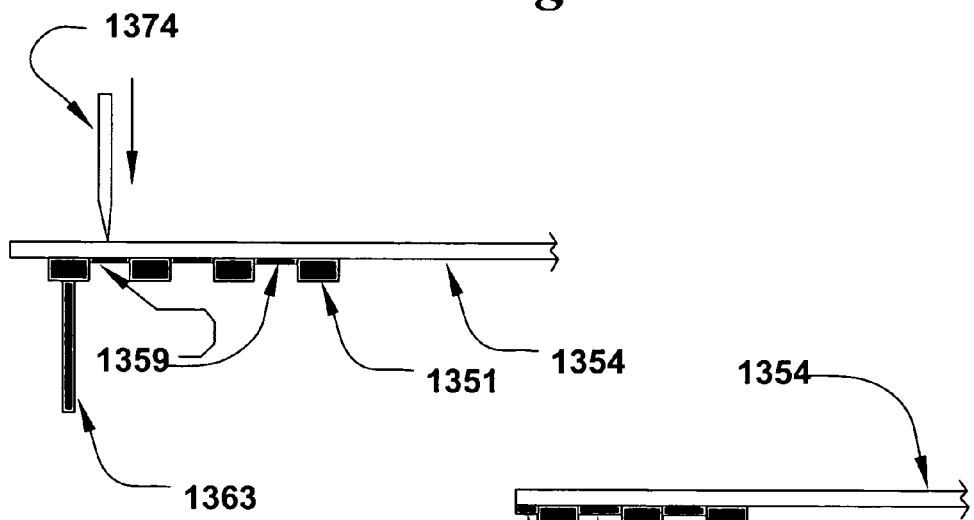
Fig. 91
Fig. 92

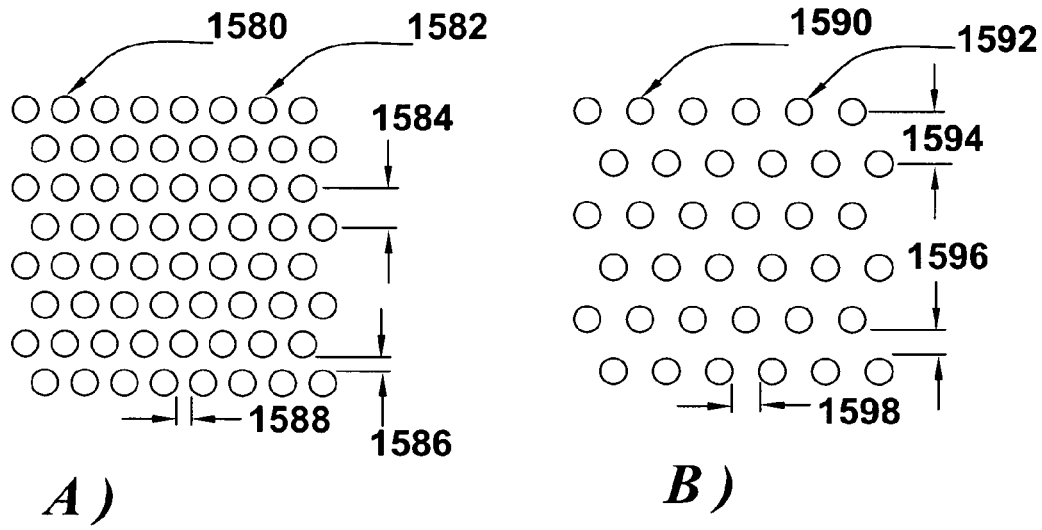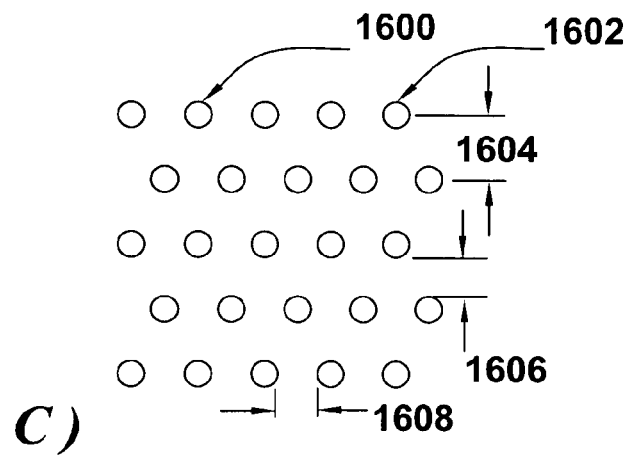
Fig. 107

ABRASIVE AGGLOMERATE COATED RAISED ISLAND ARTICLES

CROSS REFERENCE TO RELATED APPLICATION

This invention is a continuation-in-part of U.S. patent application Ser. No. 10/418,257, now Abandoned, filed Apr. 16, 2003 which is a continuation-in-part of U.S. patent application Ser. No. 10/816,275 filed Apr. 1, 2004 which is in turn a continuation-in-part of U.S. patent application number 20020061723, filed Dec. 13, 2001 (U.S. patent application Ser. No. 09/715,448) which is a continuation-in-part of U.S. patent application Ser. No. 09/715,448, filed Nov. 17, 2000 and which applications are incorporated herein by reference.

BACKGROUND OF THE ART

1. Field of the Invention

The present invention relates to abrasive media and processes for manufacturing the abrasive media. The media are thin flexible abrasive sheeting used for grinding or lapping, workpiece surfaces. In particular, the present invention relates to media having an annular distribution of abrasive particles or agglomerates bonded in monolayers to the top flat surfaces of raised island shapes that are repeated in patterned arrays capable of operating at high surface speeds. Forming flat surfaced raised islands integrally attached to backing sheets, precisely leveling the height of each island, coating the island surfaces with abrasive particles or abrasive composite agglomerate beads economically creates an abrasive article that will grind or lap a workpiece precisely flat and also generate a smooth workpiece surface. Commercially available abrasive disk articles presently used for lapping can not simultaneously produce both a flat and smooth surface. Continuous flat coated disks that do not have an annular band of coated abrasive present a slow moving and slow abrading surface at the inner disk diameter areas that results in uneven workpiece material removal at these areas. Disks having a continuous coated surface area will produce a smooth workpiece surface but will not produce a flat surface due to hydroplaning effects when used with a water lubricant at high lapping speeds. Disks having electroplated raised islands with uneven metal-trapped abrasive particles positioned at different elevations can generate a flat workpiece surface but are not capable of producing a smooth workpiece surface. Agglomerates having a sufficiently large size for high speed lapping can produce a smooth workpiece finish when resin bonded to raised island tops. The surface discontinuities provided by a series of independent gap-spaced raised islands break up the abrading coolant water boundary layer that builds in thickness as a function of the land length between the abrasive surface and the workpiece. Reduction of the boundary layer, which lifts the workpiece unevenly away from the abrasive surface, minimizes the occurrence of hydroplaning of the workpiece thereby producing flatter workpiece parts. The boundary layer thickness changes not only as a function of the length of a continuous abrasive segment in contact with a moving water film but also with the relative velocity between the abrasive segment and the moving water. Presentation of the abrasive in an narrow radial-width large diameter annular band provides a more uniform abrading surface speed across the workpiece surface than does a smaller diameter continuous coated abrasive disk. In the same way that an automobile tire having a pattern of ribbed tire threads maintains more intimate contact with a wet road surface than does a smooth surfaced tire, abrasive media having a pattern of abrasive coated raised islands maintains more intimate contact with a workpiece surface than does abrasive media that has a continuous layer of abrasive coated directly on the surface of a backing sheet. Small abrasive particles must be in direct contact with a workpiece to enable material removal from the workpiece. If a portion of the workpiece is floated above the abrasive due to the separation caused by the thickness of the induced water boundary layer, no abrading contact is made with the workpiece in that area. Coolant water freely passing through flow channels formed by the valley passageways between the raised islands flushes out grinding swarf and prevents swarf debris particles from scratching the surface of a workpiece when they are lodged between the moving abrasive and the workpiece surface.

BACKGROUND OF THE INVENTION

Abrasive articles having a single or mono layer of individual abrasive particles or composite abrasive agglomerates coated on the flat surfaces of raised islands attached to a flexible backing media provides the capability to grind and polish workpieces both flat and smooth during high speed lapping and grinding operations. Performance, manufacturing and lapping process technique issues related to the primary problems of: out-of-flat grinding caused by hydroplaning of the workpiece; providing a grinding swarf debris removal path; the effective use of all the abrasive particles coated on an abrasive article and the importance of the abrasive sheet thickness variations when operated at high rotational speeds have been defined and numerous solutions are presented. To produce accurate smooth high speed lapping it is critical that the abrasive be worn evenly across the abrasive article surface to maintain presentation of a flat abrasive surface to workpiece surfaces throughout the working life of the abrasive article. It is also very important that all the abrasive attached to the surface of an abrasive article be positioned at the same elevation relative to the back side of the backing to allow contact of all of the particles when the article is mounted to a precisely flat platen that is rotated at very high speeds. High abrading surface seeds are required to effectively utilize the cutting action of diamond abrasive that can produce very high material removal rates on very hard substrate workpiece materials. Large abrasive particles can be coated directly on the surface of a disk backing and used effectively. The small abrasive particles that are required to produce smooth workpiece surfaces are too small to be directly coated on backings, but rather, the small particles are joined together in agglomerates of a larger size. A method is described for forming equal-sized composite spherical glass or ceramic beads. The beads can be solid or hollow. The beads may be comprised of a ceramic material or the beads may be comprised of a agglomerate mixture of different materials including ceramic materials and abrasive particles. Hollow abrasive beads may be formed where the ceramic and abrasive mixture forms the shell of a hollow abrasive bead. Preferably, the beads are solid abrasive agglomerates comprised of very small abrasive particles enclosed by an erodible ceramic matrix material. Variations in the thickness of abrasive disk articles and variations in the flatness of rotating platens prevent the effective use of small particles coated directly onto backing sheets.

Annular band shapes of abrasive coated on a disk backing sheet presents abrasive to a workpiece where all of the abrasive particles have a near-equal surface speed contact with a workpiece which assures even wear of both the abrasive and the workpiece. Presenting abrasive particles at the top flat surfaces of raised island structures arranged in an annular band array pattern, where the islands have narrow tangential widths, tends to break up the continuous boundary layers of lubricant water formed during high speed lapping. The shorter and thinner boundary layers help prevent hydroplaning of a workpiece. It is very difficult to prevent hydroplaning of workpieces when lapping a workpiece at high speed using small abrasive particles or abrasive agglomerates directly coated on the surface of a backing sheet. Typical abrasive particle or agglomerate sizes are only 25 microns, or 0.001 inches, which is small compared to the depth of the coolant water that can be present on the surface of the abrasive sheet. Use of raised islands having open radial passageways allows free outward motion of the water due to centrifugal forces. Clean water can be applied continuously to provide the required cooling action that removes the frictional heat generated by the contact action of the moving abrasive. Abrasive swarf material generated by abrading action is swept away from the workpiece surface when it is carried along with the excess water that travels radially under the surface of the workpiece within the island passageways. Scratches generated by swarf particles becoming trapped between the abrasive surface and the workpiece surface are significantly reduced with the use of raised islands. Use of monolayers (single layers) of abrasive particles or abrasive composite agglomerates maximizes the use of individual abrasive particles and allows flat grinding of composite dissimilar workpiece materials including semiconductor devices having metal embedded within ceramic materials. Abrasive monolayers coated on backing sheets or coated on the top surfaces of raised island structures prevent the second-tier level of individual abrasive particles that are bonded at a raised elevation to particles bonded directly to a backing surface from digging out soft material workpiece features from hard workpiece substrate materials. Soft material "pick-out" can occur when the elevated non-monolayer abrasive particles are forced down into the workpiece embedded soft material by the abrading contact forces becoming concentrated upon the single raised particles as the abrasive moves relative to the workpiece surface.

The manufacture of flat surfaced raised island abrasive articles that are to be used in lapping or flat-lapping is critical in that the finished article product should have abrasive particles that are all bonded to an abrasive disk article at the same elevation from the backside of the abrasive article. It is not critical to control the absolute height of abrasive flat islands as the depth of the water passage valleys located between the island structures can vary considerably and still perform the function of a simple water passageway. The total thickness of the monolayer abrasive coated abrasive article must be controlled to within a small fraction of the size of the abrasive particles or agglomerates coated on the island surfaces. This thickness control can be accomplished quite easily by using abrasive media production equipment that has approximately the same precision flatness and motion accuracy as the lapping machine equipment that is required to effectively use the abrasive article for precision-surface high speed lapping. Traditional methods of producing lapping disk articles is to abrasive coat a continuous web sheet and die-cut or punch out disks from the web sheet, thereby producing substantial waste from the unused non-circular portions of the remaining web stock. Furthermore, the abrasive covered inside diameter portion of a conventionally coated die-cut abrasive disk article actually prevents the occurrence of flat lapping on a high rotational speed lapper for workpieces that have a diameter or size that their surfaces extend from the outer periphery to the inside diameter of the abrasive disk article during rotational flat lapping. This problem occurs as the inner radius abrasive disk area has a lower surface speed than the outside disk diameter no matter how fast or slow that the outer disk diameter is travelling. The localized tangential abrading surface speed is proportional to the disk radius at different radial positions which results in zero surface speed at the disk center, even at high disk rotational speeds. As the wear of the abrasive is related to the surface speed, the inner portion of the disk wears slowly. The flatness of the abrasive surface presented to a workpiece changes with abrading usage of the disk even if substantial abrasive thickness remains on the disk surface. Producing a precision flat workpiece surface when abrading with a non-flat abrasive disk article is difficult. An annular band abrasive sheet article can be made from a continuous circular disk having a flexible backing by cutting out and discarding the expensive disk center abrasive material area. The remaining flexible annular band article is structurally weakened by removal of the inside diameter area which results in an abrasive article that is difficult to mount flat on a platen surface and to maintain the annular ring flat attachment to the platen surface. It is not practical to firmly attach the full continuous circumference of the inside radial edge of the loose annular disk article to a platen surface, in part, because of the necessary positional spacing of vacuum attachment holes from each other, and also, the hole spacing from the edge of the annular ring. Vacuum attachment mounting of the annular ring abrasive article to a circular platen results in the annular band inside radius tending to collect grinding swarf under portions of the annular article circular edge. It is desired to produce annular disks that have a large outside diameter relative to the width of a annular band where the annular radial width is slightly greater or slightly smaller than the cross-width of a given workpiece, depending on the style of lapping machine is used. Any abrasive material that is located at the center of a large diameter annular band article would constitute a waste of expensive abrasive material. Many different sized workpiece parts require many different sized abrasive articles. Each selected annular band size would necessitate a number of different abrasive articles with each having different particle sizes. The different abrasive particle sized articles are required to complete the typical process of using progressively smaller abrasive particles as a workpiece is ground or lapped. The disk manufacturing system described here allows commodity materials to be used to make a wide variety of sizes of uncoated annular band raised island disks. Only the flat surfaced raised island surfaces that are contained in the annular band portion of the disk are precisely flattened by machining or grinding as the flatness of the low-level inner radius is not important for abrading action. A wide variety of abrasive particle materials, sizes and forms including agglomerates can then be resin coated on generic backing sheets having patterns of raised islands. The equipment costs, the production facility costs and machine operator skill requirements to produce these annular band abrasive articles are modest compared to the costs and skill requirements for the production of traditional abrasive materials. The typical annular band abrasive disk articles have great value, are very light weight and can be quickly shipped great distances at low costs.

The raised island shapes are preferred not to be positionally extended to the outer radial edge of the abrasive article backing sheet as some distance is required between the island edges and the backing sheet border edge. By having an outboard island-free annular gap area, each island has a smooth continuous-form shape that can be abrasive particle coated with good structural integrity of the bond between the abrasive particles and the island surface. It is not necessary to create fractured island surfaces by die-cutting a disk article from a continuous web sheet having attached raised islands. The mechanical die-cut surfaces that cut through the thickness of the backing and also through the thickness of the island structures tend to weaken the bond of the whole island structure from the disk backing and to also weaken the bond of individual abrasive particles or abrasive agglomerates from the island surface. These weakened island structures and weakened abrasive particles tend to break off the abrasive article during abrading action and cause workpiece surface scratches as they travel in the area between the workpiece surface and the moving abrasive surface.

Producing individual annular disk articles on a batch basis requires unique non-traditional production equipment and procedures. Instead of applying a uniform thickness abrasive coating on a web and then cutting disk articles out of the web stock, an individual flexible disk sheet is processed. First, raised island structures can be attached to, or formed onto, a backing sheet using an individual island-sheet batch manufacturing process or in a continuous web island-forming manufacturing process. The raised island abrasive media can have raised islands formed in annular bands on a flexible backing for use with rotational grinding or lapping machines. Rectangular arrays of raised abrasive islands can also be used for a variety of abrasive articles including: flexible flat abrasive article sheets where a workpiece can be moved relative to the abrasive sheet; continuous abrasive strips or abrading-tape articles; and also, endless abrasive belt articles. After the island structures are attached to or formed on a backing sheet, the top surfaces of the islands are flat ground to control the overall island thickness as measured from the backside of the backing sheet. Then the island surfaces are coated with a resin and abrasive particles or agglomerates are deposited in a monolayer onto the resin where there are significant gap spaces between individual abrasive particles or agglomerates to promote aggressive abrading action. A slurry mixture of abrasive particles or composite abrasive agglomerates mixed with a solvent diluted resin can also be applied to bare or primer coated island tops to leave the top surface of individual abrasive particles exposed from the surface of the resin that is bonded to the island structure top surfaces, after evaporation of the solvent. Batch manufacturing of small groups of individual annular band abrasive articles allows the utilization of quick response manufacturing techniques for specialty abrading applications. The batch process production rates can be increased substantially with a hybrid enhancement of producing resin transfer coating sheets by using simple hand-spread notch-bar coaters to apply a make coat of resin to a continuous web backing material that is then cut or converted into rectangular sheet or circular disk segments. Individual backing sheets having attached raised islands can then be placed in contact with these sections cut from the resin wetted web to transfer-coat approximately 50% of the resin thickness to the surface of the raised islands. Forming annular bands of abrasive particle coated raised islands on rotational production equipment offers many advantages, and also, presents unique manufacturing problems as this is not a continuous production process where all of the operational variables can be allowed to reach equilibrium before production of acceptable product. Rotational formation of individual annular bands can result in resin and abrasive particle coating "start" and coating "stop" lines that produce coating thickness defect variations in the annular band area. Each individual annular abrasive article must independently be produced with appropriate product characteristics and accuracies on a batch basis. The resin and the abrasive particles must both be distributed uniformly across the full surface of the annular band and the resin must structurally bond the abrasive particles to the island surfaces. Also, the quantity of both resin and abrasive particles applied to an abrasive article must be accurately controlled to assure the item-to-item performance consistency of the finished abrasive article product. Special techniques are required to compensate for the geometry factors that an annular band shape creates for establishing resin coating and abrasive particle application procedures. The outside diameter of an annular band has a tangential length greater than the inside diameter length which requires that more resin and particles be applied at the outside diameter than at the inside diameter. When resin and particle materials are applied to an individual annular band, a radial start and stop line area generally exists where there is either a tangential excess or deficiency of resin or particles depending on how these materials are applied to a rotating disk. A number of coating devices including brushes and rollers can be used to smooth out the resin excess or deficient areas. Resins may be directly coated onto island surfaces or the resin may first be applied to a resin transfer backing disk sheet that is then pressed into contact with the raised island surfaces to transfer approximately one half of the resin thickness to the island surfaces. Resins may also be sprayed onto the island surfaces or resins may be directly coated onto the island surfaces by a number of coating processes commonly used in the web coating industry, including direct-contact roll coating techniques. Abrasive particles can be applied over many revolutions of the rotating backing disk to provide a tangential uniformly distributed coating of particles over the full annular band. A measured quantity of resin can be applied to the annular band with the use of coater dies that distribute a proportionally greater amount of resin on the outer radius of the annular band than at the inner radius. A particle distribution apparatus can also be used to deposit a measured quantity of abrasive particles with a proportionally greater quantity of particles on the annular band outer radius than on the inner radius. The abrasive particle binder resins can be cured using small ovens that can accommodate the abrasive article disk sheets. For high volume production of these annular abrasive disk articles, different continuous web production systems are described that can be used.

Lapping and grinding can be performed on the surface of a workpiece part by placing the workpiece in moving contact with an abrasive sheet and controlling the contact force holding the workpiece against the abrasive. To create this abrading action either the workpiece can be moved along the surface of the abrasive or the abrasive can be moved along the surface of the workpiece. An increased contact force results in higher workpiece material removal rates and a more coarse or rough workpiece surface finish. A reduced force results in a smoother finish but lower material removal rates. Water, which is often used both as a coolant and also as an agent to flush grinding swarf from the contact area between the workpiece and the abrasive can cause hydroplaning of the workpiece when there is a high relative surface speed between the workpiece and the abrasive article surface. A continuous film of water present at the moving contact interface surface area between the workpiece and the abrasive surface tends to separate the workpiece surface from the abrasive surface. Hydroplaning of the workpiece occurring during the abrading action tends to develop cone or saddle shapes on the workpiece surface thereby preventing the formation of a precision flat workpiece surface. Use of raised abrasive top-coated flat surfaced islands attached to a backing sheet allows passage of water within the passageways formed by the valleys between islands while the abrasive is maintained in direct contact with a workpiece surface. Each abrading island contact raised land area is flat across its surface and can be used for flat lapping or flat grinding of workpiece articles. Rectangular shaped island land areas are preferred to be formed with short land-width distances in the direction of travel of the abrasive article relative to the workpiece surface to minimize hydroplaning effects. The island land-length can be long in a direction perpendicular to the direction of travel of the abrasive article relative to the workpiece surface with little effect on hydroplaning action as there is little relative surface speed differential between the two surfaces in this direction. The flat surfaced islands are attached as a integral structure to a thin flexible backing and the raised height feature of the islands bonded to the backing substantially increases the total thickness of the composite island and backing sheet which substantially increases the mechanical stiffness of the abrasive article in the localized areas where the islands are attached to the article backing sheet. A flexible polymer backing sheet has a typical thickness of 0.003 inches (76.2 microns) and a raised island has a typical height of 0.020 inches (508 microns), resulting in a total composite thickness of 0.023 inches (584 microns) in the localized island areas of the abrasive article. Island heights can range from less than 0.003 to 0.125 inches (0.076 to 3.2 mm). However, the flexible backing can be easily flexed in the valley zone areas between the mechanically stiff raised island that allows the abrasive article to conform to a flat platen or to a flat surface for lapping or grinding operations. The flat surface of each island is then aligned parallel to the surface of the platen or grinding plate, allowing all of the abrasive particles attached to the raised island surfaces to contact the flat surface of a flat-contacting workpiece. Flat raised-island abrasive articles having a flexible backing can also be used to abrade curved surfaces when the curvature of the workpiece surface is great relative to the lineal dimension of the island surface land-width, measured in the direction of travel of the abrasive. Abrasive particles or abrasive agglomerates bonded at the upstream and downstream outer edges of the island land areas will first contact a concave curved workpiece at a few points along the land length of the island land area when abrading action begins. As the land area leading and trailing edge abrasive particles or agglomerates become progressively worn down, other abrasive particles located inboard on the raised island land area adjacent to the worn edge particles will develop contact with the workpiece surface. All of the abrasive particles or agglomerates bonded to the top surface of a raised island land area can be progressively utilized when grinding or lapping a curved surface by selecting particle or agglomerate sizes and island land widths to correspond with the curvature of the workpiece surface. The flat abrasive islands can not be used effectively for abrasion of curved workpiece surfaces where the angle of workpiece surface curvature is great. The abrasive particles are typically coated in a very thin layer on the whole flat surface of each island and most of the abrasive is not used effectively for abrading sharply curved surface workpieces.

Examples of different methods of polishing the surface of a workpiece are presented to illustrate issues including workpiece hydroplaning, the provision of an adequate number of abrasive particles to be in contact with each portion of a workpiece surface, and the effect of using mono or single layers of particles coated on a backing sheet. One example method of abrading circular surfaces including crankshaft journals or other cylindrical articles is to push the surface of a stationary slow or fast moving abrasive article belt or tape article into the surface of the moving or rotating cylinder or journal with a resilient puck roll or idler nip roll. The abrasive contact force provided by the nip roll that is deformed partially around the circumference of the cylindrical journal forms a pressurized abrasive contact land area extending across the width of the abrasive belt and circumferentially for a short distance around the cylinder. The total width of the abrading land area extending along the circumference of the cylindrical workpiece article increases with a larger nip force or with a softer nip roll. The localized contact pressure, in pounds per square inch, between the abrasive and the cylindrical journal is lowest at the belt cross-width area zone positions where the abrasive belt enters and also where it exits the nip land area and is highest at the central zone area located midway between the land area entry and exit zones. There is little chance of hydroplaning induced separation of the workpiece cylinder from the abrasive due to the large localized contact pressure forces that exist in the land area because all of the roll nip force is concentrated in the narrow contact land area. If a nip roll is used that has a very hard surface with little conformal wrapping of the roll surface around the short circumferential cylinder contact segment, the land area becomes reduced to essentially a line contact area that extends across the width of the abrasive belt and this narrow line area results in a very high contact pressure. The belt can be wrapped in contact with the cylinder journal roll both ahead of and downstream of the nip roll contact area but the abrading action in these additional contact areas is minimal because the contact forces in the free wrapped segments of the belt is very low compared to the relatively large contact pressures that exist in the roll nipped land area.

Another example of a polishing technique that can be used to abrade cylindrical articles is to wrap a narrow web tensioned abrasive coated tape with a 180 degree wrap angle around the cylinder and rotate the cylinder at a high rotational speed with an abrasive tape held stationary or incrementally advanced or advanced at low or high speeds to provide new sharp abrasive particles to the abrasive tape contact wrap-area. Web tension forces directed along the tape length at both tape sections located at the entry and exit areas where the tape comes into contact with the tape wrap angle generates an abrading contact force directed perpendicular to the cylinder that is uniform along the full tape wrap angle area. Water induced workpiece hydroplaning, where the workpiece is separated from the abrasive, is more likely for the tensioned wrap-tape system than for the nipped-belt roll system as the localized contact pressure, in pounds per square inch of area, is much less for a typical abrasive wrapped-tape polishing technique than for a typical nip-roll belt polishing technique when using a similar abrasive coated flexible polymer backing on both systems.

When a nip roll is used to hold an abrasive belt against a rotating journal, only the abrasive particles contained in the narrow pressurized land area are active in the abrading polish of the journal. Here, the particles located in the portion of the land area locate at the entry are not very aggressive in abrading action material removal because the contact pressure in this portion of the land area is low due to the low pressure exerted by the relatively uncompressed resilient surfaced conforming nip roll within this entry zone area. The material removal rate is high at the central land area zone, located between the entry and exit zones, because the roll nip pressure is highest in this zone as the resilient surface of the nip roll is compressed most at this central zone region. Likewise, the material removal rate is low at the exit zone portion of the belt nip land area because the nip pressure is low in that area. Dividing the nipped land area into these three zones, the entry or inlet zone, the central zone and the exit zone allows a corresponding divisional categorization of the polishing action or material removal rate by reference to each of these zones. The entry zone produces a minor smoothing abrading action that is overridden by the abrading action in the central zone where the primary and aggressive material removal takes place. The entry zone tends to polish the surface smooth because of the low contact pressure and the sequential central zone tends to make this smooth surface rougher because of the high contact pressure on the abrasive particles. The exit zone then sequentially provides a minor abrading action that tends to smooth the rougher finish produced by the central zone. These three zones can be categorized as a series of abrading events with a different abrading action in each event: (1) the entry zone providing a smoothing polishing action; (2) the central zone as providing a aggressive material removal action with a rougher surface finish; and (3) the exit zone as providing a re-polishing action resulting in a smooth surface finish.

The number of individual particles that contact a specific width area of a cylindrical workpiece and which produce significant material removal is substantially different for a nipped-belt lapping system and a web-tensioned conformal tape system. In a nipped-belt system, the number of particles that contact a specific area of a journal is limited by the number of particles contained in that contact area band width of each of the three sequential zones, where all three zones are collectively contained within a nipped land area having a very limited down-belt length dimension. Further, the final smooth polishing action on the specific journal area results from only those particles contained in the exit zone portion of the narrow contact land area as the smooth lapping action produced by the low pressure entry zone particles is lost in the aggressive action high pressure central zone area. When a web-tension tape is used to smooth polish a cylindrical workpiece, the number of contacting abrasive particles present in the relatively long wrap-angle tape segment is huge compared to the number of contacting particles contained in the narrow width nipped-belt abrasive contact land area. Each contacting particle of the wrapped tension tape has a less aggressive cutting action than those particles located in the central zone of a nipped belt land area because the abrading contact force is so much less in the tension tape than in the nipped belt. The tension tape will tend to produce more of a smoothing action than the nipped belt using the same abrasive media for both the tape and the belt lapping systems.

When an abrasive article used for polishing that has a mono or single layer of abrasive particle or agglomerate or bead coated media, there will be less pick-out of softer materials, or discrete hard foreign nodules, located in pockets on the surface of hard workpiece articles than there will be when abrasive articles having stacked particles on the coated abrasive media. Workpieces having these characteristics include semiconductor devices having soft metal conductor material imbedded in trenches in hard ceramics material and cast cylindrical automotive parts having carbon or other precipitated inclusions on the part surface. Spherical bead composite agglomerate abrasive particle shapes are a preferred agglomerate shape for creating a single layer or monolayer of composite agglomerates on a backing sheet. The spherical shape provides more consistency in shape and consistency in slurry coating or abrasive particle drop coating than do acicular shaped or irregular shaped agglomerates formed by crushing a hardened abrasive composite material. The geometry difference between an agglomerate sphere shape and an agglomerate block shape has a pronounced effect on the utilization of individual abrasive particles coated on an abrasive article. The primary bulk of individual abrasive particles contained in a spherical erodible abrasive composite agglomerate are located at the sphere center of the spherical agglomerate which is positioned a sphere radius distance above the surface of a backing sheet. When the agglomerate abrasive spheres are raised to a elevated position above the backing surface, the elevated position of the bulk of the sphere-contained individual abrasive particles assures that most of the particles contained in a spherical agglomerate are effectively used in abrading action as the abrasive article becomes worn down. An abrasive article is usually abandoned prior to wearing all of the agglomerates completely down to the agglomerate base that is adhesively bonded to a backing surface that gives an abrasive particle utilization advantage to spherical agglomerates over block shape agglomerates. Few of the original total quantity of unused individual abrasive particles are contained in the remaining truncated hemisphere small-volume areas of spherical agglomerates that are left attached to a worn-down abrasive article backing-sheet. Comparatively, a larger portion of unused individual abrasive particles reside in the remaining truncated block-shape non-spherical agglomerates worn-down to the same height level above the backing surface as for the worn-down spherical agglomerates. The number of abrasive particles contained in the highly reduced volume in the inverted apex of a diminished truncated sphere are very small compared to the particles contained in the linearly reduced volume agglomerate block shape bonded flat to a backing sheet. Some coated abrasive particles including individual abrasive particles, abrasive agglomerates and spherical abrasive beads are often stacked at different levels where some of the particles are positioned 50% of their diameters above the height of like-sized particles which are located in direct contact with the surface of the backing sheet. Other particles are often stacked in layers that are positioned two or more particle diameters above the backing surface. These "high-positioned" particles are few in number compared to those positioned directly on the backing surface but these high-risers have an exaggerated effect on polishing a workpiece. Although not wanting to be bound by theory, it is believed that the high positioned particles will tend to reach down into the soft portions of a hard substrate surface and gouge out or selectively abrade away the softer material as the abrasive travels in abrading contact with the substrate surface. In the case of the force tensioned abrasive tape system, the abrading contact pressure that acts normal or perpendicular to the substrate or cylindrical journal surface is quite low compared to the normal surface contact pressure present in the nip-roll abrasive system. Less pick-out of soft materials will occur with the abrasive tensioned tape system than with the nipped roll abrasive belt system. The nipped belt having the relatively high contact pressures in the central land area will aggressively loosen and dispel the hard foreign surface particles or erode and gouge out soft material areas whenever a raised surface abrasive particle comes in contact with the foreign material nodule or the soft material. All of the localized high nip roll contact pressure tends to become focused on the high level abrasive particles which drives these individual high particles down into the soft material whereas the bulk of the same sized adjacent particles are self-bridged across the soft area, and are principally in contact with the hard substrate parent material surface. These high particles or agglomerates also can tend to apply large impact forces to imbedded foreign surface particles when the abrasive is travelling at high speeds in contact with the workpiece surface and dislodge the imbedded particle, leaving a crater in the surface of the substrate or cylindrical metal surface. Dislodging foreign particles can occur in the process of high speed lapping; where surface speeds of 10,000 surface feet per minute or more can be reached.

Another abrading example is flat lapping or polishing where a flat workpiece surface is presented in surface contact with a flat abrasive article to produce cutting, grinding or polishing action where the contact surface pressure, in pounds per square inch or newtons per square cm, is uniform across a portion of, or the full surface of the workpiece. Contact pressures are typically controlled to be low at the onset of the polishing process, increased progressively and then decreased in the final phase of a lapping operation to obtain the most effective utilization of the abrasive media. A single or mono layer of abrasive particles or agglomerates is highly desired for flat lapping of workpieces including pump seals, bearing seals, optical components including but not limited to a lens, a fiber optic connector, optical crystals, and semiconductor substrates. Abrasion may take place where the workpiece is held stationary and the abrasive sheet article or lapping film is moved relative to the workpiece. Lapping film is a abrasive article having a thin, flexible polymer backing coated with abrasive particles or coated with spherical bead abrasive agglomerates. Also, abrasion may occur where the abrasive article or lapping film is held stationary and the workpiece is moved relative to the abrasive article. Relative surface speeds of the abrasive may be considerably less when moving the workpiece relative to the abrasive sheet than the abrasive speeds that are used in high speed lapping. In high speed lapping, the moving abrasive sheet typically has very high surface speeds to take advantage of the high cut rates that occur when using diamond abrasive at high surface speeds. Abrasive lapping sheets, commonly referred to as lapping films, typically have very precision thickness abrasive sheet article thicknesses and also have monolayer thickness abrasive particle coatings that are critical to produce the very precise flat surfaces and the very smooth polished surfaces required for optical workpieces and fiber optic devices.

A wide range of diamond or other abrasive particles or agglomerates or spherical beads are attached to the surface of abrasive articles. Primary materials utilized as abrasive particles are faceted crystals having sharp edges on many sides. The sharp particle edges provide cutting surfaces that are brought in pressure contact with a workpiece to cut, grind or polish the workpiece surface. Some of the diamond abrasive material occurs naturally and other of the abrasive materials are man made. Most particles do not have naturally formed smooth particle surfaces. Some diamond abrasive particles have slender bodies with significant aspect ratios of length to width; other particles have rounded-block shapes and are referred to as "blocky" particles. Small sized diamond abrasives are often crushed from larger particles that are sorted into size ranges by the use of sieve screens and other methods. Crystalline diamond particles can have aspect ratios of 2 or more to 1 which allows some long particles to fall lengthwise through a screen opening that is much smaller than the particle length. Crushed composite particle agglomerates have many different shapes, which makes it difficult to separate the agglomerates into sizes that are equivalent to round spherical agglomerates. Blocky diamonds are more cubic in shape than crystalline diamonds. Ceramic bead composite agglomerates are spherical in shape and can be size classified quite accurately. Each process for manufacturing abrasive particle agglomerates creates individual particles of many sizes for the same size of diamond, or other abrasive, particles enclosed within the agglomerate shape. Ceramic bead composite agglomerates for a particular classification of diamond particles also tend to have different spherical diameters for a given particle classification. For example, a 3-micron diamond particle classification abrasive article may be supplied coated with spherical beads having a range in size from 15 micron to 45-micron beads. The exact size range of the 3-micron classification abrasive diamond particle supplied within the composite agglomerate beads coated on a commercially available abrasive article is typically not listed in the product literature description. The "3 micron" classification diamond particles are actually a range of particle sizes, either larger or smaller than the 3-micron stated size.

Large abrasive particles having sizes of microns, 300 microns and 1000 microns and even larger, can be coated in single or mono layers on an abrasive article backing and used for abrading where the individual particles are worn down from their apex top until only a small portion of each particle remains at the end of the life of the abrasive article. Individual particle are attached to a backing sheet with enough room between particles the each individual particle is a highly localized pressure contact with a workpiece surface during an abrading process. The localized pressure on the exposed tip of an individual diamond particle is so high and the frictional heating of the particle tip due to abrading action so severe, that carbides can be formed when the carbon in the diamond combines with the iron in a steel workpiece. If the spacing between the particles is too small, the abrasive surface can actually act as a load bearing surface with little resultant abrading action that removes workpiece surface material. When abrasive particles are used, the scratched depth or material removed as a layer from a workpiece substrate is thought to be roughly proportional to the diameter or size of the particle. Large diameter particles are used to aggressively remove large quantities of workpiece material but they leave large scratches on the surface of the workpiece that result in a coarse or rough surface finish. Progressively smaller sized abrasive particles are used to effect a smooth surface as the scratches produced are also progressively smaller and the top "surface damage" produced by the previous larger sized particle is removed by the subsequent small particles. When the size of the particles are less than 20 microns or 10 microns and particularly, when less than 1 micron, the small quantity of abrasive particles contained in a monolayer coated on a backing prevents extended use of the abrasive article as this thin layer of abrasive particles quickly becomes dull or the particles are worn away and expelled from the article surface rendering the abrading performance of the article ineffective. It has been found by the abrasive industry that the small sized particles desired to produce a smooth workpiece surface finish can be joined together in composite agglomerates with an eroding matrix to both provide long abrading life of the article and to produce a smooth surface finish. The eroding mixture is controlled to erode away at a rate where the individual particles become loosened and are expelled from the agglomerate at the time that the particles become dull from abrading, thereby providing a fresh new layer of sharp particles in contact with the workpiece surface. The eroding process continues progressively from the top of the agglomerate to the bottom of the agglomerate until all of the volume of the agglomerate is worn away and all of the individual particles are used. Composite agglomerates have a typical size of 45 microns or less for a mixture of 3 micron sized abrasive particles. The 45 micron agglomerates are often spherical shaped ceramic beads where the 45 micron size is not too large that enough wear occurs on one portion of the abrasive article that the flatness of the abrasive article is unacceptable due to the agglomerate abrasive height change that occurs when only some of the agglomerates are worn down and other agglomerates have little wear. Within a typical 3 micron categorized ceramic bead agglomerate, the abrasive particle component of the agglomerate bead is not restricted only to particles that are exactly 3 microns in size as it is not practical to procure a quantity of a single size particle only. When small particles are mixed with large particles, the adjacent large and small particles contained in a individual agglomerate will tend to produce different polishing effects simultaneously on the workpiece. The size of the agglomerates used to encase a specific particle size depends on many variables including the techniques or processes used to manufacture the ceramic beads or other types of agglomerates. Typically, the agglomerates coated on an abrasive article rated as "3 micron particles" have a range in size from a desired 45 micron size down to a small 15 micron size. All of the range of bead sizes have the same spherical shape. The 15 micron diameter beads would have little, if any, abrasive utility on the abrasive article as they would only come into contact with the workpiece surface after a full 30 micron wear-down had occurred in the larger 45 micron beads positioned adjacent to the smaller 15 micron beads on the abrasive article surface.

Two basic techniques, and other techniques, can be used to resin coat a flexible backing sheet with abrasive particles. One technique includes a method to coat a slurry mixture of abrasive particles or abrasive agglomerates and a polymer resin on the surface of a backing with process procedures to create a mono or single layer of abrasive particles or agglomerates on the surface of a backing. Another technique includes a method where a thin coat of polymer resin is coated on a backing and abrasive particles or agglomerates are drop coated or propelled to the surface of the resin coating by electrostatic or other techniques. When particles are propelled to the surface, they have a tendency to form a single or mono coating layer of particles on the backing. Other resin coatings may be applied to the attached particles including size coatings that strengthen the bond of the individual particles to the backing for increased resistance to the abrading forces that tend to dislodge the particles from the backing surface. When organic or polymer binders are used to bond abrasive particles to a backing sheet the particles are often mixed in a resin slurry that is commonly referred to as a binder precursor that is a binder that is in a liquid or flowable state. After the resin slurry, or resin, is coated on a abrasive article the resin is cured or polymerized to create a binder that is in a solid, non-flowable state thereby fixturing the abrasive particles to the backing sheet.

Providing an abrasive article that can be successfully and effectively used for lapping requires a number of factors to be considered which are beyond the scope of the manufacture of the abrasive article itself. These factors include the design characteristics of the lapping machine and the procedures used in the lapping process. Lapping machines must be continually evaluated and items such as platen flatness must be maintained. Also, the abrasive media may require conditioning prior to or during use for considerations including: the removal of "high-riser" particles or agglomerates; the removal of resin coatings from abrasive particles or agglomerates; the exposure of new particles from within the agglomerates; the removal of swarf debris lodged between particles; and the grind-in of the surface of an article to develop the initial abrasive article surface flatness required for high speed lapping.

Abrasive articles are coated with individual abrasive particles and they are also coated with abrasive composite agglomerates, including spherical beads, where the agglomerates can have different size classifications of enclosed individual abrasive particles. Non-spherical agglomerates can be formed with an appropriate binder material that holds small individual abrasive particles together with a controlled binding strength. The mixture of binder and particles can be coated into sheets or into specific shapes including pyramid shapes and spherical bead shapes and then fully solidified. The hardened abrasive sheets or shapes can be broken or crushed into individual agglomerate particles having some of the individual sharp-edged abrasive particles exposed on each of the agglomerate surfaces. After bonding the broken type agglomerates to the backing of an abrasive article, the article will remove workpiece material upon initial contact with a workpiece surface. Solidified composite abrasive agglomerate spheres having a exterior surface surrounding individual abrasive particles contained within the sphere composite agglomerate body can also be formed and used with, or as an alternative to, the broken agglomerates for bonded attachment on the abrasive article backing surface. Spherical composite agglomerates formed of a mixture of abrasive particles and an erodible binder matrix are often used for diamond abrasive articles when the size of the encapsulated diamond particles are less than 6 microns as it is impractical create mono layers of these small sized particles on an abrasive article. However, when the spherical bead type enclosed body composite agglomerate is bonded to an abrasive article backing, it is necessary to first break the spherical exterior surface of the agglomerate to expose individual sharp edged abrasive particles for use in abrading the surface of a workpiece. The constituent volumetric percentage amount of diamond or other particles used in the agglomerate binder mixture affects the performance of the abrasive article. Composite abrasive agglomerate coated abrasive articles have been marketed for years including those using ceramic and metal oxide encased composite spherical beads that are offered with a variety of size classifications of diamond abrasive particle sizes.

This invention references commonly assigned U.S. Pat. Nos. 5,910,041; 5,967,882; 5,993,298; 6,048,254; 6,102,777; 6,120,352 and 6,149,506 and all contents of which are incorporated herein by reference.

A present problem is the availability of high quality abrasive article sheets, disks, or long strips that have certain important characteristics. It is preferred that abrasive articles have island structures having an uppermost abrasive surface that is extremely flat and of uniform thickness. Conventional flat surface grinding or lapping platens are set up to use the full surface area of a circular shaped flat flexible sheet of abrasive. However, the abrasive contact surface speed of the rotating disk varies from a maximum speed at the outer radius to zero at the innermost center at the disk, where the radius is zero. The grinding material removal rate is roughly proportional to the surface speed of the moving abrasive, so that most of the grinding or lapping action, and the most efficient grinding or lapping action occurs at the outer portion of a rotating disk. Not only is the inside portion of the abrasive disk not used to remove workpiece surface material, but also this portion of the abrasive is not worn down by the workpiece, resulting in a shallow, cone shape of the abrasive disk surface. This uneven wear continues with usage of the disk, with the cone angle progressively increasing to a sharper angle. This cone angle is translated to the surface of the workpiece as the uneven surface of the abrasive article creates an uneven surface contour to the workpiece surface. An effective answer to this uneven wear is to create an abrasive disk with a narrow annular band of abrasive material, at the outer edges of the annulus, allowing the abrasive to wear down more evenly across the full surface of the abrasive disk (which is essentially the annulus, not a continuous circular surface) as the disk is used.

Presently, an important method of manufacturing a circular abrasive sheets is to coat a continuous web backing with diamond particles to form a coated sheet material and then to punch out round disks from the coated sheet material. Effectively, most of the expensive inner surface area of these disks is wasted. If a conventional coated disk is used with a platen having an outer raised annular band, then all of the abrasive coated area located at a radius inside the band is not used as it does not contact the workpiece surface.

Furthermore, it is not practical to punch out radial bands from a coated web sheet for a number of reasons. First, there is not necessarily a ready market for the smaller disk that remains left over from the center punch-out for the annular band. Also, there is a large waste of coated web material left over between the circular disks that are cut out, even with proficient "nesting" of the circular bands. In addition, the extra flexible center-less annular abrasive band not having backing on the inner radius when made of thin 0.005 inch (0.127 mm) thick polyester web has limited structural body strength for handling and mounting. The center-less band cannot be practically used on a platen without creating many problems, including the problem that water and grinding swarf tend to collect under the inside radial edge of the loose annular band sheet. Also, round or bar raised-abrasive islands having a thin top coating of expensive diamond particles are needed to compensate for hydroplaning affects at high surface speed lapping. The only island type of abrasive media now available which can reduce hydroplaning is a diamond particle metal plated Flexible Diamond Products abrasive sheet supplied by the 3M Company (Minnesota Mining and Manufacturing Co.). However, due to the manufacturing process of this product, the product is commercially limited by at least two counts. First, each disk has large variations in flatness, or thickness, and due to its unique construction, cannot be made flat enough to be used effectively at high speeds where the abrasive surface unevenness is accentuated by the speed. Second, the Flexible Diamond Product abrasive sheet is constructed from plated diamonds, which have been unable to produce a smooth polished finish.

Another widely used product from 3M is the pyramid shaped Trizact abrasive, which helps with hydroplaning effects. However, it is only practical for this product to be created with inexpensive abrasive media such as aluminum oxide that tends to wear fast and unevenly across its surface. Again, this is a continuous web type of product which does to have the capability of having or maintaining precise abrasive thickness control.

Two common types of abrasive articles that have been utilized in polishing operations include bonded abrasives and coated abrasives. Bonded abrasives are formed by bonding abrasive particles together, typically by a molding process, to form a rigid abrasive article. Coated abrasives have a plurality of abrasive particles bonded to a backing by means of one or more binders. Coated abrasives utilized in polishing processes are typically in the form of circular disks, endless belts, tapes, or rolls that are provided in the form of a cassette.

Abrasive particles are resin bonded to a surface of a thin flexible backing sheet to form an abrasive article by two processes include applying loose particles by drop coating or electrostatic coating to a backing coated with resin and applying a slurry coating of particles mixed with resin. Individual abrasive particles are attached to the surface of a backing sheet with spaces between each particle to provide room between the individual particles for grinding swarf material removed from the surface of the workpiece. Although not wanting to be bound by theory, it is believed that if the space between individual particles is too small, a hard and smooth surface comprised of abrasive particle material and grinding swarf develops during grinding or lapping that acts as a bearing surface to the contacting workpiece rather than acting as an aggressive abrading surface resulting in very low grinding material removal rates. Abrasive articles made with larger particle sizes of 30 to 300 microns used for aggressive material removal are often coated with individual abrasive particles but articles coated with small 0.1 to 15 micron particles used for polishing are often coated with composite agglomerate particles comprised of small particles mixed with an erodible material including ceramic. It is desired to coat a single or mono layer of abrasive particles on a backing to best achieve a smooth surface finish and to have the best utilization of expensive abrasive material including diamond and cubic boron nitride (CBN). If a mono or single layer of 1-micron particles is coated on a backing sheet these small particles will quickly wear out during the workpiece lapping or grinding process and the abrasive sheet article is rendered useless. Also, when these small 1 micron abrasive particle, 30.5 cm (12 inch) diameter, abrasive sheet disk articles mounted on a 3,000 rpm rotating platen are used in high speed lapping it is necessary for the rotating platen to have a dynamic flatness of less than 1 micron variation across the contacting abrasive surface across in order for all of the moving abrasive particles to contact the workpiece surface. It is not practical to provide this high level of dynamic platen flatness on a lapping machine without great expenditures on the machine platen rotational spindle. The alternate method to utilize the small 0.1 to 15 micron abrasive particles for an fixed-abrasive lapping or polishing process has been to form larger composite agglomerates having a sufficient number of small abrasive particles mixed with an erodible material and to coat these agglomerates on a backing sheet. The agglomerates contain a sufficient number of abrasive particles to provide a long abrasive coated article grinding life. However, the agglomerates are typically limited in size to 45 microns. If the size of the agglomerates is excessive, then it is difficult to evenly wear down all of the abrasive across the radial width of an annular abrasive band resulting in the loss of workpiece surface flatness during the abrading process. A balance is sought in selection of the size of the agglomerate, the size range of abrasive particles contained within the agglomerate and the dynamic flatness of the platen.

Abrasive agglomerates are preferred to be spherical in shape and to be of a unifom sixe for precision lapping of workpieces. These spherical abrasive agglomerates are referred to here as abrasive beads or beads. If undersized beads are mixed with full sized beads and coated on the surface of abrasive articles, the undersized beads are often not used in the abrading process as they are too small to come into contact with a workpiece surface. This means also, that the expensive materials commonly used in including diamond particles, are wasted as they are not used. A new method is described here for the manufacture of equal sized abrasive beads that can be used for abrasive articles that prevents the non-utilization and waste of undersized beads. Further these equal sized beads have the potential to produce higher precision accuracy workpiece surfaces in flat lapping than can abrasive articles having surfaces coated with a mixture of different sized beads as the workpiece would always be in contact with the same sized beads, each having the same abrading characteristics. It is thought that small diameter beads will have different abrading characteristics, including rate of material removal, as compared to large sized beads, both at very low relative surface contact speeds of less than 1000 surface feet per minute when moving small workpieces, including fiber optic devices, relative to the abrasive article surface and also, at high flat lapping surface speeds of greater than 1000 surface feet per minute where typically, the workpiece is held in contact with a moving abrasive article. These equal sized abrasive beads can be used both for raised island abrasive articles and also, for coating the flat backing sheet surfaces of rectangular sheets of abrasive articles. Composite ceramic abrasive agglomerate beads have been produced for many years as described by Howard in U.S. Pat. No. 3,916,584 and these beads can be screened to a narrow size range before coating to effect abrading benefits including those described herein.

There are a number of factors that affect the flatness of a lapping machine platen that supports a flexible abrasive article. Prior to the lapping machine assembly, a platen plate can be lapped optically flat on the surface that is used to attach the abrasive article. If this flat platen then is mounted on the face surface of a rotatable spindle there is no assurance that the platen will have a rotational surface motion that is flat because of the non precise bottom surface of the platen plate that is in contact with the spindle mounting face. It is therefore necessary to mount the platen plate on the platen spindle mounting face and then grind or lap the platen surface to the desired flatness. Other issues are the precision quality of the spindle bearings. Different types of spindles including either a relatively inexpensive porous carbon air bearing spindle or a relatively expensive orifice type air bearing spindle can provide sufficient bearing accuracy even though some air bearing spindles have limited load force capabilities. The abrading contact forces on the platen are typically quite low during a lapping process but good dynamic balance of the platen spindle assembly is required to reduce out-of-balance centrifugal forces when the spindle is rotated at high speeds. Porous carbon air bearings can provide shaft support with almost zero friction as an air film separates the shaft from the air bearing shell housing. Precision balancing of a platen spindle shaft assembly can be quickly and easily accomplished with an inexpensive air bearing balancing apparatus. Here, a spindle shaft having an attached platen can be supported by a two widely spaced shell air bearings horizontally mounted to provide friction free rotation of the platen spindle shaft. The heavy side of the out-of-balance platen will rotate to a bottom position that will allow determination of the location and magnitude of a mass weight to be added, or removed, from the platen body to correct the unbalanced condition. This method of static balancing the platen and shaft assembly provides adequate balancing of the platen assembly to allow operation of the platen at very high rotational speeds. Non-concentric attachment of an abrasive article to a platen can cause vibration of the platen as it is rotated. Adding an unbalance to the platen by having an off-set in the concentric attachment of a flexible backing abrasive article can provide significant out-of-balance dynamic load forces to the platen when the platen shaft is mounted vertically in a lapping machine that is operated at very high rotational speeds. However, a flexible backing abrasive article is typically constructed of very thin and lightweight polymer materials and the annular band arrays of attached raised islands can be formed at a position that is precisely concentric to the circular disk backing. Some concentric offset disk mounting error is allowed when a lightweight low mass abrasive article sheet is mounted concentric to a heavy high inertia platen. If desired, a circular mounting through hole can be added at the center of a abrasive article disk backing to allow the disk to be accurately positioned on a mounting post attached to the circular center of a platen resulting in a concentric attachment of the abrasive disk to the platen. Thin, lightweight and low weight mass flexible polymer backings having a backing thickness of 0.002 to 0.005 inches (50.8 to 127 microns) can be attached to precision flatness platens that are rotated at speeds in excess of 40000 rpm due to the great abrasive article clamping forces generated by a platen vacuum chucking system having a 50 cm Hg vacuum. Precision mechanical roller bearings can be used in a spindle but the larger diameter bearings commonly used in these spindles are limited in rpm relative to the commonly used 3,000 rpm required to utilize the high surface speeds required for the best use of diamond particle abrasives. Some spindles have two or three sets of precision mechanical roller bearings mounted in series with a common pre-load force to average out the spindle deviations caused by the dimensional variations in the diameters of the individual roller balls. Frictional heating caused by these pre-load forces can limit the rotational speed capabilities of the spindles. Careful selection of the materials of construction and design of the platen spindle assembly is required to assure that weak mounting joints do not bend or warp the platen when the platen is operated at high rotational speeds. The platen may have sufficient static flatness at rest or at low speeds but may not have sufficient dynamic flatness at high speeds or after long periods of use where material creep or mechanical joint creep takes place due to dynamic structural load forces.

There are a number of suppliers that sell different grades, types and sizes of diamond particles to abrasive article manufactures. Diamond particles are produced by various methods and these particles can be sorted into specific size ranges which may include particles that range for example from 30 to 10 microns, or from 15 to 2 microns, or simply 15 micron and smaller. When composite agglomerates of diamond particles are produced, the basic component of diamond particles will include a prescribed range of particle sizes, all of which particle sizes are mixed with an erodible material including ceramics and encapsulated within a typical composite agglomerate particle. It is necessary that the size of the agglomerate particle is larger than the largest diamond, or other individual abrasive particles that are enclosed within the agglomerate. It is desired that there are many individual abrasive particles contained within a individual agglomerate to allow the erodible agglomerate surface to be eroded away by abrading contact with a workpiece to expose the sharp surface of one or more hard abrasive particles that removes material from the contact surface of the workpiece as the abrasive moves in contact with the workpiece. Further abrading action will dull the edges of the exposed individual abrasive particles contained within the structure of the agglomerate and as the erodible agglomerate material erodes away, the dull abrasive particles are ejected from the agglomerate and new sharp abrasive particles are exposed to continue the abrading action that removes material from the workpiece. Large abrasive particles abrade away more workpiece material than small particles but the large particles leave a rougher surface than small particles. Use of a wider range of different sized individual particles within an agglomerate composite structure is thought to produce a smoother workpiece surface finish than will be produced by use of a very narrow range of abrasive particle sizes contained within an agglomerate. Different methods can be utilized to produce different shapes of the agglomerate particles. These shapes include rectangular blocks, pyramids, truncated pyramids, oval, and spherical beads. In some instances, a wide variety of sizes of the agglomerates are produced in the agglomerate forming process. These agglomerates can be separated into ranges of sizes and a specified size range can be selected for a specific abrasive article. When a range of agglomerate sizes is produced by a specific process and all the agglomerates are produced from the same mixture of abrasive particles and erodible material, then the maximum size of the abrasive particles must be smaller than the size of the smallest agglomerate produced to allow the largest abrasive particles to be enclosed in the smallest agglomerates. When a range of sizes are coated in a single or mono layer on a backing sheet, the largest diameter agglomerates will have a higher abrading contact elevation from the top surface of the backing than will the smaller agglomerates.

Examples of commercially available polishing products include "IMPERIAL" Microfinishing Film (hereinafter IMFF) and "IMPERIAL" Diamond Lapping Film (hereinafter IDLF), both of which are commercially available from Minnesota Mining and Manufacturing Company (hereinafter 3M), St. Paul, Minn. The IDLF product line of abrasive articles include abrasive articles having spherical bead composite agglomerates coated on the backing film sheet has been commercially available for a number of years.

A new class of large diameter precise thickness disks that have an annular band of raised islands coated with a thin coat of diamond abrasive particles is required for high speed lapping which requires a completely different manufacturing technique than has been employed in the past by the abrasives industry. The new batch type of processing required to produce these disks must be practical and cost effective. A batch process of manufacturing a raised island disk, as a separate item, can be converted partially or wholly into a continuous production process when product sales volume demand warrants the investment in process equipment and converting technology.

High speed lapping uses expensive thin flexible abrasive coated disks that must be very precise in thickness and must also be attached to a platen that is very flat and stable. As the platen rotates very fast, this speed tends to "level" the abrasive as it is presented to the workpiece surface. As only the high spots of the abrasive contact the workpiece, the remainder of the disk abrasive is not used until the high spots wear down. Thus, it is necessary for the total system to be precisely aligned and constructed of precision components to initialize the grinding. Furthermore, the wear of the abrasive must proceed uniformly across both the surface of the sheet and the surface of each island to maintain the required flatness of both the effective abrasive surface and correspondingly, the workpiece surface. These issues have all been addressed in the configurations of a lapper machine along with the process techniques employed in operating it. The preferred shape of a raised island abrasive article is a rotational round disk with an outer annular band of raised abrasive islands that can be manufactured in batches but the same raised island flexible backing material can also be manufactured in continuous web form to create a various forms of abrasive articles including disks, rectangular sheets or endless belts. To generate even abrading wear on both the workpiece and the abrasive media with rotating abrasive disks, an annular raised abrasive is used as taught in U.S. Pat. Nos. 5,910,041; 5,967,882; 5,993,298; 6,048,254; 6,102,777; 6,120,352 and 6,149,506.

U.S. Pat. No. 2,216,728 (Benner et al.) discloses a porous composite diamond particle agglomerate granule comprised of materials including ceramics and a borosilicate glass matrix that can be fired in an oxidizing atmosphere at 600 degrees C. and then fired at 900 degrees C. in a reducing atmosphere. Diamonds are subject to oxidization at temperatures above 700 degrees C. so a non-oxidizing atmosphere is used up to 1500 degrees C.

U.S. Pat. No. 2,820,746 (Keeleric) discloses diamond abrasive particles deposited on their long ends by electrostatic deposition to a toluene thinned adhesive that is thin enough to allow electroplating of abrasive particle bonding metal in island patterns onto a coated electrically-conductive plate. In another embodiment, metal is plated through a thin wax or oil layer coated on a electrically-conductive base plate in island patterns and the electroplate formed sheet encompassing abrasive particles is peeled off the waxed conductor plate, ground flat on the surface opposed the resin attached particles and bonded to a base. Plating of abrasive particles together in a common metal layer allows the formation of a cup-wheel face-surface grinding wheel having an annular pattern of abrasive islands attached directly to the cylindrical-end flat surface of the wheel. One of the island patterns has a higher concentration of islands toward the outer annular radius to provide more abrasive at the outside radius that has a higher surface speed, and greater abrading material removal rate, than the inner annular radius. Islands are created at the intersection of curvilinear arcs drawn in different directions from a radial positioned circumferential circle. The shallow island valley passages, initially equal in height to the exposed top portions of individual abrasive particles, between island patterns provide very limited water or other coolant flow only when the passages are not eliminated as the abrasive particles are worn down by abrading action. Abrasive islands are also formed directly on the cylindrical working surface periphery of grinding wheels. Individual abrasive particles are laterally separated from adjacent abrasive particles with dissolvable salt particles to provide a particle surface density where approximately 35% of an abrasive island area is coated with abrasive particles. Also, the islands comprise approximately 50% of the abrasive article abrading surface area. The abrasive islands are not raised from the surface of the abrasive article as the abrasive particles are attached directly to the cylindrical or face surface of the solid-base abrasive articles. Abrasive particles are not attached to thin flexible backing sheets.

U.S. Pat. No. 3,423,489 (Arens, et al.) discloses a number of methods including single, parallel and concentric nozzles to encapsulate water and aqueous based liquids, including a liquid fertilizer, in a wax shell by forcing a jet stream of fill-liquid fertilizer through a body of heated molten wax. The jet stream of fertilizer is ejected on a trajectory from the molten wax area at a significant velocity into still air. The fertilizer carries an envelope of wax and the composite stream of fertilizer and wax breaks up into a string of sequential composite beads of fertilizer surrounded by a concentric shell of wax. The wax hardens to a solidified state over a free trajectory path travel distance of about 8 feet in a cooling air environment thereby forming structural spherical shapes of wax encapsulated fertilizer capsules. Surface tension forces create the spherical capsule shapes of the composite liquid entities during the time of free flight prior to solidification of the wax. The string of composite capsule beads demonstrate the Theological flow disturbance characteristics of fluid being ejected as a stream from a flow tube resulting in a periodic formation of capsules at a formulation rate frequency measured as capsules per second. Capsules range in size from 10 to 4000 microns.

U.S. Pat. No. 3,709,706 (Sowman) discloses solid and hollow ceramic microspheres having various colors that are produced by mixing a aqueous colloidal metal oxide solution, that is concentrated by vacuum drying to increase the solution viscosity, and introducing the aqueous mixture into a vessel of stirred dehydrating liquid, including alcohols and oils, to form solidified green spheres that are fired at high temperatures. Spheres range from 1 to 100 microns but most are between 30 and 60 microns. Smaller sized spheres are produced with more vigorous dehydrating liquid agitation. Another sphere forming technique is to nozzle spray a dispersion of colloidal silica, including Ludox, into a countercurrent of dry room temperature or heated air to form solidified green spherical particles.

U.S. Pat. No. 3,711,025 (Miller) discloses a centrifugal rotating atomizer spray dryer having hardened pins used to atomize and dry slurries of pulverulent solids.

U.S. Pat. No. 3,916,584 (Howard, et al.), herein incorporated by reference, discloses the encapsulation of 0.5 micron up to 25 micron diamond particle grains and other abrasive material particles in spherical erodible metal oxide composite agglomerates ranging in size from 10 to 200 microns and more. The large agglomerates do not become embedded in an abrasive article carrier backing film substrate surface as do small abrasive grain particles. In all cases, the composite bead is at least twice the size of the abrasive particles. Abrasive composite beads normally contain about 6 to 65% by volume of abrasive grains, and compositions having more than 65% abrasive particles are considered to generally have insufficient matrix material to form a strong acceptable abrasive composite granule. Abrasive composite granules containing less than 6% abrasive grains lack enough abrasive grain particles for good abrasiveness. Abrasive composite bead granules containing about 15 to 50% by volume of abrasive grain particles are preferred since they provide a good combination of abrading efficiency with reasonable cost. In the invention, hard abrasive particle grains are distributed uniformly throughout a matrix of softer microporous metal oxide (e.g., silica, alumina, titania, zirconia, zirconia-silica, magnesia, alumina-silica, alumina and boria, or boria) or mixtures thereof including alumina-boria-silica or others. Silica and boria are considered as metal oxides. The spherical composite abrasive beads are produced by mixing abrasive particles into an aqueous colloidal sol or solution of a metal oxide (or oxide precursor) and water and the resultant slurry is added to an agitated dehydrating liquid including partially water-miscible alcohols or 2-ethyl-1-hexanol or other alcohols or mixtures thereof or heated mineral oil, heated silicone oil or heated peanut oil. The slurry forms beadlike masses in the agitated drying liquid. Water is removed from the dispersed slurry and surface tension draws the slurry into spheroidal composites to form green composite abrasive granules. Other shapes than spheroidal such as ellipsoid or irregularly shaped rounded granules can be produced that also provide satisfactory abrasive granules. The green granules will vary in size; a faster stirring of the drying liquid giving smaller granules and vice versa. The resulting gelled green abrasive composite granule is in a "green" or unfired gel form. The dehydrated green composite generally comprises a metal oxide or metal oxide precursor, volatile solvent, e.g., water, alcohol, or other fugitives and about 40 to 80 weight percent equivalent solids, including both matrix and abrasive, and the solidified composites are dry in the sense that they do not stick to one another and will retain their shape. The green granules are thereafter filtered out, dried and fired at high temperatures. The firing temperatures are sufficiently high, at 600 degrees C. or less, to remove the balance of water, organic material or other fugitives from the green composites, and to calcine the composite agglomerates to form a strong, continuous, porous oxide matrix (that is, the matrix material is sintered). The resulting abrasive composite or granule has a essentially carbon-free continuous microporous matrix that partially surrounds, or otherwise retains or supports the abrasive grains. The firing temperatures are insufficiently high to cause vitrification or fusion. Vitrification of the composite agglomerate or granule is avoided as the external surface of the composite would change into a continuous glassy state, thereby preventing the composite from having a porous external surface. Having a porous surface on abrasive agglomerates allows liquid adhesive binders to penetrate the porous agglomerate surface somewhat or to better wet the agglomerate surface that tends to provide increased bonding strength when the agglomerate is attached to the surface of a backing sheet. The spherical composite matrix outer surface retains a degree of micro-porosity, as can be detected by the disappearance of the matrix when the spherical composite is filled with oil having the same refractive index as the matrix where the oil penetrates into the porous matrix. When the oil filled composite agglomerate is viewed with an optical microscope, only the diamond grains are visible and the dispersion of the diamond particles within the agglomerate can be seen. This oil-absorbing feature of the matrix spherical composite permits the incorporation of liquids including lubricants, liquid grinding aids, etc., to enhance performance of the composite in actual abrading operations. The sintering temperature of the whole spherical composite bead body is limited as certain abrasive granules including diamonds and cubic boron nitride are temperature unstable and their crystalline structure tends to convert to non-abrasive hexagonal form at temperature above 1200 degree C. to 1600 degrees C., destroying their utility. An air, oxygen or other oxidizing atmosphere may be used at temperatures up to 600 degrees C. but an inert gas atmosphere may be used for firing at temperatures higher than 600 degrees C. These abrasive composite agglomerate beads incorporate abrasive particles 25 microns and less sized particles, as abrasive particle grains 25 microns and larger can be coated on abrasive articles to form useful materials. Example 1 described a mixture of 0.5 gram of 15-micron diamond powder, 3.3. grams of 30 percent colloidal silica dispersion in water (Ludox LS) and 3 grams of distilled water that was stirred and sonically agitated to maintain a suspension. The formed agglomerates were fired, a backing sheet was coated with resin, and the abrasive agglomerates were drop coated onto the wet resin and then a resin size coat was applied to the coated agglomerates. Example 8 resulted in composite granules that ranged in diameter from 10 to 100 microns, with an average of about 50 microns and the diamond particle content was approximately 33% of the abrasive composite agglomerates. In example 6 a slurry of the average sized 50 micron abrasive agglomerates was mixed in a phenolic resin and was knife coated with a 3 mil (0.003 inch or 72 micron) knife gap setting which exceeded the size of the agglomerates. As the individual abrasive particles were smaller than the depth of the coated resin binder slurry, there is indication that enough resin binder solvent was evaporated after coating to expose a substantial portion of the individual coated abrasive agglomerates when the abrasive product was dried. When a composite bead granule was submerged in oil having a refractive index of about 1.5 under a microscope at 70-140X the oils penetration into the porous matrix was observed by visual disappearance of the silica matrix and only diamond particle grains throughout the composite bead granule were readily visible. The dispersion of the diamond particle grains throughout the bead granule was noted.

U.S. Pat. No. 3,933,679 (Weitzel et al.) discloses the formation of uniform sized ceramic microspheres having 1540 microns and smaller ideal droplet diameters. Mechanical vibrations are induced in an aqueous oxide sol-gel fluid stream to enhance fluid stream flow instabilities that occur in a coaxial capillary tube jet stream to form a stream of spherical droplets. Droplets are about twice the size of the capillary orifice tube diameter and the vibration wavelength is about three times the diameter of the tube. The spherical oxide droplets are solidified in a dehydrating gas or in a dehydrating liquid after which the solidified droplets are sintered. The spherical metal oxide particles have a very narrow size distribution. Reference is made to alternative droplet generators such as spray nozzles, spinning discs and bowls that provide feed stock dispersion at high throughput capacity but these devices produce an undesirably wide droplet size distribution. Generally this vibration enhanced spherical droplet system is effective for making larger sized spheres with the use of capillary tubes having diameters of approximately 630 microns (0.024 inches). The production of 45-micron spheres would require a capillary tube diameter of only 23 microns (0.0009 inches) that is too small for practical use in the production of significant quantities of oxide spheres. Example 2 indicated extreme accuracy in control of the sphere sizes in that 99% of the large sized 599 micron (0.024 inch) microspheres produced had sphere diameters within the relatively narrow range of 0.43 microns (0.000017 inch).

U.S. Pat. No. 4,108,576 (Lowder, et al.) discloses the metal coating of diamond particles with metal alloys that readily wet the surface of the diamond crystals particularly when used with fluxing agents. These diamond particles are brazed to a backing surface in a reducing atmosphere to enhance the flow of the brazing material. Temperatures are controlled to avoid thermal degradation of the diamond particles.

U.S. Pat. No. 4,112,631 (Howard), herein incorporated by reference, discloses the encapsulation of 0.5 micron up to 25 micron diamond particle grains and other abrasive material particles in spherical composite agglomerates ranging in size from 10 to 200 microns. Encapsulated 75 micron composite spheres are knife-coated using a knife opening of 3 mils (76 micron) on a polyester film backing with a urethane phenoxy resin thinned with methyl ethyl keytone. The coating knife gap opening disclosed is approximately equal to the size of the composite spheres.

U.S. Pat. No. 4,225,322 (Knemeyer) discloses the brazing of diamond and cubic boron nitride abrasive particles to a rigid tool substrate with heat sinking techniques to prevent temperatures from exceeding the 700 degree C. thermal degradation temperature of both of these abrasive materials.

U.S. Pat. No. 4,256,467 (Gorsuch), U.S. Pat. No. 5,318,604 (Gorsuch et al.) and U.S. Pat. No. 4,863,573 (Moore et al.) discloses abrasive articles where metal island areas are progressively built up in raised height by electroplating areas within the fiber structure of mesh cloth that is positioned in contact with an electrically insulated metal drum having arrays of exposed circular electrically conducting island-forming areas coated with wax. Abrasive particles contained in the electroplating liquid bath fall on the upper portion of the near-full-height plated metal islands during the process of depositing metal to create the islands. After the abrasive particles are metal bonded to the top surface of the islands that were formed by plating metal buildup, the island abrasive particle covered top surface curvature would tend to match the curvature of the circular drum. At completion of the plating process, the cloth encompassing the individual abrasive covered island structures is peeled from the drum surface and laid flat to be used, by further manufacturing steps, to create a variety of abrasive articles. However, the individual abrasive particles do not lie in a common flat plane. Instead, the particles are bonded on the curved surface of the raised islands, and also, are attached at many different random elevations within the upper portion of island structures. This particle out-of-flatness condition, where each particle is at a different elevation, occurs in part, because of uneven metal deposition rates that occurs over the surface of the drum at all the different island locations during the process of building-up the height of each island. Also, a random uneven particle deposition occurs over time when particles come out of solution and are deposited in the final portion of the island build-up. Further, the plating process creates nominal island height differences that vary from island to island, in part, due to the different characteristics of the individual fibers of the mesh cloth. The height thickness of each island, as measured from the surface of the plated abrasive particles to the backside of the mesh cloth, or to the island bottom, is not precisely uniform. Another thickness tolerance disadvantage of this product occurs when the plated cloth material is stripped from the electrically conductive metal base and attached with adhesive to a backing substrate sheet to form a laminated abrasive article. This laminated abrasive article does not have precise overall thickness control due to thickness variations in the island plated cloth material, in the backing sheet, and in the laminating adhesive. The product can be used to create a flat workpiece surface by grinding action but is generally not effective for creating smooth surfaces, particularly in high speed lapping. The different height locations of the abrasive particles prevent the generation of precision workpiece smooth surfaces during abrading action. However, the plated abrasive island articles can be effective in producing flat (but not smooth) workpieces. Large abrasive particles, ranging from 100 to 300 microns, are preferred for plating. Segmented island areas consisting of abrasive particles dispersed in a resin binder that is directly molded on the surface of a backing, with grooves between the thick abrasive coated areas, is disclosed but these areas are not raised island areas. In another embodiment, a metal belt, used as a flat electrical conducting surface, is joined with a open mesh continuous web within an electroplating tank and abrasive covered raised islands are electroplate formed in patterns within the fiber mesh material that is separated from the belt and cut up or laminated into abrasive articles. Diamond particles can be surface coated with metals including copper, nickel, silver, cobalt and molybdenum and they can also coated with non-metals.

U.S. Pat. No. 4,311,489 (Kressner) discloses the use of irregular-surface agglomerates of abrasive particles and a binder where the agglomerate binder is weaker than the agglomerate make-coat binder to permit gradual wearing down of the agglomerate.

U.S. Pat. No. 4,314,827 (Leitheiser, et al.) discloses processes and materials used to manufacture sintered aluminum oxide-based abrasive material having shapes including spherical shapes that are processed in an angled rotating kiln at temperatures up to 1350 degrees C. with a final high temperature zone residence time of about 1 minute.

U.S. Pat. No. 4,364,746 (Bitzer, et al.) discloses the use of composite abrasive agglomerates. Agglomerates include spherical abrasive elements. Composite agglomerates are formed by a variety of methods. Individual abrasive grains are coated with various materials including a silica ceramic that is applied by melting or sintering. Agglomerated abrasive grains are produced by processes including a fluidized spray granulator or a spray dryer or by agglomeration of an aqueous suspension or dispersion. Composite agglomerates contain between 10 and 1000 abrasive fine P 180 grade abrasive particles and agglomerates contain between 2 and 20 abrasive particles for P 36 grade abrasive.

U.S. Pat. No. 4,373,672 (Morishita, et al.) discloses a high speed air-bearing electrostatic automobile body sprayer article that produces 15 micron to 20 micron paint-drop particles by introducing a stream of a paint liquid into a segmented bore opening rotating head operating at 80,000 rpm. Comparatively, a slower like-sized ball-bearing sprayer head rotating at 20,000 rpm produces 55 micron to 65-micron diameter drops. A graph showing the relationship between the size of paint drop particles and the rotating speed of the spray head is presented. The 20 micron paint drops ejected from the sprayer head travel for some time over a distance before contacting an automotive body, during which time surface tension forces will act on the individual drops to form the drops into spherical shapes.

U.S. Pat. No. 4,421,562 (Sands) discloses microspheres formed by spraying an aqueous sodium silicate and polysalt solution with an atomizer wheel.

U.S. Pat. No. 4,541,566 (Kijima, et al.) discloses use of tapered wall pins in a centrifugal rotating head spray dryer that produces uniform 50 to 100 micron sized atomized particles using 1.0 to 4.0 specific gravity, 5 to 18,000 c.p. viscosity feed liquid when operating at 13 to 320 m/sec rotating head peripheral velocity.

U.S. Pat. No. 4,541,842 (Rostoker) discloses spherical agglomerates of encapsulated abrasive particles including 3 micron silicone carbide particles or cubic boron nitride (CBN) abrasive particles encapsulated in a porous ceramic foam bubble network having a thin-walled glass envelope. The composites are formed into spherical shapes by blending and mixing an aqueous mixture of ingredients including metal oxides, water, appropriate abrasive grits and conventional known compositions which produce spherical pellet shapes that are fired. Composite agglomerates of 250-micron size are dried and then fired at temperatures of up to 900 degrees C. or higher using a rotary kiln. Heating of the agglomerates to a temperature sufficiently high to form a glassy exterior shell surface on the agglomerates is done in a reducing atmosphere over a time period short enough to prevent thermal degradation of the abrasive particles contained within the spherical agglomerate. A vertical-shaft furnace is used to produce agglomerates as small as 20 microns.

U.S. Pat. No. 4,776,862 (Wiand) discloses diamond and cubic boron nitride abrasive particle surface metallization with various metals and also the formation of carbides on the surface of diamond particles to enhance the bonding adhesion of the particles when they are brazed to the surface of a substrate.

U.S. Pat. No. 4,918,874 (Tiefenbach) discloses a slurry mixture including 8 micron and less diamond and other abrasive particles, silica particles, glass-formers, alumina, a flux and water, drying the mixture with a 400 degree C. spray dryer to form porous greenware spherical agglomerates that are sintered. Fluxes include an alkali metal oxide, such as potassium oxide or sodium oxide, but other metal oxides, such as, for example, magnesium oxide, calcium oxide, iron oxide, etc., can also be used.

U.S. Pat. No. 4,930,266 (Calhoun, et al.) discloses the application of spherical abrasive composite agglomerates made up of fine abrasive particles in a binder in controlled dot patterns where preferably one abrasive agglomerate is deposited per target dot by use of a commercially available printing plate. Small dots of silicone rubber are created by exposing light through a half-tone screen to a photosensitive silicone rubber material coated on an aluminum sheet and the unexposed rubber is brushed off leaving small islands of silicone rubber on the aluminum. The printing plate is moved through a mechanical vibrated fluidized bed of abrasive agglomerates that are attracted to and weakly bound to the silicone rubber islands only. The plate is brought into nip-roll pressure contact with a web backing which is uniformly coated by a binder resin which was softened into a tacky state by heat thereby transferring each abrasive agglomerate particle to the web backing. Additional heat is applied to melt the binder adhesive forming a meniscus around each particle, which increases the bond strength between the particle and the backing. The resulting abrasive article has gap-spaced dots of abrasive agglomerate particles on the backing but the agglomerates are attached directly to the backing surface and are not raised away from the backing surface. Each composite abrasive agglomerate preferably is a spherical composite of a large number of abrasive grains in a binder; the agglomerates typically range in size from 25 to 100 microns and contain 4-micron abrasive particles. It is indicated that the composite abrasive agglomerate granules should be of substantially equal size, i.e., the average dimension of 90% of the composite granules should differ by less than 2:1. Abrasive grains having an average dimension of about 4 microns can be bonded together to form composite sphere granules of virtually identical diameters, preferably within a range of 25 to 100 microns. Preferably, the abrasive composite granules have equal sized diameters where substantially every granule is within 10% of the arithmetic mean diameter so that the granules protrude from the surface of the binder layer to substantially the same extent and also so the granules can be force-loaded equally upon contacting a workpiece. Granules are spherical in shape or have a shape that has approximately that same thickness in every direction. By individually positioning the equal sized granules to be spaced equally from adjacent granules, the granules each bear the same load and hence wear at substantially identical rates and tend to be equally effective. Consequently, workpieces continue to be polished uniformly. One difficulty with this abrasive product, even with abrasive composites having uniform diameters where each composite granule can be positioned to protrude to the same extent from the binder layer, the variation in the thickness in the backing thickness is not considered. If there are significant variations in the backing thickness, even equal sized individual composite abrasive agglomerates coated on a abrasive article rotating at high lapping surface speeds of 8,000 surface feet per minute will not evenly contact a workpiece surface. Eventually, the highest positioned composite abrasives will wear down and adjacent composite agglomerates will be contacted by the workpiece surface. It is necessary to control the diameter of the composite agglomerates, the thickness variation of the binder and the variation of the coated surface height of the backing, relative to the back platen mounting side of the backing, to some fraction of the diameter of the average diameter of the abrasive composites to attain effective utilization of all or most of the abrasive composite agglomerates.

U.S. Pat. No. 4,931,414 (Wood, et al.) discloses the formation of microspheres by forming a sol-gel where a colloidal dispersion, sol, aquasol or hydrosol of a metal oxide (or precursor thereof) is converted to a gel and added to a peanut oil dehydrating liquid to form stable spheriods that are fired. A layer of metal (e.g. aluminum) can be vapor-deposited on the surface of the microspheres. Various microsphere-coloring agents were disclosed.

U.S. Pat. No. 5,152,197 (Bruxvoort, et al.) discloses the use of solder or brazing alloys to bond diamond and other abrasive particles to a flexible metal or non-metal backing material.

U.S. Pat. No. 5,152,917 (Pieper, et al.) discloses a structured abrasive article containing precisely shaped abrasive composites. These abrasive composites comprise a mixture of abrasive grains and an erodible binder coated on one surface of a backing sheet forming patterned shapes including pyramid and rib shapes. The patterned shapes comprised of abrasive particles mixed with an erodible material wear down progressively during abrading use of the abrasion article. U.S. Pat. No. 5,175,133 (Smith, et al.) discloses bauxite (hydrous aluminum oxide) ceramic microspheres produced from a aqueous mixture with a spray dryer manufactured by the Niro company or by the Bowen-Stork company to produce polycrystalline bauxite microspheres. Gas suspension calciners featuring a residence time in the calcination zone estimated between one quarter to one half second where microspheres are transported by a moving stream of gas in a high volume continuous calcination process. Scanning electron microscope micrograph images of samples of the microspheres show sphericity for the full range of microspheres. The images also show a wide microsphere size range for each sample, where the largest spheres are approximately six times the size of the smallest spheres in a sample.

U.S. Pat. No. 5,190,568 (Tselesin) discloses a variety of sinusoidal and other shaped peak and valley shaped carriers that are surface coated with diamond particles to provide passageways for the removal of grinding debris. There are a number of problems inherent with this technique of forming undulating row shapes having wavelike curves that are surface coated with abrasive particles on the changing curvature of the rows. The row peaks appear to have a very substantial heights relative to the size of the particles which indicates that only a very small percentage of the particles are in simultaneous contact with a workpiece surface. One is the change in the localized grinding pressure imposed on individual particles, in Newtons per square centimeter, during the abrading wear down of the rows. At first, the unit particle pressure is highest when a workpiece first contacts only the few abrasive particles located on the top narrow surface of the row peaks. There is a greatly reduced particle unit pressure when the row peaks are worn down and substantially more abrasive particles located on the more gently sloped side walls are in contact with the workpiece. The inherent bonding weakness of abrasive particles attached to the sloping sidewalls is disclosed as is the intention for some of the lower abrasive particles, located away from the peaks, being used to structurally support the naturally weakly bonded upper particles. The material used to form the peaks is weaker or more erodible than the abrasive particles, which allows the erodible peaks to wear down, expose, and bring the work piece into contact with new abrasive particles. Uneven wear-down of the abrasive article will reduce its capability to produce precise flat surfaces on the work piece. Abrasive articles with these patterns of shallow sinusoidal shaped rounded island-like foundation ridge shapes where the ridges are formed of filler materials, with abrasive particles coated conformably to both the ridge peaks and valleys alike is described. However, the shallow ridge valleys are not necessarily oriented to provide radial direction water conduits for flushing grinding debris away from the work piece surface on a circular disk article even prior to wear-down of the ridges. Also, a substantial portion of the abrasive particles residing on the ridge valley floors remain unused as it is not practical to wear away the full height of the rounded ridges to contact these lower elevation particles.

U.S. Pat. No. 5,232,470 (Wiand) discloses raised molded protrusions of circular shapes composed of abrasive particles mixed in a thermoplastic binder attached to a circular sheet of backing.

U.S. Pat. No. 5,489,204 (Conwell, et al.) discloses a non rotating kiln apparatus useful for sintering previously prepared unsintered sol gel derived abrasive grain precursor to provide sintered abrasive grain particles ranging in size from 10 to 40 microns. Dried material is first calcined where all of the mixture volatiles and organic additives are removed from the precursor. The stationary kiln system described sinters the particles without the problems common with a rotary kiln including loosing small abrasive particles in the kiln exhaust system and the deposition on, and ultimately bonding of abrasive particles to, the kiln walls. A pusher plate advances a level mound charge quanity of unsintered abrasive grains dropped within the heated body of a fixed position kiln having a flat floor to sinter dried or calcined abrasive grains. The depth of the level mound of unsintered particles is minimized to a shallow bed height to aid in providing consistent heat transfer to individual unsintered abrasive precursor grains, and in consistently providing uniformly sintered abrasive grains. The abrasive grain precursor remains in the sintering chamber for a sufficient time to fully sinter the complete body volume of each individual particle contained in the level mound bed. The surface of each unsintered particle is heated to the temperature of the sintering apparatus in less than a 1-second time period.

U.S. Pat. No. 5,496,386 (Broberg, et al.) discloses the application of a mixture of diluent particles and also shaped abrasive particles onto a make coat of resin where the function of the diluent particles is to provide structural support for the shaped abrasive particles.

U.S. Pat. No. 5,549,961 (Haas, et al.) discloses abrasive particle composite agglomerates in the shape of pyramids and truncated pyramids that are formed into various shapes and sintered at high temperature. Numerous references are made to the deployment of individual abrasive microfinishing beads on a backing but no reference is made concerning the production of these spherical beads by the technology disclosed in this patent. Rather, the creation of composite agglomerates is focused on the production of pyramid shaped agglomerates. The breakdown of abrasive composite agglomerates is characterized in the exposed surface regions of the abrasive composite where small chunks of abrasive particles and neighboring binder material are loosened and liberated from the working surfaces of the abrasive composite, and new or fresh abrasive particles are exposed. This breakdown process continues during polishing at the newly exposed regions of the abrasive composites. During use of the abrasive article of this invention, the abrasive composite erodes gradually where worn abrasive particles are expelled at a rate sufficient to expose new abrasive particles and prevent the loose abrasive particles from creating deep and wild scratches on or gouging a workpiece surface. The composite abrasive particles including diamond contained in the agglomerates range in size from 0.1 to 500 microns but preferably, the abrasive particles have a size from 0.1 to 5 microns.

U.S. Pat. No. 5,888,548 (Wongsuragrai, et al.) discloses formation and drying of rice starches into 20 to 200 micron spherical agglomerates by mixing a slurry of rice flour with silicone dioxide and using a centrifugal spray head at elevated temperatures.

U.S. Pat. No. 5,910,471 (Christianson, et al.) and U.S. Pat. No. 5,910,471 (Christianson) disclose raised adjacent abrasive composite truncated pyramids attached to a backing sheet and that the valleys between the raised pyramids provide a means to allow fluid medium to flow freely between the abrasive composites which contributes to better cut rates and the increased flatness of the abraded workpiece surface.

U.S. Pat. No. 6,186,866 (Gagliardi) discloses the use of a backing contoured by grinding-aid containing protrusions having a variety of peak-and-valley shapes. The protrusions present grinding aid to the working surface of the abrasive article throughout the normal useful life of the abrasive article. Useful life of an abrasive article begins after the abrasive particle coating that exists on the protrusion peaks is removed, which typically occurs within the first several seconds of use. Initial use, which occurs prior to the "useful life", is defined as the first 10% of the life of the abrasive article. Protrusions contain a grinding aid, with the protrusions preferably formed from grinding aid alone, or the protrusions are a combination of grinding aid and a binder. The protrusion shapes have an apex shape that is coated with an adhesive resin and abrasive particles. The particles are drop coated or electrostatically coated onto the resin and thereby form a layer of abrasive particles conformally coated over both the peaks and valleys of the protrusion shapes. The primary objective of the protrusion shapes is to continually supply a source of grinding aid to the abrading process. There are apparent disadvantages of this product. Only a very few abrasive particles reside on the upper-most portions of the protrusion peaks and it is only these highest-positioned particles that contact a workpiece surface. The small quantity of individual particles contacting a workpiece, which are only a fraction of the total number of particles coated on the surface of the abrasive article, will be quickly worn down or become dislodged from the protrusion peaks. Particles would tend to break off from the protrusion wall surfaces, when subjected to abrading contact forces, due to the inherently weak resin particle bond support at individual particle locations on the curved protrusion walls. Abrasive particles are very weakly attached to the sloping sidewalls of the protrusions due to simple geometric considerations that makes them vulnerable to detachment. It is difficult to bond a separate abrasive particle to a wall-side with a resin adhesive binder that does not naturally flow by gravity and symmetrically surround the portion of the particle that contacts the wall surface. Abrasive particles attached to a traditional flat-surfaced abrasive backing sheet article tend to have a symmetrical meniscus of resin surrounding the base of each particle but this configuration of meniscus would not generally form around a particle attached to a near vertical protrusion side-wall. Also, the protrusion side wall is inherently weak as the protrusion body is constructed of grinding aid material. Much of the valuable superabrasive particles located in the valley areas are not utilized with this technique of particle surface conformal coating of both protrusion peaks and valleys. As the abrading action continues, with the wearing down of the erodible protrusions, more abrasive particles are available for abrading contact with a workpiece article. However, the advantage of having protrusion valleys, that are used to channel coolant fluids and swarf, disappears as the valleys cease to exist. The procedure cited for testing the protrusion contoured abrasive article cited the use of a 7 inch (17.8 cm) diameter disk operated at approximately 5,500 rpm indicating an intended high surface speed abrading operation.

U.S. Pat. No. 6,231,629 (Christianson, et al.) discloses a slurry of abrasive particles mixed in a binder and applied to a backing sheet to form truncated pyramids and rounded dome shapes of the resin based abrasive particle mixture. Fluids including water, an organic lubricant, a detergent, a coolant or combinations thereof are used in abrading which results in a finer finish on glass. Fluid flow in valleys between the pyramid tops tends to produce a better cut rate, surface finish and increased flatness during glass polishing. Presumably, these performance advantages would last until the raised composite pyramids or domes are worn away. Abrasive diamond particles either have a blocky shape or a needle like shape and may contain a surface coating of nickel, aluminum, copper, silica or an organic coating.

U.S. Pat. No. 6,217,413 (Christianson) discloses the use of phenolic or other resins where abrasive agglomerates are drop coated preferably into a monolayer. Leveling and truing out the abrading surface is performed on the abrasive article which results in a tighter tolerance during abrading.

U.S. Pat. No. 6,299,508 (Gagliardi, et al.) discloses abrasive particle coated protrusions attached to a backing sheet where the protrusions have stem web or mushroom shapes with large aspect ratios of the mushroom shape stem top surface to the stem height. A large number of abrasive particles are attached to the vertical walls of the stems compared to the number of particles attached to the stem top surface. Abrasive discs using this technology range in diameter from 50 mm (1.97 inches) to 1,000 mm (39.73 inches) and operate up to 20,000 revolution per minute. As in Gagliardi, U.S. Pat. No. 6,186,866, the abrasive article described here does not provide that the attachment positions of the individual abrasive particles are in a flat plane which is required to create an abrasive article that can be used effectively for high surface speed lapping.

U.S. Pat. No. 6,319,108 (Adefris, et al.) discloses the electroplating of composite porous ceramic abrasive composites on metal circular disks having localized island area patterns of abrasive composites that are directly attached to the flat surface of the disk. Glass-ceramic composites are the result of controlled heat-treatment. The pores in the porous ceramic matrix may be open to the external surface of the composite agglomerate or sealed. Pores in the ceramic mix are believed to aid in the controlled breakdown of the ceramic abrasive composites leading to a release of used (i.e., dull) abrasive particles from the composites. A porous ceramic matrix may be formed by techniques well known in the art, for example, by controlled firing of a ceramic matrix precursor or by the inclusion of pore forming agents, for example, glass bubbles, in the ceramic matrix precursor. Preferred ceramic matrixes comprise glasses comprising metal oxides, for example, aluminum oxide, boron oxide, silicone oxide, magnesium oxide, manganese oxide, zinc oxide, and mixtures thereof. A preferred ceramic matrix is alumina-borosilicate glass. The ceramic matrix precursor abrasive composite agglomerates are fired by heating the composites to a temperature ranging from about 600-950 degree C. At lower firing temperatures (e.g., less than about 750 degree C.) an oxidizing atmosphere may be preferred. At higher firing temperature (e.g., greater than about 750 degree C.) an inert atmosphere (e.g., nitrogen) may be preferred. Firing converts the ceramic matrix precursor into a porous ceramic matrix. An organic size coat comprising resole phenolic resin (the resole phenolic was 78% solids in water and contained 0.75-1.8% free formaldehyde and 6-8% free phenol), tap water, silane coupling agent and a wetting agent may be coated over the ceramic abrasive composites and the metal coatings on an abrasive article. Individual diamond particles contained in the composites have metal surface coatings including nickel, aluminum, copper, inorganic coatings including silica or organic coatings. Composite abrasive agglomerates sink through an electroplating solution and land on a conductive backing where they are surrounded by plated metal that bonds the agglomerates to the backing surface. A polymer size coat can be applied over the agglomerates to strengthen the bond attachment of the agglomerates to the backing. Composites may have a mixture of different sizes and shapes but there is a stated preference that the abrasive composites have the same shape and size for a given abrasive article. Diamond particles were mixed with metal oxides to form an aqueous slurry solution that was coated into cavities, solidified, removed from the cavities and at 720 degrees C.

U.S. Pat. No. 6,645,624 (Adefris, et al.) discloses the manufacturing of abrasive agglomerates by use of a high-speed rotational spray dryer to dry a sol of abrasive particles, oxides and water.

U.S. Pat. No. 6,521,004 (Culler, et al.) and U.S. Pat. No. 6,620,214 (McArdle, et al.) disclose the manufacturing of abrasive agglomerates by use of a method to force a mixture of abrasive particle through a conical perforated screen to form filaments which fall by gravity into an energy zone for curing. U.S. Pat. No. 4,773,599 (Lynch, et al.) discloses an apparatus for extruding material through a conical perforated screen. U.S. Pat. No. 4,393,021 (Eisenberg, et al.) discloses an apparatus for extruding a mix of grit materials with rollers through a sieve web to form extruded worm-like agglomerate lengths that are heated to harden them.

U.S. Pat. No. 6,371,842 (Romero) describes abrasive grinding disk articles that have an article center aperture hole and circular bands of raised islands having flat top surfaces that are adhesive coated and abrasive particles which are deposited onto the adhesive. The abrasive articles described are not suggested for nor is awareness indicated for their use in flat lapping or in flat grinding where the disks would be mounted on a flat surfaced rotary platen. Instead the articles are taught to be mounted on hand tool mandrels by the use of mechanical fasteners that penetrate an aperture hole located at the center of the circular disk. No mention or teachings are made of the art of precision flat grinding, or lapping, of flat workpiece surfaces or of using these island disks in that abrasive application area. Also, there is no mention of the precision control of the variation in the thickness of the abrasive disk articles or the use of the precision flatness grinding or lapping machines that are required to produce precise flat workpiece surfaces. There is no mention of the desirability of the existence of a mono (single) layer of coated abrasive particles; or of controlling the variation of the thickness of the abrasive article to a proportion of the diameter of the coated abrasive particles. Further, no mention is made of the problems of hydroplaning of disks or workpieces. Instead, the raised island abrasive hand tool disks taught by Romero are intended to correct a specific problem that occurs in typical non-island disk manufacturing where thick preformed disks are coated with a adhesive binder that has a tendency to form a high lip of binder coating on the disk backing outer peripheral edge after which abrasive particles are deposited on the binder raised peripheral lip. This raised elevation outer diameter raised lip that is coated with abrasive particles causes undesirable workpiece surface scratches during abrading use. The use of abrasive coated raised island structures that are attached to a backing sheet reduces the formation of the raised abrasive peripheral edge lips on manual tool grinding disk articles.

Romero does not teach the advantages or requirements of having the features of uniform flat surfaces or even "substantially planar surfaces" for: the valley areas located between the islands; the top surfaces of the islands; or the back side surface of the backing in the non-claims portion of the patent specification. There is no reference given for the use of the island type abrasive articles to be used for creating precision flat workpiece surfaces or precise smooth workpiece surfaces as in a flat-lapping operation. Flat lapping requires extremely flat abrasive disk machine tool platens and the abrasive disk article also must be precisely flat and of uniform thickness to enable all of the coated abrasive particles to be utilized. Further, there is no mention of the advantages of arranging the raised islands in an annular array having a narrow outer radius annular band width of abrasive to avoid having the slow moving abrasive surfaces that are located at the inner diameter area of a disk, to be in contact with a workpiece surface. Uneven wear occurs across the surface of a workpiece when the workpiece is in contact with an abrasive article abrading surface that has both fast and slow surface speeds.

His abrasive disks have significant amounts of fibers and other fillers imbedded in the disk backing which tends to produce a disk of limited thickness uniformity. The preferred embodiment of Romeo is a thick fiber filled disk having integral raised islands that is constructed by: molding a flat disk with integral raised islands; or adhesively bonding island shapes cut out from sheet material to a backing disk; or embossing island shapes into the surface of a flat backing disk sheet. None of these three raised island disk manufacturing techniques would be expected to produce islands having precisely flat surfaces where the island height variations, as measured from the backside of the backing, is within the 0.0001 to 0.0003 inch (0.003 to 0.008 mm) tolerance that is typically required for 8,000 or more SFPM high speed platen flat lapping. The Romero disks are intended for use with manual grinding tools where the amount of workpiece material removal is of primary concern, rather than controlling the flatness of the workpiece. This type of grinding disk generally would have large sized abrasive particles that are not suitable for polishing or lapping operations. The described abrasive disk is frictionally mounted to a flexible backup pad that is attached to a mandrel with a disk-center screw-cap that penetrates the disk-center aperture hole and squeezes the disk against the flexible and conformable metal or polymer backup pad. The screw-cap mounting forces result in significant and uneven distortions of both the abrasive disk sheet and the backup pad prior to the moving abrasive contacting a workpiece. Romero does not teach the use of a circular disk backing that does not have a center hole aperture in the non-claims portion of the patent specification. He describes raised island abrasive substrate sheets having rectangle, square, hexagon, octagon and oval shapes. However, these non-circular shapes are intended to also be used with sheet center aperture holes, the same as for circular disks, to allow multiple layers of these non-circular abrasive sheets to be mounted on a mandrel. He incorporates by reference U.S. Pat. No. 5,142,829 (Germain) which describes a variety of these same types of non-circular abrasive sheet shapes, all having center aperture holes, where the holes allow them to be progressively stacked on a mandrel for use as a flapper abrasive portable manual tool. There is no mention of flat sheets, long strips or belts of abrasive coated raised island articles that do not have a disk-center aperture hole or where these disks would be used for non-manual tool abrading purposes. The only described disk articles are those that have disk-center aperture holes that are used exclusively on portable tool mandrels. The method described by Romero for coating the abrasive disk with abrasive particles is to first coat the island top surfaces with a make coat of binder, deposit loose abrasive particles on the make coat and then add a size coat of binder after which the binders are cured. Coating the island top surfaces with a abrasive slurry is not taught.

Romero does not teach the hydroplaning of workpieces surfaces when lapping at very high surface speeds. Hydroplaning would not be an issue when using a abrasive disk on a mandrel tool device as the abrasive article would have a line-shaped area of contact with a workpiece surface due to the abrasive article out-of-plane distortion by the tool operator. A water boundary layer does not build up in thickness and create hydroplaning for line-contact abrading surfaces because there is not enough distance for the water film to increase in thickness across the short distance of the line width. Also, there is a very high localized area of contact pressure at the abrading contact line area due to the large applied pressure that is distributed over a very small area. This high contact line-area pressure tends to prevent the boundary layer thickness buildup of coolant water. In the instance of flat lapping, the abrasive contacts the workpiece with a very low contact force across a full surface area that is typically as wide as the width of the workpiece. Due to the low contact force and large contact area, the water boundary layer can build up in substantial thickness across the relatively long distance that extends across the full length of the mutual abrading contact area. In this way, hydroplaning, where a portion of the workpiece is lifted from the abrasive surface by the depth or thickness of the water boundary layer, does not tend to occur for mandrel-and-pad type of manual tool abrading but is difficult to avoid for machine tool flat lapping.

Island types of abrasive articles used for precision flat grinding or lapping are primarily suited for use with rotating flat platen surfaces. The localized individual island sites are structurally stiff due to their increased thickness as compared to the thickness of the adjacent thin backing sheet. The flexural stiffness of the island areas is a function of the total island material thickness cubed, which means a relatively small change in the backing sheet material thickness at the location of a raised elevation island can change the localized stiffness of the island area by a very large amount. These abrasive coated stiff islands will not easily conform to a curved surface. Stiff raised large diameter islands that have a thin flat top surface coating of abrasive material will only be contacted by a workpiece at the central portion of the island abrasive when contacting a convex workpiece. Only the abrasive outer island peripheral edges of a stiff island would be contacted for a concave workpiece. In either case, abrading action results in uneven wear of both the island coated abrasive and of the workpiece surface. In a like manner, raised island abrasive disk articles having stiff islands that have their flat disk-plane surface distorted by manual pressure when contacting a flat workpiece will only be effective in uniform material removal if the island dimensions are very small, in particularly the tangential direction. Here, small islands can lay flat to a workpiece but only if the adjacent disk backing material that is located next to the islands is flexible enough to allow the island to bend enough to compensate for the disk out-of-plane distortion created by the abrasive tool operator. Even if the backing is flexible, the backing pad would tend to prevent this conforming action. Stiff and thick backings are generally used with manual abrasive disk articles as thin backings are too fragile for this type of abrading usage. Manual pressure will distort the disk plane in both a radial and tangential direction. This abrasive sheet distortion would prevent the production of a precision flat workpiece surface with this manual apparatus and abrasive article. Flexible sheets of a non-island uniform coated abrasive article having a thin backing will conform to a flat rigid platen which provides a natural flat abrading surface for the whole surface of the abrasive sheet. Likewise, a thin backing sheet or disk having integral raised islands will likewise conform to the flat platen surface where each of the individual islands will be presented with a flat island top surface that is mutually flat to the workpiece surface. Flexible abrasive sheets or disks having raised islands mounted on flat platens can be used effectively for the flat grinding and smooth lapping of a flat workpiece surfaces. The Romero described abrasive disks as used with conformable screw-cap mandrel pads are not practical for use for precision flat grinding. Conformable pad mandrels are generally used on portable grinding tools that are held with large (6 kilogram or 13 lbs) manual contact forces against a workpiece which deforms the flexible abrasive disk supporting pad to allow an area of the thick and stiff abrasive disk to be in flat contact with a workpiece surface. The whole large contact force tends to be concentrated at the typical small line-type contact area that exists between the abrasive and the workpiece surfaces. The manual abrasive grinding operator typically moves the disk with a random oscillation-type orientation motion relative to the surface of the workpiece. In the comparative case of a flat lapping machine, a low contact force of 1 to 2 lbs (0.5 to 1 kg) is spread evenly over large surface areas of a workpiece that is supported by a workpiece holder spindle. The workpiece spindle of a flat lapping machine is typically orientated perpendicular to the surface of an abrasive disk that is flat mounted to a rigid platen. A manual abrasive disk tool is typically oriented at a significant angle to the workpiece surface. Very low stresses are induced within the thin and weak abrasive backing sheet used in flat lapping because the relatively large mutual flat workpiece and abrasive contact surface areas do not create localized areas of abrading contact forces. Thin backings as used with the manual tool grinding pad disks is stated by Romero to be a problem as this fragile type of disk easily rips and tears and can crease and pucker the disk article.

U.S. Pat. No. 4,272,926 (Tamulevich) describes the use of a abrasive coated sheet to polish the face end of a fiber optic connector where the fiber optic is positioned precisely perpendicular to the abrasive sheet mounted on a flat platen and the connector is moved relative to the sheet to produce a precisely flat and smooth facet. This same type of abrading process may be used to polish other components used with fiber optic systems.

U.S. Pat. No. 4,341,439 (Hodge) describes the use of abrasive to polish the face end of a fiber optic connector to produce a precisely flat and smooth face on the fibers U.S. Pat. No. 6,277,160 (Stubbs, et al.) discloses regions of abrasive that is directly coated on a backing where the regions form abrasive island areas that have abrasive free borders. He also describes coating more than one different abrasive coated on an abrasive article.

Abrasive products using small abrasive particles encapsulated in composite erodible spherical agglomerates or abrasive beads have been sold for a number of years. The 3M Superabrasives and Microfinishing Systems, 3M Abrasive Systems Division Product Guide (copyright) 3M 1994 60-4400-4692-2 (104.3) JR describes diamond particle spherical ceramic bead shaped agglomerates coated on flexible backing. The 3M Imperial™ Diamond Lapping Film, Type B is described as "diamond particles are contained in ceramic beads which makes this product more aggressive than the standard product. Grade for grade a Type B product will yield more cut, longer life, and a coarser finish. Recommended for extremely hard materials and larger parts." Different ceramic bead lapping films are listed in the 1994 3M Abrasives Product Guide including: the 3M Product I.D. Number 3M 662X, Imperial Diamond Lapping Film—Type B has a 3 mil. backing; and the 3M 666X, Imperial Diamond Lapping Film—Type B PSA has a PSA (5 mil.) backing. The 3M 1994 Product Guide also lists a number of different Micron Grade particle sizes for various ceramic bead lapping films along with their individual identifying product color codes including: 0.5 micron type B (Off White); 1 micron type B (Lavender); 3 micron type B (Pink); 6 micron type B (Brown); 9 micron type B (Blue); and 30 micron type B (Green). Microscopic examination of the Type B Lapping film abrasive articles reveals a number of product characteristics of the abrasive media.

Examination of samples of the product described in this 3M Product Guide reveals much useful information related to this invention. The examined abrasive articles were used to abrade a workpiece on a experimental Keltech designed lapping machine having a raised annular land area on the platen to which the 12 inch (304 mm) diameter disks were mounted with a vacuum attachment system. Each of the subject Imperial Diamond Lapping Film disks had been subjected to 2000 to 3000 rpm rotational abrading wear on an raised precision flatness annular area of the platen extending from 8.375 inch (21.3 cm) inside diameter to 11.0 inch (27.9 cm) outside diameter. Wear of the abrasive disk article was concentrated on the annular band surface of the disk that corresponded in location to the raised annular band surface area of the platen with little or no abrading wear occurring in the central disk area extending out to 8.375 inches (21.3 cm) diameter. Visual and microscopic examination of the 3-micron disk indicated that each spherical abrasive particle agglomerate coated on the 3-micron abrasive article has a pink color that results in a overall pink coloration of the abrasive disk. The 3-micron abrasive particles are contained in spherical beads that range in size from approximately 45 microns to 15 microns. Approximately 30% of the beads were about 45 micron in size, approximately 30% were about 30 micron and approximately 30% were about 15 micron. Substantial numbers of 30 micron to 15 micron beads were resin bonded sparsely adjacent to the large 45-micron beads. Each size of the spherical bead agglomerates exhibited the same pink color, indicating the full range of sizes of beads was manufactured by the same bead forming process. Also, there were occasional scattered approximate 10 to 15 micron shiny light-reflective beads having an intense red hue color that were resin bonded to the backing. A significant number of 15-micron abrasive beads were submerged in the solidified resin. The worn annular portions of the abrasive disk article could be compared to the adjacent unworn disk portions that were located at the inner radius portion of the same disk. The larger diameter beads were approximately half worn away but the adjacent smaller diameter beads were untouched. There were large gap openings between adjacent abrasive beads of all sizes and some beads were positioned in adjacent contact with other beads. The gap openings between individual large beads were substantially greater than the average gap between smaller beads. Full-sized beads made up less than 20% of the total quantity of beads. Some of the large full-sized beads were oblong or had a joined double-bead configuration where the internal erodible matrix was common to both of the original spherical bead shapes. The large beads were approximately half worn away that revealed the basic structure of the individual beads. Individual diamond abrasive particles imbedded in a (presumably porous ceramic) matrix were exposed within the confines of the open semi-hemispherical shaped worn abrasive beads. Individual abrasive beads exhibited a light-reflective glassy exterior surface. Most of the worn large beads had a distinct thin white-appearing exterior shell that surrounded the opaque interior in which individual abrasive particles were imbedded. The thin white exterior shell thickness was less than 5% of the diameter of the overall bead body. The exterior thin shell was worn down evenly with the worn body of the interior portion of the bead.

SUMMARY OF THE INVENTION

Lapper Process and Apparatus

Lapping or grinding with abrasives fixed to the flat surfaces of raised island structures attached to a flexible sheet is performed at high surface speeds of at least 5,000, at least 7,500 and preferably about or at least 10,000 or more surface feet per minute (1,517; 2,228; and 3,048 meters per minute, respectively), desirably with the use of water-like lubricants to cool the workpiece and to carry away grinding swarf. A workpiece can be held rigidly or flexibly by many different types of supports, including, by way of non-limiting examples, a rotating spindle platen to effect grinding contact with a rotating abrasive platen. Hydroplaning of the workpiece on water lubricated abrasive is minimized when using abrasive covered flat surfaced raised island sheets. Hydroplaning tends to be severe for uniformly coated abrasive non-raised island disks that have historically been used for smooth polishing or lapping operations. Cone shaped workpiece surfaces are caused by hydroplaning, even when flat-coated abrasive sheets are mounted on rotary platens having raised annular bands, to concentrate all of the abrading action within a narrow radial width annular band. The cone-shape results in too sharp grinding surfaces, too rapid wear, and greatly different wear in various areas. The abrasive platen must be ground very flat and the abrasive disk sheet must be precise in thickness to be used effectively at high speeds.

Abrasive disks of large 18 inch (0.457 m), 24 inch (0.609 m), 36 inch (0.914), 48 inch (1.22 m), 60 inch (1.5 m) or even 72 inch (1.8 m) diameters, having an outer annular band of raised islands which have a thin precise coating of diamond particles, can be produced inexpensively with very precise thickness control. Also, abrasive disks having small diameters of less than 0.75 inches (19.1 mm) may also have an outer band of raised islands. Very large disks can be used at slower rotational speeds and very small disks are operated at high speeds to generate the same linear speed where grinding is desired to be performed, and in both cases, a relatively high surface speed is reached. It is preferred that the inner radius of the raised annular band is greater than 20% and more preferred that the inner radius is greater than 30% of the outer annular band radius. Island shapes are preferred that have top surface area lengths measured in a tangential direction of from 0.010 to 0.375 inches (0.25 to 9.5 mm). Raised island foundation bases can be deposited on a backing by a variety of means on a variety of commonly available thin flexible plastic, polymer or metal backing materials. These island foundation base plateau surfaces are preferred to be machined or ground after attachment to the backing to establish a precisely controlled thickness relative to the bottom surface of the disk backing material. It is not critical that the absolute sheet thickness, relative to the bottom surface of the disk backing, is precisely controlled. Rather, it is only important that the heights of the top surfaces of all the islands have the same elevation after they are deposited on the backing. Individual diamonds or other abrasive particles, including composite structured agglomerates, can be metal plated or organic resin binder coated as a single mono layer on the top surface of the islands. Abrasive particles can be slurry resin coated; or drop coated (e.g., similar to shaking salt from a salt shaker), gravure coated, spray coated, or electrostatically deposited onto a wet organic resin island surface coating. Resin coatings are based on a variety of organic resins including phenolics and epoxies that have been used traditionally in the abrasive industry for many years. A make-binder resin coating can be applied to an island foundation top surface, abrasive particle powder applied, a partial or full resin cure effected, a resin size coat applied and then a full resin cure effected by heat or other energy sources. These abrasive disks typically would be produced by a batch process, but a more traditional continuous web process can also be used. The web process technology can be used to create abrasive particle coated raised islands in rectangular or annular band array patterns by a number of different techniques. Raised islands can be cast on the surface of a flexible web, islands can be machined or etched into the web surface, or islands can be formed with the use of spherical beads where the height of the island is equal to the diameter of the beads. Abrasive particles can then be resin coated, electroplate-bonded or braze-bonded to the island surfaces and reinforcing size coats of resin can be applied to structurally reinforce the bond of the individual abrasive particles to the backing. The abrasive web material can be converted to form annular disks or rectangular sheets or continuous belts or other abrasive articles such as daisy wheels. A wide range of abrasive articles produced with small sized abrasive particles that are formed into disk sheets or belts can be used for lapping. Articles with large sized or coarse particles can be used for grinding. All the abrasive articles can be used at high surface speeds, which fully utilize the increased abrading material removal rates which occur at high speeds, particularly with diamond particles.

A number of techniques are described to establish a uniform thickness of a make-coat composition of binder to the top surface of island foundations which have been previously ground to a very precise height as measured from the bottom side of a backing material. One method to produce this make-coat is to first spin coat a layer of binder resin onto a flexible sheet of backing and then to press this layer of binder wetted coating onto the top surface of an annular array of raised islands attached to a round backing. Approximately one half of the spin-coated binder is transfer coated to the island top surfaces when the spin-coated transfer sheet is separated from the island sheet. Many other coating devices including hand spread notch bar coaters, knurl roll coaters, roll coaters, extruders, curtain coaters, gravure coaters, and reverse-roll coaters can be used to apply resin to continuous web sheet material that can be used to transfer-coat a layer of resin onto the top surface of raised island structures. Abrasive particles can be applied to the coated surface by any convenient process including by way of non-limiting examples drop coated or electrostatic coated onto the binder-wetted surface of the islands and then the binder can be partially or fully cured. Make coats of resin may be wet through the full thickness of the resin coat or only the top surface of a solidified partially cured resin coat may be changed to a wet surface condition by the application of heat or by other means prior to the application of abrasive particles. Subsequently, other size coats of resin binders can be applied to the island sheet, optionally coating either the island tops only, or covering both the island tops and the island valleys. Other coatings can be applied optionally by various printing techniques directly on the surface of the islands, for the make coat, for the size coat and for other coatings. Printing apparatus devices include: metal printing plates, print transfer blankets, rubber or polymer flexographic plates and print screen masks. A variety of techniques are described which control the application of the abrasive particles to achieve a uniform density of particles on the surface of the islands where there is no more than 65% of a given island flat area that is covered by abrasive particles, with the surface viewed from a vertical perspective and areas of the surface that are not visibly blocked by particles are uncovered areas (e.g., at least 35% of the vertically viewed area is uncovered). Furthermore, the resultant layer of particles is controlled to minimize the occurrence of more than a single (mono) layer of particles on an island surface. The resultant sheet or disk form of abrasive article has a single layer of abrasive particles bonded to island surfaces where the variation of height, measured from the backside of the abrasive particle backing, of adjacent particles on islands is preferred to be less than one half the average diameter of the particle. One objective in the use of a single layer of abrasive particles is to utilize a high fraction of the expensive particles, particularly for the two super abrasives, diamond and cubic boron nitride (CBN). Another objective is to minimize the dimensional change in the flatness of the abrasive article due to wear-down. A preferred abrasive particle size is from 30 to 45 microns that is from 0.0012 to 0.0018 inches. When the abrasive particles are fully worn away, the abrasive surface of the islands has therefore only changed by approximately 0.001 inch (25.4 microns). A number of the commercial abrasive articles presently available are coated with erodible composite agglomerate shapes including beads or spheres, pyramids, truncated pyramids, broken particle and other agglomerate shapes which have nominal effective diameters of two to ten times, or more, of the individual abrasive particles contained in the agglomerate body shapes. Large agglomerates can wear unevenly across the abrasive article surface due to abrading contact with workpiece articles due to a number of factors. If the abrading contact size of the workpiece is smaller than an abrasive disk article surface and is held stationary, a wear track will occur where the workpiece contacts the abrasive. Also, there often is an increased abrasive wear-down at the outer diameter of an abrasive disk article, having high surface speeds, and decreased wear-down at the inside diameter having slower surface speeds. When the agglomerate wears down unevenly on a portion of its surface and this uneven abrasive surface is presented to a new workpiece article, the new workpiece tends to wear unevenly. Uneven wear of a workpiece article reduces the capability of a lapping process to quickly and economically create flat surfaces on a sequence of workpieces. However, the workpieces may be smoothly polished due to the characteristics of the fine abrasive particles embedded in the erodible agglomerates even though the workpieces are not flat.

It is preferred that a single or monolayer of individual abrasive particles, such as natural or man-made diamond particles or composite particles, be coated on abrasive island tops. However, a single or mono layer of erodible agglomerates made up of smaller abrasive particles can also be used on top of the abrasive islands. It is preferred that each of the island foundations are high enough from the surface of the abrasive article backing that cooling water and generated grinding swarf can freely travel down the valleys between the island tops. A radial orientation of the long dimension of non circular raised islands allows the best water flow for an abrasive disk article. The radial flow of water and debris swarf is created by the centrifugal forces generated by rotation of the abrasive sheet. The spent coolant water exits the active grinding surface area of the disk while fresh clean water is supplied continuously over the whole time of the grinding event. A wide range of abrasive particles can be used to coat raised islands and to be encapsulated within the spherical composite abrasive beads disclosed here. These abrasives include diamond, cubic boron nitride, fused aluminum oxide, ceramic aluminum oxide, heated treated oxide, silicone carbide, boron carbide, alumina zirconia, iron oxide, ceria, garnet, and mixtures thereof.

A method to produce equal sized spherical agglomerates from ceramic materials is described. These spheres can contain abrasive particles that can be coated on the surface of a backing to produce an abrasive article. The spheres can contain other particles or simply consist of ceramic or other materials. After solidifying the spherical agglomerates in heated air or a dehydrating liquid by techniques well know in the art, the spherical particles are fired at high temperatures to create spherical beads having abrasive particles distributed in a erodible porous ceramic material, again by well known techniques. Equal sized abrasive beads have many abrading advantages over the beads presently used in abrading articles. A primary advantage is that all of the expensive diamond or other abrasive material is fully utilized with equal sized beads coated on an article in the abrading process compared to present articles where a large percentage of the undersized beads do not contact a workpiece.

BRIEF DESCRIPTION OF THE DRAWINGS

FIGS. 23 and 23A are cross-section views of a thin backing with island flex distances.

FIGS. 60A, B, C and D are cross-section views of worn spherical abrasive agglomerates.

FIGS. 65 and 65A are cross-section views of a platen raised island surface grinding.

FIG. 90 is a cross-sectional view of injection molded island structures.

FIG. 91 is a cross-sectional view of a molded island section of a backing sheet.

FIG. 92 is a cross-sectional view of a trimmed backing with molded island structures.

FIG. 107 is a top view of spaced abrasive beads deposited on a backing.

DETAILED DESCRIPTION OF THE INVENTION

Figure 1:
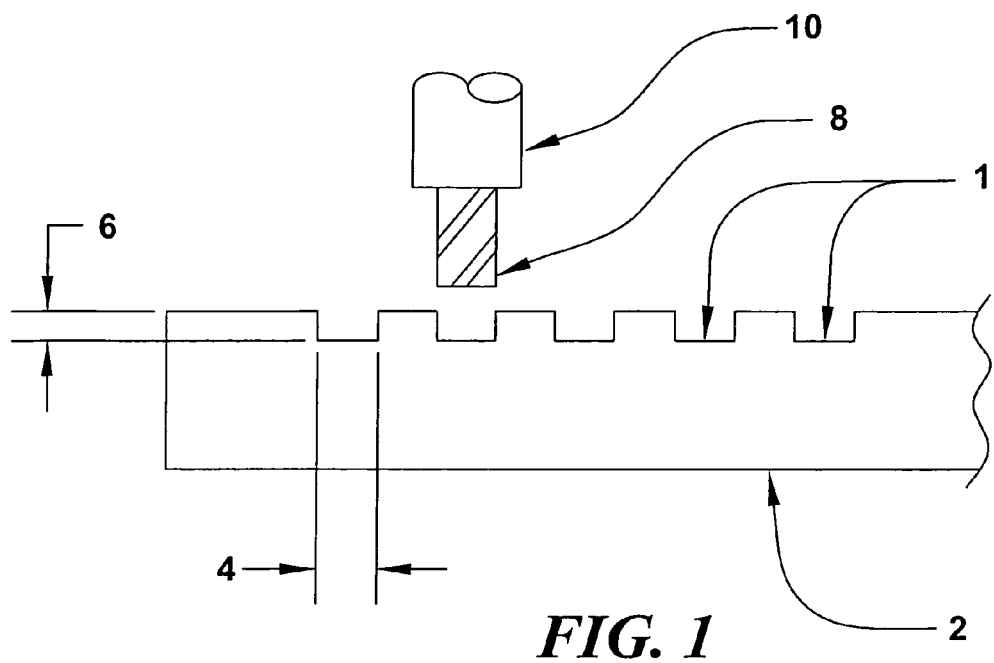
FIG. 1 is a cross-section view of a machined island mold plate.

Apparatus, abrasive sheets and methods are needed for super high speed lapping at greater than 500 surface meters per minute and even speeds of 3,000 or 5,000 or greater surface meters per minute with abrasive sheets of 0.75 inch (1.9 cm), 12 inch (0.31 m), 18 inch (0.46 m), 24 inch (0.61 m), 36 inch (0.91 m), 48 inch (1.2 m), 60 inch (1.5 m) and 72.0 inch (1.8 m) in diameter. The abrasive article backing sheets made of polymer or metal have a thickness range of from 0.0015 inches to 0.015 (0.038 to 0.38 mm) inches and also up to 0.250 inches (6.4 mm). An abrasive article disk sheet having a annular band coating of abrasive particles coated directly on its surface or a disk sheet article having an annular band of abrasive coated raised islands is preferred to have an inner annular radius of the coated annular band that is greater than 30% of the outer abrasive coated annular band radius. The inner radius of the abrasive annular band may, by way of non-limiting examples, have a radius that ranges from less than 1% to less than 85% or less than 90% of the outer radius to allow the construction of very wide to very narrow width annular bands of abrasive coating on the disk surface. Abrasive articles having an annular band of abrasive particles or agglomerates coated directly on the surface of the disk backing sheet or abrasive articles having an annular band of abrasive particles or agglomerates coated on raised islands attached to a disk backing sheet can have a abrasive-free or an raised-island-free outer gap border located between the outer radius of the annular band and the abrasive disk backing sheet outside diameter. The radial width of the abrasive-free or island-free border gap can range from 0.2 to 10.0% of the abrasive disk article outside diameter. The abrasive-free or island-free outer border would typically be a minimum of 0.010 inches (0.25 mm) but can exceed 0.5 inches (12.5 mm), or more for large diameter disk articles. Abrasive particles or abrasive agglomerates can range in size from less than 0.1 micron to greater than 400 microns. In the abrasive agglomerates, hard abrasive particle grains are distributed uniformly throughout a matrix of erodible material including softer microporous metal or non-metal oxides (e.g., silica, alumina, titania, zirconia-silica, magnesia, alumina-silica, alumina and boria or boria) or mixtures thereof including silica-alumina-boria or others. Agglomerates can be manufactured using both ceramic and non-ceramic materials by creating solidified large sized shapes or solidified sheet layers comprised of abrasive particles in an erodible matrix material where the solidified composite shapes or sheet material is broken into small agglomerate particle block shapes or into small irregular broken-particle shapes, both of which can be coated on an abrasive sheet article. Near-spherical composite abrasive shapes can be produced by creating agglomerates of an water based abrasive slurry that are dried when free-span travelling in heated air or in a dehydrating liquid during which time surface tension forces tend to produce near-spherical shapes prior to solidification of the agglomerates. A desirable size of agglomerates having 10 micron or less abrasive particles is 30 to 45 microns or less and a desirable size of agglomerates having 25 micron or less abrasive particles is 75 microns or less.

The present invention may be further understood by consideration of the figures and the following description thereof.

The materials and process of the present invention may be used, by way of non-limiting example, in the various combinations as there are a variety of methods that could be used to create the desirable "island-like" coating patterns on abrasive disk products that are described here.

Island Shape Backing Mold Plate

Problem: It is desired to mold or cast polymer raised island shapes onto the surface of a flexible disk backing where the precisely shaped islands are attached to the backing with a strong bond. Raised islands may be in an annular array pattern on an individual circular disk backing sheet or rectangular island arrays may be attached to continuous webs and converted into individual raised island sheet articles.

Solution: A plastic or metal mold plate can be machined with an array of raised island shapes on the plate surface where the island shapes are arranged in an annular band pattern positioned at the outer diameter of a circular mold plate. If the mold plate is constructed of metal or other rigid material, including a polymer or inorganic material, a mold release agent including silicone oil can be sprayed onto the surface of the island cavities to prevent the polymer island-shape material from adhering to the mold plate. The use of mold release agent coatings can be eliminated or reduced by selection of mold plate materials such as ultra-high molecular weight (UHMW) polyethylene, teflon® fluoropolymers, nylon and other materials that have a natural adhesive release characteristic. A polyethylene mold plate can be fastened to a milling machine table bed and patterns of island cavity shapes can be machined into the surface of the mold plate with the use of end-mill cutters. The island cavities have the reverse image shape of the raised islands. Then the machined mold plate can be removed from the milling machine, the cavities can be filled with an liquid island foundation polymer including an epoxy, or a phenolic resin and a flexible backing sheet can be placed in flat contact with the liquid polymer and the polymer is solidified. When the flexible sheet is separated from the mold plate, the raised island shapes are integrally bonded to the flexible backing. Rectangular abrasive sheet articles can be formed by the same process. Continuous webs having patterns of raised islands can be formed by use of a nipped roll set where one of the nip rolls has island cavities on its surface. The mold cavities may have tapered angled walls or rounded or chamfered edges to aid in separation of the formed islands from the island cavities. FIG. 1 is a cross-section view of a machined island cavity mold plate. Island cavities 1 are machined into an island mold plate 2 using an end mill cutter 8 mounted in a milling machine tool head 10. The island cavities have a defined width 4 and cavity depth 6.

Abrasive Particle Uniform Disk Deposition

Problem: It is important that each individual abrasive annular band abrasive article have a consistent controlled quantity of abrasive particles and that the particles have a sparse surface distribution having significant gap spaces between individual particles to provide effective abrading action of the abrasive article.

Figure 2:
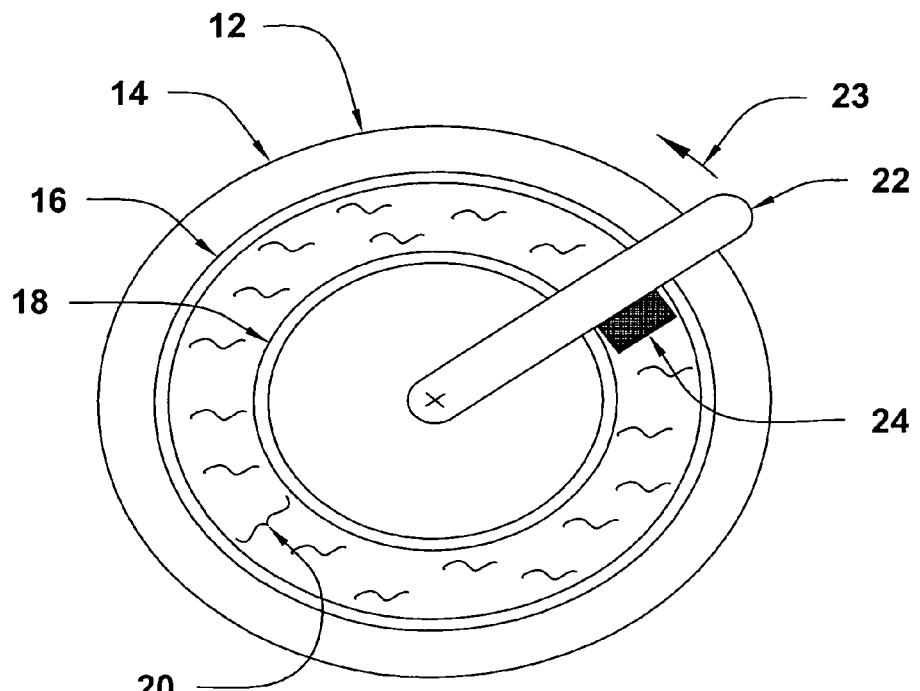
FIG. 2 is a top view of an annular trench abrasive particle deposition system.
Figure 3:
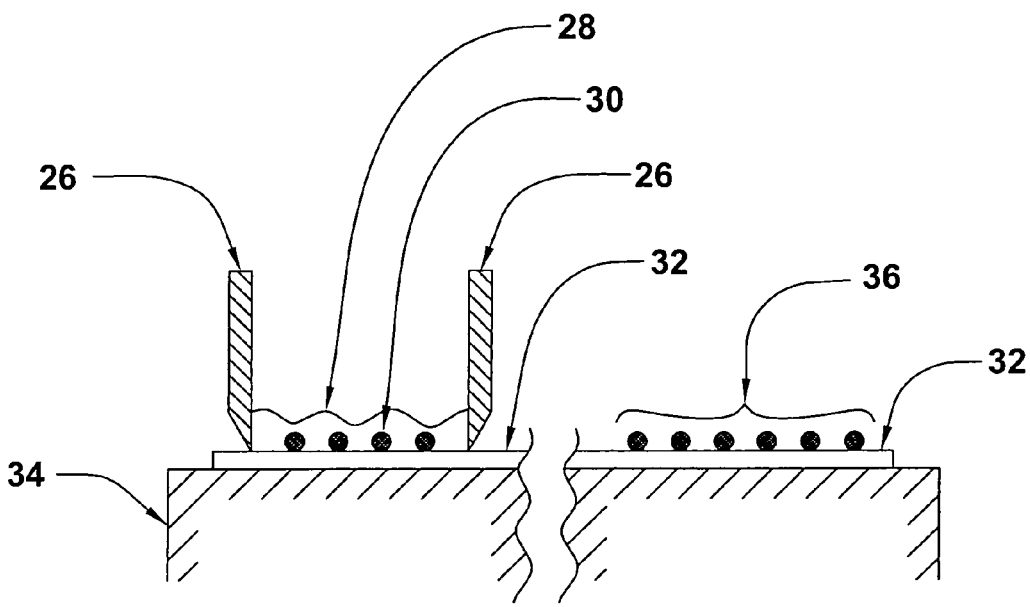
FIG. 3 is a cross-sectional view of a trench abrasive particle deposition system.

Solution: An annular trench with removable electrically insulated knife-edge polymer or metal circular walls can be used to direct the deposition of abrasive particles, mixed in a solvent solution, to an annular track area on a particle transfer sheet or onto a solid polymer or a solid metal base. The transfer sheet or the solid base may be provided with a rough surface by scrubbing or sandblasting the surface; or, a surface micro-patterned silicone rubber printing plate may be used to enhance the even distribution of the particles. An electrostatic spray device (such as described in Morishita et al in U.S. Pat. No. 4,373,672) can be used to spray the abrasive particle solution on to the trench floor. Solvents include water, alcohol, methyl ethyl keytone (MEK), toluene and others and mixtures thereof. A peristaltic pump can be used to apply a stream of the solvent particle mixture to the trench floor by use of a rotating arm to move the solvent stream tangentially around the trench. The rotating arm may have a doctor blade or a fibrous paint brush or other device that can be used to spread the particle solution across the surface of the trench floor to achieve a monolayer of particles on the surface floor of the annular trench with a uniform gap spacing between adjacent abrasive particles. The abrasive particles or composite abrasive agglomerates having gap spaces between adjacent particles cover from 5% to 60% of the annular band floor surface area. Depositing a wet solution of abrasive particles and a solvent on a flat trench surface will tend to distribute the particles with gap spaces between adjacent particles. After the solvent is evaporated, the two knife-edged trench walls can be removed leaving an annular band of abrasive particles on the trench floor area. These deposited particles tend to be loosely attached to a polymer or metal transfer sheet or to a thin plate or to a thick solid plate. Particles deposited in the annular band area are then transferred to the resin wetted surfaces of raised islands attached to a backing sheet where the raised islands have an annular band pattern that has the same annular band inner and outer radius as the loose particles residing on the transfer sheet. When resin wetted island surfaces are brought into firm contact with the loose dry particles on the transfer sheet, the particles become bonded to the resin island surfaces. Excess loose particles, located principally in the areas between the islands, are collected and reused. Each batch mixture of a of measured quantity of particles is used for each disk article to assure that a controlled quantity of particles is deposited on each transfer sheet or solid base article. FIG. 2 is a top view of a transfer sheet backing disk 14 attached to a base plate 12 where an annular trench area 20 is formed by an outer wall 16 and an inner wall 18. A rotating arm 22 moving in the direction 23 has a abrasive particle liquid solution dispersing and smoothing head 24 having elements including one or a combination of: a spray head, a doctor blade, a paint brush and an electrostatic abrasive particle dispersing head. FIG. 3 is a cross-section view of an abrasive particle and solvent mixture of particles 30 and a solvent 28 coated between circular knife edge walls 26 held in direct contact with a backing sheet 32 attached to the base plate 34. After evaporation of the solvent 28, the dry abrasive particles 36 are positioned on the surface of the backing sheet 32.

Annular Band Abrasive Disks

Problem: It is desired to produce abrasive disks having annular bands of abrasive particles coated on thin flexible polymer material backing sheets having a 0.0015 inch to 0.015 inch (0.038 to 0.38 mm) and up to 0.125 inch (3.2 mm) thickness where an annular band of a fixed quantity of abrasive particles are applied to one sheet. The annular band of particles may be coated directly on the sheet or the annular band may be a raised plateau area that encompassed the approximate outer one third of the disk. The abrasive article disk can have an outer disk border free of abrasive isolated from the abrasive edge to aid in the manufacturing of the disk by providing an outer area that can be contacted by coating apparatus devices. It is desired that a annular band positioned between the abrasive annular band and the outside diameter of the disk be free of abrasive particles to eliminate the discontinuity effects created by applying a resin coating or by applying abrasive particles directly to the outer peripheral edge of a abrasive article disk.

Solution: A coating of resin adhesive may be applied directly to the surface of a sheet of flexible backing material and a fixed quantity of abrasive particles can be drop coated on an annular band area only over a process time period during which time a rotating circular disk makes up to 100 revolutions under the powder deposition head during the full time period the particles are applied to the annular band area. Adhesive resin may be applied in the disk across the full cylindrical surface area of the disk; or, the resin may be applied in an outer annular band area only; or the resin may be applied on an outer annular area having a 0.010 to 0.500 inch (0.25 to 12.5 mm) radial width border gap side edge on the outermost disk border that is free of resin. After the abrasive particles are deposited and the make coat of resin is solidified, further size coats of resin can be applied by various coating techniques. A precise thickness coating of a monolayer of particles can be provided by this technique of depositing abrasive particles progressively during the time period when the disk makes a number of revolutions during the particle deposition. A flexible abrasive sheet disk article can have an outer annular band of abrasive particles or erodible abrasive agglomerates resin bonded directly onto the surface of a polymer or metal material disk backing sheet having a sheet thickness of from 0.0015 to 0.015 inches (0.038 to 0.38 mm) but up to 0.125 inches (3.2 mm) for large diameter disks. The disk article has a disk sheet diameter of from 0.75 to 72.0 inches (1.9 to 182.9 cm). The inner radius of the abrasive coated annular band is greater than 20% or preferably greater than 30% of the outer annular band radius and at least a monolayer of gap-spaced abrasive particles or gap-spaced erodible abrasive agglomerates is resin bonded directly onto the surface of the disk backing sheet. Gap spaces would exist between individual resin bonded adjacent abrasive particles or between individual adjacent erodible abrasive agglomerates where the gaps are sufficiently large to provide sparse particle coatings where the collective area of all the abrasive article bonded particles comprise a particle density of from 5 to 65% of the particle or agglomerate coated annular band surface area. It is desired that an outer annular border gap area located between the outer radius of the coated abrasive annular band of coated abrasive and the outer radius of the disk article is free of coated abrasive particles or agglomerates where the annular abrasive-free outer disk radius border gap area has a radial width of either from 0.010 inches to 0.500 inches (0.25 to 12.5 mm) or from 0.2 to 10.0% of the abrasive disk article outside diameter. The abrasive particles or agglomerates have diameters or sizes of from 0.1 to 400 microns and the composite erodible abrasive agglomerates enclosing abrasive particles including diamond or cubic boron nitride bound in a porous ceramic matrix material have all of the composite agglomerate mixture components capsulized into a near-spherical shapes. The abrasive particles having sizes less than 25 microns are capsulized together with ceramic materials and processed to form erodible composite agglomerates having near-spherical shape agglomerate diameter sizes of 75 microns or less. Abrasive particles having sizes less than 10 microns are capsulized together with ceramic materials and processed to form erodible composite agglomerates having near-spherical shape agglomerate diameter sizes of 30 to 45 microns or less. The abrasive agglomerates erodible material includes metal or non-metal oxides (e.g., silica, alumina, titania, zirconia-silica, magnesia, alumina-silica, alumina and boria or boria) or mixtures thereof including silica-alumina-boria or others.

Figure 4:
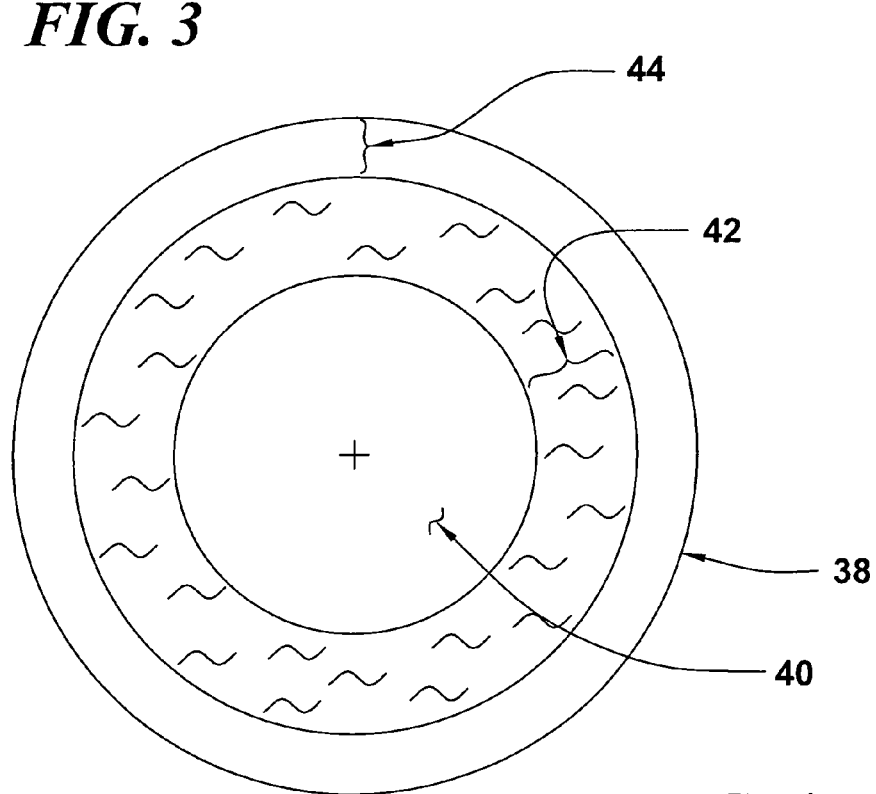
FIG. 4 is a top view of an annular band of abrasives with an abrasive-free outer border.
Figure 5:
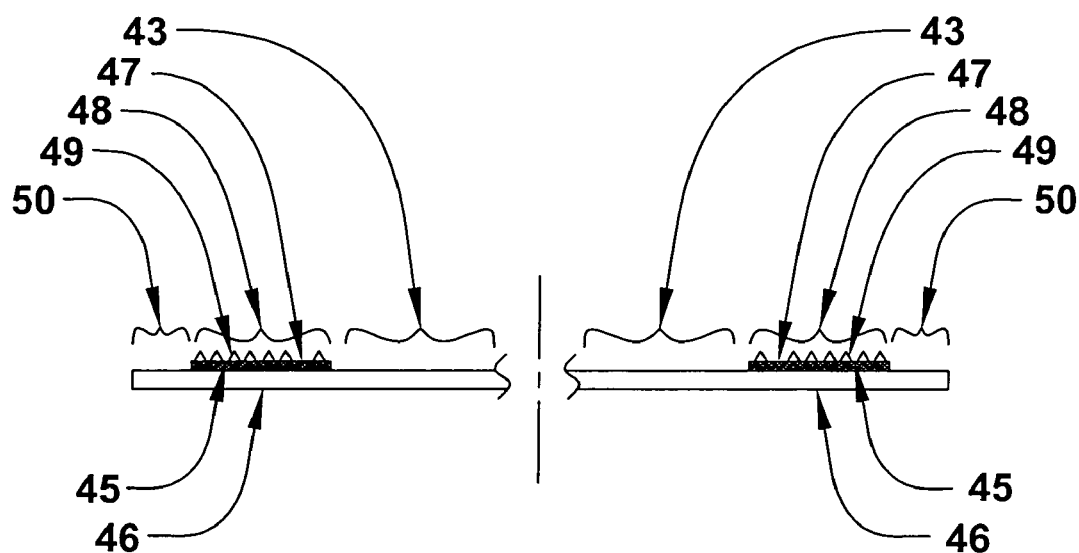
FIG. 5 is a cross-section view of raised annular band with an abrasive-free outer border.

FIG. 4 is a top view of a flat abrasive disk 38 having a annular band 42 area of abrasive particles where the inner area 40 is free of abrasive particles and the outer annular band area 44 having a annular radial dimension from 0.025 inches to 1 inch (0.63 to 25.4 mm) is free of abrasive particles. FIG. 5 is a cross-section view of a flat circular abrasive disk 46 having a annular area 48 coated with abrasive particles and having a flat outer annular area 50 that is free of abrasive particles and a inner flat disk area 43 that is free of abrasive particles. Abrasive particles 49 can be bonded in an annular band area 48 with a resin layer 45 directly coated on the disk backing 46 form an outer annular band 50 and a inner area 43 free of raised island material free of particles 49. Providing a discrete annular band of abrasive particles on a circular disk having a particle-free outer band eliminates the necessity to disturb the abrasive particles lying in the area of the periphery of a disk when cutting a disk from a continuous abrasive particle coated web material by mechanical converting means including punch and die disk cutting systems. A punch will structurally disturb the attachment of those abrasive particles to the backing that are contacted and sheared by the cutting edge of the punch as it enters the corresponding die opening to create a circular disk from a continuous abrasive particle coated backing web. Those weakly bonded abrasive particles residing at the periphery of a die punched disk will tend to become dislodged when subjected to workpiece contact forces during abrading action. Loosened abrasive particles can travel between the abrasive bonded to an abrasive article and the workpiece surface and can cause significant scratches or gouges on the workpiece surface during a workpiece abrading process. Water jet cutting of abrasive disk articles from a abrasive particle coated web would tend to produce fewer weakened particles than a hole punch as the water jet can carry fully loosened particles in the water jet stream away from the body of the abrasive disk article. However, some weakly bonded particles that remain attached to the abrasive article can still be fully loosened by abrading contact forces that are different in magnitude and direction than the water jet forces during the abrading action of a workpiece.

Particle Deposition by Linear Oscillation Ramp

Problem: It is desired to provide a uniform sparse coating of a fixed quantity of abrasive particles on an annular band area of a circular disk backing flexible sheet. A uniform particle coating can be achieved by progressively applying the particles over up to 100 revolutions.

Figure 6:
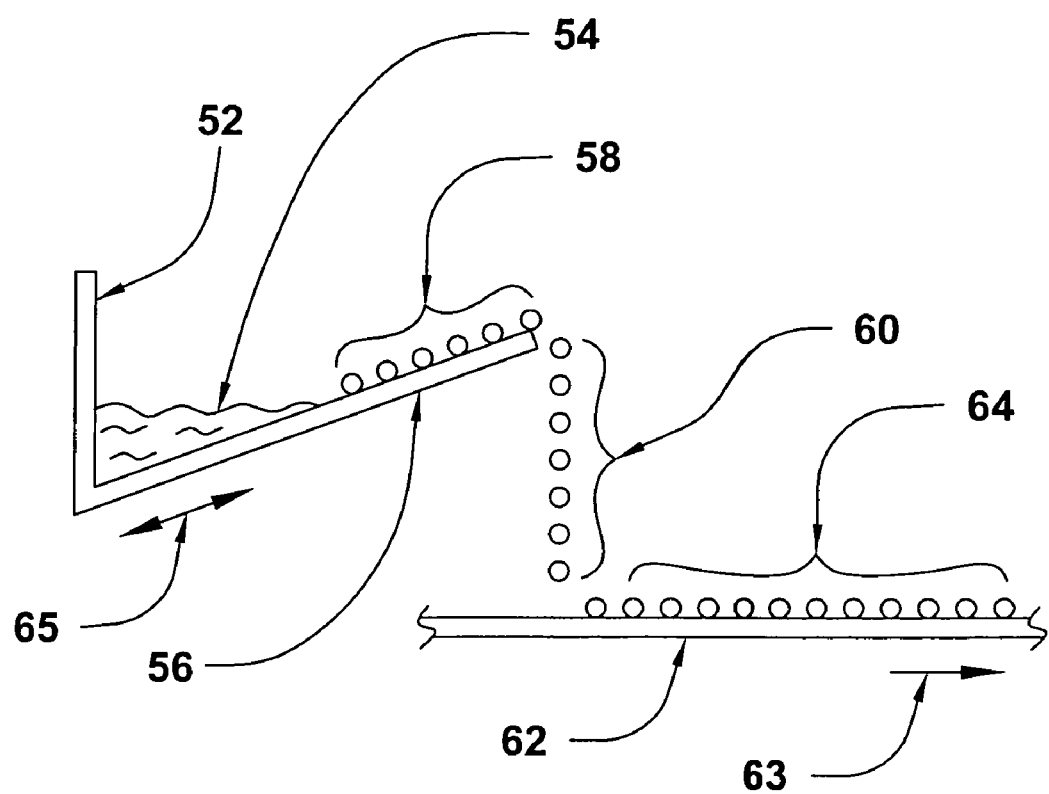
FIG. 6 is a cross-section view of abrasive particle oscillation ramp.
Figure 7:
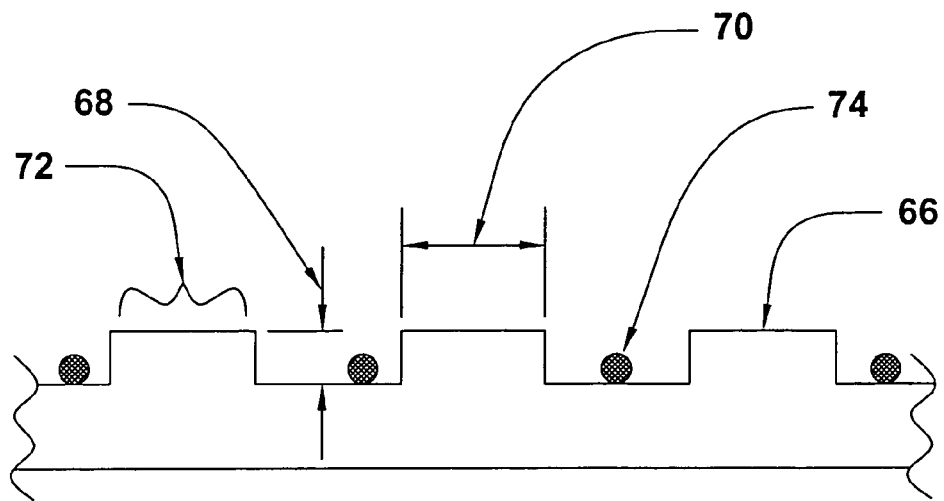
FIG. 7 is a cross-sectional view of a linear oscillation particle ramp.
Figure 8:
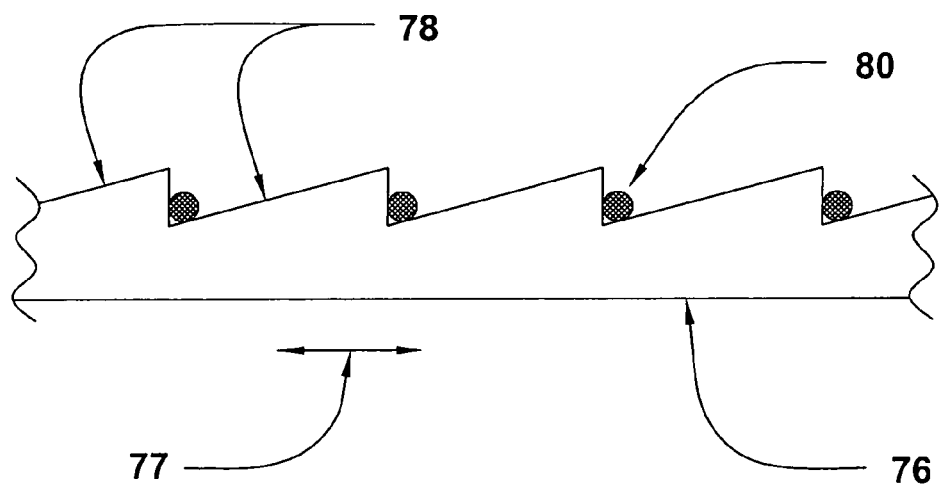
FIG. 8 is a cross-sectional view of a toothed oscillation particle ramp.

Solution: A fixed quantity of abrasive particles can be measured and placed in an open container area that is central to a vibratory part or particle feeder device that has a shallow-angle fixed-width outlet linear ramp. Vibration is then applied to the feeder device to impart a combination lifting and forward accelerating motion to individual particles that results in the particles advancing in incremental steps up the length of the shallow-angle ramp. This is similar technology to that utilized by vibratory bowl small parts feeder devices used in automatic assembly machines. The rate at which the particles advance up the ramp is controlled by the angle of the ramp, the surface characteristics of the ramp, the depth of the particles remaining at the center of the feeder bowl, the amplitude and frequency of the vibration and the three dimensional motion of the vibration source and bowl spring suspension system. The particles will tend to move up the flat ramp with a uniform distribution of particles across the width of the ramp exit edge which is designed to be the same width as the cross-width of the annular band of deposited particles which are dropped in a straight line on a resin adhesive wetted disk backing sheet rotated below the ramp exit lip edge. The ramp can be tilted sideways to increase the particle flow rate on one side of the ramp. The uniformity and rate of the particles moving up the ramp can be changed by use of different roughness characteristic surfaces on the linear ramp. A smooth surface may be used or a rough surface or a textured surface or a grooved surface or a toothed-ramp surface may be used to transport and incrementally capture particles up the length of the ramp which would have a typical ramp angle of 8 degrees but can vary from 2 to 20 degrees. FIG. 6 is a cross-section view of abrasive particles 64 distributed on a resin wetted abrasive disk backing 62 that is moving in the direction 63. The disk 62 is positioned at a location under an angled particle ramp 56. Bulk particles 54 contained in a particle bowl container 52 are incrementally translated by vibratory oscillations 65 up the angled ramp as shown by particles 58 that are dropped off the open ledge of the ramp 56. The dropped particles 60 fall in a straight line extending across the width of the angle ramp 56 onto the backing 62. FIG. 7 is a cross-section view of a vibratory line-ramp 66 having cross grove lines 72 that have line widths 70 and line heights 68 where the heights 68 approximately equal the diameter of the abrasive particles 74. FIG. 8 is a cross-section view of a toothed particle ramp 76 having sloped teeth 78 that carry particles 80 up the angled tooth ramp 76 when vibrated in a direction 77 along the ramp length of the ramp.

Fluidized Bed Particle Deposition Device

Problem: It is desired to provide a sparse uniform fixed quantity coating of abrasive particles on a narrow annular band area of a circular-backing sheet. Control of the rate of application of the powder and control of the gap space between adjacent particles across the width of the deposition device is necessary. Particles can be applied over a period of many revolutions of the disk being coated. To achieve a uniform particle density over the full annular band at the outer radial portions of the annular disk requires more total particles than at the inner radius area to provide a uniform particle covering density, measured in particles per square inch. Particles have a typical size of 30 to 45 microns and cover from 10 to 60% of the annular band surface.

Figure 9:
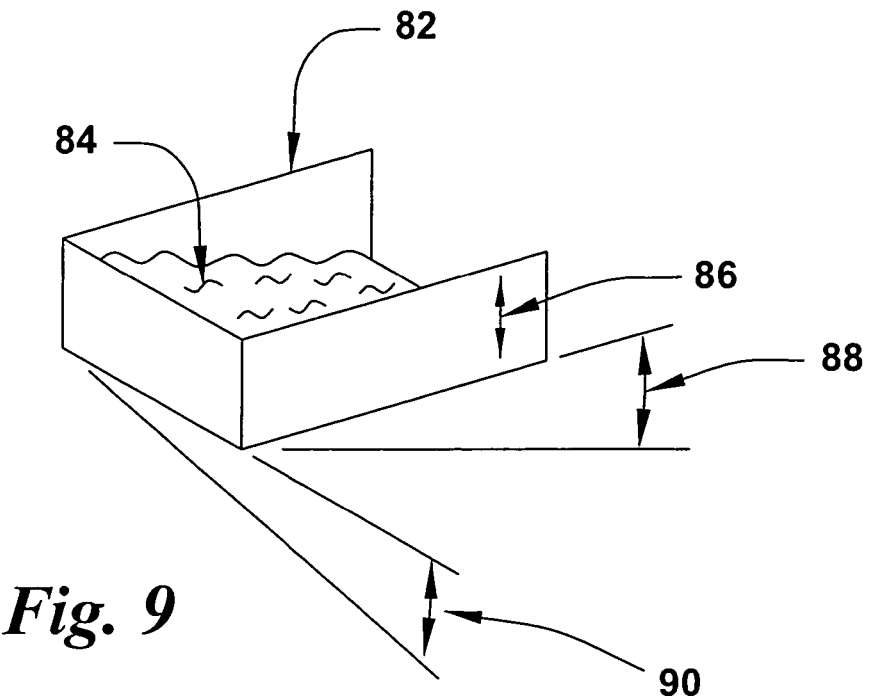
FIG. 9 is an isometric view of a fluidized bed particle deposition device.
Figure 10:
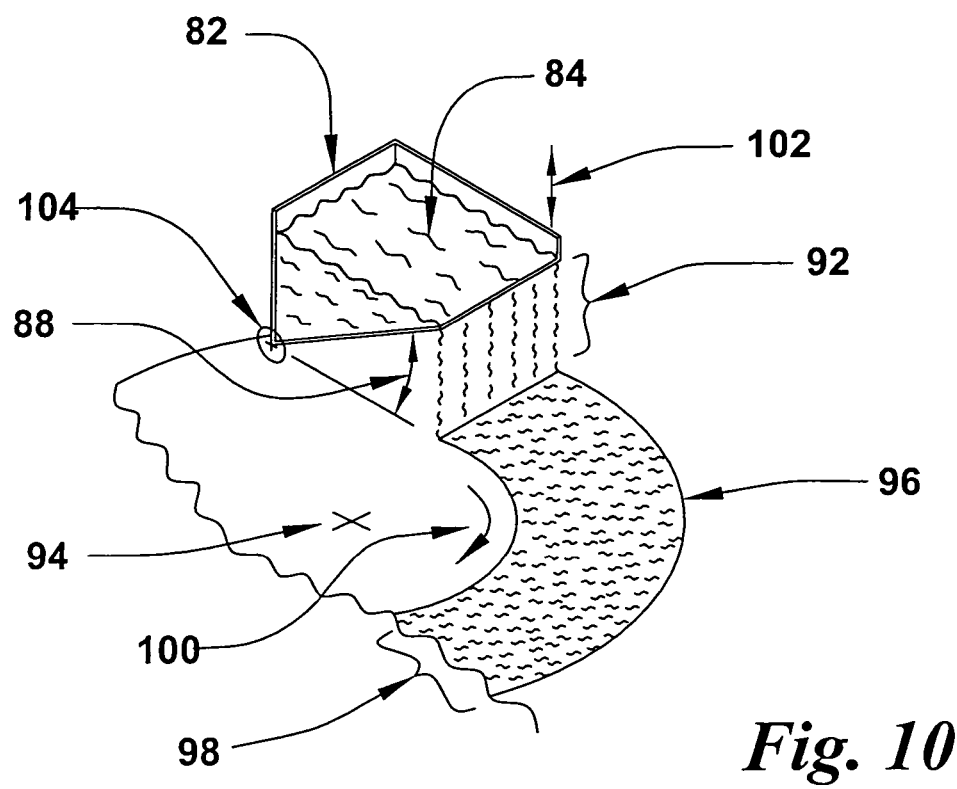
FIG. 10 is an isometric view of fluidized particle deposition.

Solution: An angled box with three vertical side walls and a straight flat horizontal exit edge at the box side having no walls can be filled with a measured fixed quantity of small abrasive particles to produce a fluidized bed of free float particles when vertical, or other direction, vibration is applied to the particle box. The angle of the box bottom prevents particles from flowing out the free-edge non-wall side of the box. When the box is progressively tilted toward the free-edge side, the loose vibrated particles will travel toward the free edge and then fall over the edge to form a straight-line line of powder that can be deposited on a resin adhesive coated disk rotated in position below the powder deposition device. The bandwidth of the abrasive powder deposited is equal to the width of the free edge lip of the box. The particle vibration box apparatus can be used to deposit an annular only band of abrasive particles on the disk backing even if the resin particle bonding coated on a backing area is much greater in surface area than the desired particle annular band width. Tilting the box sideways will increase the flow rate of particles on one side of the free horizontal edge that can be used to provide a relatively greater flow of particles on the outer radial band side of the annular band. The deposition of the particles is continued until all of the measured fixed quantity of particles is deposited on the annular disk backing, assuring that each disk produced by this method contains the same quantity of particles. FIG. 9 is an isometric view of a fluidized bed abrasive particle deposition device. A three-walled box 82 contains particles 84 subjected to vibration 86 where the box 82 has a forward tilt angle 88 and a side tilt angle 90. FIG. 10 is an isometric view of three-walled box 82 containing abrasive particles 84 that are line-dropped 92 to form a line of particles contacting a backing disk 96. An annular band of particles 98 is formed on the backing 96 that is rotated in the direction 100 as the disk 96 is rotated about a pivot axis center 94. The box 82 pivots at position 104 through a pivot angle 88.

Particle Deposition in Annular Band

Problem: It is desirable to sparsely deposit a fixed measured quantity of abrasive particles with a uniform density tangentially and radially around an annular band with the ability to change the particle deposition rate radially to compensate for the longer tangential length and higher surface speed at the outer radius of the annular band.

Figure 11:
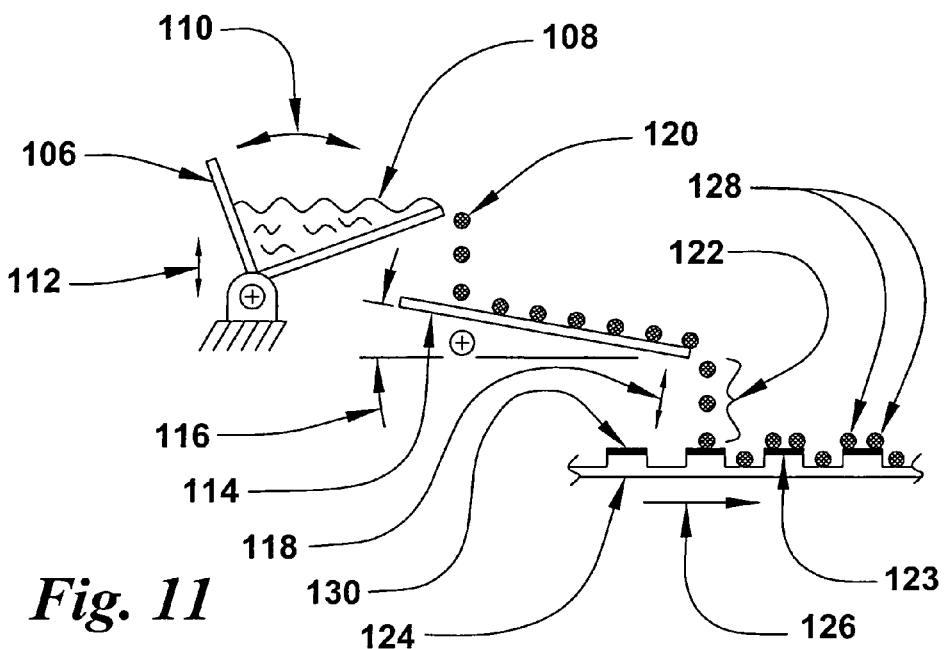
FIG. 11 is a cross-section view of fluidized particles deposited with a vibrating chute.
Figure 12:
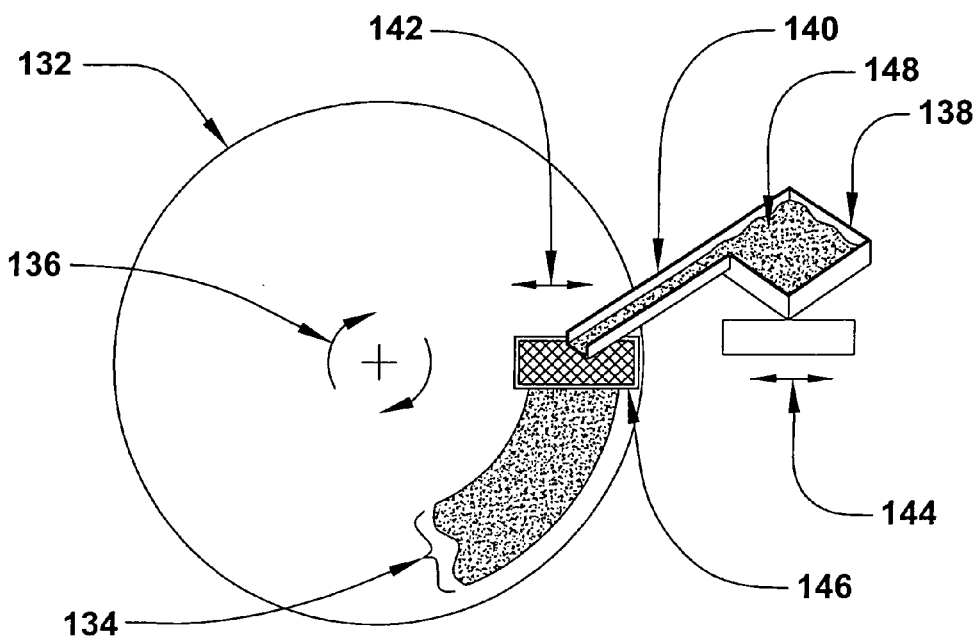
FIG. 12 is an isometric view of particles deposited as an annular band.

Solution: A measured quantity of abrasive particle powder can be deposited in an angled three-sided box that is vibrated to produce a fluidized-bed state of suspension of particles that tend to remain separated from each other, and which collectively, tend to easily flow as an equivalent liquid matter. The box can be progressively emptied of the particles at a controlled flow rate into a vibrated transportation chute, or alternatively, onto a moving conveyor belt by progressively tilting the box toward the open-lip side of the box until the typical 30 to 45 micron particles drop from the box into the chute or onto the conveyor. The chute can be narrow to a width less than the particle box width to constrain the flow into a narrow powder stream. The chute width may range from 0.25 inches (0.64 cm) to 30 inches (76.2 cm) or more wide and the chute shallow downward angle ranging from 2 to 40 degrees can be angle-adjusted to obtain a nominal downstream particle separation between adjacent particles. The downstream free-end of the chute can be moved laterally in an oscillatory motion across the radial width of a wet resin coated annular band area of a flexible circular disk backing sheet which is rotated about the disk center below the free end of the chute. Individual particles are dropped from the chute onto the resin coated backing sheet to progressively deposit particles over a period of time which allows up to 100, or more, revolutions of the backing during the particle deposition process. There can be as little as 1 or up to 20 radial oscillation cycles made during the deposition process. Various control schemes can be employed to apply a larger flow rate of particles at the outer radial area of the annular band including slowing down the radial movement of the chute free-end at the outer radial position area. Instead of dropping the particles directly on the backing, the particles can be dropped into a vibrating screen box to enhance the distribution of particles into sparse adjacent positions where the particles comprise typically from 5 to 65% of the annular band surface area. The annular bands can consist of raised islands or raised plateaus or the bands can consist of non-raised areas where the particles are bonded directly to the flat backing surface. FIG. 11 is a cross-section view of a vibration induced fluidized bed of abrasive particles deposited on a raised island backing sheet. A three-sided box 106 containing a fluidized bed of particles 108 subjected to vibration 112 where the box 106 has a box tilt angle 110 that aids in control of the rate of flow of falling particles 120 unto particle chute 114 having a chute angle 116 where the chute 114 is subjected to vibration 118. Particles 120 tend to spread out along the width of the chute 114 as the particles travel down the length of the chute 114 and falling chute particles 122 are deposited on the surface of a backing sheet 124 that is moving in the direction 126 relative to the chute 114. Falling particles 122 contact both the wet resin 123 coated raised islands 130 and the valleys between the islands to form a uniform sparse particle coating on the top surface of the backing sheet where the width (not shown) of the deposited particle band is equal to the face width (not shown) of the chute. FIG. 12 is an isometric view of a band of abrasive particles deposited on a circular backing sheet. A backing disk 132 is rotated in the direction 136 to form an annular band 134 of abrasive particles dropped from a particle shaker screen device 146 having the screen width equal to the radial width of the annular band 134. Loose bulk particles 148 contained in a tilt box 138 are dropped unto a chute 140 that is vibrated 142 to drop the individual particles spread-out along the surface of the chute 140 into a shaker screen 146 subjected to radial or other direction oscillations 144.

Annular Band Particle Deposition

Problem: It is desirable to apply a fixed quantity of abrasive particles or abrasive agglomerates in a defined width annular band area with a uniform circumferential sparse particle density and with a controlled radial density.

Solution: A fixed quantity of abrasive particle powder or abrasive agglomerates can be loaded into a fixed horizontal length vertical slot open storage and distribution hopper which has the capacity to contain a linear or proportionally increasing unit volume quantity of stored particles and where the hopper is increased in height, or volume, from one slot end to the other end. This hopper is positioned above and across the radial width of the intended annular band of particles deposited on a flexible sheet backing disk that is rotated about the disk center. A rotatable metering rod is mounted at the bottom of the open base particle exit lip extending across the length between the particle hopper chamber and the particle exit lip of the slotted hopper in a position to block the exit flow of particles or agglomerates from the hopper chamber when the rod is stationary. A metering rod having a textured surface including a knurled, ribbed, particle coated, etched, sandblasted, indented or otherwise roughened surface on the rod will temporarily capture individual particles on its surface along the full slot length of the rod contained within the hopper slot area. The size of the metering rod surface texture pockets is increased for large abrasive particles and decreased in size for small abrasive particles. Upon rod rotation, individual particles will be transported from the constraints of the hopper storage box to the metering box exit lip and on to a zone outside of the hopper. Rotation of the metering rod will cause the loose particles to free-fall along a defined line away from the rod surface and the exit lip. These falling particles will have a falling-line length equal to the open particle slot length in the hopper box. The particles can be deposited directly on the surface of the wet resin coated disk backing sheet to form an annular band abrasive particle band area on the sheet that is rotated one or many times during the process of depositing the falling particles. The total quantity of particles exited the apparatus when the contents of the hopper is exhausted, per lineal length of the metering rod, is proportionally increased in a rod axial length direction that is in the same hopper length direction wherein the hopper unit volume increases along the hopper length.

Figure 13:
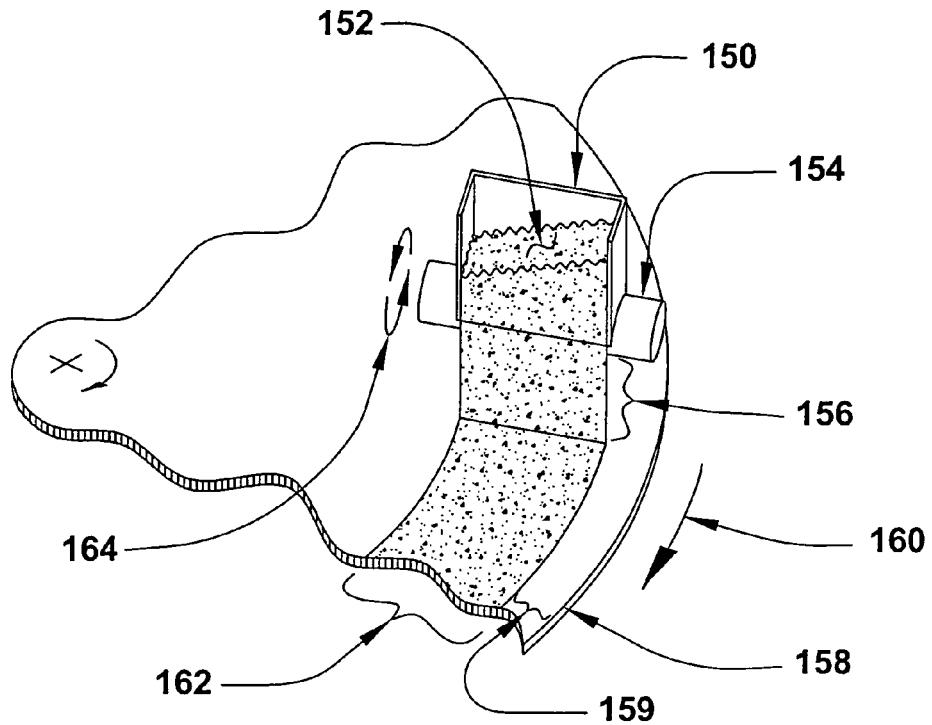
FIG. 13 is an isometric view of hopper particles having a rotating particle metering bar.
Figure 14:
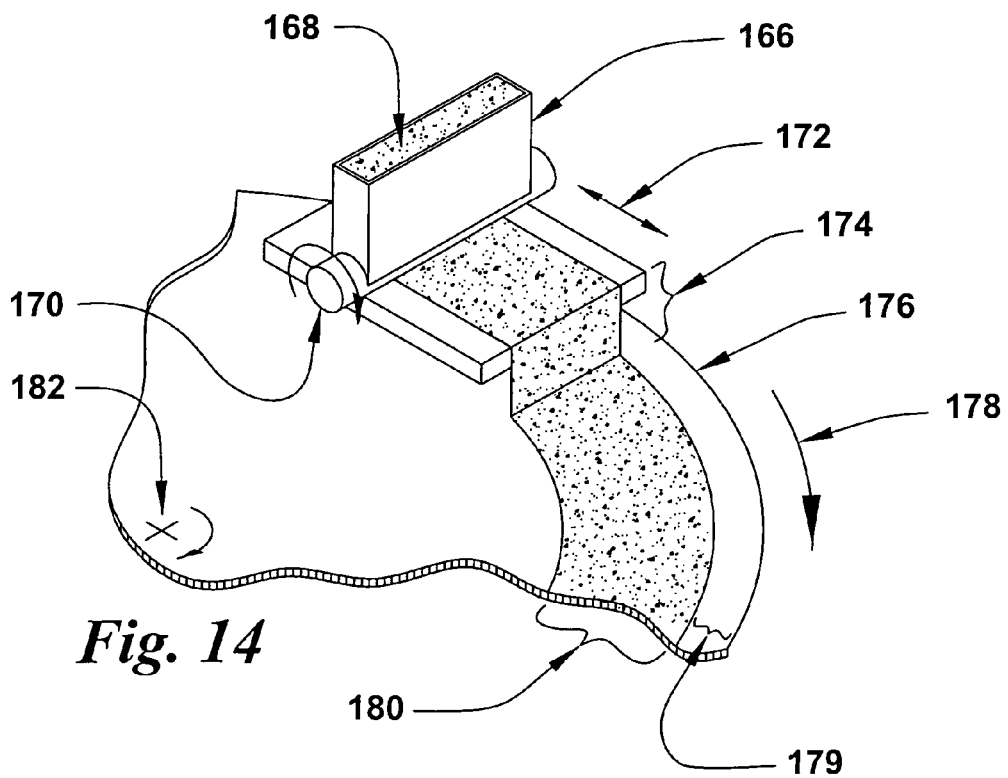
FIG. 14 is an isometric view of a rotating metering bar and shaker table for particles.

In preparation for coating abrasive particles, resin may be coated across the full surface of the disk, or the resin coating may be restrained to an annular band area that extends radially over the disk to form an resin area that slightly overlaps both the inner and outer radius of the abrasive particle annular band, or the resin width may match the particle annular band width. The controlled width of the annular band of deposited particles would be equal to the slot length of the hopper box. The falling particles may also be deposited on a flat-width vibrating angled ramp that would tend to further develop spacing between individual particles prior to falling onto the surface of the disk backing. The rate at which the particles are transported from the box can be controlled by changing the rotational speed of the metering rod that would tend to create an even volumetric flow rate of particles along the full length of the rod. The particle storage areas of the hopper box that are initially loaded to a higher level, or wider level, can generate a proportional, or non-proportional, increase in the quantity of particles at the outer radial surface of the annular band. The unit volume of abrasive particles or abrasive agglomerates contained in the hopper is preferred to be proportionally increased, in particles per unit of hopper length, from one side of the hopper to the other. These higher-level box particle storage volume areas will tend to be emptied of particles at a later time than the lower-level volume portion of the box that is located at the inner radial band area during the particle deposition process. To prevent tangential discontinuities in the sparse deposition particle density, the disk sheet would be rotated a number of revolutions, up to one hundred, during the period of particle drop deposition. The proportional annular band abrasive particle deposition apparatus can be used as an abrasive particle or abrasive agglomerate deposition device. Rotation of the abrasive metering rod provides a uniform flow rate of abrasive particles or agglomerates from the full length of the metering rod where the quantity of particles, per lineal length of the rod, is constant along the length of the exit lip when the hopper is full of particles along the full length of the hopper. Continued rotation of the metering rod provides a particle flow that remains at a constant exit rate across the length of the rod until the particles or agglomerates stored in the particle hopper is exhausted at a lineal portion of the hopper chamber. The particle flow would stop at the annular inner radial position before the flow stopped at the outer annular position. Particle flow would continue from the deposition device until all of the particles or agglomerates are exhausted from the hopper chamber providing a higher quantity of particles per unit length of rod at the end of the particle hopper chamber having the highest particle volume per unit length of the rod. The total quantity of particles exited the apparatus when the contents of the hopper is exhausted, per lineal length of the metering rod, is proportionally increased in hopper length direction. Abrasive particle or agglomerate flow from the particle deposition device is interrupted when the rotation of the metering rod is interrupted. A annular band abrasive particle deposition process where abrasive particles or abrasive agglomerates are deposited on a backing sheet by a apparatus providing abrasive particle flow that varies proportionally across the exit width of the die lip would require positioning the particle or agglomerate deposition device above the backing sheet with the apparatus having a exit lip width equal to the annular abrasive band width. It is preferred that the hopper exit width is equal in length to the width of the annual band of abrasive particles and that the exit lip be positioned on a radial line extending out from the rotational center of a platen that holds a backing sheet upon which the particles are deposited. The exit side of the hopper having the smallest particle flow is positioned at the inner radius of the particle coated annular band. The backing sheet would be coated with wet resin and may be a flat backing sheet or a sheet having attached raised islands where particles are deposited on both the wet resin coated islands and the valleys between the islands. If the valleys are not coated with wet resin, the abrasive particles that temporarily reside in the valleys may be recovered and recycled. Wet resin may also be applied to the valley areas and the valleys coated with abrasive particle, which would result in non-used particles, but the functional abrading performance of the abrasive article would not be significantly affected as the depth of the valleys is much greater than the diameter of the particles. The total volume of the particles or agglomerates supplied by the particle deposition apparatus during a annular band coating event is preferred to be controlled to within 15% of the desired amount. The number of particles or weight quantity of particles would be selected for a specified particle or agglomerate coating density. The particle hopper chamber configuration would be proportioned to vary the particle or agglomerate deposition quantity in particles per unit exit lip length across the die lip length to match the particle flow rate required to provide an equal thickness particle coating over at least 85% of an annular coated band having a size controlled concentric annular inner radius and outer radius. Particles or agglomerates that exit the die lip where the particles drop onto the backing sheet to form an annular particle coated band would have the particle metering rod rotational speed controlled to apply the particles or agglomerates to the backing surface over at least 1 revolutions of the backing and preferred over 2 revolutions and more preferred over 5 revolutions and up to 100 or more revolutions of the backing during a single event of particle deposition. A rotating textured surface particle distribution metering rod can also be used to deposit distributed abrasive particles on the full web width surface of a continuous web or an individual abrasive sheet article. A air bar extending along the length of the particle exit lip can provide a high velocity linear air jet stream that contacts the exit particles and propels the individual particles, or agglomerates, away from the metering bar exit lip at high speed into contact with wet resin coated on the flat surface of, the raised island surfaces of, or the raised island surfaces and valleys of a backing sheet article. High speed deposition of particles results in a monolayer of deposited particles. FIG. 13 is an isometric view of hopper stored abrasive particles deposited in an annular band on a backing sheet with a rotating particle metering rod. Stored abrasive particles 152 contained in a hopper box 150 are dispensed from the box by a rough or patterned surface rotating particle metering rod 154 rotating in the direction 164 where dropping particles 156 contact a rotating backing disk 158 moving in a direction 160 to form an annular band 162 of deposited particles. The dropping particles 156 fall in a line having a length equal to the particle exit opening formed by contact of the rotating metering rod 154 as it contacts the open bottom of the hopper box 150. The line width of the dropping particles 156 is equal to the radial width of the annular band of deposited particles 162. Air jets (not shown) can also be positioned along the exit edge of the metering rod 154 to propel the particles at great velocity into the resin coating (not shown) on the surface of the backing disk 158 to assure that a mono layer of particles is coated on the disk 158 as the high speed particles will not tend to stack in layers when they impact the resin coating. An abrasive particle-free annular band 159 is shown on the outer periphery of the disk 158. FIG. 14 is an isometric view of a rotating metering rob particle distribution device used with a flat shaker table used to increase the separation of individual abrasive particles prior to deposition on a backing sheet. A hopper box 166 containing bulk particles 168 has a open bottom that is sealed by a cylindrical rotatable metering rod 170 that drops particles upon rotation of the rod 170 upon a vibrating shaker table 172 that tends to spread the particles across the surface of the shaker table 172 as the particles travel down the length of the downward angled shaker table 172. Particles 174 dropped off the straight exit edge of the shaker table 172 fall unto a disk backing 176 rotating in the direction 178 to form an annular band 180 of particles on the disk backing rotating about the axis location 182. Air jets (not shown) can also be positioned along the exit edge of the shaker table 172 to propel the particles at great velocity into the resin coating (not shown) on the surface of the backing disk 176 to assure that a mono layer of particles is coated on the disk 176. An abrasive-free annular band 179 is shown on the outer periphery of disk 176.

Resin Coated Annular Band

Problem: It is desired to coat an annular band of measured liquid resin on either a individual resin transfer sheet or directly on an individual annular band of raised island structures where the fixed quantity of resin assures that the resin coat for each coated disk has the same resin thickness. Also, the resin coating must be uniform in thickness tangentially and radially without significant thickness changes at start or stop lines created by the coating device. Further, it is desired to use high viscosity resins that cannot be spread easily across an annular band area with spin coating unless a very high spin coater rotation speed is used.

Figure 15:
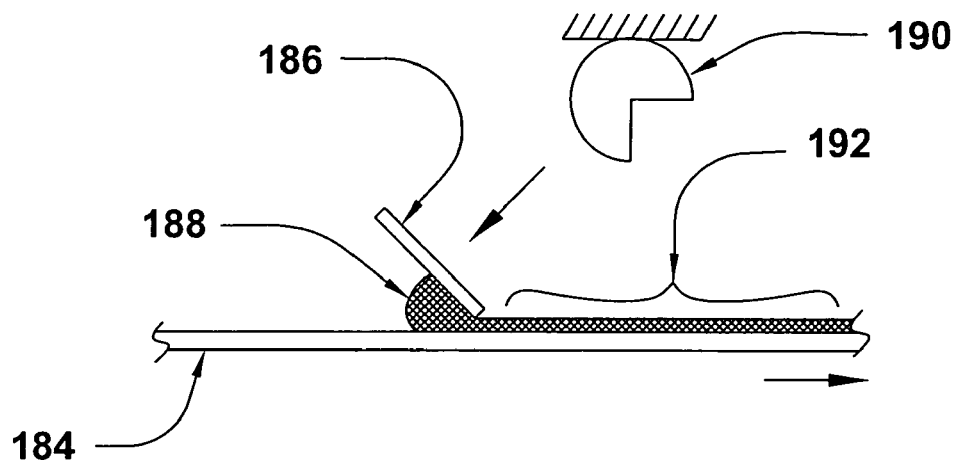
FIG. 15 is a cross-section view of resin coating a moving backing sheet.
Figure 16:
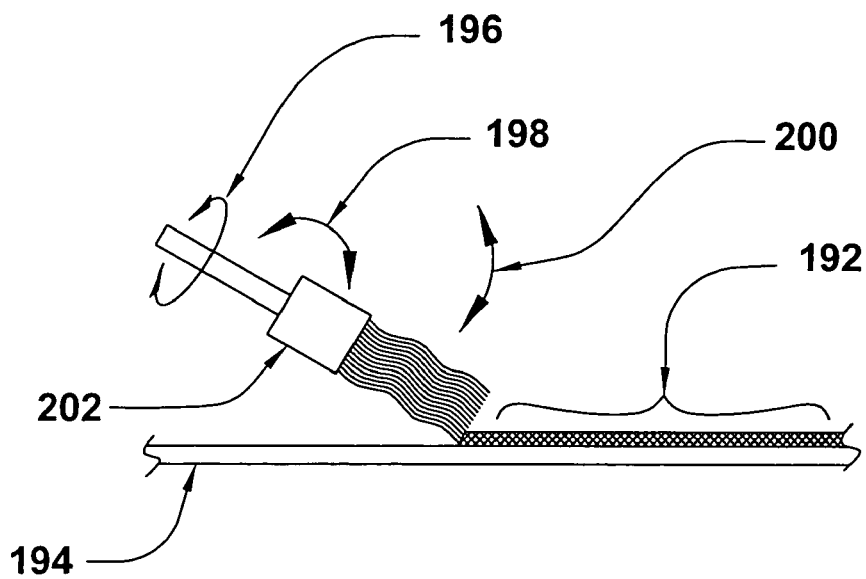
FIG. 16 is a cross-section view of a paint brush resin smoothing device.
Figure 17:
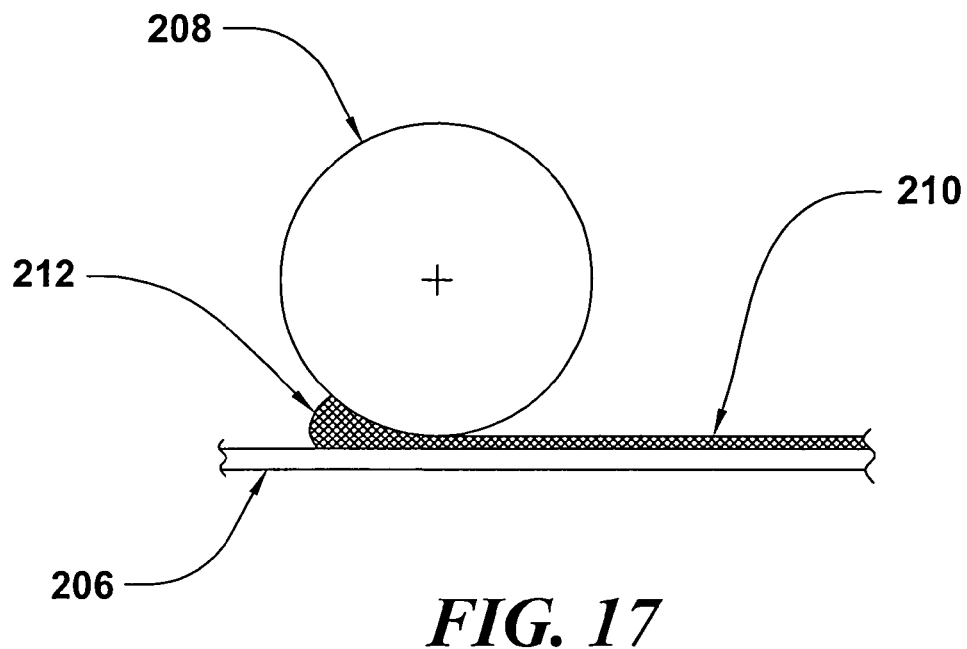
FIG. 17 is a cross-section view of a roller resin smoothing device.
Figure 18:
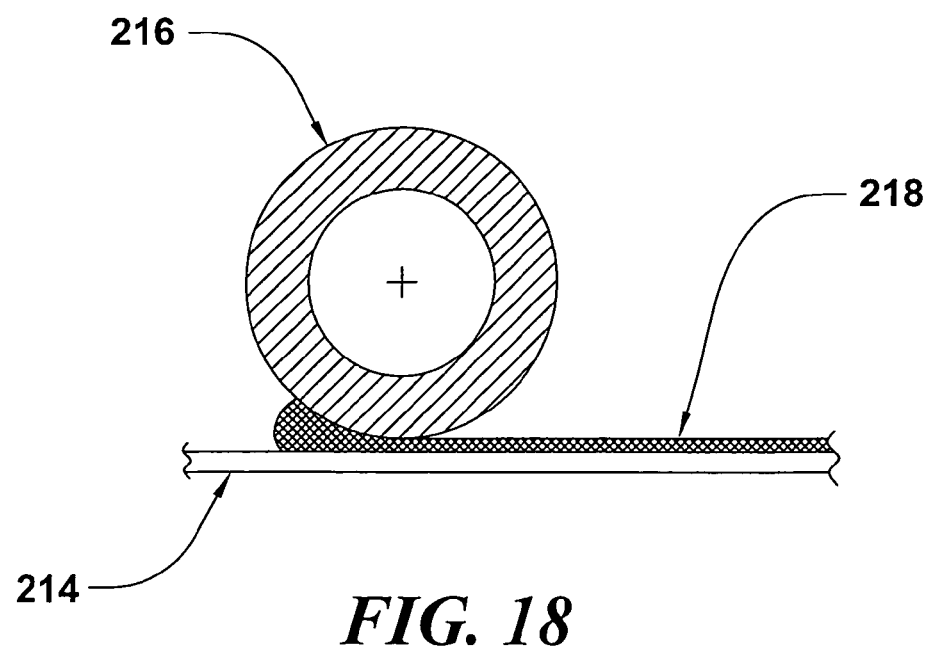
FIG. 18 is a cross-section view of a sponge roller resin smoothing device.

Solution: Measured quantities of high viscosity liquid resin can be applied to a flexible disk sheet having a specific diameter and annular width. Resin can be applied directly on the flat surface of a backing sheet in annular band areas and abrasive particles or abrasive spherical agglomerates can be deposited in contact with the wet resin to form abrasive coated annular band abrasive articles. Also, resin can be deposited on flat surfaced transfer sheets in annular band areas and a portion of this wet resin can be transferred to the top surfaces of an of raised island structures that are attached to a backing sheet annular band area. Resin can be applied to form a annular resin band on the sheet surface by rotation of the disk about the disk center where the resin is applied with the use of a variety of devices including: a notched-bar edge knife coater, an angled doctor blade coater, a rigid tapered roll coater, a rubber covered tapered roll coater, a bristle paintbrush, a sponge brush, an absorbent sponge covered paint tapered roller, a resin sprayer where atomized particles of resin are deposited, and other resin application devices. The liquid resin can be applied progressively as the disk backing is rotated over one or many revolutions. Edge-dam liquid resin guard-wall devices can be used to contain the resin to the desired width of the annular band. The paint brush and the sponge surfaced paint roller can temporarily store some of the resin liquid and release it progressively over the tangential surface of the rotating annular band. Absorption of excess coating thickness resin by the resin contacting brush or roller will tend to diminish double-coating thickness variation coating defects located at the start and stop lines when the disk backing sheet is rotated up to 100 revolutions during the coating application and coat smoothing process. After a number of disks are coated and the coating operation reaches a coating process equilibrium, a measured quantity of resin can be consistently added to the apparatus to coat each new disk. A continuous disk sheet-coating operation or a multiple-disk batch sheet coating operation would start with pre-filling a coating fluid storage device including a paint brush or a paint roller with resin before processing the first backing sheet. Application of a fixed quantity of coating resin to an individual disk sheet assures that a uniform thickness resin is applied to each sheet. A measured quantity of coating fluid can be applied as a single volume sized coating charge or the new added coating charge can be volume decreased progressively to the paint sponge roller, or other coating device, when each new backing disk is coated to reach an equilibrium for obtaining a consistent coating on each individual sheet. If non-fluid-storage devices including doctor blades or non-porous coating rolls are used in the coating process, the same quantity of coating resin can be applied to all of the coated disk sheets, from the first sheet coated to the last sheet. Non-storage smoothing devices eliminate the requirement to establish a coating-addition process equilibrium. In a storage-type smoothing device, the added fluid is changed somewhat for each progressive disk to reach the final added quantity that is required to obtain a consistent applied coating thickness on a annular disk. After initial application of the resin, multiple revolutions can be made with a porous smoothing roller or a different style of smoothing device that is held in surface contact with the resin to level the resin thickness variations by absorbing and removing excess resin. A resin transfer sheet can be coated in an annular pattern area and this transfer sheet can be brought into pressure contact with a like-shaped disk of raised islands to transfer approximately 50% of the resin thickness to the island tops. Also, a paint roller, or other device, such as a paintbrush can be used to apply liquid resin directly to the top surface of raised island structures. The coating device can be changed in contact pressure force or the device can be angled in a downstream or radial direction to the annular band with different forces, positions or angles at different stages of coating. A resin spray device can also be used to apply resin directly to the top surface of raised island structures that are attached to a backing sheet. s FIG. 15 is a cross-section view of a moving transfer coating backing sheet 184 having a uniform thickness resin coating 192 applied with a notch-bar knife 190 shown in a raised non-contacting and non-used position above a doctor blade device 186 having a resin coating fluid bank 188 that is used to apply and smooth out coating discontinuities on the backing 184. The coating bar 190 can be used in place of the doctor blade 186 or used in-line with the doctor blade 186. FIG. 16 is a cross-section view of a backing sheet 194 having a uniform thickness resin coating 192 applied and smoothed to reduce the thickness of coating discontinuities by use of a bristle paint brush 202 that is raised and lowered into contact with the backing 194 and adjusted for roll, pitch and yaw angle contact with the backing 194 by a first brush angle 196, a second brush angle 198 and a third brush angle 200. FIG. 17 is a cross-section view of a backing sheet 206 having a uniform thickness resin coating 210 applied and smoothed to reduce the thickness of coating discontinuities by use of a paint roller 208 having a coating bank 212. FIG. 18 is a cross-section view of a backing sheet 214 having a uniform thickness resin coating 218 applied and smoothed to reduce the thickness of coating discontinuities by use of a open pore or closed pore sponge roller 216.

Resin Band Coated Annular Band

Problem: It is desired to create a uniform approximate 0.001 inch (25.4 microns) thick coat of resin on an annular band of a resin transfer sheet even if there are variations in the thickness of the transfer sheet material and variations in the surface height of the rotating platen to which the transfer sheet is attached. The resin coating of the transfer sheet, the transfer contact coating of raised island surfaces and the deposition of abrasive particles to the island surfaces must be completed prior to the resin forming a semi-hard skinned-over surface due to resin solvent loss or partial solidification of the resin coating.

Figure 19:
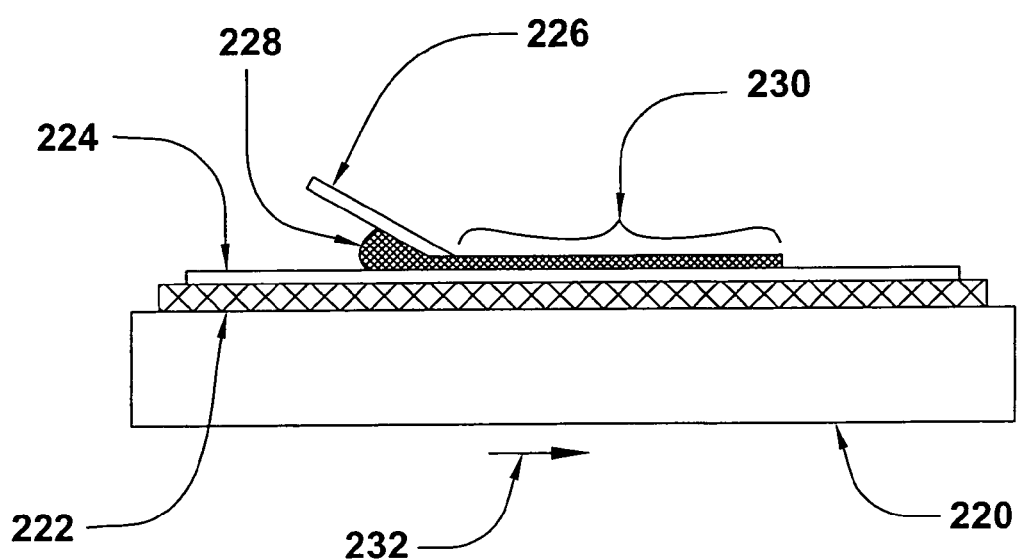
FIG. 19 is a cross-section view of a doctor blade resin sponge backing smoothing device.

Solution: Flexible backing material that has thickness variations can be used with a fixed-position precise flatness notch-bar knife, or a rigid straight-edge dam plate, or a rigid coating metering roll by using a conformal compliant sponge layer sheet between a rotating platen surface and a transfer disk backing sheet. The sponge sheet will deflect locally across the annular width of the knife bar to compensate for the backing thickness variations as the backing travels past the coating knife bar. Alternatively, a conforming flexible doctor blade can be held at an angle under force pressure across the doctor blade width to allow the blade to move conformably with the localized backing thickness variations. A coating metering roll can be covered with a flexible rubber cover which allows the roll surface to deflect locally to compensate for backing thickness variations that may range from 0.0001 to 0.010 inch (2.5 to 254 microns). Sponge covered paint rollers or bristle-type paintbrushes provide resin application device surfaces that flex a large amount at the coating fluid surface contact area. A doctor blade can optionally be used downstream of the coating application to aid in smoothing out variations in the coating thickness caused by the paint roller or paintbrush. This coating technique allows a uniform thickness resin fluid to be applied to a transfer sheet backing even though the transfer sheet varies in thickness, or the rotating platen, that carries the backing sheet, varies in surface height around the platen circumference relative to a fixed-position coating device. Excess-coated resin is absorbed internal to the device structures by both the sponge paint roller and the paintbrush. A resin dam typically exists upstream of a rigid coating device such as a knife-bar and excess resin fluid is temporarily stored in this rolling-bank dam volume. The solvents used in the resin would be controlled by volumetric percentage and by evaporative quality type selection to prevent the exposed resin from skinning-over or developing a semi-sealed solvent barrier surface prior to coating the transfer sheet or applying abrasive powder either to flat disk sheets or raised islands. A number of different coating techniques well known in the coating industry can be used to change the thickness of fluids coated on a backing. Rigid surfaced coating devices can be positionally separated further from the coated surface to effect a slightly thicker coating. Also, the contacting pressure force on a paint roller or paint brush can be reduced to increase the thickness of the resin deposited uniformly over the backing sheet annular band. FIG. 19 is a cross-section view of a backing sheet supported on a compliant sponge layer during the process of applying a resin coating to the backing sheet. A backing sheet 224 is supported by a sponge layer 222 that is supported on a platen 220 moving in the direction 232 while resin from a resin coating bank 228 is spread as a uniform thickness coating 230 with the use of a doctor blade 226 pressing the backing 224 down into the sponge layer 222 thereby creating a uniform fluid shear coating pressure under the contacting land area of the flexible doctor blade device 226.

Resin Coating Floating Bar

Problem: It is important to create a uniform thickness resin coating on an annular band of a circular disk when there is variations in the thickness of the disk backing sheet and variations in the flatness of the rotating platen used to support and move the backing sheet under a coating bar that spreads the liquid resin to form an annular band on the backing.

Figure 20:
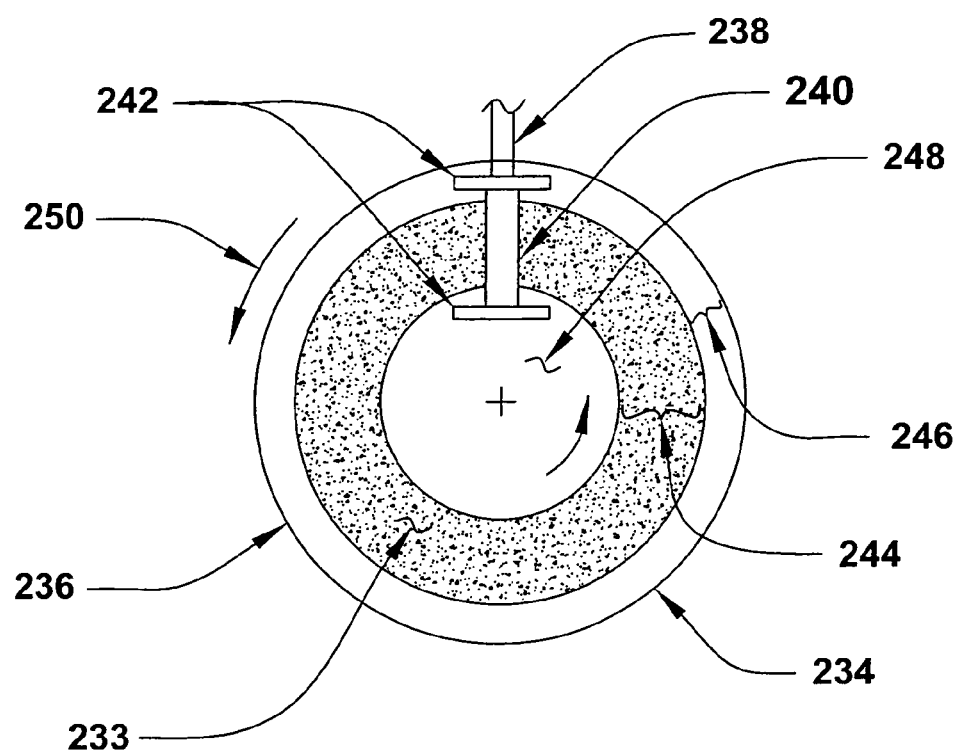
FIG. 20 is a top view of an annular band resin coating device.

Solution: The coating bar can be floated on the surface of the moving backing sheet as the sheet is rotated by the use of skid plates attached to both of the outboard free ends of the coating bar. The skid plate would be in direct contact with the surface of the backing sheet and would tend to apply friction contact forces to the backing sheet as the sheet is moved under the floating coating bar. Alternatively, the skid plates could be replaced with precision bearing elements to reduce the contact friction between the coating bar and the moving backing sheet. The skid plates or roller bearings would contact the exposed resin-free surfaces of the backing sheet that exist at positions both inboard and outboard of the resin annular band areas. The bearings or skid plates would be positioned at a small radial distance away from the travel path area of the moving annual band of resin. Here, the radial contact areas of the coater bar skid plate or the coater bar support bearing would be directly adjacent to the annular resin coated area. Because the radial cross-width dimension of the annular band is small compared to the tangential length dimensions of the annular band, the rigid precision-flatness coating bar applies a uniform thickness coating on the surface of the backing. The coating bar follows localized small variations in the backing sheet thickness as the platen rotates. Platen height variations, that predominately occur in the tangential direction, have little influence on the coating thickness. Small localized contact line coating thickness variations can occur along the length of the radially positioned coating bar knife-edge as the knife has two height reference positions, one at each end of the knife blade. Variations in the platen height or in the backing thickness in this localized knife edge contact area that typically has a 2.5 inch (6.35 cm) long line is only a small fraction of the variations that occur across the whole surface of a disk backing. A backing disk having a 20-inch (50.8 cm) diameter has a corresponding 62.8-inch (159.5 cm) circumferential length that is very long compared to the radial width coating bar length. Coating bar types including notch bar coater devices are held stationary in a tangential direction but allowed to freely float up and down across the full length of the bar that spans the radial width of the annular band in a direction perpendicular to the backing surface. The difference in surface speed at the inner and outer radial skid plates, or bearings has little effect on the skid plates or support bearings or the bar fluid coating action as the platen would typically rotate slowly at a constant speed ranging from 10 to 200 rpm during the coating process. FIG. 20 is a top view of notch-bar coater device having outboard skid or bearings contacting a circular disk backing to form an annular band area of resin coating on the backing. A disk backing 234 mounted on a rotating platen 236 moves under a fixed position 238 supported notch bar coater knife 240 having skid plates 242 or precision support roller bearings 242 that applies an annular band 244 of resin 233 on the backing 234 traveling in the direction 250 leaving the inner disk area 248 free of resin and also, the outer radial band area 246 free of resin 233.

Adhesive Coating of Annular Bands

Problem: It is desirable to apply a thin coat of adhesive binder to an annular band area of a thin sheet of circular backing where the coating is uniform in thickness with a minimum of coating thickness variation at the start and stop lines created by the coating apparatus or process. An annular band transfer sheet disk that is fluid coated can be used to transfer coat adhesive onto the top surface of an annular band pattern of raised island foundation structures.

Figure 21:
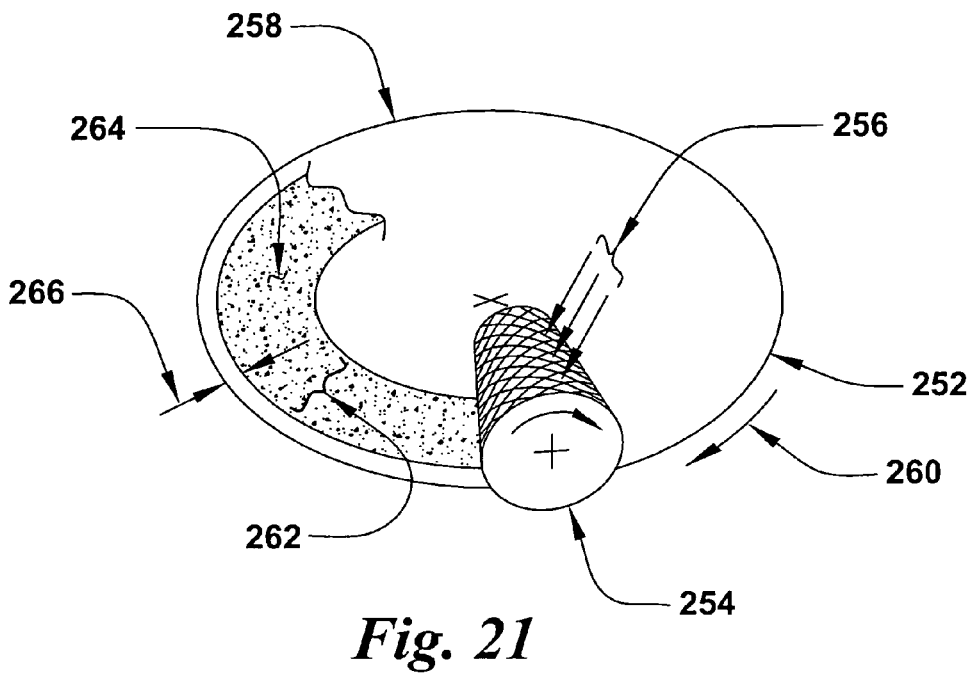
FIG. 21 is an isometric view of a tapered roll annular band resin coating device.
Figure 22:
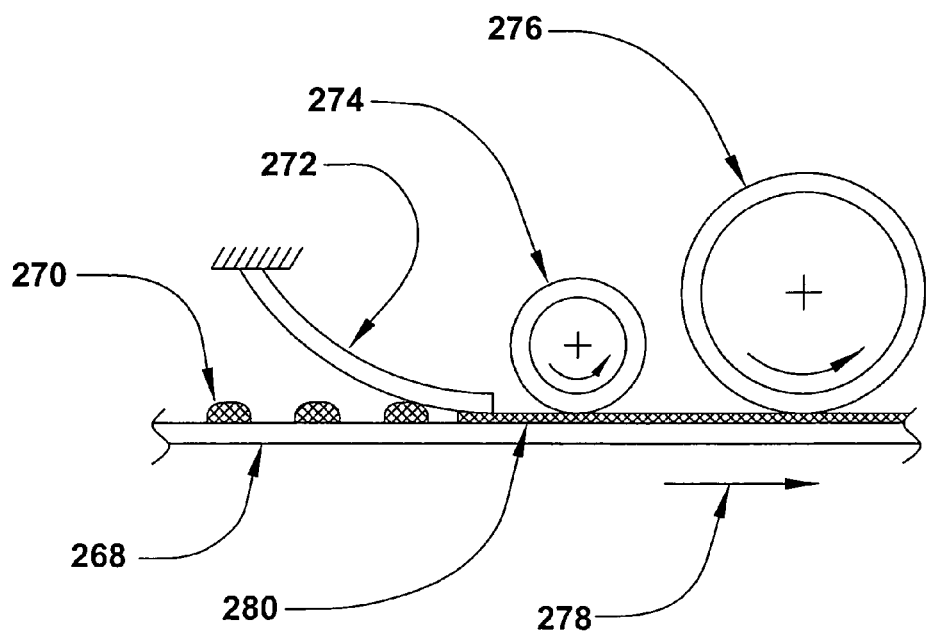
FIG. 22 is a cross-section view of doctor blade and multiple roll resin smoothing devices.

Solution: Patterns of a measured quantity of coating fluid drops or other coating shapes can be applied by a cone-shaped knurl roll or other device in an annular pattern to a backing sheet. Then, these drops can be spread out with the use of doctor blades, rubber rollers, sponge surface rollers, porous sponge paint brushes, fiber paint brushes, air jets, or other devices, to create a continuous film of adhesive coating on the transfer sheet annular band surface. A single spreader device may be used to spread the drops or multiple devices or a combination of devices may be used simultaneously or in sequential steps to spread the coating evenly. The "start" line where the coater first contacts the backing disk tends to create a discontinuity of coating thickness that can be diminished by rotating the backing disk multiple revolutions under the single coating fluid spreader device or a multiple-gang of spreader devices. The "stop" coating line that tends to occur at the position where the coater device is lifted from the backing disk surface can be diminished by raising the coater slowly while the backing is moved continuously beneath it. Different amounts of pressure or force can be applied to the spreader device with variations in force changed throughout the fluid spreading or fluid smoothing process. An aggressive force will utilize the fluid storage-and-release characteristics of spreader devices such as paintbrushes and open-cell sponge rollers. The rollers can be of different diameters, either large or small diameters or a combination of large and small diameters, to improve the downstream transfer of excess coating to areas of lesser coating thickness. The rollers can be tapered in diameter to a cone shape to prevent skidding on the annular surface of a rotating disk backing sheet surface. Fluid viscosity of the coating may vary from 10 to 10,000 centipoise. Droplets or patterns of coating fluid can be applied by the use of a tapered cone-shaped knurl roll with a coarse knurl for larger widely spaced drops and a fine, shallow knurl pattern for small closely positioned drops. It is preferred that the drop-pattern roll would be raised from the backing at the end of one revolution of the backing disk but the roll can be continued for multiple revolutions. FIG. 21 is an isometric view of a tapered cone shaped knurl roll used to apply small discrete drops of coating resin, in an annular band on a backing disk, that can be spread out to form a uniform thin coat of resin on the annular area. A disk backing sheet 258 mounted on a rotating platen 252 having a platen motion direction 260 is contacted by a tapered cone shaped knurl roll 254 having a resin coating feed system 256 that is used to coat a pattern of resin drops 264 in an annular band area 262. An annular band area 266 is shown free of coating material on the backing 258. FIG. 22 is a cross-section view of individual drops of resin deposited by a knurl roll spread into a continuous coating having a uniform thickness by a combination of a doctor blade and coating rollers. A flexible backing 268 traveling in the direction 278 is coated with individual resin drops 270 that are spread into a resin film 280 by either a single flexible-lip doctor blade 272 or a small rubber covered roll 274 or a large rubber covered roll 276 or a combination of the doctor blade 272, small roll 274 or large roll 276 or the use of two rolls 274 or 276 or more rolls (not shown).

Conformable Raised Islands and Coating

Problem: It is desirable to produce raised rigid islands coated with abrasive on a flexible backing article that allows the backing to have a planar two-dimensional flexing capability that will allow the rigid island article to conform to a circular or spherical or other curved surface. Production of the abrasive coated islands by a continuous web process is particularly desirable. Island surface abrasive coatings can be particle monolayer coatings or can be slurry coated with abrasive particles mixed with erodible materials.

Figure 23:
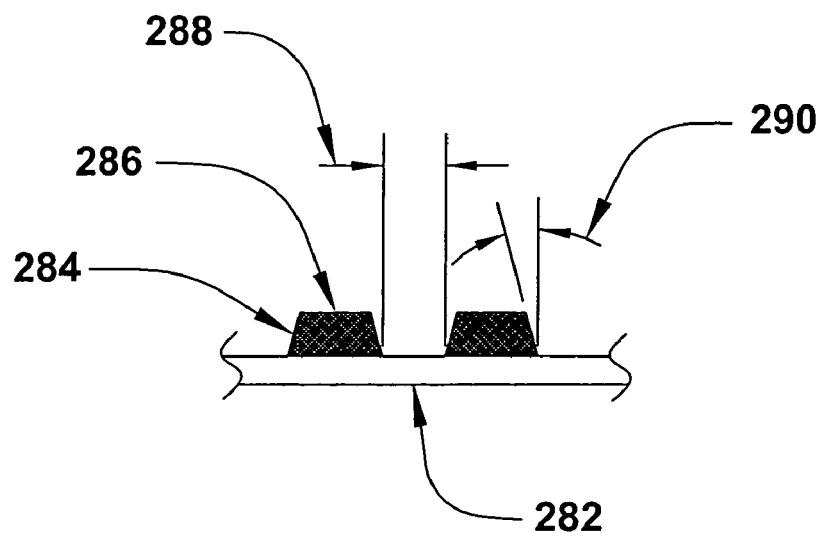
Figure 23:
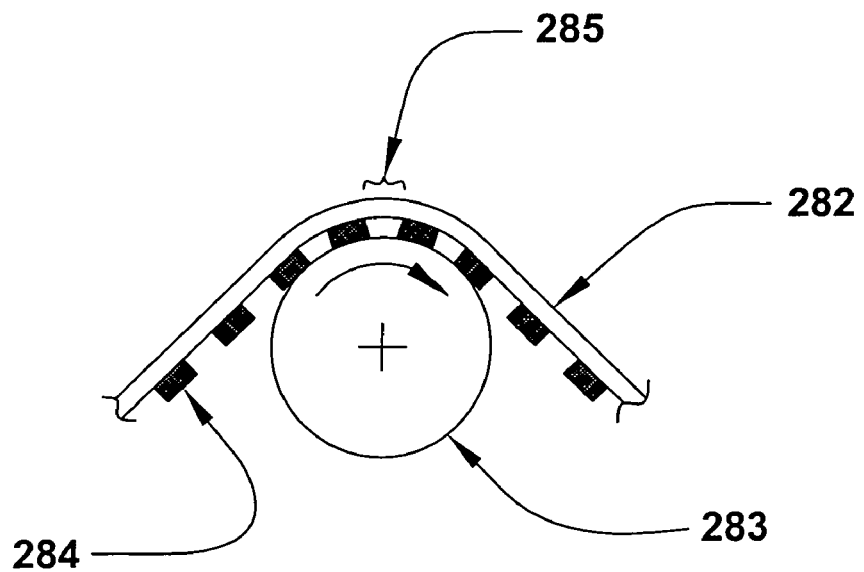
Figure 24:
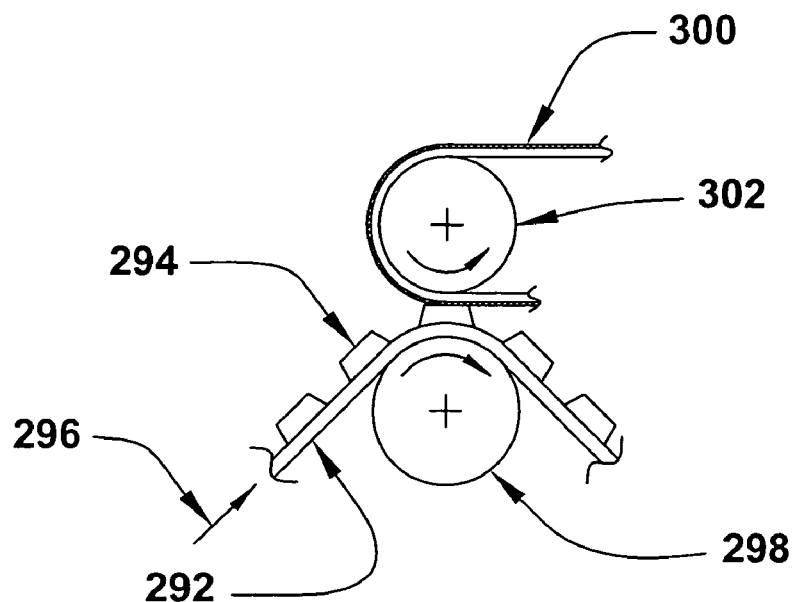
FIG. 24 is a cross-section view of island grinding with an abrasive belt.
Figure 25:
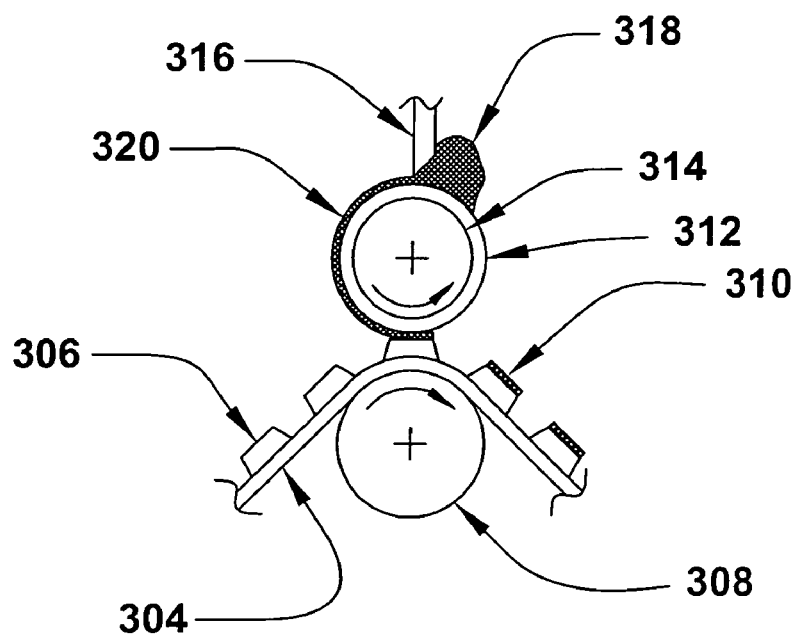
FIG. 25 is a cross-section view of a resin transfer roll island coating system.

Solution: A thick jell-like coating of island forming polymer or filled polymer can be applied to a moving web by a variety of coating techniques including a knife over roll system. Then an embossed roll can be brought into pressure contact with the jell coat to form raised islands having tapered walls, flat top surfaces and open gap spaces between adjacent islands. Island shapes include circular islands and truncated pyramids. The gap spacing between the bases of the pyramids can range from 0.001 inch to 0.20 inches (0.025 to 5.1 mm) that allows the thin polymer backing to have area regions that flex. When the cured rigid island foundation structures are flexed over a rotating roll or made to conform to a workpiece when mounted on a flexible disk grinder the raised island backing article will flex three dimensionally. Abrasive articles including disks can be cut from the continuous web material. After the islands are made rigid by curing or drying, the island top surfaces can be ground level with the use of precision surfaced rolls using precision oil lubricated journal bearings, precision roller bearings or porous carbon air bearings or conventional air film bearings. Island heights may also be accurately controlled by transporting the partially cured island formed web-backing system between two parallel nip rolls set with a precision gap. After the desired uniform height of the islands is established, abrasive particles can be applied exclusively to the island top surfaces by either coating the island surface with an resin adhesive binder and drop coating particles on the resin or by transfer coating the island top surfaces with a slurry mixture of abrasive particles mixed in a polymer binder. Here, slurry is first coated on a transfer sheet that is brought into resin slurry surface contact with the islands to transfer coat the abrasive slurry to the island surface. Also, a slurry transfer roll system can be used to transfer coat slurry onto the island top surfaces. Either a monolayer of abrasive particles can be coated on the islands or an abrasive layer with a coating depth of multiple abrasive particles can be made. After partial curing of the abrasive slurry, a resilient material surfaced roll can be brought into force contact with the raised island surfaces to roll down the slurry at the island edges to provide a rounded island abrasive slurry edge shape. FIG. 23 is a cross-section view of separated raised island structures on a thin flexible backing. The raised islands 284 having truncated pyramid shapes having flat surface top areas 286 and taper angle 290 walls are attached to a thin flexible backing 282 with gap 288 spaces between each island 284. The gap 288 spaces allow the backing 282 to flex in the areas between the islands that allows the island top surfaces 286 to conformably contact a curved workpiece (not shown) surface when the backing 282 is held against the workpiece with contact pressure. FIG. 23A is a cross-section view of raised islands 284 attached to a flexible backing 282 having gap spaces 285 that allow the flexible backing 282 to bend and conform to the curvature of the cylindrical workpiece 283 thereby providing surface contact between the islands 284 and the workpiece 283. The raised islands 284 attached to the flexible backing 282 can also be held in surface contact with the inside diameter surface of a cylindrical bore workpiece (not shown). In a like fashion, cylindrical shaped raised islands attached to a flexible backing sheet having gaps surrounding each island can be held in contact with a convex or concave spherical shaped workpiece (not shown) to conform the surface of the islands to the spherical shaped workpiece. FIG. 24 is a cross-section view of grinding raised islands attached to a flexible backing with a grinding belt. Truncated pyramid shaped islands 294 attached to a backing 292 moving in a direction 296 are routed over a backing idler roll 298 as a moving abrasive surfaced belt 300 routed over a belt drive roll 302 is brought into abrading contact with the island 294 surfaces. A nominally flat surface having a slight cylindrical curvature will be ground on the surface of each island if the island foundation is structurally stiff and resists structural bending around the curved surface of the backing idler roll 292 and the idler roll 292 has a large diameter relative to the surface and height dimensions of the raised islands. FIG. 25 is a cross-section view of a slurry coating transfer roll used to transfer coat abrasive slurry to the surfaces of raised islands. A slurry of abrasive resin mixture in a coating bank 318 is spread across the surface width of a transfer coating roll 314 having a rubber covering 312 with the use of a roll coating knife 316 to form a uniform thickness slurry coating film 320 on the roll 312 that is partially transferred to the surfaces of the uncoated islands 306 by nipping the transfer roll 314 to the islands 306 to form abrasive slurry top coated islands 310. The continuous web, or disk backing, 304 is supported by an idler roll 308. Approximately one half of the transfer roll 314 slurry coating film 320 thickness is removed from the transfer roll 314 rubber surface 312 and transferred to the island tops to form the coated islands 310. After leaving contact with the coated islands 310, the remaining thickness of slurry is carried on the surface of the transfer roll 312 back into the coating bank 318 area where it is mixed in the coating bank 318 volume and is re-coated on the transfer roll 312 surface by the roll coater knife 316. The undesirable slurry coating material degradation effects of localized slurry aging, of localized partial curing or of drying portions of the slurry contained within the slurry bank during the coating process are all minimized by reducing the size of the coating bank 318.

In another embodiment, raised islands that are attached to the surface of backing sheet can be formed by coating a continuous layer of island formation material on the surface of a continuous web backing sheet by various coating processes including by way of non-limiting examples, extrusion die coating, curtain coating, slot coating, gravure coating, meniscus coating, and the like. The backing sheet is preferred to be flexible and backing sheet materials include polymer, organic, inorganic, ceramic, composite or metal materials. After partial or full solidification of the foundation material, the surface of the island formation material can be scribed with a shape-formed sharp pointed tool, ablative lasers, fluid jet pipes (trace out and erode island and valley patterns by erosion of material by air, water or other fluids, that may contain abrasive additives), molding devices, embossing materials or other tools, to form passageways, scribe lines in the formation material that leave flat topped formation material island shapes that are separated by material channels having been formed by the scribe tools. Trenches may be skived into the non-solidified coated formation material to form valleys that act as liquid coolant passageways between the flat surfaced island structures. Various linear, circular and other movement pattern designs and paths can be used to form different island top surface cross-sectional shapes that include trapezoid, diamond, rectangular, circular, bar and other regular or irregular shapes. The scribe tools may have tapered sides that can form island shapes that include truncated pyramid island shapes that have angle-tapered walls, larger at the base and smaller at the flat truncated top. The scribe tools or island forming process may penetrate the full thickness of the island structure material layer or the tools may penetrate only a portion of the foundation material thickness to form raised island structures that are attached to the surface of a backing material. Precision feedback web coating thickness sensors can be employed to close the control loop on a island foundation material coating application system that has the capability of providing a average coating thickness, measured from the coating surface to the backside of the web backing material that varies in thickness less than 0.0002 inches (5.1 microns). The excess passageway foundation material that is separated from the layer of foundation material by the island formation process, such as a scribe action, can be removed from the remaining foundation material with various techniques including the use of air jets or vacuum cleaner systems thereby leaving an array of raised islands attached to the backing material. Jagged island edges created by the process, such as by a scribe or skive tools can be minimized by the use of impinging air jets or by other means. The raised island top surfaces will tend to maintain the original coated material thickness, thereby producing island surfaces of sufficient height accuracy that the island surfaces can be coated with abrasive particles or abrasive particles to produce abrasive articles that can be used effectively in high speed lapping and grinding applications. An intermediate pressing step against a flat surface or a roller can be used to moderate or perfect the relative flatness and uniformity of the island surfaces. If desired, the precision height of the islands can be established by the use of gap-set calender rolls or by surface grinding. Rectangular island arrays can be formed on individual backing material sheets or on continuous web materials to produce rectangular sheet, belt strips or endless belts of abrasive particle or abrasive agglomerated coated abrasive articles. Also, circular disks having annular island array patterns of raised islands can be produced with the island scribing methods. These and other raised island abrasive articles can be used for grinding or lapping workpieces that include semiconductor articles and fiber optic articles.

In another embodiment of the invention, a "tennis racket" type of open mesh or open cell grid may be made from various materials to form a pattern of RTV or polymer (polyethylene). The grid may be made of such diverse materials as the RTV material or polyethylene formed in a mold by casting or molding into grid sheets or into continuous grid belts. The RTV molded material can be reinforced with fibers, fabrics, or particulates. The mold sheets can themselves be used to mold raised island structures on the surface of backing sheets by placing the rigid into contact with the backing, filling the grid with the foundation material that forms the islands, and then removing the grid, leaving the islands behind. The grid removal should be completed after the foundation material is sufficiently hardened to remain in place upon removal of the grid. An open cell mesh screen (e.g., wire screen) may alternatively be used as a grid mesh sheet.

Mutual Alignment of Platen and Grinding Wheel

Problem: It is important to precisely align a platen surface and raised island annular surface with a grinding wheel that creates a flat surface both radially and tangentially on the ground platen or raised island surfaces. First, the surface of the platen is ground flat and then raised islands attached to a flexible sheet are ground flat by mounting the island sheet on the rotating platen and grinding the raised islands with a grinding head traversing the rotating platen in a radial direction. It is difficult to mutually align the system grinder and platen to produce island or platen surface grinding flat within 0.0001 inch (2.5 microns).

Figure 26:
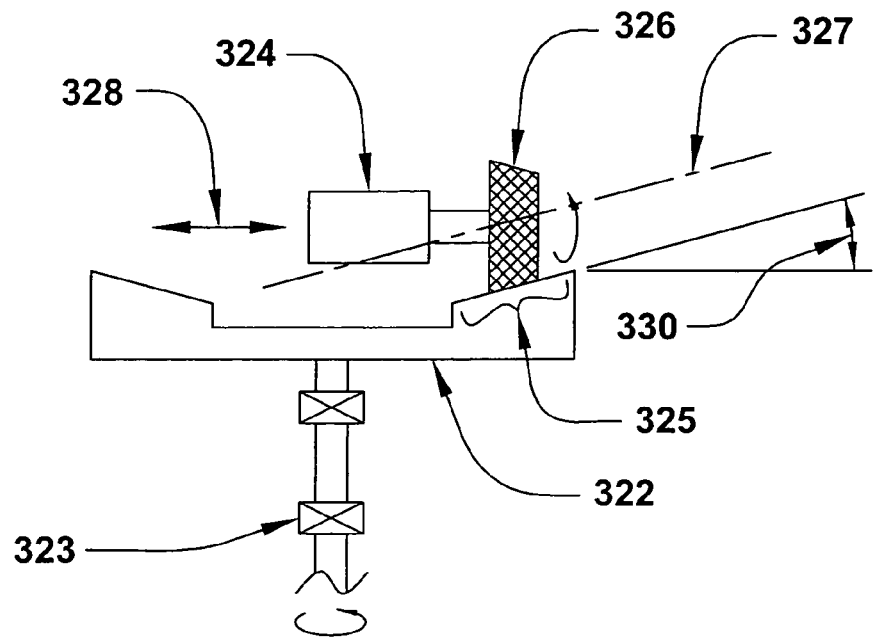
FIG. 26 is a cross-section view of a platen surface grinder.
Figure 27:
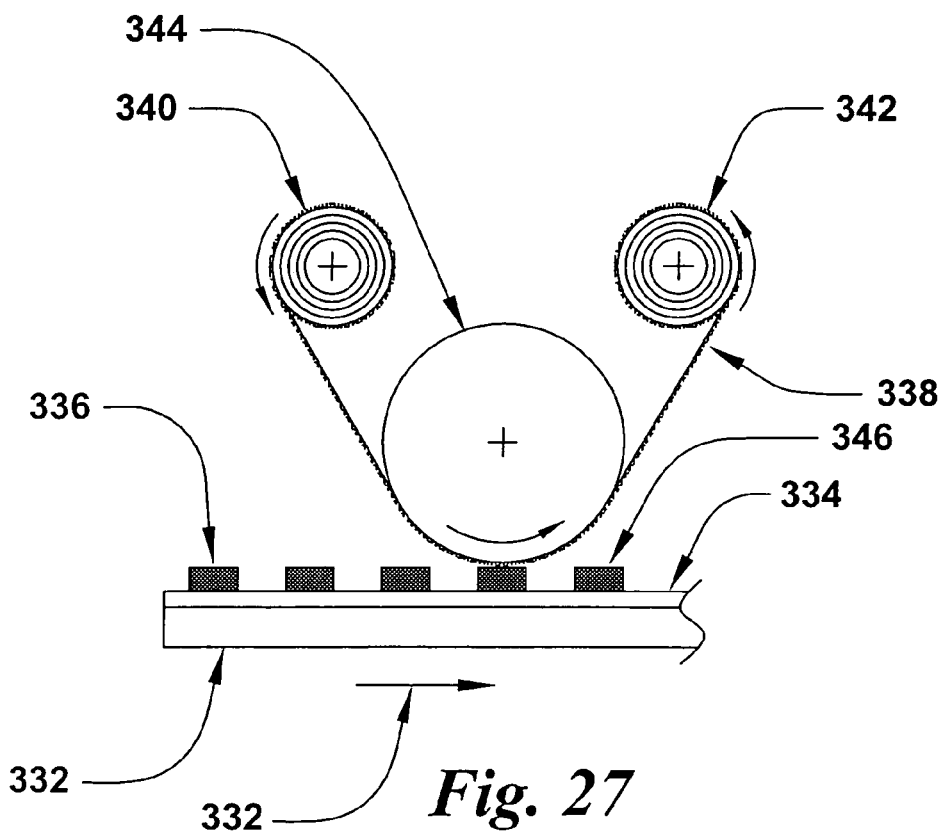
FIG. 27 is a cross-section view of a raised island surface grinder.

Solution: A process technique is sued where a platen is precisely ground by a grinder head and the same aligned grinder is used to grind raised islands. Either an eroding conventional rotating grinding wheel or a rotatable idler backing wheel used in conjunction with a strip of precision thickness continuous long coated abrasive can be used to perform the flat grinding of the platen surface or the island surfaces. The strip width of the grinding media surface is typically less wide than the radial width of the annular band to be ground and this narrow width tends to generate even abrasive wear across the width of the strip grinding media. Use of a narrow abrasive strip for abrading a wider radial annular band requires that the grinding head travel radially to grind the full annular surface. It is not critical that the grinding head travel radially in a precise straight line extending across the full diameter of the annular band; it is only required that the grinding head travel in a precisely straight line extending only across the radial width of the annular band. The short radial grind-line path extending across the annular radial width may be downward angled from a true line, extending across the full diameter and passing through the center of the annular band, thereby defining a cone-shape surface of the full annular band. The grinder is traversed across the platen annular radius width only along an axis parallel with the cone angle of the cone-shaped platen surface. Then non-perfect radial path alignment of the grinding head is not critical as the raised islands are attached to a flexible backing sheet that will conform radially, and tangentially, by means of a vacuum hold down system to the radially straight, but cone-shaped, ground surface of the platen. The raised islands attached to a flexible backing sheet are ground flat using the same grinder set-up and apparatus used to grind the platen and to dress the abrasive back-up wheel. Later a flexible raised island backing disk article, having all islands ground to the same precise elevation measured relative to the backing backside when the conformable flexible backing sheet was mounted flat on the surface of a slight-cone-shaped platen, can be attached to a perfect radially flat grinder or lapper machine platen surface for abrading use. All of the raised islands attached to the abrasive article will abrasively contact a flat workpiece surface. If raised islands attached to a stiff backing are surface ground at a surface cone-angle and this stiff backing abrasive article is attached to a perfectly flat grinder platen, only those abrasive coated islands residing at the highest portion of the cone-shaped annular surface will contact a flat workpiece. A process procedure to achieve the required mutual alignment of the grinder head and platen is to grind the surface of the platen and then to dress an erodible rotating grinding wheel with abrasive media that is attached to the ground platen surface. Here, the grinding wheel surface is abrasively worn to match the flatness straight radial line surface of the cone-shaped platen prior to grinding annular band raised island sheets. An alternative technique is to use a flat surface idler wheel mounted on a precise roller or air bearing and grind the surface of the flat idler to be flat to the cone-shaped platen. Then a continuous abrasive belt, or a very long narrowed strip of precise thickness abrasive media can be routed around the idler wheel whereby the abrasive can contact the annular band of raised islands attached to a backing mounted on the pltaen. The abrasive belt, or strip, may be moved at higher speeds of up to 3,000 fpm or moved slowly at 1 fpm or moved incrementally to continuously present new fresh abrasive to the island surfaces. FIG. 26 is a cross-section view of a platen and a platen grinding device. A rotating platen 322 having shaft support bearings 323 has a typical radial flatness error angle 330 that matches the ground surface of the grinder 324 grinding wheel 326. The flatness error angle 330 can be caused by a number of sources including either a flatness error of the wheel 326 that is then replicated on the platen 322 surface. A flatness error angle 330 can initially exist between the platen 322 and the grinding path line or axis 327and the grinding wheel 326 surface then wears-in to match the platen 322 surface slight cone-shape. The grinder 324 is traversed along a axis 327 that is parallel to the error angle 330 with a oscillating motion 328 across the platen 322 cone-shaped annular raised land surface 325. The platen radial flatness error angle 330 can be caused by misalignment of the grinder 324 traversing mechanism (not shown) relative to the flat-diameter surface of the platen 322. FIG. 27 is a cross-section view of the raised islands attached to a backing sheet in abrading contact with an abrasive grinding strip. A flexible backing sheet 334 is mounted conformably to a platen 332 having a vacuum attachment system (not shown) in such a manner to present each raised un-ground island 336 attached as an integral part of the backing 334 to a contacting abrasive grinding strip media 338 where the top surface of each island 336 is ground to a height relative to the top surface of the platen 332 at the localized area immediately under the abrading contact line created by the abrasive media strip 338 idler roll 344. Unground island 336 islands that are top-level ground with this system produce surface ground islands 346 that have the same thickness measured from the top surface of the island 346 to the bottom surface of the backing 334 if the platen 332 surface is precisely flat radially and circumferentially in the annular band island 325 area, and if the abrasive media 338 is precisely flat as presented in abrading contact to the islands 336. The island 336 can be ground in one rotational pass of the platen 332 having a motion direction 332 or the islands 336 can be progressively ground with multiple rotations of the platen 332. The abrasive media is shown as strip 338 but it can be in the form of a continuous belt. The abrasive strip 338 is unwound from an unwind roll 340 and is supported in abrading contact by an idler roll 344 and is wound on winder roll 342. The abrasive strip 338 can move at very low speeds, at high speeds, or held stationary between incremented advancement motions.

Island Formation on Backing Sheet

Problem: It is desired to create raised island structures on one surface of a flexible backing sheet with each island shape strongly bonded to the backing sheet and the island top surfaces are at the same height measured from the backside of the backing sheet. Formation of web backing islands is desired for both a single-sheet backing batch manufacturing process basis or a continuous web manufacturing basis.

Figure 28:
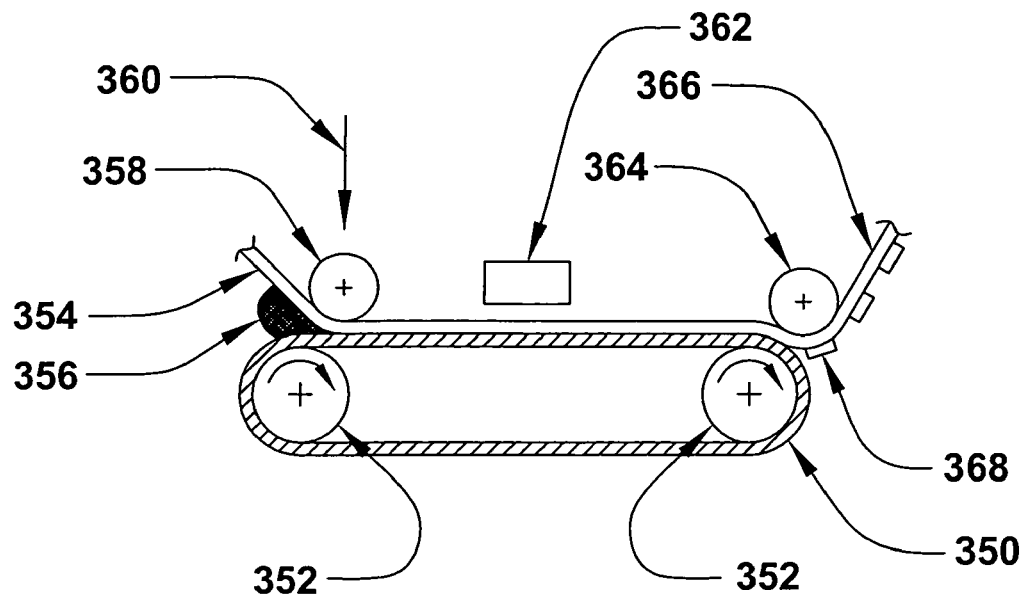
FIG. 28 is a cross-section view of a cavity belt island forming system.
Figure 29:
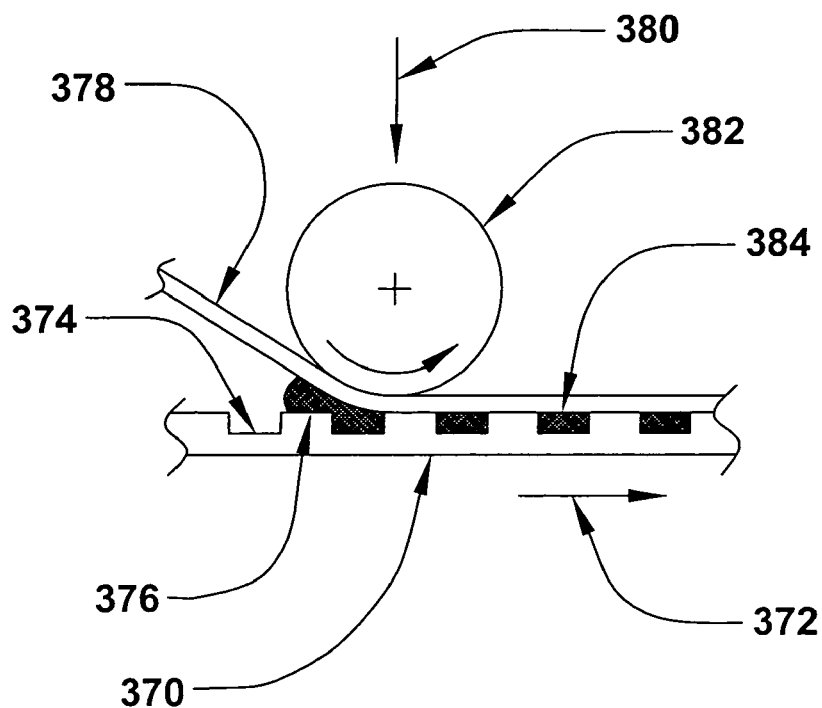
FIG. 29 is a cross-section view of a roll nipped cavity island forming system.

Solution: Island shaped cavities can be formed into the surface of a rigid metal or plastic surface or cavities can be formed into the surface of a flexible material such as silicone room temperature vulcanizing (RTV) material. The RTV cavity mold can be formed as a continuous belt structure or the RTV mold can be deposited as a layer on a stiff cloth, fiber or metal flexible flat belt. The belt can be mounted on a web roll machine and island foundation material can be deposited in the cavities as a coating fluid across the full web width of the belt. A continuous length of web backing material can be brought into contact with the fluid island foundation cavity material as the continuous endless RTV island cavity belt is transported under a cavity filling head. A nip roll can be used to press the backing into the coating that performs the functions of wetting and filling each cavity with the coating material and also bringing the backing into intimate contact with the TRV belt surface. Any excess coating is driven upstream of the nip roll contact and the backing is fully wetted with the coating fluid. As no forces are present to separate the backing from the belt surface, the island coating can be cured into a rigid bonded state by the use of a variety of energy sources including an electron beam, an ultraviolet light source, a radiant thermal heater or an oven station. After curing the island material, the backing web can be peeled off or separated from the surface of the RTV belt and wound into a web roll or converted into individual raised island articles such as annular disks of raised islands. Disks may be cut from a continuous web by various devices including a raised edge razor blade circular shaped rule-die cutter, or a circular mechanical punch and die set, or a water-jet cutter. A batch process can produce an individual disk of raised island foundations on a backing by using a cavity plate made of a plastic such as high density polyethylene or RTV, both of which will not adhere readily to the island foundation coating. A sheet of backing can be positioned in contact with one end of the cavity plate, either before or after the island foundation coating is applied, and the backing sheet then can be nip-rolled into contact with the cavity plate. After solidification of the coating, the backing sheet with attached raised islands can be separated and die cut to the desired diameter or size. FIG. 28 is a cross-section view of an endless island cavity belt with an island structure material cavity filling and curing device used to form island structures as an integral part of a continuous web backing material. A cavity belt 350 constructed from RTV silicone rubber or other materials is routed over two idler rolls 352 with a continuous backing web 354 routed under a nip driven roll 358 having a nip force 360 that forces a liquid island formation coating material 356 into the open island cavities (not shown) located on the contacting surface of the cavity belt 350. The cavity belt 350 is advanced with the web backing 354 to a cure station 362 that applies energy including heat, light, ultraviolet light, radiation, electron-beam and other energy sources to the web 354 and the cavity filled island formations (not shown) to effect a solidification of the island material and to create a common adhesive bond between the island structure formation and the web backing 354. After solidification of the island material, the backing web 354 can be web-wrap routed around a peeling roll 364 that pulls the web backing having integral raised islands 366 away from the cavity belt 350 in a manner that separates the formed islands 368 from the cavity belt 350 without weakening the bond between the raised islands 368 and the web backing 354 moving attached islands 366. The cavity belts can have raised island patterns in annular bands to form abrasive disk articles or the raised islands can be arranged in continuous rectangular arrays to form a web backing having a continuous array of integrally attached raised islands that can be used to construct long strip abrasive articles or abrasive article sheets or endless belt abrasive articles. Lap joints of the backing can be made in an area of backing free of islands to form the endless belts from a strip of integral island backing material where the overlapping backing lap joint will not affect the thickness of the belt having abrasive particle coated islands attached to the endless belts. The endless belts can be constructed before the islands are coated with abrasive particles or after the islands have been abrasive particle coated. Continuous webs can be made to contact with a sequential series of individual cavity plates to form annular patterns of raised islands; or, rectangular arrays of raised islands can be formed on separate article backing sheets. FIG. 29 is a cross-section view of a nip roll forcing a continuous web backing or a single article backing sheet into intimate contact with island forming material contained in island cavities of a cavity plate. A cavity plate 370 is moved in a direction 372 under a rotating nip roll 382 that presses a backing sheet 378 into wet island formation fluid 376 unfilled island cavities 374 with a nip force 380. The backing sheet 378 will lay in flat contact with filled island cavities 384 and the backing sheet 378 will also lay in flat contact with the contacting surface of the cavity mold plate 370 that allows the cavity mold plate 370 and backing sheet 378 to be removed together from the nip roll 382 for solidification of the islands at a later time in a separate curing device.

Platen Stress-free Mount

Problem: It is desired to mount large 14 to 30 inch (35.6 to 76.2 cm) diameter platens to machine rotary spindles in a bolt-down stress-free state to avoid creep-type distortions of the platen surface over time after the platen has been mounted to the spindle with controlled-torque tightened bolts. Forces from tightened hold-down bolts tend to distort the flat surface of a platen when a platen cover plate is mounted to a platen or a platen is mounted to the circular head of a spindle, particularly when the mounting surfaces are not precisely flat to each other. Flatness distortions of the platen surface can occur immediately on tightening the bolts. Later, an extended period of time, additional platen surface distortions can occur as the platen material creeps and distorts due to the applied bolt forces. It is desired to achieve and maintain flatness across the surface of a platen to be within 50 millionths (0.000050) of an inch (1.25 microns) using platen materials including steel, aluminum plate and cast aluminum. It is important to be able to create a flat surface, disassemble the platen assembly and reassemble it while maintaining the original surface flatness over a period of time.

Figure 30:
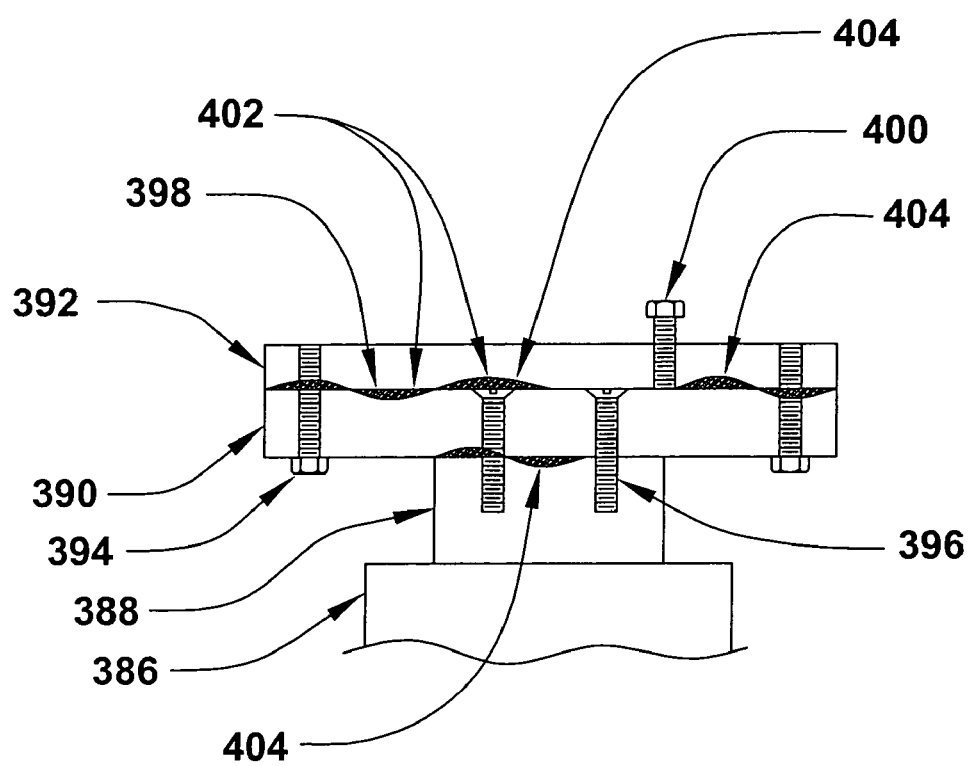
FIG. 30 is a cross-section view of stress-free platen mounting system.

Solution: Rough machined platen material having localized discontinuities can be coated with a thin coat of curable polymer such as epoxy. This platen can be placed in contact with a spindle surface that has been coated with a release agent including a mold release, oil or grease. Rotating or oscillating the epoxy-coated platen surface against the spindle surface will spread the epoxy across the spindle surface and fill all of the gap discontinuities that exist between the platen and spindle contact surfaces with epoxy. Then the hold-down bolts are installed and temporarily tightened with low torque to drive any excess epoxy from the contact surface after which the bolts are loosened. After the epoxy has solidified, greater torque can be applied to the hold-down bolts to achieve a strong mounting connection between the platen and the spindle without any significant localized defection of the platen because the original surface discontinuities are filled with solidified epoxy. The platen can be easily separated with jackscrews from the spindle because the epoxy will not adhere to the mold-release-coated surface. Remounting the platen with the original tangential relative orientation between the platen and spindle allows reestablishment of a strong distortion stress free mounting. This technique can be applied between sandwich layers of different platen materials to build up a thick platen. After mounting, the top surface of the platen can be machined or ground precisely flat within 0.000050 inch (1.25 microns). FIG. 30 is a cross-section view of a composite platen using epoxy to fill surface defect voids. A lower platen plate 390 is attached to a rotatable spindle 386 having a spindle head 388 with the use of spindle bolts 396. An upper platen plate 392 is attached to the lower platen plate 390 with platen bolts 394. A mold release material 398 is applied to the contacting surfaces of the mold plates 390 and 392 and the spindle head 388. Small surface flatness defects 404 present on the surfaces of each of the contacting members, plates 390 and 392 and the spindle head 388 are filled with an epoxy or other polymer 402 prior to assembly of the platen spindle assembly. Mounting bolts 394 and 396 are installed and tightened with a minimum amount of torque to squeeze excess epoxy from the flat joint area common to the face matching components, the upper platen plate 390 and the lower platen plate 392 and from the joint area common to the lower platen plate 390 and the spindle head 388. Then the bolts are loosened and the assembly components are left in the loosely mounted condition until the epoxy has fully solidified and reached full compressive strength after which time, the mounting bolts are fully tightened to the desired torque load. As the bolt forces are acting on a continuous rigid body the localized deflections of the component plates in the localized areas of the bolts is significantly reduced as compared to the same components without the epoxy joint filler material mounted with the same bolt forces. The release agent applied to the contact surfaces of the assembled components prior to applying the epoxy filler minimizes the separation forces required by the platen plate jack screws 400 used to disassemble the platen assembly.

Coated Web Annular Bands Using Printing Plates

Problem: It is desired to coat annular band patterns of adhesive binder on individual sheets of flexible backing or onto continuous webs of flexible backing where individual sheets of coated annular bands can be cut from the web. The coating binder must be uniform in thickness across the full annular band surface to enable the use of the sheet to transfer coat approximately one half the coating thickness to the top surface of raised islands or for other process or product uses.

Figure 31:
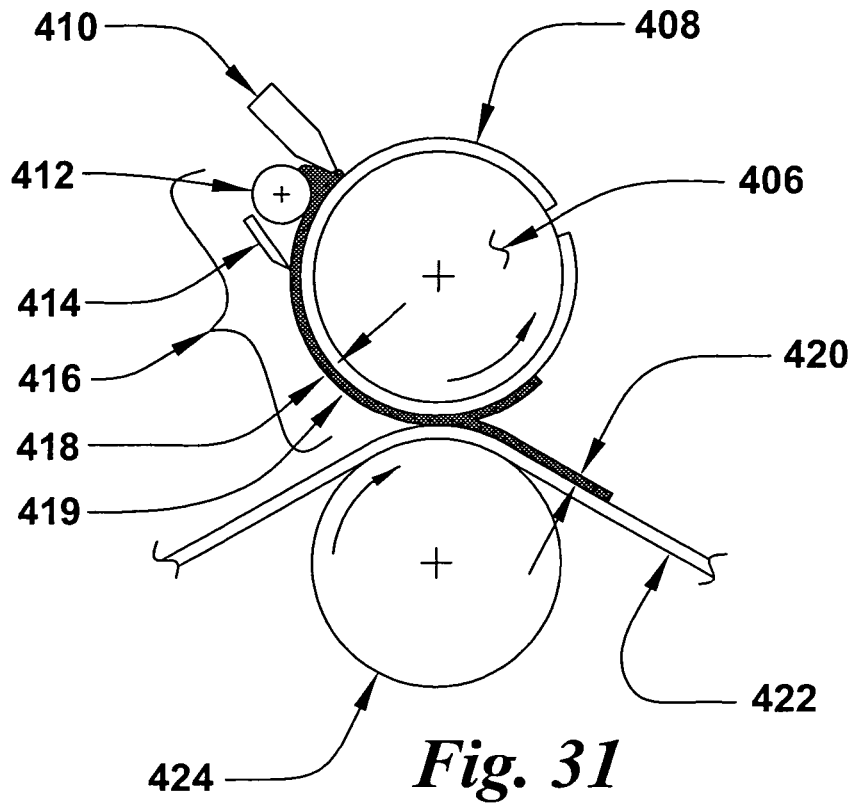
FIG. 31 is a cross-section view of a nipped resin printing-plate coating system.
Figure 32:
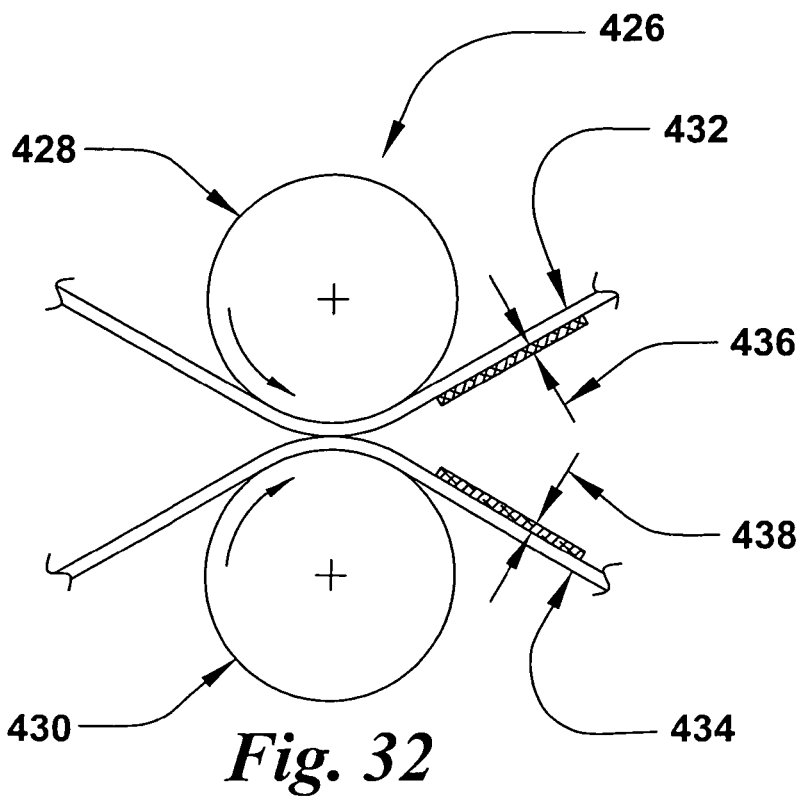
FIGS. 32 and 32A are cross-section views of a nipped resin transfer backing coating system.

Solution: A rectangular flexible printing plate can be prepared with an annular band section that can absorb or hold a uniform thin coating of binder adhesive that can be applied by various printing press machines commonly available. The printing plate may have a raised annular band with a fluid absorbing, or fluid holding, textured surface or the plate may be flat across its full surface with a textured annular band pattern. This flexible plate may be made of metal or rubber coated metal or it may be a polymer-based material, or other composite materials. The printing sheet would be wrapped around a roll and coating fluid applied to the annular band pattern. A single backing sheet or a continuous web would be routed in nipped contact with the printing plate roll to transfer all or a fraction of the coating to the backing sheet as the sheet passes through the nipped roll system. The roll system can rotate continuously to create a sequential series of coated annular bands on the backing. An annular section of the web can be cut out and the coated annular web pressed in contact with another web or in contact with raised island surfaces to transfer approximately one half of the coating to the contact surface. If desired, after one half thickness of coating is transferred to an intermediate sheet, this half-thickness coated sheet can be pressed in contact with a final target surface to transfer one half of its coating thickness with the coating applied to the target resulting in a thickness of only one fourth of the original coating applied to the target surface. This coating thickness halving process can be continued to create even thinner layers of coating. FIG. 31 is a cross-section view of a printing plate system used to print annular band patterns of resin on a continuous web backing. A printing roll 406 has an attached printing plate 408 that is resin coated at a printing station head 410 using a coating applicator roll 412 where the coating is smoothed by a doctor blade 414 to produce a uniform thickness 418 resin coating 419 on a textured or otherwise surface conditioned annular band printing plate annular band pattern 416 portion only of the printing plate 408. Resin coating is not coated on the non-textured area portion of the printing plate 408. The annular band patterns on a printing plate 408 may be generated by various methods including the use of a polymer sheet having portions of the surface removed or a plate can be provided with a textured surface by light reaction polymerization or by other methods commonly used in the printing industry. The resin coating 419 is shown as being split resulting in a coating thickness 420 that is partially or wholly transferred from the printing plate 408 to the surface of a backing sheet 422 by nipping the rotating printing roll 406 to the backing 422 that is routed over a back-up roll 424 to form the same geometric annular band shaped annular pattern on the surface of the backing sheet 422. The backing sheet 422 can be a discrete sheet of backing or it can be a continuous web backing material where the identical annular band pattern is printed in succession on the surface of the backing 422 as the printing plate 408 makes repetitive contacts with the backing 422 as the printing roll 406 is continuously rotated. FIG. 32 is a cross-section view of a transfer roll coater that can be used to make progressively thinner resin coating patterns on a backing sheet by transfer printing a pattern on one sheet and then using this sheet to transfer approximately one half of the resin thickness to another sheet. This process can be repeated to progressively develop thinner resin coatings of the same original patterns. The resin coating on the final sheet can then be used to transfer coat approximately one half of the resin thickness to the top surfaces of a matching pattern of raised islands attached to a backing sheet. Abrasive particles can then be applied to the resin to produce a raised island abrasive article. A transfer station 426 has a transfer roll 428 in contact with a continuous web backing 432 having resin coated annular or other patterns that is brought in contact with another continuous web or backing sheet 434 that is supported with a backing roll 430. As the rolls 428 and 430 are mutually rotated, approximately one half of the original resin coating is transferred from the continuous web 432 to the backing sheet 434 to leave a patterned resin deposit of approximately one-half resin thickness 438 deposited on or transferred to the backing sheet 434 and one-half resin thickness 436 remains on the web 432.

Resin Transfer Printing Pad

Problem: It is desired to create a resin printing pad transfer sheet that can provide a uniform resin coating on the surface of raised islands having rectangular or annular island array patterns.

Figure 32A:
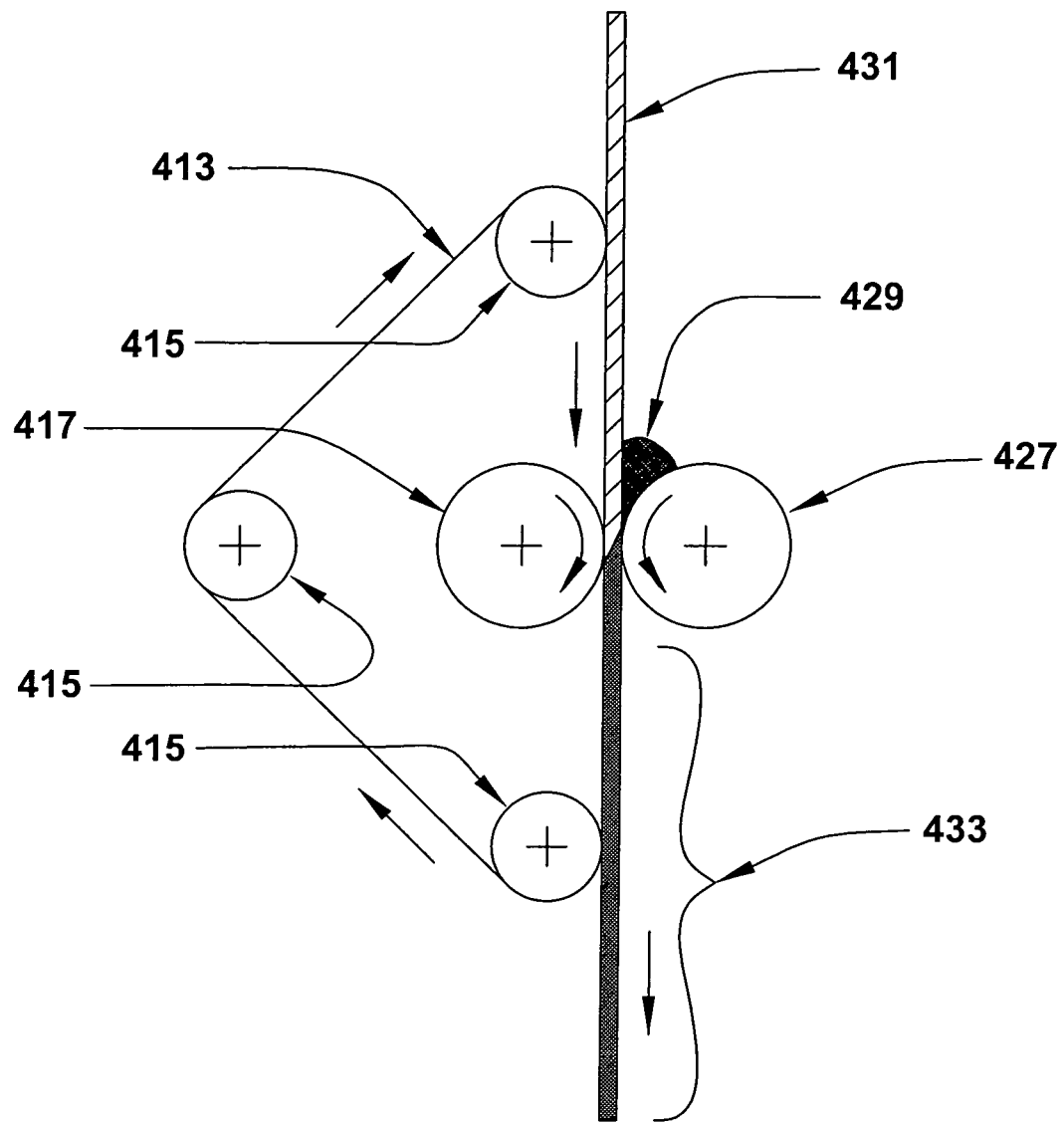

Solution: A printing pad can be saturated with a consistent amount of resin by using a nip roll coater having a resin bank and a endless belt that prevents resin coating contamination on the coater nip idler roll surface. The printing pads can have a rectangular sheet shape or an annular band shape and the printing pad may be attached to a backing carrier sheet. Printing pad material may be an open cell or a closed cell foam or sponge material, a silicone rubber or polyurethane rubber material or a polymer sheet or a metal sheet material. Solid or resilient non-sponge printing pad material can have a textured surface to improve the capture and retention of resin. Pad sponge material would be selected to have uniform sponge cell characteristics to provide a uniform controlled resin thickness when resin is transferred to the surface of an abrasive article sheet. The resin saturated or resin filled printing pad would be brought into pressurized surface contact with an abrasive sheet article or a raised island article by using a nip roll or a stamping plate that provides a consistent transfer of resin from the printing pad to the surface of the backing sheet article. The printing pad can be refilled with resin after one or more resin transfer operations by processing the printing pad through the roll coater again. A solvent based resin would be used that allows fresh resin to be maintained inside the pad body when a single pad is used to transfer resin to multiple raised island article sheets. Compressing the pad during a resin deposition action and compressing the pad during a resin replenishment action tends to mix old resin with new resin and exhaust old resin from the pad that reduces the possibility of the existence of degraded resin within a printing pad. Other coaters including a rotating annular band resin coater can also be used to initially apply resin to a pad or to replenish depleted resin in a printing pad. Printing pads may have the shape of an annular band. A continuous rectangular sheet where resin is applied and replenished only from an annular band area can be used to provide a continuous contacting surface with a roll coater to assure uniform resin coating characteristics across the full surface of the printing pad transfer sheet. FIG. 32A is a cross-section view of a printing pad roll coater used to saturate a porous sponge transfer sheet with a solvent base liquid resin. A endless belt 413 is routed around three idler rolls 415 and past a nip idler roll 417 that is in controlled force or controlled position contact with a rigid or rubber covered coater roll 427 to provide support for a sponge printing pad 431 that is transported through the resin bank 429 positioned at the top of the driven coater roll 427. The resin in the bank 429 is metered and driven into the depth of the printing pad 431 as the pad 431 is transported through the nip area formed by the coater roll 427 and the nip idler roll 417. The endless belt 413 contacts the resin 429 when the pad 431 is not present thereby preventing resin 429 contact with the nip idler roll 417. The printing pad having a resin filled section 433 that is removed from the roll coater to transfer coat resin to the surfaces of raised island structures, thereby leaving the belt 413 in direct contact with the resin bank 429 and the coater roll 427. Non-sponge printing pads can be processed using the same coater roll apparatus.

Transfer Roll-Coating of Polymer or Slurry

Problem: It is desired to coat annular bands or rectangular patterns of raised island surfaces or to coat annular bands directly on the flat surface of a backing sheet with either polymer resin or with a slurry comprised of abrasive particles mixed in a polymer resin. The typical 10 to 45 micron thick resin coating should be uniform in thickness to within 35% of the nominal thickness and the solvent filled abrasive slurry coat is to be only one abrasive particle diameter thick nominally. The coating or slurry can be applied on a batch basis to individual disks or can be applied in patterns to a continuous web.

Solution: A nipped fluid coating metering roll system can be used to coat the surface of one roll that is held in running contact with a backing sheet having raised islands. Approximately one half of the polymer resin or abrasive slurry on the surface of the transfer roll will be transferred to the top surface of the raised islands. Resin coating, or slurry coating, remaining on the rotating transfer roll after contact with the island tops can be removed from the roll surface by a scrapper device and mixed into a coating bank. The coating bank, formed by another smaller diameter roll nipped to the transfer roll, will continuously re-circulate the coating fluid and prevent aging or coating solidification or stratification of the bulk coating fluid. Edge dam devices mounted in contact with the running or moving surface of the two nipped rolls control the width of the applied coating and prevent fluid leakage from the ends of the rolls. The thickness of the coating or slurry fluid can be controlled by methods including adjusting nip roll nip pressure, selection of roll surface materials including different durometer or stiffness of rubber rolls, use of textured roll surfaces, use of solid or metal rolls, use of different thickness rubber coverings or use of different roll diameters or combinations thereof. Speed variations, including reverse direction rotation can be applied to each roll to affect the applied coating thickness on the transfer roll. One or more rolls may have open-pore fluid storage capability such as a knurl roll, a textured roll or an open-cell resilient roll covering that can minimize downstream coating thickness defect variations such as voids or excess coating thickness variations. A function of the coating fluid-bank contained in the formed-volume located in the fluid pocket formed between the two nipped coater rolls is to spread the fluid along the fluid-wetted length of the transfer roll. The coating bank minimizes occasional or periodic coating thickness deficiency defects across the width of the coating roll. After the coating or slurry is applied to the island tops, a fluid storage device including a paintbrush or a sponge or a non-fluid storage device including a doctor blade can be dragged on the moving island surfaces to drag excess coating to the downstream edge of each individual island surface. A cone-shaped roll system can be used to coat rotating annular bands and a constant diameter or flat-roll system used to coat continuous web backing. A release-liner cover sheet or web of polyethylene material, or other polymer material, can be brought into forced contact with the slurry coated islands with or without applied vibration to force raised or double-height particles into direct contact with the island foundations surface to achieve a monolayer of particles. An option is to keep the cover sheet in contact with the island surfaces until the coating resin has partially solidified. Raised islands attached in rectangular or annular array patterns to flexible backing sheets can be coated with an abrasive slurry mixture comprised of abrasive particles, erodible filler materials and a binder resin to provide a uniform thickness coating on the surface of the raised islands. Individual abrasive particles are positionally separated from each other by the erodible material that fills the spaces between adjacent abrasive particles. During abrading action, the erodible material that supports the abrasive particles is ejected to continuously present new and sharp abrasive particles to a workpiece surface during abrading action. Very fine abrasive particles having sizes of less than 30 microns can be coated in abrasive layers that have at least a monolayer of abrasive particles coated on the top surfaces of raised islands. The raised islands having a uniform thickness erodible abrasive coating are positioned with sufficient space between adjacent island walls that significant abrading contact force is present to provide aggressive workpiece abrading action.

Continuous Web Resin Transfer to Islands

Problem: It is desired to apply a uniform controlled thickness of resin to the upper surface of rectangular arrays or annular arrays of raised island structures attached to a backing sheet.

Figure 33:
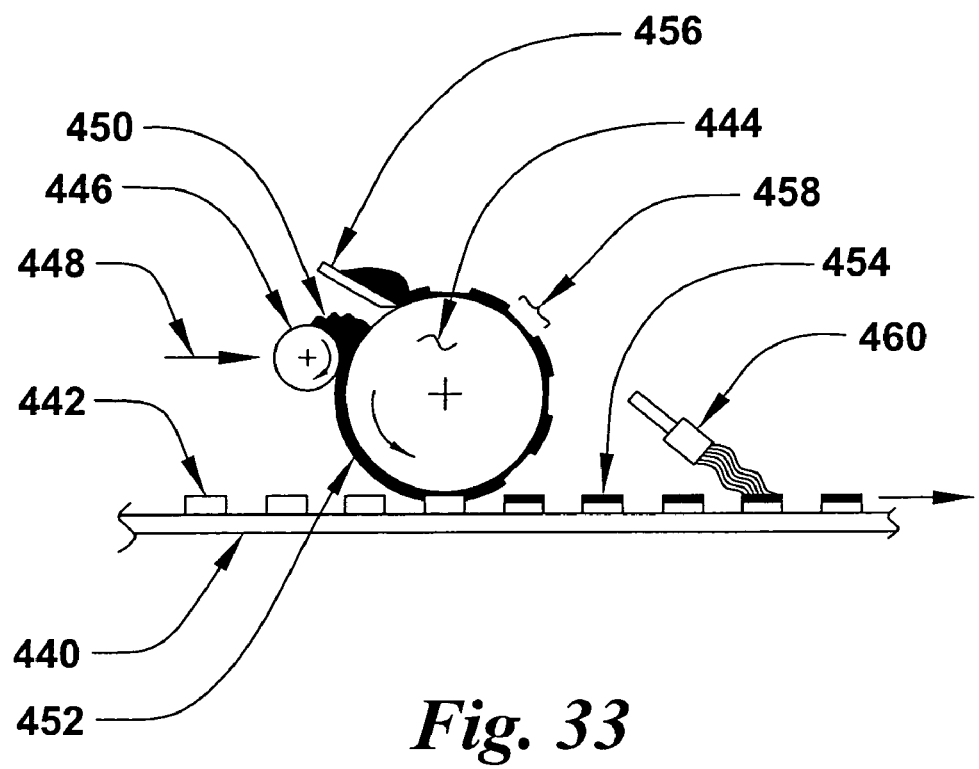
FIG. 33 is a cross-section view of an abrasive slurry transfer roll island coating system.
Figure 73:
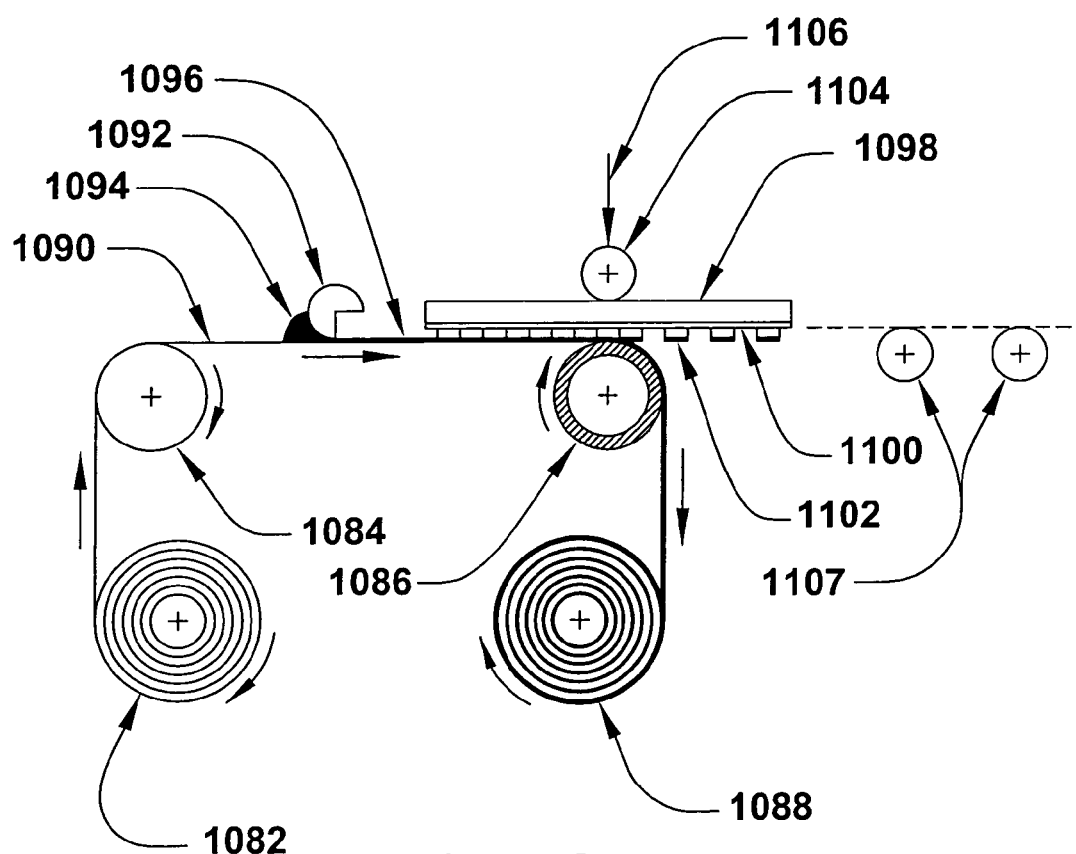
FIG. 73 is a cross-section view of a notch bar knife coater applying resin to raised islands.
Figure 74:
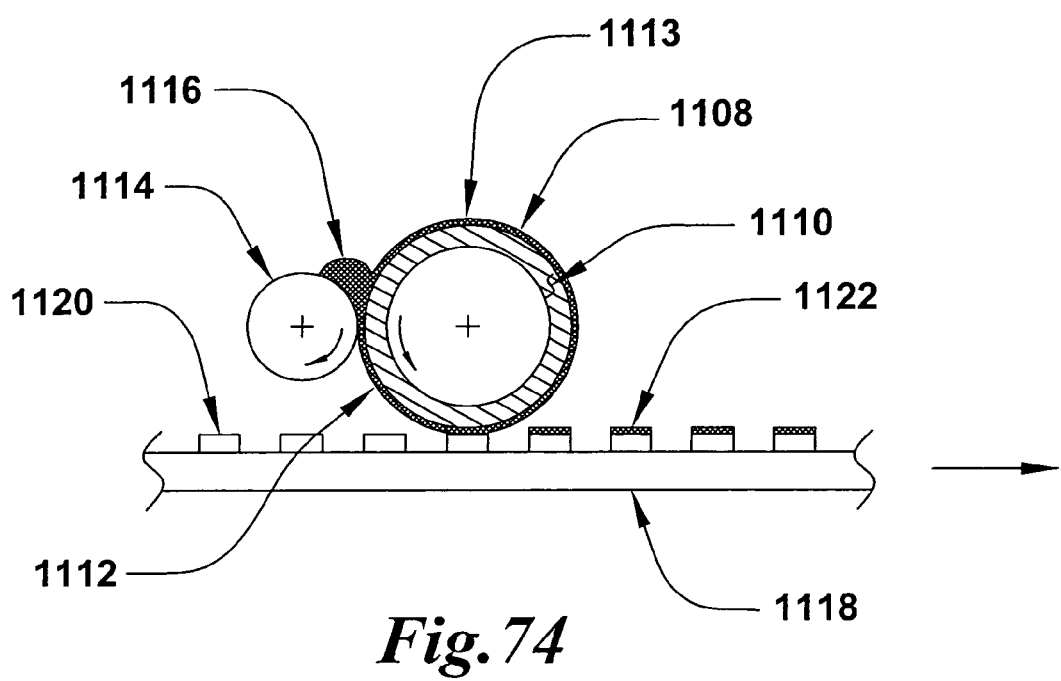
FIG. 74 is a cross-section view of a roll coater applying resin to raised islands.

Solution: A uniform resin coating can be applied by a simple continuous web coater apparatus to the surface of a continuous web using traditional coater equipment commonly used in the web coating industry. Coaters include motorized notch-bar knife coaters, knurl roll coaters, multiple roll coaters, reverse roll coaters and other coaters. A motorized knife coater machine having a length-notched precision ground cylinder shaped knife bar positioned above a flat bed extending along the bar axis can be used to apply a controlled resin thickness on the surface of a continuous web pulled through the gap area that exists between the notch bar knife and the knife flat bed. The knife coater equipment comprises: a drag clutch restrained unwind web roll; a notched bar fluid metering coater knife; a knife flat bed, having a flat bed area for the raised island resin transfer application; a rubber covered combination nip and web peel roll; and a driven wound web roll. The resin coated on the continuous web would have a thickness of approximately twice the thickness of the resin transferred to the surface of the raised islands. The raised island sheet article can be vacuum-chuck attached to a flat carrier plate that is nip-roll pressed into island-surface force contact with a moving wet resin coated web that is routed over a resilient rubber covered roll. Only the raised island surfaces will be in contact with the resin, leaving the non-island surfaces of the article free from resin as the island surfaces are typically elevated approximately 0.020 inches (508 microns) from the backing surface while the typical resin coating is only 0.0005 inches (12.7 microns) thick. Raised island articles having either annular band patterns or rectangular array patterns of raised islands can be processed with this resin transfer coat apparatus. Rectangular arrays of raised islands are deposited on backing sheet material that is rigid or flexible and which has a sheet thickness of from 0.0015 to 0.015 inches (38 to 381 micrometers), the raised island shapes can have space gaps between the top edges of adjacent islands of from 0.01 to 0.20 inches (0.25 to 5.1 mm) and the islands can have top surface edge lengths of from 0.01 to 0.375 inches (0.25 to 9.5 mm). At least a monolayer of abrasive particles or abrasive agglomerates can be bonded to the island surfaces with spaces between adjacent particles or adjacent agglomerates and the islands can have heights measured from the top surface of each abrasive coated island (including or not the height added by particles) to proximal bases of the islands attached to the backing sheet of from about 0.003 to 0.125 inches (0.076 to 3.2 mm). The backing sheets having an rectangular array of abrasive coated attached islands preferably can be used to form rectangular shaped abrasive article sheets or the sheets can be cut and formed into a continuous abrasive belt article by joining the two opposed ends of a strip of the abrasive backing sheet with an adhesive, by welding or brazing the loose ends together. Also, circular disks having diameters that range from 0.86 to 82.6 inches (1.9 to 182 cm) can be formed from backing sheets that have rectangular arrays of abrasive coated raised islands attached over the full surface of the backing surface to produce a disk that has an rectangular array of raised islands located over the full surface of the disk. Disks having an annular band of an rectangular band of abrasive coated islands can also be produced where the inner radius of the annular band ranges from 1 to 90% of the outer disk diameter or the outer annular band diameter. The abrasive coated on the raised islands can be a monolayer of gap spaced abrasive particles or erodible abrasive agglomerates. Carrier plate rollers can stabilize and support the plate from dropping the height of the raised islands as the moving plate leaves contact with the transfer nip roll downward routed wet resin coated web to prevent wet resin contact with the island-free backing area as the carrier plate is separated from the resin transfer web. Movable resin dams can be positioned along the length of the notch bar knife to process resin transfer webs having different web widths on the same coater apparatus. After resin is transferred to the islands, the resin coated transfer web is wound on the winder roll. Resin wetted broken island structure particles or other debris generated by the resin transfer process or other foreign material carried into the system would tend to become trapped in the resin layer remaining on the transfer web. These would be removed from the coater system apparatus by becoming wound up within the confines of the wound web roll that is discarded after a complete length of web is processed. Fresh, new non-solidified resin is continuously presented to raised island surfaces as new raised island articles are resin transfer coat processed. Prior to resin or abrasive slurry coating of the surface of raised islands, the raised islands can be bead blasted to break off any weak island edges that were structurally weakened by the island thickness machining or grinding process actions. The island and island backing surfaces can also be cleaned of debris or foreign matter by a variety of methods including the use of air or liquid impinging jets prior to coating resins or abrasive slurries When transfer coating the top surface of raised island structures attached to a flexible backing sheet, the resin coat or resin based abrasive slurry coat applied to a continuous web backing sheet (e.g., by a coating process such as by a roll coater or by a coating transfer sheet) is approximately 200% thicker than the desired island surface resin coating as approximately 50% of the transfer sheet resin thickness is transferred to the island tops. At least 5% of the thickness of a resin or a polymer resin abrasive slurry, comprised of abrasive particles and an adhesive resin binder, is transferred, but typically 35 to 65% is transferred. The continuous web backing can be coated with sufficient accuracy with simple coating apparatus devices as it is less difficult to control the coating thickness of this double-thickness transfer web sheet coating than it is to control the thickness of the thinner final island surface resin coating. The resin can be applied to the web backing that is moved at a constant speed under the coating notch-bar knife and individual raised island sheets can be placed in island surface contact with the wet resin as the web is moving. The coater line can also be stopped to place the raised island sheet article in contact with the wet resin and the web line motion restarted to complete the resin transfer process and to create another resin coated web section. A line-speed controlled nipped roll-set driven by the coater motor can be used to press the island surfaces into the resin at a controlled nip force to effect the consistent transfer of resin to the islands as the web moves. The carrier plate can also be tendency driven at a speed that matches the web line speed to encourage a smooth separation transition as the carrier plate is removed from transfer coating apparatus. The raised island article sheet is separated from the resin transfer web by a web peeling action that occurs progressively across the surface of each island as the web is roll-surface routed down and away from the raised island article that proceeds in a horizontal direction parallel to the coater web bed. Idler rolls are provided to maintain the horizontal routing of the web independent of the web-unwind and would roll diameter changes that occur as the continuous web is processed. Instead of forcing the resin contact with the raised island surfaces with a nip roll, the raised island article can be held in force contact with the resin coating by techniques that include the use of a vertical stamping type of device that can be used with the coated web in motion or stationary. This island surface resin transfer process can be repeated with individual raised island articles as the transfer web is processed continuously. The unused resin coated transfer sheet material is discarded with little economic loss as inexpensive commodity web material can be used and the cost of the resin or web materials is not significant relative to the value of the raised island abrasive article product. The knife coater line can be used with a wide range of web widths or to create a narrow resin band on a wide web by using hand positioned coater dams that are spaced along the width of the notch bar knife. The coater can also be stopped at any time and coating resumed while maintaining good control of the resin thickness for that portion of the web that was coated at a constant web speed. If desired, sheet sections can be cut from the resin coated web and these independent coated sheets used as resin transfer sheets. Another method of transferring resin to the surfaces of raised islands is to apply a controlled thickness resin across the width of the surface of a rubber covered roll and bring a nipped raised island sheet article into nipped contact with the moving resin wetted coated transfer roll. This direct contact roll coater has the advantage that a transfer sheet and transfer sheet coated resin are not discarded as the roll surface is continuously recoated by a number of resin thickness control devices including knife over roll and nipped fluid metering rolls. FIG. 33 is a cross-section view of a transfer roll applying a abrasive particle resin slurry coating to the top surface of raised islands attached to a backing sheet. A backing sheet 440 having uncoated raised islands 442 attached is in contact with a transfer roll 444 coated with a abrasive resin slurry 452 where approximately one half of the thickness of the resin slurry 452 is transferred to the islands 442 as shown by the island slurry coating 454. The nip roll 446 pressed into the transfer roll 444 by a nip roll force 448 is used to form a slurry coating bank 450. A slurry smoothing brush 460 smoothes the slurry across the top surface of the slurry 454 coated islands 442 that can have localized coating discontinuities at the outboard edges of each island when the islands 442 are disengaged from the roll surface slurry 452 that is nominally twice as thick as the slurry coating 454 deposited on the island 442 tops. Indentation hole patterns 458 in the slurry remaining on the surface of the transfer roll 444 after the roll 444 is rotated past contact with the islands 442 are formed by the withdrawal of the islands from 442 from the coating 452. The irregular shaped slurry resin coating is transferred back toward the slurry coating bank 450 where the transferred slurry is mixed with new incoming slurry and is re-coated on the next transfer coat operation thereby minimizing the possibility of ageing or partial curing of the resin prior to use. A scrapper blade 456 can be used to scrape the returning slurry prior to re-entry into the slurry bank 450. FIG. 73 is a cross-section view of a notch bar knife coater applying resin to the raised islands attached to a backing sheet. An unwind roll 1082 supplies web 1090 that is routed over a idler roll 1084 to continue in a horizontal direction in surface contact with a notch bar knife 1092 having a resin bank 1094 wherein a resin coating 1096 is spread uniformly across the width of the moving web 1090. Resin coated 1096 web 1090 contacts a raised island disk backing sheet article 1100 attached to a flat carrier plate 1098 that is pressed downward toward a resilient rubber covered web idler roll 1086 by a nip force 1106 applied to nip roll 1104 to effect the transfer of resin coating 1096 from the web 1090 to the island surfaces resulting in resin coated islands 1102. The carrier plate 1098 continues to travel past the idler roll 1086 where it is supported by carrier plate rollers 1107. The coated 1096 web 1090 is routed to and wound onto a wound roll 1088. FIG. 74 is a cross-section view of a roll coater applying resin to the raised islands attached to a backing sheet. A resin bank 1116 positioned between a nip roll 1114 and a rotating rubber 1110 covered resin transfer roll 1108 provides a resin coating 1112 on the surface of the transfer roll 1108 that is held in resin 1112 contact with the raised island backing sheet article 1118 uncoated raised islands 1120 to create resin coated raised islands 1122. The returning surplus resin 1113 reenters the resin bank 1116.

Extrude Photosensitive Island Coat with Patterns

Problem: It is desirable to create a raised island surface on a web backing in a continuous web process with a very precise uniform height of each island that is attached to a backing with array patterns including annular band patterns or continuous rectangular patterns of circular raised islands.

Figure 34:
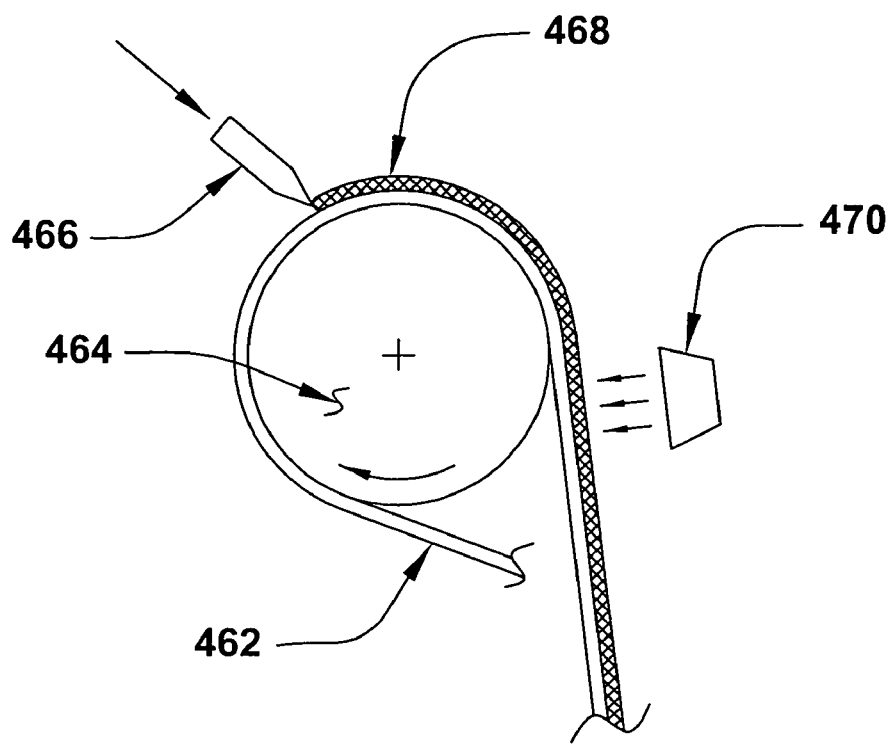
FIG. 34 is a cross-section view of an extruder and roll island forming system.
Figure 35:
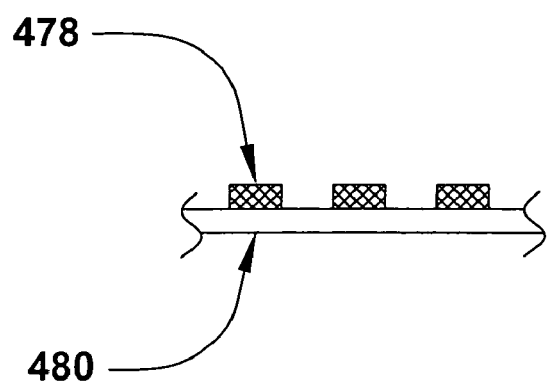
FIG. 35 is a cross-section view of islands formed on a backing.
Figure 36:
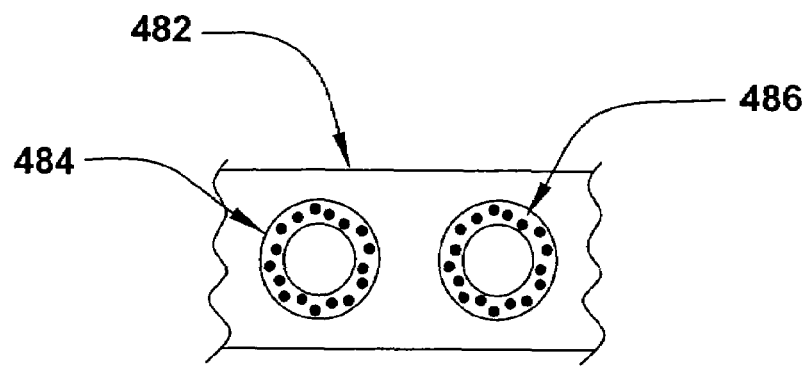
FIG. 36 is a top view of annular bands of raised islands on a web backing

Solution: A wide variety of backing web materials can have a top layer of island foundation material extruded on a backing top surface in a continuous web extrusion process where the top surface height of the island material is controlled to provide a precisely uniform thickness as measured from the island surface to the back side of the backing. An extrusion die lip can deposit material directly on a backing web routed over a roll in near proximate position to the extrusion die. Downstream, a closed-loop web coating thickness gauging system can be employed to automatically control the overall thickness of the coating surface across the full width of the web. A photosensitive or light-cure activated island foundation material can be used as the coating on a backing that allows a light pattern to be applied to the continuous moving coated web to provide a continuous array of circular, or other shape, islands on the surface of the web backing. Also, islands can be arranged in annular band shapes along the length of the continuous web that will allow circular disks of raised islands on a backing sheet to be die-cut or water-jet cut from the continuous web. Each island foundation can have a precise overall thickness measured from the backside of the backing, typically within a preferred tolerance range of from 0.00005 to 0.0005 inches (1.25 to 12.7 microns) for high speed lapping abrasive sheet articles. In another method, the photosensitive island material may be co-extruded directly onto the surface of backing material to create an integral bond between the backing and the island foundation. The photosensitive island foundation material may be filled with a variety of materials including organic and inorganic materials. The photo light source may be applied to the exposed coated side of the foundation material, or alternatively, through the backside of an optically clear backing material. Also, a slurry coating of abrasive can be applied to the non-solidified uniform layer of island material by a conventional knife coater or other coating methods and the photosensitive island material can be exposed to light patterns through the backside of the web backing sheet and then the photosensitive material located between islands removed along with the abrasive coating attached to the removed island foundation material. A pattern of raised islands having a abrasive top surface coating are left remaining and attached to the surface of the backing sheet. Abrasive particles contained in the abrasive slurry that is removed with the non-island foundation material can be collected, separated and reused. FIG. 34 is across-section view of island formation material extruded on the surface of a continuous web backing to form annular or rectangular array patterns of photosensitive material raised islands attached to the web backing. A continuous web backing 462 is routed over a rotating roll 464 where a extruder 466 deposits island foundation photosensitive material 468 on the surface of the web backing 462 where a patterned light source 470 is projected onto the coated material 468 to form island array patterns in various shapes including annular bands and other shapes. Island material not polymerized by the light source is removed that leaves the individual raised islands attached to the backing 462. FIG. 35 is a cross-section view of raised islands 478 attached to a backing sheet 480. FIG. 36 is a top view of annular band patterns 484 of individual raised islands 486 attached to a continuous web 482.

Measured, Distributed Coating Liquid for Annular Band

Problem: It is desired to apply a measured quantity of coating liquid to a backing to create a consistent thickness of resin or resin based abrasive slurry coating that is uniformly distributed across the full surface of a annular band on the backing sheet. Applying a coating that matches the desired width of an annular band minimizes the loss of excess coating fluid used in the coating process. The inability to create an accurate sized annular coating band requires using oversized annular bands having an excess sized annular band width to compensate for inaccurate matches of transfer sheet coated annular bands and uncoated annular bands of raised islands.

Solution: A fixed-charge liquid storage device can be constructed that has a linear volumetric increase from one end to the other end that will allow resin or resin based abrasive slurry fluid coating to be discharged in a manner that provides a larger quantity of fluid at the outer radius of an annular band as compared to the inner radius. Typically, the coating device would be positioned above a circular flexible disk backing sheet rotated directly below it to form an annular band of coating on the sheet. The outer tangential path of an annular band located at the outer radius of the annular band is proportionally longer than the tangential path located at the inner annular band radius. Coating fluid has to be dispensed at a higher flow rate at the outer radius of a annular band than at the inner radius to provide a coating thickness that is uniform over the whole annular band surface area. The annular band cross-width coating flow proportioning coater device can provide the required amount of coating fluid to create a uniform thickness of coating across the full surface of the disk annular band. The coating can be applied in a single revolution of the disk or the fluid can be applied over many revolutions of the disk backing to minimize the abrupt change in fluid thickness at the coating start and stop lines. A flow-proportioning narrow-slot fluid storage device, having a deeper end at the disk outer radius, can be progressively emptied by driving a thin blade slot die plunger into contact with the top surface of the fluid stored within the slot. The plunger speed is controlled at a constant speed where the fluid container is emptied upon completion of a single disk revolution or emptied over multiple revolutions of the annular disk. Use of a thin slot with a long slot plunger path length minimizes the cross-die width fluid flow within the slot-die body as the plunger moves along the slot length. A preferred geometry of a proportioning slot die has a straight edged plunger on the plunger edge contacting the coating fluid where the plunger and die slot proportionally increase in thickness across the die width. The coater die has a continuous slot coating fluid chamber that has a linear increasing fluid storage volume across the die width and the coater die has a controlled width fluid exit lip extending across the width of the die. A translatable die plunger is positioned within the body of the coater die and the leading edge of the die plunger uniformly contacts the coating fluid contained within the die chamber. Translation of the slot plunger into the chamber slot drives the stored coating fluid out of the die fluid exit lip providing proportionally increased fluid quantity at the increased fluid storage volume width-end location of the coater die compared to the fluid quantity provided at the opposite end location of the coater die. Fluid flow from the coater die is interrupted when the slot plunger motion is stopped. The quantity of fluid ejected from the coater die can be adjusted by controlling the distance the die plunger travels. In the reverse of this coating fluid deposition operation, the blade can be withdrawn up an empty slot opening to draw fluid into the slot volume from a fluid reservoir container to refill the slot opening with coating fluid.

Another similar proportioning fluid distribution device, that would prevent the flow of coating fluid laterally within the storage volume, would be constructed of a large number of varying length hollow tubes positioned directly adjacent to each other. Each tube is proportionally longer than an adjacent tube to provide a lineally increasing volume of fluid at the outer annular radius position of the rotating disk backing sheet. Small cylindrical rods fitting the internal diameter of the hypodermic tubes would be joined at one end and driven through the length of the tubes by a mechanism to drive the fluid progressively out of the tubes as the disk is rotated below the array of tubes. A single row of adjacent tubes can be used to form the coating head. Also, a two-row tube coating head can be constructed to provide a more uniform flow of fluid along the width of the row of tubes. Here, a second row of tubes can be nested directly adjacent with the first row of tubes where the second tube row is positioned one half tube diameter from the first tube row. The second row of tubes fit in the crevices formed between adjacent round tubes in the first tube row. The tube rods can collectively be withdrawn together up the length of the tubes when the free end of the tubes are submerged in a fluid container to refill each tube with a controlled fluid volume quantity. If a lesser amount of coating fluid is desired, the rods can be moved in a shorter stroke. All residual fluid is exhausted from each tube coater, or slot-blade coater, on each fluid deposition cycle that reduces the possibility of accumulating old or partially cured coating fluid material within the tubes or within the tube-die apparatus systems.

The proportional die coating system devices are easy to disassemble and clean between operations. The coating resin deposited on the backing can be spread radially across the annular width and also spread downstream in a tangential direction by use of a thin flexible doctor blade device moved relative to the coated surface of the disk. As the coating fluid moves relative to the surface of the doctor blade, it is not very important that the surface speed of the inner radius of the annular coated band is less than the surface speed at the outer radius to accomplish effective smoothing of the coating fluid. If a coating die continues to deposit coating fluid on top of a previously deposited layer of coating material from a previous backing disk revolution, the coating in this overlap area is thicker than the coating in the original single-coat area. Likewise, if the die coating deposition is interrupted prior to completion of a single revolution of a disk, there will be a coating gap between the coating start and coating stop lines formed in the annular coated band. These start and stop coating discontinuities may have the form of a radial line, or a spiral line, or a intermittent line shape or they may consist of a series of coating drops or coating void spots. Fluid discontinuities formed at the coating start lines and the coating stop lines by the coating die head on the annular coating band can be minimized by the use of a variety of devices, including the use of one, or more tapered diameter rollers having different diameters to spread or even-out the resin into a uniform layer. The rollers may have a stiff rubber covering providing a narrow roll contact land area; or, the roll can have a soft compliant covering that provides a wide roll contact land area that is more conformable to the backing surface thickness variations. Other coating discontinuities include those created by early or late localized coating deposition flows, due to fluid entrained air bubbles, and the excessive flow or the interrupted flow from blocked or damaged sections of the coating die head. Fluid smoothing devices would typically move a portion of a fluid excess lump in an upstream direction relative to the rotary motion of a rotating backing sheet when the smoothing device is stationary and the backing sheet travels relative to the smoothing device. A rotating smoothing device can travel either clockwise or counterclockwise when the backing is held stationary. The downstream direction is defined as a straight or tangential line viewing vector pointed in the direction of backing that has already been contacted or processed by the smoothing device immediately before the viewing event; and the upstream direction is in the opposite direction to the downstream direction. Some coating thickness smoothing devices have the capability to transfer fluid excesses downstream and to fill in void areas downstream but do not have the capability to move fluid laterally at right angles to a downstream direction in a radial direction for an annular band. Examples of smoothing devices that principally move fluid downstream include: stiff, flexible type doctor blades, stiff surfaced contact rolls, and number of fluid transfer single or multiple roll systems commonly used in web coating systems including driven rolls that run faster and slower and in opposing directions than resin contacting idler rolls. Other smoothing devices have the capability to move fluid laterally to change the radial position of fluid discontinuities in an annular band. Examples of lateral fluid transfer smoothing devices would include: a doctor blade having a large fluid bank; a doctor blade angled radially to "snowplow" fluid sideways; a paint brush with a fluid volume contained within the bristle body where the fluid is free to migrate laterally within the bristle mass by capillary action; an open-celled sponge brush; or a sponge covered roll where fluid can migrate laterally due to capillary action within the sponge body.

Figure 37:
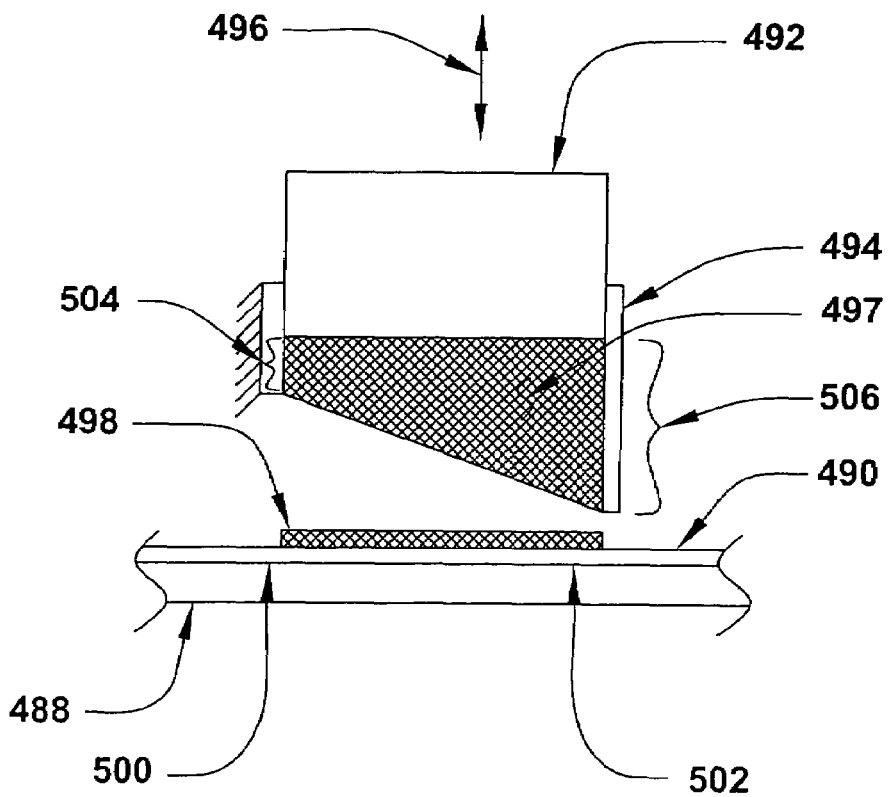
FIG. 37 is a cross-section view of a slot blade annular band resin coater.
Figure 38:
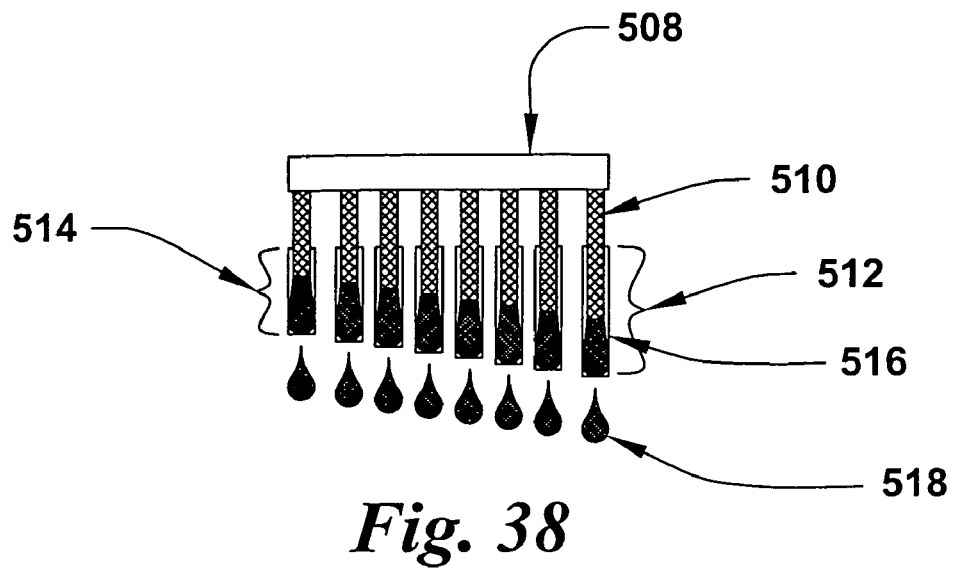
FIG. 38 is a cross-section view of a rod tube annular band resin coater.
Figure 39:
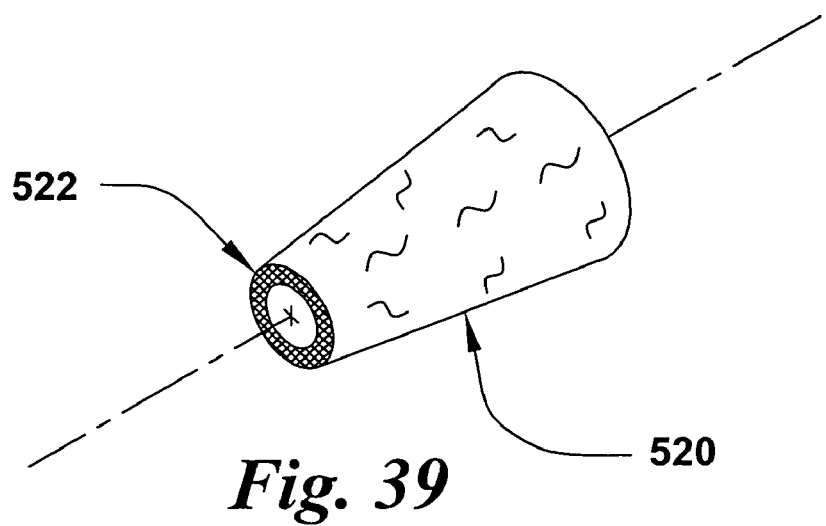
FIG. 39 is an isometric view of a cone shaped rubber resin smoothing island.
Figure 40:
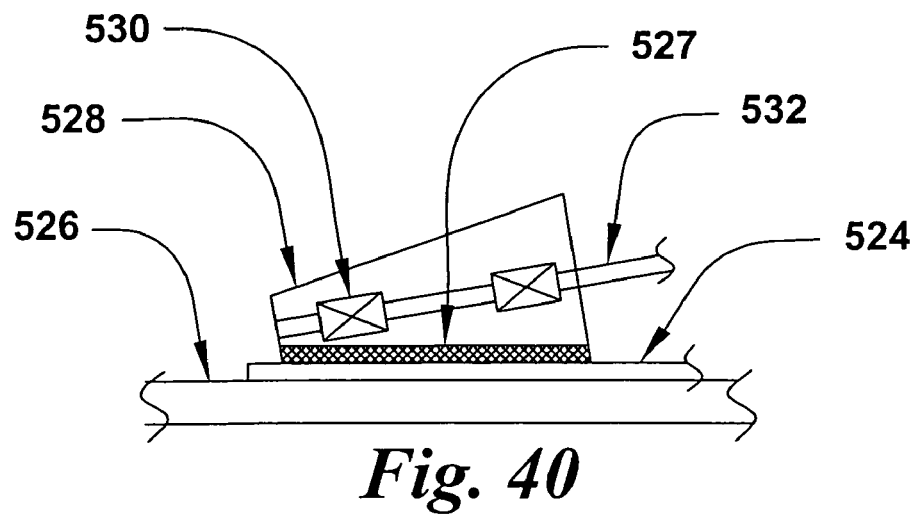
FIG. 40 is a cross-section view of a tapered resin smoothing roll system.

Resin coatings are preferred to be from 0.0001 inch to 0.002 inches (2.5 to 50.8 microns) thick where the coating resin has a viscosity of from 10 to 10,000 centipoise (c.p.) viscosity. The volume of coating fluid that is applied to a specific annular band area is controlled to be within 20% or less than the desired volume that is equal to the thickness of the coating times the surface area of the coating. Smoothing devices that level the annular band coating to a uniform thickness can be used effectively when the coating excess or coating deficient areas that exist at the tangential start and stop line areas have tangential lengths that are less than 90% of the circumference of the annular band outside diameter. Radial and tangential coating thickness variations measured across the radial width or the tangential length of an annular coated band are preferred to be less than 80% than the arithmetic mean annular band coating thickness to assure that the proper amount of coating is present to bond the individual abrasive particles or abrasive agglomerates to the backing sheet and to assure that a significant portion of the particle is exposed above the resin coating layer depth for effective abrading action. Thin coatings can be coated on webs by a variety of techniques including making patterns of small spaced drop deposits with a knurl roll and smoothing these drops into larger, thinner continuous coated areas with the use of flexible doctor blades, rollers or brushes. FIG. 37 is a cross-section view of a slot-blade coating head that can apply a total measured quantity of resin coating on the surface of an annular band where the coating is uniform across the full area of the band even thought the outer annular area of the band has a tangential length greater than the tangential length of the inner radius of the annular band. The slot blade plunger having a constant blade thickness across the full blade surface is shown contacting an angled fluid-containing slot to illustrate the proportional change of coating fluid stored within the body of the proportional coating die. A annular backing disk 490 is mounted to a rotating platen 488 positioned directly below a slot blade 492 travelling vertically in the direction 496 through a blade-slot housing 494 filled with a resin coating material 497. Resin 497 is pushed out of the slot volume by vertical motion of the blade 492 depositing a resin coating 498 on the surface of the backing disk 490 rotating under the blade housing 494 having a short fluid storage slot length 504 at the annular band inner radius 500 and a long fluid storage slot length 506 at the annular band outer radius 502 while the backing disk makes a single revolution or multiple revolutions. FIG. 38 is a cross-section view of a rod-tube coater device that will apply an even coating of resin in an annular shape on a disk backing. A rod holder 508 has a number of individual rods 510 aligned in a row and having a rod 510 spacing that matches the spacing of a line of hollow tubes 512 having tube 512 inside diameters slightly larger than the rod 510 diameters. The rods 510 are positioned within the tubes 512 and are used to draw coating resin into the tubes 512 and to push resin out from the tubes 512 by moving the rod holder 508 along the axis of the tubes. Drops of resin 518 are pushed from the internal passages of the tubes 512 and free-fall to become deposited on the surface of a backing sheet (not shown). Short tubes 514 containing a lesser volume of resin than long tubes 516 are positioned on the inside radius of an resin coated annular band having a relatively short tangential length compared to the outside radius having a longer tangential length. This rod-tube coater will supply a controlled total volume of resin fluid to an individual backing and also, will supply a lesser quantity of resin to the shorter inner radius of the annular band and a greater resin quantity to the longer outer radius of the annular band. The resin can be applied during a single revolution of a rotating disk backing or the resin application can be progressively completed over a number of revolutions of the backing. FIG. 39 shows a isometric view of a cone-shaped tapered roller 520 having a compliant rubber covering 522 that can be used to smooth out annular band resin coating discontinuities including an localized excess of coating resin or a deficiency of resin. One or more tapered rolls having different diameters can be used to smooth the resin coating when running in forced contact with the resin coated backing rotating on a platen support. FIG. 40 shows a cross-section view of a tapered roller 528 having roll bearings 530 mounted on a roll shaft 532 rotating in contact with a resin 527 coated backing disk 524 mounted on a platen 526.

Coating Die for Annular Bands

Problem: It is desired to apply coating resin or an abrasive slurry coating with an increasing flow rate on the increasing radius of an annular band to achieve a uniform coating density on the band and uniformity of the coating at the inner and outer radii of the annular band. It is also desired to have an absence of coating on the portion of a backing disk in the area from the center of the disk to the inner diameter of the annular band and also to have an absence of coating to exist on the narrow annular band area that exists in the area defined between the outer radius of the coated annular band and the outside diameter of the disk. Control of the quantity of fluid ejected from a die assures that a controlled thickness of coating fluid is applied to a backing article. The coated liquid material includes resins used as a make coat for abrasive particles, a resin transfer coat, a size coat for increasing the structural bond of coated particles, raised island structural foundation coating material and a backing resin pre-coat for raised island material.

Solution: A coat-hanger design style coating or extrusion die commonly used in web coating can be modified to have a proportional, or other, decrease in the length of the fluid metering flat land area orifice section of the die lip. Also, the metering slot gap in the orifice land area can be progressively increased or decreased in thickness to provide a flow rate that changes proportional across the width of the die. The resin coater die can have a continuous slot narrow-gap orifice coating fluid path metering land area that has a linear increasing fluid path land-length extending across the die width. The fluid flow resistance is approximately proportional to the flow path length as a liquid fluid flow is typically laminar in character in a narrow slot. The longer the liquid fluid path length, the less the fluid flow rate is for the same applied fluid pressure drop across the fluid land length. The coater die has a controlled width fluid exit lip extending across the width of the die where the fluid exit die lip width is approximately equal to the radial width of an annular band of liquid resin, or other fluid, that is to be deposited on a rotating disk backing sheet. A fluid pump device supplies fluid to a fluid manifold that feeds pressurized fluid across the fluid entry edge of the proportioning orifice fluid metering land area. Activation of the pump device drives fluid into the fluid manifold land entrance area and onward through the narrow-gap metering land area continuous slot that extends across the die width. The die provides a proportionally increased fluid flow rate at the shorter fluid land-length width-end location of the coater die compared to the fluid flow at the opposite end location of the coater die having a longer land length. Fluid flow from the coater die is interrupted when the pump fluid motion is stopped. The total quantity of fluid deposited is a function of the flow rate provided by the pump device and the time duration that the pump is activated.

A proportional coater die can be positioned with the width of the die aligned above or in near surface contact with an annular band area positioned on a disk backing with the outside diameter of the annular band somewhat less in size than the outside diameter of the backing disk that rotates below the die to form a coating-free outside border annular band area on the disk backing surface. Coating fluid can be deposited on the backing sheet to form a continuous annular band of coating or the flow can be interrupted slightly before or after completion of one revolution. The deposited coating can later be smoothed into one continuous thinner annular band of coating. It is desired that the total quantity of resin or resin based abrasive slurry coating fluid in a specific tangential portion of the annular band is correctly proportioned to the length of the band. If an full-tangential band area excess of coating fluid exists at the inner diameter of the annular coated band, the doctor blade and smoothing rolls will not tend to redistribute the coating in an outboard radial direction. The primary effect of these smoothing devices is to smooth-out or average the coating only in a tangential direction as a backing sheet is rotated in contact with the coating smoothing devices. Random defects in the original coating thickness can be easily corrected with little influence on the average thickness in the annular band. Doctor blades and, or, resin contacting rollers can distribute the defect thickness variation of a typical short defect tangentially over a long non-defect annular band area. A defect having a very short tangential distance of 0.25 inches (6.4 mm), will have very little influence on the remainder of coating at the same radial position that typically would have a tangential length of 35 inches (88.9 cm) as the coating average thickness influence caused by this short defect is uniformly spread over this full tangential length. The total quantity of coating fluid deposited in one coating process event can be adjusted by controlling the stroke of a volume calibrated syringe fluid source or by use of an speed controlled or interruptible motor driven gear pump used to feed the inlet of the coat-hanger or other type of proportional coating die. Discontinuities in the coating at the start or stop deposition lines can be reduced by use of a doctor blade that spreads the coating tangentially around an annular band shaped coating area. Also, similar to the use of flat wall paint rollers, one or more cone-shaped rollers having a soft compliant surface, or stiff surface, and rollers of various diameters can be held in contact with the backing surface to pick up excess coating fluid that exits at the sites of coating discontinuities and deposit portions of the excess coating fluid at other locations downstream of a given coating discontinuity. The rollers will carry some of the excess fluid that exists at the site of a annular band coating excess defect discontinuity to form a new, but smaller, fluid discontinuity at another position on the annular band. This diminished size new defect occurs as a portion of the original excess fluid tends to adhere to a rotating roll surface and is deposited at a new position on the original annular disk backing resin coating. As the roll having the fluid discontinuity continues to roll in contact with the backing sheet, a portion of the original discontinuity is transferred to a new but considerably smaller discontinuity defect site on the backing sheet. If another smoothing roll having a larger diameter than the first contacting smoothing roll contacts the remainder of the original coating discontinuity, a portion of the remaining discontinuity fluid adheres to the larger diameter roll surface and it is also transferred to a different location from the original defect location. However, the new large-roll reduced size deposition position would be located at a more distant tangential position on the annular band than the small-roll larger fluid defect deposition. A small diameter smoothing roll will carry a portion of the excess fluid that exists at a coating defect location to a nearby upstream location while a larger diameter smoothing roll will carry a portion of an excess fluid coating defect to a farther distant upstream location. Coating defects include the newly created defect deposits that are created by the smoothing rolls depositions. This progressive event smoothing action tends to make the annular band coating progressively more smooth and of even thickness as the resin coated backing is rotated while being resin contacted by the smoothing rolls. Multiple revolutions, from 2 to 20 revolutions, of the disk can be made under the constant fluid surface contact of the doctor blades and, or, smoothing rolls. Single or multiple smoothing rolls may used at a smoothing station and the roll diameters can range from 0.75 inches to 3.0 inches (1.91 to 7.6 cm) or more or less depending on the diameter of the disk. The rolls would be tapered at an angle to form a truncated cone surface to match the backing disk annular band diameter with the same contact surface speed across the face width of the cone roll. Rolls can have a resilient surface and may also be constructed of open-cell porous material to allow absorption and release of coating fluid material. Likewise, annular band areas that are not sufficiently filled or are barren of coating fluid, or areas where a dispersed pattern of fluid dots deposited by a knurl roll are to be spread out into a continuous thin coating, can be leveled by the use of doctor blades, brushes, and particularly, with the use of rollers. These smoothing devices transfer fluid from other portions of the annular band to progressively fill the fluid deficient defect areas. In an analogous operation, flat roll surfaced adhesive rollers are commonly used by graphic artists to manually apply, spread out and evenly coat liquid adhesive that is unevenly deposited on artwork backing sheets without significant "start" and "stop" lines. Here, coating fluid is transfer coated from fluid excess areas of a sheet to deficiently filled areas with multiple passes of the roller over a given surface area. Painters also apply and smooth out uneven deposits of wall paint to a uniform thickness by making multiple passes on a area with porous paint rollers that absorb and dispense fluid from fluid excess areas to fluid deficient areas. In general, hard surfaced non-storage material rollers act as coating transfer devices where approximately one half of the coating thickness remains attached to the surface of the roll and the other half of the coating thickness becomes attached to the backing sheet. Eventually, with enough revolutions of the backing sheet disk past wet resin surface contacting fluid smoothing devices, all of the annular band will have the same nominal coating thickness. Both fluid-storage and fluid non-storage devices can be used independently or in combination to level coat or create a uniform thickness coating on a backing sheet. For instance, fluid storage devices including a fiber paint brush and a sponge brush can perform the same fluid smoothing functions and they can be used together or separately with non-storage devices including doctor blades and non-porous material rollers. When a coating is sufficiently leveled, the smoothing devices can be sequentially brought out of contact with the annular coating surface with a gradual separation of the last smoothing device from the web coating surface to minimize the coating thickness disturbance caused by removal of the last smoothing device. Paint brushes having natural hair bristles where individual hair fibers have a long shaft taper to a sharp pointed end are preferred to paint brushes having flagged bristles where the individual fibers are mechanically split at the ends. These long tapered bristle ends are of particular advantage when the paint brush is progressively raised from the resin coated surface to minimize the coating thickness discontinuity caused when the small diameter tips of the last of the individual bristles leave the resin coated surface. Fluid can be transferred within the body of a fluid storage type smoothing device such as a paint brush, sponge brush or sponge roller by capillary action that aids in leveling an annular band of resin in a radial direction in addition to averaging the thickness in a tangential direction. Comparatively, fluid non-storage smoothing devices tend to average-out the fluid thickness only in a tangential direction. Some coating irregularities can be tolerated when coating raised islands as these small area defects can be positioned in the island valley areas or the excess fluid defects can be forced off the island surface by the contact forces present in a resin transfer process. Abrasive particles not present in a resin deficient localized area will have a small effect on the abrading performance of a abrasive article used in high speed lapping but rather, would only present a cosmetic deficiency.

A uniform thickness coating can be provided for a specific sized annular band by applying a measured total amount of coating fluid when coating each annular disk. The coated backing sheet can be used as a transfer sheet to transfer approximately one half of the applied resin or resin based abrasive slurry coating to the top surface of raised islands attached to a abrasive article backing disk or directly on the flat surface of a backing sheet. The preferred final dry raised island coating thickness ranges from approximately 25% to 35% of the diameter of the abrasive particle bonded to an abrasive article. The initial solvent filled wet resin binder may have a resin thickness in excess of this thickness to provide an adequate amount of coating to resin wet each individual particle and to bond individual particles to the backing with sufficient bonding strength to resist abrading contact forces. An excess of dry solidified resin coating that remains after solvent removal can prevent contact of the abrasive particles with a workpiece surface during abrading action.

Another proportional annular cross-feed coating die can be constructed of a number of hollow hypodermic needles of progressively different lengths that are joined at one end into a common manifold that feeds coating fluid each of the individual tubes. The flow from each needle tube is metered by the length of each tube having precisely the same inside diameter where more flow exits from shorter tubes than the flow from longer tubes. Long tubes create more fluid flow resistance than shorter tubes where the flow rate is approximately proportional to the length of the tube as the fluid flow within the tube is generally laminar in character for relatively high viscosity resin fluids. Reduced fluid flow rate is required at the inner radius of a resin flow-coated annular band shape so longer tubes are used at this position, and correspondingly, shorter tubes with relatively increased flow rates are positioned at the outer radius position of the annular band. A second set of metering tubes can be nested with the first set of tubes by off-setting them one-half outside tube diameter from the first set of tubes to provide parallel individual tube streams, distance spaced by an amount equal to the outside tube radius, of fluid flow from the two sets of parallel tubes. Fluid flow from the die is interrupted when the pump is stopped. The total quantity of fluid deposited is a function of the flow rate provided by the pump device and the time that the pump is activated. The coated liquid material applied by the tapered-flow annular band coating die includes both resins used as a make coat for abrasive particles, a resin transfer coat, a size coat for increasing the structural bond of coated particles, an abrasive slurry coat, and raised island structural foundation coating material.

Annular bands of photosensitive island foundation material can be coated with slot-type or tube-type coating dies on backing sheets and the island foundation material coating can be smoothed with smoothing devices prior to exposing the photosensitive material to an island formation light pattern. Non-exposed material can be removed to leave solidified raised islands attached to a backing sheet.

Resin based island foundation material, with or without filler materials can also be deposited and smoothed as a continuous annular band layer on a backing sheet with a fluid proportioning die. Raised islands can be formed by contact-pressing an embossing die into the layer of non-solidified deposited material to form raised island shapes on the backing sheet. The embossing die may have extra deep island cross sectional shaped cells that are deeper than the thickness of the island foundation material initially coated as an annular band on a backing sheet. The extra depth provides space for the excess coating material forced into the cells when the embossing die island defining rib sides are forced into and through the depth of the coating material. The cell cavities can have a cavity depth that is at least 10% deeper than the thickness of the flat surface annular coated material to compensate for the extra material that is pushed into the cavity cell opening by the embossing die walls that form the gap spaces that exist between individual island structures. It is preferred that the cell head-room depth that exists above the coated material forced into the island cavity cell opening is sufficient to provide room for the extra embossing die wall material to allow the embossing die walls to directly contact the surface of the backing sheet as the embossing die is pressed into the coating material. It is not necessary that the bottom surface of the embossing plate cavity cell walls that form the island valleys directly contact the surface of the backing sheet. Island cavity embossing cells can be used that have the exact shape of the island, particularly the island flat top surfaces, where the cells are vented with vent holes to relieve the air that is trapped above the island shapes that becomes compressed when the embossing die is forced into the coated material layer. An open cell cookie-cutter type or egg-crate type of island forming die can also be used that eliminates the pressure build-up when the leading edges of the cell cavity embossing die are forced through the coating until reaching the underlying backing sheet. The top surface of the individual islands will not be flat but they can be flattened after removal of the embossing die by pressing a flat plate against the island surface before solidification of the island structure. Non-solidified islands can be flattened by routing the island backing sheet through a roll set having a precision gap between the roll surfaces to establish the height of the islands relative to the bottom side of the backing sheet. Fully solidified islands can be ground or machined flat relative to the bottom of the backing sheet. The island formed resin shapes can be solidified by a variety of energy sources including convective or conductive heat, light, radiant, laser, ultra violet and electron beam. A heated thermally conductive metal cookie-cutter die or deep-cell embossing die can be used to accelerate the solidification of the island foundation material. Polymer or rubber materials having good adhesion release characteristics may be used to construct the embossing die or cookie-cutter die. Island forming cell walls may be tapered, or have sharp or rounded leading edges to assist in penetration of the coated fluid and vibration may be used to aid in bringing the cell walls into contact with the underlying backing that is supported either on a rigid or compliant surface. Flat surfaced cookie-cutter, regular depth embossing and deep-cell embossing dies can all be used to form both annular band patterns of raised islands on individual disk backing sheets and rectangular array island patterns on individual rectangular shaped backing sheets. A continuous web island forming process can use cylindrical shaped cookie-cutter, regular depth embossing and deep-cell embossing die rolls to form both annular band patterns of raised islands and rectangular array island patterns on continuous web backing sheet material that has been coated with a layer of island foundation material. The embossed island web backing sheet having non-solidified raised islands can be routed through a precision gap opening formed between the two rolls of a roll-set driven at the web line-speed to level the top surfaces of the embossed islands to an equal height. A sacrificial thin web film sheet or other release liner sheet can be inserted between the roll that contacts the non-solidified raised islands and the raised islands while the web, or an individual raised-island backing sheet, is routed through the rotating roll set to uniformly level the height of each island structure. After partial or full solidification of the island structure material, the sacrificial backing film can be removed.

A single resin coated annular band transfer sheet can be used repetitively to transfer resin to a secession of annular band patterns of raised islands. After a annular band of resin is coated on a backing sheet, a raised island backing sheet can be placed, concentrically with the resin annular band coated on the transfer sheet, with the islands face down in contact with the resin to allow some of the wet resin coating fluid to be transferred to the surface of the islands. Then, an additional amount of resin coating fluid can be added to the remaining transfer sheet resin annular band to replace the resin transferred to the raised islands. The new added resin is mixed with the "old" remaining resin and smoothed by use of doctor blades and fluid leveling rollers to create a smooth, uniform resin annular band having a controlled coating thickness. A new raised island sheet can be transfer coated by contacting the new re-coated annular band. This re-coating process can be repeated where many raised island sheets can be transfer resin coated with the use of a single repetitively coated backing sheet. Transfer resins may be unfilled or they may be filled with a range of materials including abrasive particles, microspheres, and other organic or inorganic materials.

Figure 41:
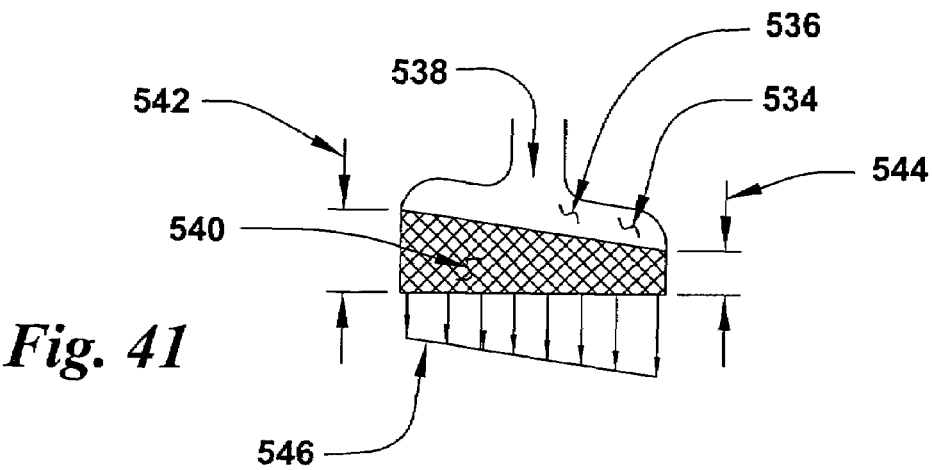
FIG. 41 is a cross-section view of a coat-hanger annular band resin coater.
Figure 42:
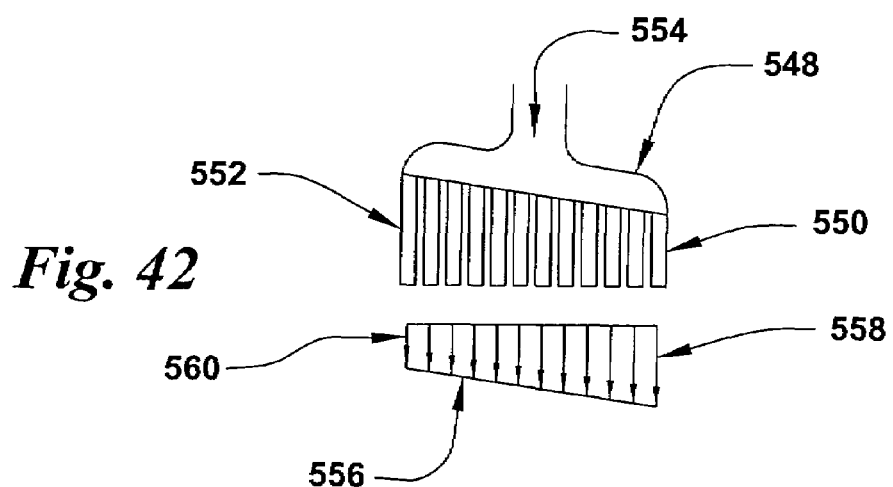
FIG. 42 is a cross-section view of a variable length metering tube annular band resin coater.

Another use of resin coated annular band transfer sheets is to coat a annular band on a backing sheet and then place the raised surface of a printing plate having a pattern of raised islands in contact with the resin to transfer resin to the printing plate island surfaces. The printing plate can then be placed in contact with a backing sheet to transfer a pattern of resin-coated bar mark shapes to the surface of a backing sheet after which abrasive particles can be drop coated onto the wet resin to form a abrasive sheet article that has bar mark patterns of abrasive attached to a flexible backing sheet. The coated liquid material applied by a proportional flow annular band coating die includes resins that can be applied to a thin and flat open or closed cell sponge layer backing that can be used to transfer coat resin to island surfaces by placing a raised island backing sheet in island surface contact with the resin coated sponge layer. The resin may be replenished in the thin flat sponge layer after each time a island sheet is resin coated or the fluid may be replenished after a number of island sheets have been island surface coated. The resin will tend to be coated only on the island surfaces as coating fluid will not coat the valley areas that exist between island structures. A backing sheet annular band area may be primed or surface conditioned using techniques including sand or bead blasting, scrubbing the surface with abrasive, wet scrubbing where the surface is abrasively scrubbed with water or organic solvent, etching the backing surface, corona discharge surface preparation of the backing and coating the surface with various chemicals prior to applying resin material for abrasive make coatings, resin transfer coatings or raised island foundation coatings. FIG. 41 shows a cross-section view of a coat-hanger configuration coater die 534 having a metering land area 540 having a short land die side length 544 and a long land die side length 542. The coater die 534 has a coat-hanger shaped fluid distribution manifold chamber 536 that prevents fluid stagnation across the width of the coater die as coating resin present at the fluid inlet 538 travels to contact the upstream edge of the linear orifice land fluid flow rate metering area 540. The long land area 542 restricts the typical laminar fluid flow proportionally more than the short land area 544 to effect a resin flow 546 that is less at the inside radius of an annular band and greater fluid flow at the outer radius of the annular area. FIG. 42 shows a cross-section view of a hypodermic tube flow manifold with proportional changing lengths of tubes connected to a common flow chamber that will proportionally change the flow rate of resin across the width of an annular band on a backing disk mounted on a rotating platen.

Figure 43:
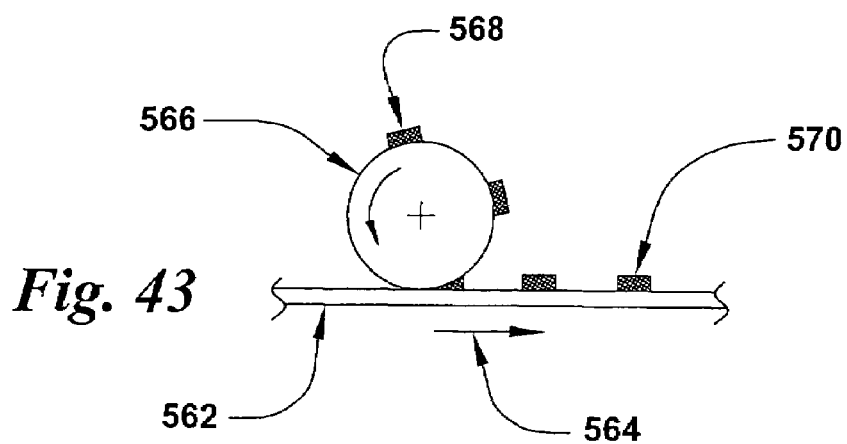
FIG. 43 is a cross-section view of resin coating discontinuities smoothed with a roll.

The tube coater having a linear array of tubes varying in length from short tubes 550 to long tubes 552 that are attached at one end to a common fluid manifold 548 is provided with resin at the inlet 554 by a syringe (not shown) or a metering pump (not shown). Resin flow 556 from the tube die varies proportionally from slow flow 560 to fast flow 558 allowing a controlled quantity of resin fluid to be evenly coated on an annular band shape on a individual rotating backing sheet. The width of the die across the tube die exit length from the end tube 552 to the end tube 550 defines the resin deposited radial fluid width of the resin coated annular band. FIG. 43 is a cross-section view of a roller picking up a excess-fluid bar mark from the surface of a coated backing and transferring a portion of this localized excess fluid resin to another location on the backing as the roll rotates in continuous contact with the coated backing. A backing sheet 562 having coating discrepancy bar marks 570 is shown in a motion direction 564 relative to a rotating roll 566 that picks up portions of the bar marks 570 and the picked-up bar marks 568 positioned on the surface of the moving the roll 566 are transported to a new location on the backing. A single roll can be used or a number of rolls with each having different diameters can be used to perform the function of transporting portions of fluid bar mark discontinuities to new locations upstream of the original location of the bar marks. This resin coating leveling action can be repeated many times by having the backing disk rotate many times when in contact with one or more transfer rolls 566.

Transfer Coated Abrasive Slurry to Annular Raised Islands

Problem: It is desired to apply a uniform coating of a measured quantity of abrasive particle slurry to the top surfaces of an annular band of raised islands or directly to the top surface of a backing sheet without having coating thickness variations or coating bar-marks, particularly coating discontinuities that are raised above the average surface height of the coated surface. Localized variations that are lower than the average coating surface height will have little effect on the smooth grinding performance of an abrasive article operating at high speeds. A raised bar-mark type coating excess defect positioned on a annular band of abrasive articles can create once-around bump inducing vibrations of a contacting workpiece when the abrasive article mounted on a platen is rotated at high speeds during abrading operations. A bar-mark abrasive gap coating deficient defect will not cause a vibration excitation of the contacting workpiece when rotated at high speeds as the workpiece is supported by abrasive surface contact on both sides of the chasm formed by the coating gap defect. Defects occurring on a periodic location basis are often classified as bar-marks as they can be easily seen on the surface of continuous web backing coatings as the web is moved past the observer. These bar-mark defects can be dimensionally subtle in character but their visual effect can easily be magnified by the use of different reflective light sources. Repetitive bar-marks are generally periodic in occurrence as they tend to be evenly spaced in a tangential direction. Workpiece vibration excitation can be caused by a single start or stop coating bar-mark defect occurring on a abrasive article disk that is rotated on a platen at high rotational speeds. Variations in the flow from an annular band coating device can produce bar marks that are either periodic or random in occurrence.

Solution: A linear variable flow rate coating die can be constructed of an array of closely spaced hollow hypodermic tubes where the length variation of each tube is designed to orifice-meter the coating fluid flow rate to be proportionally changed across the radial width of the annular band surface area to be coated. A typical hypodermic needle tube would have a 0.059 inch (1.5 mm) outside diameter and a 0.035 inch (0.9 mm) inside diameter and vary in length from 1.0 inch to 1.5 inches (2.5 to 3.8 cm) to coat an annular band surface having an approximate 12.0 inch (30.4 cm) outside diameter and a 9.0 inch (22.9 cm) inside diameter. The exact variation in tube lengths would be designed by using the rheological characteristics of the coating fluid to obtain the desired tube fluid velocity generated by the fluid pressure drop applied across the length of the tube as the fluid travels down the length of each fluid metering orifice tube. A fluid manifold would encompass the inlet ends of all tubes to provide a common pressurized fluid feed source to each tube from a calibrated syringe plunger feed, or from a motor driven gear pump, both of that would provide a constant inlet fluid flow rate. The pump or syringe is also capable of controlling the total quantity of coating fluid applied in a single abrasive article coating operation. Also, the pump or syringe can supply a fluid flow that can be interrupted to start and stop the coating fluid deposition at the start and end of the annular band coating area. The coating tracks deposited by individual needle tubes can be spread radially and tangentially by the use of doctor blades and also, by the use of one and up to four or more small diameter rollers contacting the surface of a circular disk backing mounted on a rotating platen positioned below the coating head. Two or more rows of different sized equal diameter hollow tubes can also be nested to form double or triple or more staggered rows of coating tubes that comprise a needle coating die. A measured amount of a slurry mixture of 45 micron, or less, abrasive particles mixed with a solvent thinned binder adhesive resin can be pumped into the tube head and coated evenly on the backing with the option of interrupting the coating fluid flow prior to completing the full 360 degrees of platen rotation to intentionally create a tangentially short length low area discontinuity of coating thickness at the start-stop coating area. Coating dies that have a proportional change of flow rate across the width of the die can be used to apply a variety of fluids including a resin and an abrasive resin slurry, to form a coated annular band on the surface of a backing rotated below the die. The annular band resin coating process where a coater fluid die provides fluid flow that varies proportionally across the exit width of the die lip consists of a number of steps. The coater die having a die lip width equal to the annular band radial width is positioned in close proximity to the surface of a backing sheet attached to a rotatable platen. The die pump coating fluid apparatus is activated to cause the coating fluid to exit the die lip where the fluid drops onto the backing sheet; or the fluid is extruded onto the backing sheet to form an annular fluid coated band on the surface of the backing sheet when the platen is rotated. The total volume of the coating fluid supplied by the coater die during a annular band coating event is preferred to be controlled to within 15% of the amount of fluid required to form a specified uniform coating thickness annular band on a backing sheet that is rotated at a controlled speed in a position directly under the coating die fluid exit lip. Also, the coating die configuration allows proportioning to vary the fluid flow rate across the die lip length to match the radial position rates within 25% of the theoretical fluid flow annular coated band radial position rates required to provide an equal thickness coating over at least 85% of an annular coated band having a size controlled concentric annular inner radius and outer radius. Further, the coating die coating fluid flow is preferred to be controlled to apply the coating fluid to the backing surface within 95% of one revolution of the backing. The annular band coating process can also be controlled to apply the coating fluid to the backing surface over two or more revolutions of the backing. The annular band that is coated can be resin surface smoothed where the localized resin based coating fluid excess resin or deficient resin defect areas coated on a first backing sheet are thickness averaged with the first backing coated annular band area by placing a flexible transfer sheet having a equal sized wet resin pre-coat annular band in concentric transfer sheet wet resin-to-wet resin contact with the first backing coated resin, separating the transfer sheet from the coated resin, rotationally moving the transfer sheet to a new tangential position, re-contacting the first backing coated resin with the transfer sheet resin and then separating the transfer sheet from the first backing resin coating. Further, the resin smoothing transfer sheet that contacts the resin on the first backing sheet, can be lifted, sequentially rotated to a new tangentially advanced position and brought into resin contact two or more resin defect-leveling process events.

The proportional radial width annular band coating process can have a variety of coating applications. Techniques and apparatus devices described for coating of abrasive slurry fluids can also be used to coat non-abrasive fluids. The coating fluid can be a resin that forms a coated annular band on a flexible backing sheet where the backing sheet is forced into wet resin contact with the raised island structure bases contained in a silicone rubber island cavity mold. Also, abrasive particles or abrasive agglomerates can be deposited onto the coated wet resin that binds the particles or agglomerates directly to the flat surface of a flexible backing to form an abrasive article having an abrasive-free annular gap located between the outer radius of the abrasive annular band and the outside diameter of the disk backing. Further, the coating fluid can be a resin that forms a coated annular band on a flexible transfer sheet where the transfer sheet is forced into wet resin contact with raised island structures attached to a flexible backing sheet. The localized resin based coating fluid excess resin or deficient resin defect areas coated in an annular band on a backing sheet can be thickness averaged with the total coated annular band area by smoothing-over the resin coat defect areas with the use of fluid-storage or non-fluid-storage devices including: a doctor blade, a bristle or sponge brush or one or more coating fluid-contacting tapered-surface resin contact rolls. The coating fluid can be a photosensitive raised island structure material that forms a coated annular band on a flexible backing sheet that is exposed to light array patterns to form solidified raised island structures after which the non-solidified photosensitive raised island structure coating material is removed to leave solidified raised island structures attached to a backing sheet. The coating fluid can be a raised island structure material that forms a coated annular band on a flexible backing sheet that is embossed with a embossing plate or embossing roll having an array pattern of island cavities wherein the depth of each island cavity is preferably at least 10% deeper than the coating thickness to form raised island shapes on the surface of the backing sheet. The embossing plate may also have a depth equal to the height of the island and each island embossing cavity may be vented to release air trapped by the action of island structure material entering the cavity.

Continuous web can be resin coated to transfer-coat a portion of the resin to individual backing sheet disk article. For instance, a coating polymer resin material can be transferred to the surfaces of raised island structures attached to flexible backing sheets by placing the exposed island surfaces of the islands in pressurized contact with resin that is coated on a continuous web sheet by a web coater including a notch-bar knife coater, a knurl roll coater, a roll coater or a reverse-roll coater where the web moves at a constant web speed. Here, a nip roll set driven at the web line-speed can apply controlled nip roll pressure force on the resin-contacting raised island article as the article is carried along the web path by the moving resin coated web. Further, a process of transfer coating polymer resin material to the surfaces of raised island structures attached to flexible backing sheets can be completed where the exposed island surfaces of the islands are placed in pressurized contact with wet resin that is coated on a backing sheet segment cut from a continuous web sheet resin coated by a web coater including a notch-bar knife coater, a knurl roll coater, a roll coater or a reverse-roll coater where the web moves at a constant web speed.

The proportioning die coating fluid can also be an abrasive particle resin slurry that forms a continuous coated annular band on a flexible transfer sheet. The transfer sheet can be forced into resin slurry contact with the top surface of raised island structure surfaces attached to a flexible backing sheet or to the flat surface of a backing sheet, thereby transferring a portion of the abrasive slurry coating to the island surfaces or to the backing sheet. In the slurry coat transfer process, both the abrasive particles and resin binder tend to split evenly where approximately one half of the resin and also one half of the abrasive particles are transferred together from the transfer sheet to the island top surfaces. The transferred slurry thickness is preferred to be at least 35% of the transfer sheet original slurry thickness. When the deposited resin or abrasive slurry coating is applied to a transfer disk sheet, the coating thickness would be approximately twice as thick as the desired slurry coat on the raised island tops as only approximately one half of the slurry thickness would be transfer coated to the island tops. The coating transfer sheet can be reused in which case it would then be recoated with slurry by the same coat application process as used for the original coat to obtain a slurry coating thickness equal to the desired double-thickness coating required for the transfer process. After transferring resin or slurry to island tops, there will be a array pattern of island-shape discontinuities in the resin or slurry that remains on the annular band surface of the resin or slurry transfer sheet. When the transfer sheet is separated from the island sheet, a new measured quantity of resin or slurry can be applied to the annular surface of the transfer sheet over the top of the original resin that has the pattern of coating indentations in the resin or slurry. This array pattern of island-shaped coating indentations can be smoothed-over to form a uniform thickness of resin or slurry across the full surface of the coated annular band using one or more of the coating smoothing devices that include doctor blades, brushes or cone-shaped rollers. If desired, the original resin or slurry can be fully intermixed with the newly applied resin or slurry by use of a scrapper blade that would lift the resin or slurry temporarily from the surface of the transfer sheet after which it would be mixed with the new resin and re-coated on the transfer sheet. Resin or slurry material degradation effects including aging, or solvent depletion caused by evaporation, or curing degradation of the resin or slurry would be minimized by this resin or slurry intermixing process. A single transfer sheet can be used repetitively for the transfer coating of resin or slurry to many annular raised island sheet articles or to many direct-coated backing sheet articles. The amount of resin or slurry applied to each article would tend to equal the measured amount of resin or slurry that is re-coated onto the transfer sheet after each resin or slurry transfer event. The discontinuity effect of any coating thickness errors developed in the re-coat process are diminished by the averaging process of transferring only one-half of the coating thickness, including deficient or excess coating, of the resin or the slurry thickness on the transfer sheet that exists prior to the transfer coating event. A variety of solvents can be used in the resin slurry to assure that the individual abrasive particles have more than one half of their shapes exposed above the local-particle resin surface after the solvent has evaporated. Solvent evaporation significantly reduces the volume of the original solvent-laden particle binder resin that tends to expose the top surface of individual abrasive particles above the surface of the resin attached directly to the backing sheet. The evaporated resin binder tends to cling to the backing surface or the raised island surface and to develop a meniscus film structural support at the base of individual abrasive particles or spherical shaped composite abrasive agglomerates in the localized regions where the particles or agglomerates are attached to the backing or island surfaces. Abrasive slurry or filled resin or unfilled resin can be applied in an annular band on a transfer backing sheet by a variety of techniques including the use of a number of different proportioning coater dies including needle-tube dies and land-area metering dies. A controlled quantity of abrasive slurry can be deposited as an annular coated band that can be smoothed to a uniform thickness by doctor blades, rollers or brushes after the slurry has been transferred to a raised island or flat surfaced backing sheet article. In the case where an abrasive particle slurry is transfer coated, the excess slurry remaining on the transfer sheet can be removed by mechanical or chemical means and the abrasive particles recovered. Approximately one half of a resin or abrasive slurry can also be transferred directly onto a flat backing sheet using the same techniques as described for transfer coating abrasive slurry to the top surfaces of raised islands.

A process of resin coating annular bands on a backing using a coater fluid die providing fluid flow that varies proportionally across the exit width of the die lip requires the coater die to be positioned correctly relative to the backing to successfully create an annular coated band on a backings sheet or solid substrate. First, the stationary proportional coater die having a die lip width equal to the desired resin annular band width is positioned in close proximity to the surface of a backing that is attached to a rotatable platen where the coater die length is positioned radially above the rotatable platen horizontal surface and along a radial line extending from the rotation center of the platen. The end of the die having the smallest fluid flow rate is positioned at the desired location of the inside diameter of the desired resin coated annular band. Proportional coater dies having exit lengths longer than the radial width of the desired annular band can be also used by positioning the long die at an angle with a radial line emanating from a platen center of rotation. Activation of a coating fluid die pump causes coating fluid to exit the die lip where the fluid drops onto the backing sheet or the fluid is extruded onto the backing to form an annular fluid coated band on the surface of the backing when the platen is rotated over one or more revolutions during the fluid deposition. Transfer backing sheets may be constructed of flexible polymers or metal materials. Resin or slurry transfer plates or transfer devices may also be constructed of rigid plate materials including polymers, high density polyethylene, silicone rubber and metal to minimize process clean-up difficulties and to promote long wear of the transfer devices. The abrasive article backings to which the resin or slurry is transferred are typically flexible and these backings will conform to the surface of the rigid transfer plates during the resin or slurry coating transfer events.

Figure 44:
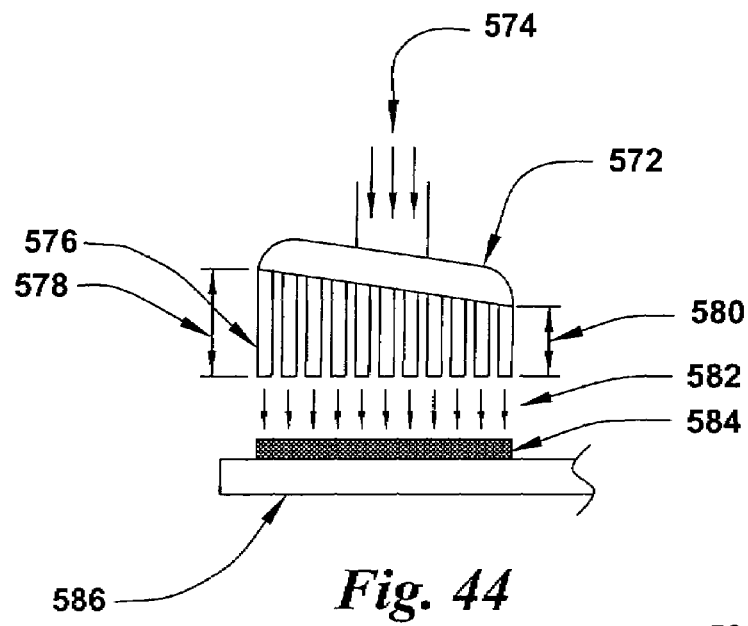
FIG. 44 is a cross-section view of an annular band metering tube abrasive slurry coater.
Figure 45:
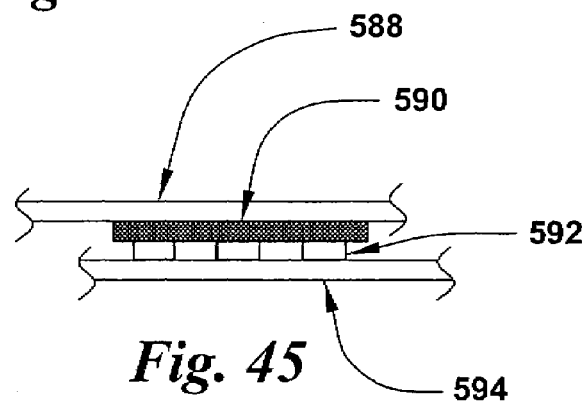
FIG. 45 is a cross-section view of an abrasive slurry transfer coated on raised islands.
Figure 46:
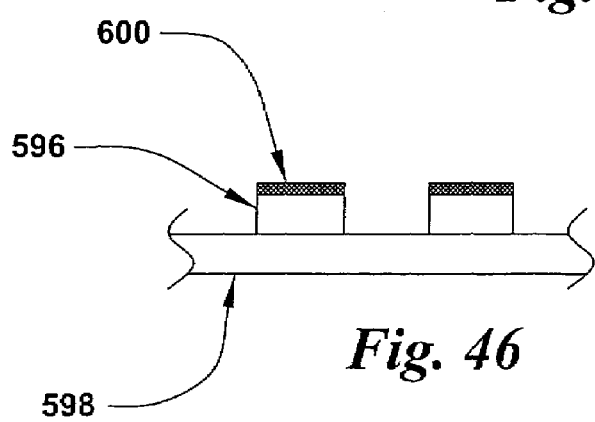
FIG. 46 is a cross-section view of half-thickness abrasive slurry coating on raised islands.

FIG. 44 is a cross-section view of a hypodermic needle tube coating die applying a abrasive slurry coating as an annular band on a transfer sheet. Hollow tubes having proportionally increasing length tubes 576 where the shortest length 580 tube is positioned at the outer radial position of the slurry coated annular band (not shown) and the longest length 578 tube is positioned at the inside radius position of the slurry coated annular band. The feed tubes 576 are joined together in a linear array with the open inlets to the tubes 576 projecting into a abrasive resin slurry manifold 572 that is supplied with slurry by a inlet system 574. The liquid slurry exit flow 582 can exist as independent tube streams or can exist in the form of sequential drops that are deposited as an abrasive slurry coating 584 on the surface of a backing sheet 586. FIG. 45 is a cross-section view of a double-thickness abrasive slurry 590 coated transfer sheet backing 588 in contact position with raised islands 592 attached to a backing sheet 594. FIG. 46 is a cross-section view of half-thickness abrasive slurry coating 600 coated on the top surface of raised islands 596 attached to a backing sheet 598.

Transfer Sheet Leveling of Annular Resin Defects

Problem: It is desired to minimize the localized resin thickness variations that exist at start and stop lines when resin based coatings are applied in an annular band form to a flexible backing sheet.

Solution: Random coating discontinuities, start and stop coating lines and intentional coating discontinuities of filled and unfilled resin based coatings can be smoothed-out or averaged into the coating thickness of the remainder of the non-discontinuity portion of an annular band with the use of a contacting transfer sheet. A transfer sheet can be stamp-pressed or progressively pressed into contact with the resin coated annular band, then separated from the original resin coating after which, the transfer sheet can be rotated to a new position where the transfer sheet is again stamp or progressively pressed into contact with the original resin. By this method, a defect area having an excess of resin has a portion of the excess resin transferred to a new tangential position. Likewise, a coating defect area having a resin void area has the void area partially filled in when resin is transferred from another tangential region. The process of contacting the full annular coated area with another annular transfer sheet can be repeated at numerous tangential locations to minimized the original coating defect areas. A similar use of a transfer sheet to smooth out one or many tangential coating defects is to contact the coated annular band with a transfer sheet and rotate the transfer sheet relative to the resin coated sheet while maintaining contact between the resin sheet and the transfer sheet. Dragging the transfer sheet rotationally while in contact with the resin on the resin backing sheet produces the effect of smearing and leveling the defect area where excess resin is carried to a new location or resin material is transferred to a void area. After separation of the transfer sheet from the resin coated sheet, the same transfer sheet can be used as a rotational stamp smoothing device or a defect smearing device for a succession of resin coated backing sheets. The amount of resin that is initially applied to the resin coated sheet is increased or the transfer sheet is resin pre-wetted to compensate for the resin that remains attached to the transfer sheet upon separation of the transfer sheet from the resin backing sheet. However, the initial increased resin quantity is only required for the first resin sheet processed as the amount of resin left remaining on the transfer sheet after sheet separation will tend to be consistent for the next smear-leveled or stamp-leveled resin backing sheets that are contacted by the already resin wetted transfer sheet. The transfer sheet would make a limited net addition to the amount of resin applied to the resin coated on the backing sheet as its primary function is to more evenly redistribute resin to or from resin excess or void areas. Many resin defects can be leveled on the full annular area by a single-event contacting action of a transfer sheet whereas the action of other smoothing devices including doctor blades, brushes or rollers individually or sequentially contact single resin defect areas as a resin coated backing sheet is rotated past the smoothing device station. When a resin defect transfer sheet is separated from the resin coated sheet, a uniform resin thickness split occurs progressively over the resin coated annular area as the transfer sheet is peeled from one side of the backing sheet to another side. The progressive resin thickness split tends to leave a continuous uniform resin coating on the backing sheet as compared to the potential creation of another resin thickness defect when a defect smoothing device including doctor blades, brushes or rollers are lifted of the surface of the resin coated backing sheet after the defect smoothing procedure has been completed. A resilient sponge or foam material device can be applied to the backside of the transfer sheet backing to assure uniform annular band contact of the transfer sheet with the resin coated backing when low resin contact forces are applied during the resin stamp or progressive transfer or the resin drag-transfer procedures. The annular band coating smoothing devices including doctor blades, contact rolls, stamp transfer sheets or resin dragging transfer sheets can be used for a variety of coatings including resin make coatings, backing primer coatings, pre-coats used with island foundation material, abrasive particle slurry mixtures and other transfer coatings. The resin defect smoothing transfer device can be a flexible backing sheet material or the device can be a solid plate that is smooth or has a textured surface. When the transfer device is a solid plate device, resilient sponge backing can be used under the resin coated backing to aid in developing a conformal contact fit between the transfer plate and the flexible resin coated backing sheet.

Abrasive-Solvent Slurry Annular Transfer

Problem: It is desired to coat the surfaces of an annular pattern of raised islands attached to a flexible disk backing or to apply a abrasive coating direct to the flat surface of a backing sheet with a uniform coat of typical 30 to 45 micron sized abrasive particles that are evenly spaced with a surface density of 5 to 65% abrasive and where the quantity of abrasive is predetermined for a specific disk article.

Figure 47:
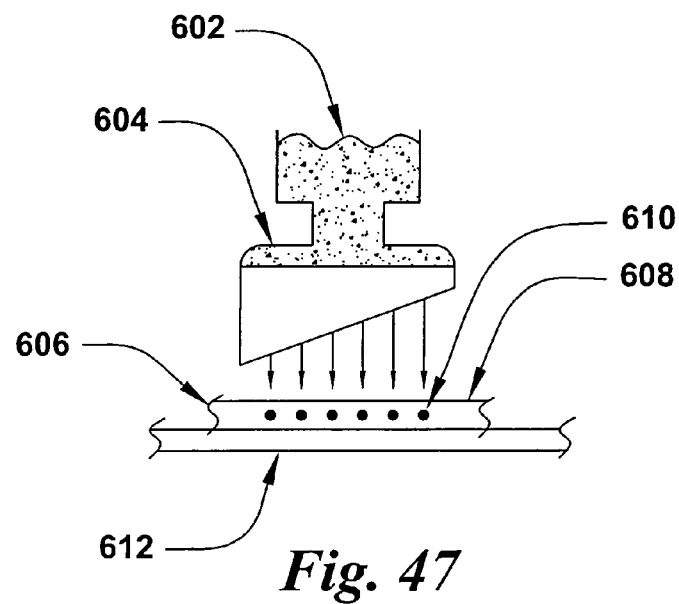
FIG. 47 is a cross-section view of annular band coating of a mixture of abrasive particles.
Figure 48:
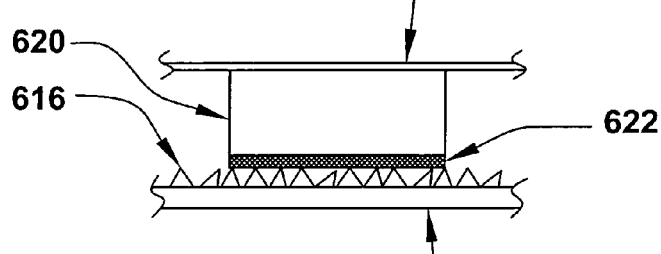
FIG. 48 is a cross-section view of transfer coating of abrasive particles to raised islands.
Figure 49:
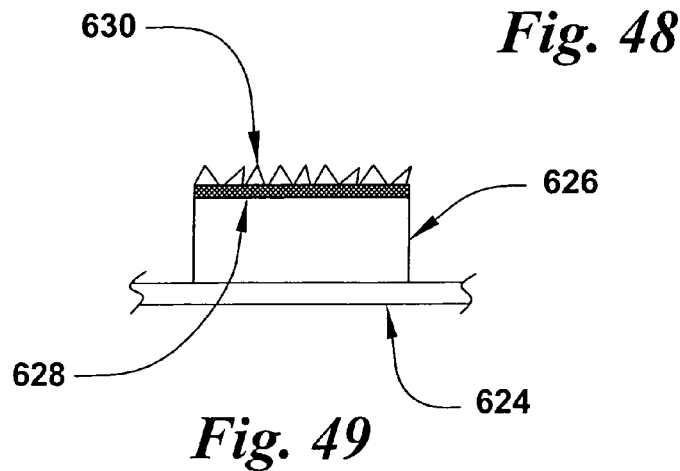
FIG. 49 is a cross-section view of a raised island with transferred resin bonded particles.

Solution: A measured quantity of abrasive particles can be mixed with water, alcohol or a mixture of various common solvents and this liquid slurry can be coated on a transfer sheet or transfer plate in an annular pattern with the use of a coathanger die or a hypodermic tube die or other proportional fluid dies. Any of the coating dies would have longer length orifice fluid passageways at the annular inner radius position than at the outer radius position to create an decreased liquid abrasive slurry flow at the inner radius of the annular band. The abrasive particles would be maintained in a suspended state in the solvent by the use of selected solvents, by the use of dispersing agents and the use of vibration, either selectively or in combination during processing the liquid slurry through the metering coating die. Abrasive fluid mixture exiting from the die would be deposited onto the transfer sheet, or transfer plate, mounted on a rotating platen. The rate of flow of the abrasive mixture would be metered as an equivalent non-slurry liquid through the fluid flow orifice-type metering die. The abrasive slurry can be deposited on the transfer sheet during a single revolution or, over two, or more revolutions of the platen to effect a uniform sparse coating of abrasive particles in an annular band on the transfer sheet. After evaporation of the solvent contained in the abrasive slurry, individual dry abrasive particles would be separated from adjacent particles to create a sparse particle density particle coating on the transfer sheet. Another flexible sheet having a wet coat of adhesive binder on the top surface of raised islands arranged in an annular band pattern having the same inner and outer diameters as the abrasive transfer sheet annular band can be brought in wet coating contact with the solvent-dry particles and pressed together. The abrasive particles at the island sites would become adhesively attached to the island surfaces. After removal of the abrasive particle coated island backing sheet, the unused excess abrasive particles located in the space between the raised islands that remain on the transfer sheet can be recovered for future use. This same abrasive particle transfer technique can be employed to transfer a distributed particle layer to a flat surface of a resin coated backing sheet. FIG. 47 is a cross-section view of a proportioning coater die 604 applying a annular band coating mixture of abrasive particles and solvent 602 to form particle and solvent mixture layer 606 on the surface of transfer backing sheet 612 where the solvent layer 608 is filled with abrasive particles 610. FIG. 48 is a cross-section view of a resin 622 wetted raised island 620 attached to a backing sheet 618 pressed into contact with loose dry abrasive particles 616 positioned on the surface of a particle transfer sheet 614. FIG. 49 is a cross-section view of transferred abrasive particles 630 bonded by a resin coating 628 to a raised island 626 attached to an abrasive article backing sheet 624.

Multiple RTV Island Cavity Mold Plates, Belts

Problem: It is desired to form room temperature vulcanizing (RTV) silicone rubber raised island cavity mold plates or an island cavity mold continuous belt that accurately reproduces annular patterns of raised island foundations that are attached to a circular disk backing, or are attached to a continuous length of web backing. RTV produced rectangular array patterns of raised islands that are attached to a backing sheet can also be used to provide useful forms of abrasive articles. An inexpensive, accurate and simple method to create multiple cavity mold plates is desired with identical size characteristics of each cavity mold plate.

Solution: A metal or polymer island font sheet of material having a thickness equal to the desired height of the raised island can be drilled with an annular pattern of straight through-holes, or holes with tapered walls, where the diameter of the holes is equal to the desired diameter of the circular raised islands. Other raised island shapes, including radial bars can alternatively be machined by drilling, milling or electrical discharge machining (EDM) into a typical 0.020 inch (0.508 mm) thick island font sheet or into the surface of a plate. Drilling thin font sheets can produce distorted hole edges and drill burrs, both of which can be eliminated by EDM machining the island shape holes. This drilled or machined island font sheet can be attached to a mounting plate by the use of double-stick tape where the side of the island font sheet having the narrow top surface of the islands is mounted flat to and attached to the surface of a mounting plate. A 1.5 inch (3.8 cm) high or less circular dam wall can be positioned from 0.5 inches to 3.0 inches (1.25 to 7.6 cm) outboard of the annular band of island cavity holes and attached to the font mounting plate to enclose the annular band of island cavity holes. A 0.061 to 2.00 inch (1.55 to 51 mm) thick layer of liquid RTV rubber can then be poured into the open area enclosed by the dam wall attached to the top surface of the font sheet mounting plate to create a intermediary rubber mold pattern, upon RTV solidification, of the island cavity sheet where each island protrudes up from the surface of the intermediary rubber mold plate. If desired, the RTV mold process can be repeated and multiple intermediary master configuration RTV molds can be completed. Then, another RTV silicone rubber reverse copy can be made from the intermediary RTV rubber configuration plate by replication molding a new RTV rubber copy of the original RTV intermediary mold plate to form a RTV silicone rubber island cavity plate having a pattern of island cavity holes on the RTV mold surface. The reverse RTV cavity mold plate has island cavities in its flat surface that are of a cavity depth equal to the thickness of the machined metal font sheet. The island cavity shapes are a replicated duplicate-copy of the island cavities machined into the island font sheet. Individual RTV silicone rubber cavity mold plates can be used to create annular band arrays or rectangular arrays of raised cavities on backing sheet segments. Multiple RTV reverse mold plates can be reproduced from a single intermediate RTV mold. It is desired to create a island cavity mold plate from RTV silicone rubber as this material is structurally flexible, is tear resistant, does not adhere to other materials including candidate island foundation materials and faithfully duplicates precise detail features with great accuracy. A RTV silicone mold can be readily used as a master to make another RTV mold, with or without the use of mold release agents being used to prevent the new RTV material from adhering to the master RTV material when liquid uncured RTV rubber is poured in contact with the master RTV master mold to form the final configuration mold. It is desired to make a reverse RTV mold as it is easier to machine island cavity shapes into a thin metal font having the same thickness as the desired cavity height than it is to machine away metal or plastic to leave islands standing above the surface of the metal baseplate. If a raised standing-island baseplate is machined, this baseplate can be used as a master to mold form a RTV silicone rubber island cavity mold directly from the baseplate without the secondary TRV molding reverse operation. Creating straightforward or reverse RTV molds from masters is commonly done in the rapid prototyping industry. Masters are used in the production of extremely accurate powdered metal plastic injection mold cavities that are used in the automotive industry. A typical sample silicone rubber would be a two-part platinum catalyst cured Type M SILASTIC®L RTV supplied by Dow Corning Corporation, Midland Mich. The RTV can be mixed and placed in a vacuum environment to reduce the size of entrained air bubbles generated by the mixing action. A vacuum environment can also be use to promote filling of small mold cavity detail features. RTV rubber is desired as a cavity mold material as the cured or solidified RTV can be used to form accurate copies of raised island foundations attached to a backing sheet, or web. RTV will not adhere to other molded materials upon separation from the RTV mold used in molding operations including the use of epoxy island foundation materials or the use of another RTV material that is used to create a reverse copy of the first RTV mold. Also, the RTV silicone rubber stretches and is flexible that allows easy removal of the raised island backing sheet from the RTV mold plate or belt. The RTV mold can also be used to create an intermediate or reverse configuration epoxy mold plate master by filling a RTV cavity mold with epoxy that solidifies to create a reverse impression of the RTV rubber mold. Great flexibility in mold production is provided by the use of low-shrink epoxy systems and RTV rubber to create a family of durable and accurate molds that can be easily produced and can be used to produce accurate raised island abrasive articles without great mold production expense. The system of using RTV molds allows even an occasional user of precision annular raised island abrasive articles the capability to produce abrasive articles on a limited production basis that are size matched to his workpiece size requirements. Here, the annular radial width of a abrasive article can be optimized to be slightly greater or smaller, depending on the lapping machine traversing capabilities, than the diameter of the workpiece to assure that both the abrasive and the workpiece mutually experience uniform wear that eliminates grinding flat channel areas on either the workpiece or abrasive article. Use of standard commercially available abrasive disk articles that are either too large or too small for the lapping or grinding application is not necessary when a suitably sized abrasive disk article can be produced quickly and at low cost with a small capital equipment investment. A room temperature vulcanized silicone rubber material mold having an annular band array pattern of island cavity structure cavity holes can be used to attach raised island foundation shapes that are adhesively bonded to flexible disk backing sheets. A rigid polymer or metal cavity hole font sheet having an annular band array pattern of circular, radial bar, chevron or other island shape through-holes can be fabricated by machining techniques including drilling, milling and electrical discharge machining with the island shape holes have a depth of from 0.005 to 0.125 inches (0.127 to 3.2 mm) where the thickness of the font sheet is equal both to the depth of the island shape holes and also equal to the height of the island shapes. The annular band island cavity pattern having outer annular band diameters of from 0.75 to 72.0 inches (1.9 to 182.9 cm) where the inner radius of the annular band array band of raised island cavities is greater than 30% of the outer annular band diameter and the island cavity hole shapes have angled walls having the same orientation taper angle of less than 20 degrees where the tapered walls form cone-shaped island cavity holes having a narrow-top and a wide-base. A layer of adhesive including double-stick adhesive film is applied to the narrow-top island cavity hole shape side of the font sheet and the island hole font sheet is positioned in flat pressurized contact with a flat mold plate to bond the font sheet adhesive coated island cavity narrow-top side surface to the mold plate surface. A circular edge dam wall having a wall height of less than 1.5 inches (3.8 cm) is mounted in contact with the surface of the mold plate and positioned to surround the annular array band of island shaped cavity holes leaving a annular gap of less than 2.0 inches (5.1 cm) between the wall surface inner radius and the island cavity annular band outside radius. A two-part mixture room temperature cure silicone liquid rubber is poured into the open area enclosed by the dam wall that is attached to the mold plate to form an intermediate silicone rubber mold having an annular band of raised narrow-top island structures extending above the flat surface of the intermediate silicone rubber mold. The solidified or cured or vulcanized intermediate raised-island silicone rubber cavity mold is separated from the flat surface of the cavity hole font sheet after cure-solidification of the silicone rubber. Then a circular edge dam wall having a wall height of less than 1.5 inches (3.8 cm) is attached to the surface of the intermediate silicone rubber mold in a position surrounding the annular array band of island shaped structures leaving a annular gap of less than 2.0 inches (5.1 cm) between the wall surface inner radius and the raised island shape annular band outside radius. A two-part mixture room temperature cure silicone liquid rubber is poured into the open area enclosed by the dam wall that is attached to the intermediate rubber mold to form an island cavity silicone rubber mold having an annular band of open-cell island hole shapes extending below the flat surface of the island cavity silicone rubber mold. The solidified or cured or vulcanized island cavity silicone rubber cavity mold is separated from the flat surface of the intermediate raised-island rubber mold after cure-solidification of the island cavity silicone rubber. Rectangular island cavity arrays can be created using a process similar to that used to create the annular band RTV rubber mold except that a rectangular hole font is machined and box silicone rubber side walls are used in place of the circular wall. The raised island sizes, island spacing, wall taper angles and other characteristics for the rectangular island array patterns would be the same as those for the annular array islands. Also, multiple annular band patterns of island cavities can be formed into the surface of an endless RTV belt by a number of replication process or RTV cavity mold techniques. A RTV cavity belt can be constructed by sequentially attaching a number of RTV cavity mold plates to the surface of an flexible metal, polymer or woven fiber cloth endless carrier belt. Another technique would be to sequentially RTV mold continuous sections of island array cavity patterns onto the surface of a carrier belt using one or more intermediate RTV molds having island shaped surface protrusions as island mold patterns to create a series of island cavity surface-hole array patterns positioned sequentially to form a endless belt having annular or rectangular island cavity arrays. Successful structural bonding attachment of non-stick RTV material to the surface of a flexible polymer or metal carrier belt can be improved by first attaching a non-woven fiber including felt or a porous woven cloth to a belt carrier and then impregnating the open-fiber surface material with RTV during the process of forming the RTV cavity belt to mechanically lock the partially entrapped RTV to the carrier belt. The RTV room temperature vulcanized silicone rubber island cavity mold plates or the RTV endless belt articles have similar mold cavity characteristics for both the annular array cavity patterns and for the rectangular array patterns. The rectangular or annular array pattern island shapes include circular, bar, chevron or other island shape island-cavity hole shapes having cavity hole flat-surface bottoms where the island cavity hole shapes have cavity-hole bottom surface area lengths of from 0.010 to 0.375 inches (0.25 to 9.5 mm); the island-shape holes have a depth of from 0.005 to 0.125 inches (0.127 to 3.2 mm); and the mold plate thickness is preferred to be at least 125% of the island-shape hole depth. The island cavity hole shapes can have taper angled walls having a taper angle of less than 20 degrees where the tapered walls provide a narrow cavity hole bottom having flat-bottom dimensions that are less than the corresponding hole dimensions located at a elevation position level with the mold surface. The rectangular arrays can be formed with equal cross-width or downstream spacing between individual cavity holes that would allow the formation of island structure arrays on a continuous web backing. Other techniques using rigid master island mold plates or island cavity hole sheets can be used to form endless belts directly with RTV rubber or by using reverse-copy RTV duplication processes. The process of molding and attaching polymer resin material raised island structures in an annular array or rectangular array band pattern onto the surface of a flexible backing sheet disk using a RTV silicone rubber island cavity mold plate or RTV island cavity endless belt are similar. The backing sheet may or may not be surface-conditioned with coatings or by abrading processes or it may be pre-coated with a wet resin coating in the backing area where the island structures are to be attached prior to contact with the RTV mold. The open island cavity holes that are indented into the surface of the silicone rubber cavity mold are filled with a liquid island structure resin adhesive material and the liquid island structure resin adhesive material is leveled flat with the surface of the rubber mold adjacent to each cavity opening. A flexible backing sheet is positioned in pressurized flat contact with the surface of the silicone rubber filled cavity mold to bring the liquid island structure material into direct contact with the backing sheet and the sheet is maintained in contact until the island material solidifies thereby creating an attachment bond between each raised island structure and the backing sheet. Then the backing sheet having an annular band array of attached islands is separated from the silicone rubber mold. A backing sheet may be pre-coated with a layer of resin or other pre-oat material prior to placing the sheet in contact with the resin based island structure material contained within the filled island mold cavities to enhance the bonding attachment of the island structures to the backing sheet. A RTV resin printing plate can be made by the same process used to make a mold plate used for creating island structures that are attached to a backing sheet or backing plate. A RTV resin or abrasive slurry transfer mold can be made from a hole font plate or from other raised island masters where the mold has an array of flat surfaced raised islands that protrude above the surface of the mold. The RTV mold can then be resin or slurry coated on the island surfaces and the resin or slurry coated islands placed in force contact with a backing sheet or plate to transfer island patterns of resin or slurry to the backing. Spherical abrasive beads or abrasive particles can then be placed in contact with the wet resin to bond the beads to the backing sheet at the resin coated island sites.

A strip can be cut from a backing sheet having an rectangular array of abrasive particle or abrasive agglomerate coated raised islands attached to the backing sheet and two opposing ends of the strip can be joined together by using adhesive to create a strip butt-joint, a angled butt joint or a overlapped feathered-edge strip joint to form a endless belt having attached abrasive islands on the belt abrading surface. An endless belt can be made from a raised island metal backing sheet by welding, brazing or laser welding the two ends of a strip together. Some of the raised island structures may be removed from the strip ends adjacent to the belt splice joint to provide an island-free area of the belt joint that allows fabrication of the belt splice without disturbing the structural integrity of individual island structures in the belt joint area.

Figure 50:
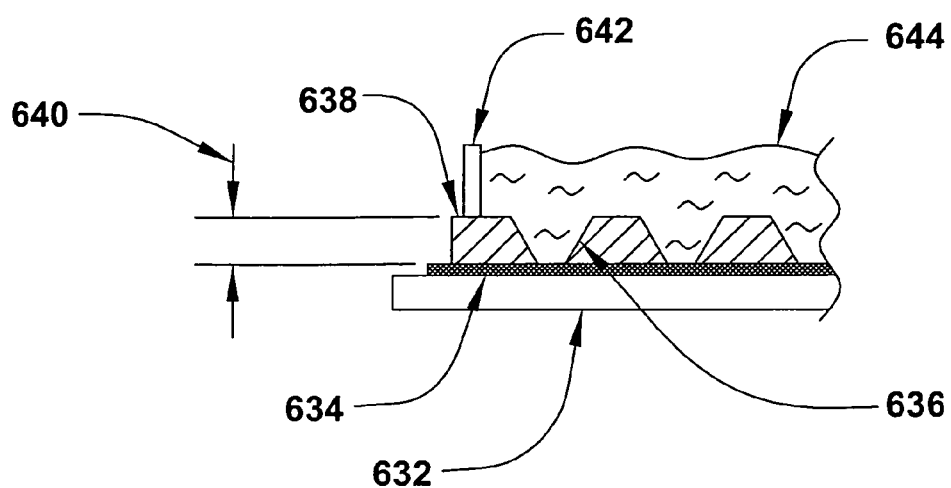
FIG. 50 is a cross-section view of an intermediary RTV silicone mold of raised islands.
Figure 51:
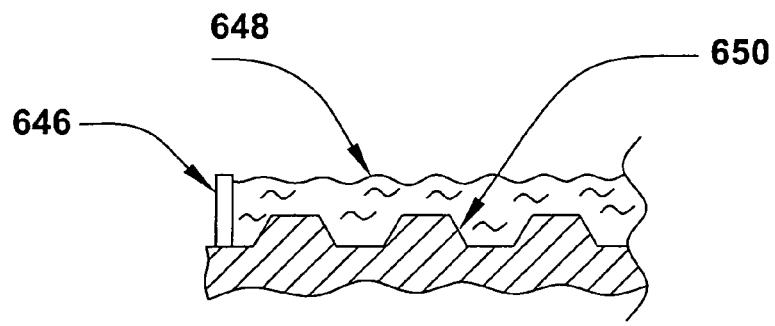
FIG. 51 is a cross-section view of a reverse silicone rubber mold of raised island cavities.
Figure 52:
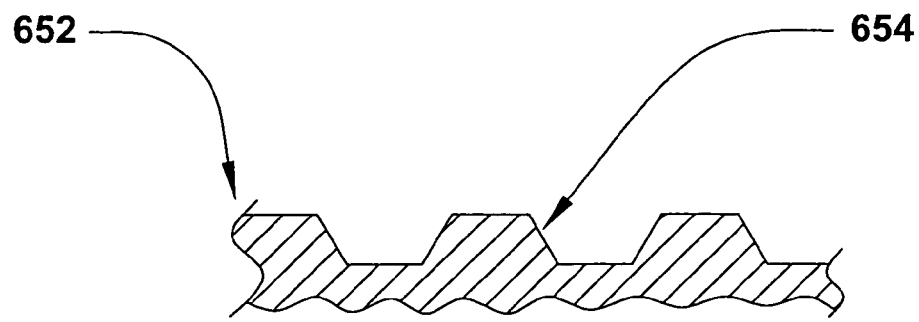
FIG. 52 is a cross-section view of island cavities in a RTV silicone rubber mold plate.
Figure 53:
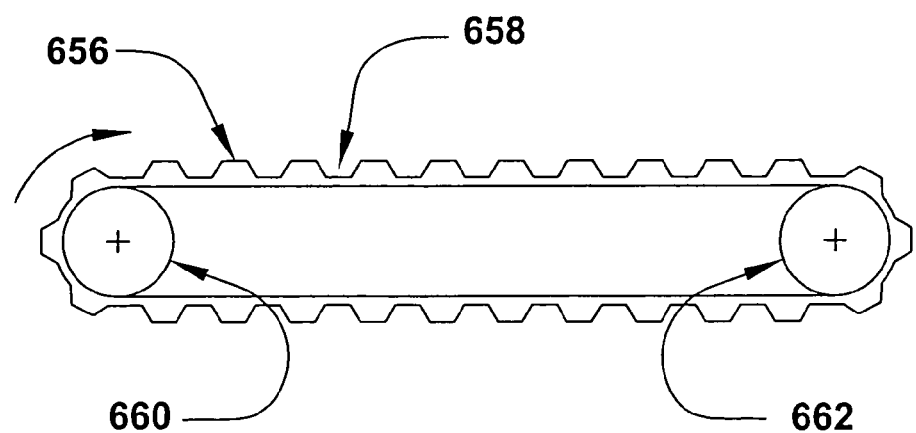
FIG. 53 is a cross-section view of a RTV silicone rubber island cavity endless belt mold.

FIG. 50 is a cross-section view of an intermediate RTV mold using an island cavity font as a master. An island cavity font sheet 638 having island cavities 636 that have a thickness or depth 640 is attached to a baseplate 632 with double-stick tape 634. A dam wall 642 contains liquid RTV 645 that fills the island cavity 636 features in the font sheet 638 to form a RTV intermediary mold 644. FIG. 51 is a cross-section view of a solidified RTV intermediary mold used to form a final reverse replication RTV cavity mold. A dam wall 646 contains liquid RTV 648 that encompasses all the island cavity detail features of the solidified RTV intermediary mold 650. FIG. 52 is a cross-section view of island cavities in a RTV mold plate. The RTV cavity mold plate 652 has island cavities 654. FIG. 53 is a cross-section view of a RTV silicone rubber island cavity mold endless belt. The RTV endless belt 656 having island cavities 658 is mounted on a driven roll 660 and an idler roll 662.

Ground-Flat, Raised Annular Islands

Problem: A simple, inexpensive and effective method to mutually grind flat the top surfaces of raised islands on an annular disk backing sheet is desired. The absolute height of each island surface is not important, only that all surfaces are at the same elevation.

Figure 54:
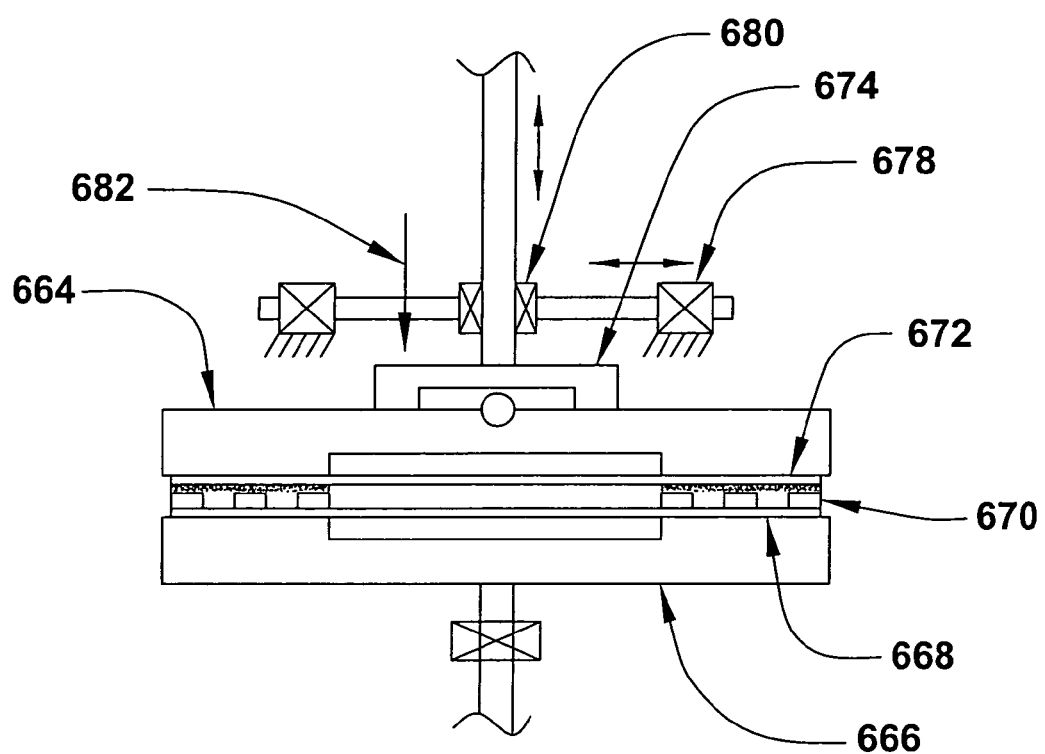
FIG. 54 is a cross-section view of an annular band grind plate for grinding raised islands.

Solution: A precise thickness abrasive surface coated annular backing disk can be attached by vacuum chucking to a circular lapping plate that is precisely flat across its surface in the annular area where the abrasive sheet is mounted. A platen would be mounted on an air bearing or precision mechanical roller bearing spindle and the top exposed surface of the platen would be ground or lapped or machined flat after it is mounted to the rotating spindle. A circular disk backing sheet having an annular band of raised island foundations attached to the backing is mounted on a platen surface by vacuum chucking. The abrasive surfaced grinding or lapping plate is then brought into contact with the raised islands that can either be stationary or the platen spindle can be rotating. Nominally, the abrasive plate is contacted concentrically with the island platen and the annular band of abrasive has the same annular radial width and diameters as the annular band of islands. The abrasive lapping plate can be held in a non-rotating state during the contact grinding process or the abrasive plate can be incremented or can be rotated slowly, or rotated fast, in the same direction as the rotating platen or it can be rotated in a direction opposing the platen. Also, the abrasive plate can be horizontally moved or translated in the plane of the platen surface to promote even wear across the surface of the abrasive annular band. The plate can be attached to a vertical shaft or slide with a low friction universal joint that will allow the full annular surface of the abrasive sheet to lay flat in contact with the full annular surface of the raised islands. The highest of the raised island foundations will be ground first with the process continued until each of the islands has been ground flat to each other. The abrasive lapping plate would have sufficient mass to hold the plate in a stable position against once-around impact forces while the raised island platen is rotated at high speeds. Either raised island abrasive sheets or uniform coated non-raised abrasive sheets can be used as the abrasive disk. Water can be freely used as a lubricating agent as hydroplaning will not occur when grinding the surfaces of raised islands. The same annular plate lapping system can be used to flat grind or flat lap with loose slurry abrasive particle liquid mixtures using the abrasive plate and the platen surface to mutually lap the plate to the platen. FIG. 54 is a cross-section view of an annular lapping plate used to flat grind raised islands attached to a disk backing sheet. A backing disk 668 having attached raised island structures 670 is mounted to a rotating platen 666. A lapping plate 664 acting as a abrading plate device having an attached abrasive sheet 672 where the plate 664 is attached to a mechanism having a vertical slide 680 and a horizontal slide 678 by a universal joint device 674 that allows the lapping plate 664 to conformably contact and lay flat on the matching surface of the uppermost raised islands 670 formed in an annular band on the backing sheet 668. The lapping plate 664 can be raised and lowered to make or break contact with the islands 670 and the lapping plate 664 can be rotationally stationary or can be incremented rotationally or can be rotated slowly or at high rotational speeds either in the same or reverse direction of rotation as the platen 666. The abrading plate 664 can be lowered with a controlled contact pressure to progressively grind off the top surfaces of the raised islands 670 until each island 670 has been ground flat or the abrading plate 664 can be lowered a prescribed distance to grind a controlled amount off the tops of all the islands or the abrading plate 664 can be lowered a controlled distance to grind all the islands to a desired height as measured from the top surface or bottom surface of the backing sheet 668. The abrading plate 664 can be traversed laterally in a horizontal direction with use of the horizontal slide to present new abrasive material to the island surfaces and also to even out the wear across the surface of the abrasive sheet 672. The horizontal abrading plate 664 horizontal movement may have an oscillating motion, may have an incremental motion or may have different one or two-dimensional patterned motions to optimize the wear of the abrasive sheet 672 surface and also to optimize the level grinding of the raised island 670 surfaces on the abrading plat 664. A force 682 may be applied with different magnitudes at different stages of the abrading process.

Screen Formation of Spherical Ceramic Abrasive Agglomerates

Problem: It is desired to form spherical ceramic abrasive particle composite agglomerates or beads that are made of abrasive powder particles mixed with metal or non-metal oxides or other materials where each of the agglomerates have the same nominal size. Production of equal-sized beads increases the bead product utilization as expensive composite beads that are not of the desired size at times do not have to be discarded. Also, the use of undersized beads that do not contact a workpiece surface is avoided. Spherical composite abrasive agglomerate beads produced by the present methods of manufacturing tend to result in the simultaneous production of agglomerate beads having a wide range of sizes during the process of encapsulating a single abrasive particle size. When this wide range of different sized agglomerate beads are coated together on an abrasive article, the capability of the article to produce a smooth finish is primarily related to the size of the individual abrasive particles that are encapsulated within a bead body, rather than being related-to the diameter of the bead body. Also, when abrasive beads are coated in a monolayer on the surface of an abrasive article, it is desired that each of the individual beads have approximately the same diameter to effectively utilize all of the abrasive particles contained within each bead. If small beads that are mixed with large beads are coated together on an abrasive article, contact of the small beads with a workpiece surface is prevented by the adjacent large diameter beads that contact the surface first. Typically the number of particles contained within a small bead is insufficient to provide a reasonable grinding or lapping abrading life to the abrasive article before all of the particles are worn away. The number of individual particles encapsulated within the body volume of a spherical agglomerate bead is proportional to the cube of the diameter of the bead sphere but the average height of the bulk of the particles, located close to the sphere center, is directly proportional to the sphere diameter. A small increase in a bead diameter results in a modest change of the bulk agglomerate center height above the surface of a backing sheet, but the same diameter change results in a substantial increase in the number of individual abrasive particles that are contained within the bead body. Most of the volume of abrasive particles are positioned at a elevation raised somewhat off the surface of the backing sheet, or the surface of a raised island, that results in good utilization of nearly all the encapsulated abrasive particles during the abrading process before the agglomerate is completely worn down. Even though the spherical bead shape is consumed progressively during the abrading process, the body of the remaining semi-spherical agglomerate bead structure has sufficient strength and rigidity to provide support and containment of the remaining abrasive particles as they are contacted by a moving workpiece surface. It is necessary to provide gap spacing between adjacent agglomerate beads to achieve effective abrading. The presence of coated undersized non-contacted agglomerate beads results in the water and swarf passageways existing between the large diameter agglomerates being blocked by the small agglomerates. The nominal size of the abrasive bead diameters is also selected to have sufficient sphere-center heights to compensate for both the thickness variations in the abrasive sheet article and also the out-of-flatness variations of the abrasive sheet platen or platen spindle. Overly small beads located in low-spot areas on a non-flat platen rotating at very high rotational speeds are not utilized in the abrading process as only the largest sized beads, or the small beads located at the high-spot areas of a rotating abrasive disk article, contact the surface of a workpiece. When a non-flat abrasive surface rotates at high speeds, a workpiece is typically driven upward and away from low-spot areas due to the dynamic impact effects of abrasive article high-spots periodically hitting the workpiece surface during the high speed rotation of a workpiece contacting abrasive platen. Workpieces subjected to these once-around impacts are prevented from travelling up and down in contact with the uneven abrasive surface due to the inertia of the workpiece or the inertia of the workpiece holder. Most of an abrasive article beads can be utilized if the abrasive platen is operated at sufficiently low rotational speeds where a small or low inertia workpiece can dynamically follow the periodically changing contour of a non-flat moving abrading surface. However, the abrasion material removal rate is substantially reduced at these low surface speeds as the material removal rate is thought to be proportional to the abrading surface speed. Use of very large diameter agglomerate spheres or beads addresses the problem of abrasive article thickness variations or platen surface flatness variations. Very large beads introduce the disadvantage of tending to create a non-level abrading surface during abrading operations as the coated abrasive is too thick to retain its original-reference precision flatness over extended abrading use. A non-level abrasive surface typically can not generate a flat surface on a workpiece. There is a trade-off in the selection of the abrasive coating thickness or selection of the size of abrasive beads coated on an abrasive article. If the abrasive coating is too thick or the beads too large, the original flat planer surface of the abrasive article ceases to exist as abrading wear proceeds. If the abrasive coating is too thin, or the beads are too small, the abrasive article will wear out too fast. High surface speed operation with super hard abrasive particles, including diamond and cubic boron nitride, is very desirable for abrading manufacturing processes because of the very high material removal rates experienced with these abrasives when used in a high surface speed abrading operation. It is not a simple process to separated the undesirable under-sized beads from larger sized beads and crush them to recover the expensive abrasive particle material for re-processing to form new correct-sized beads. In many instances, the too-small beads are simply coated with the correct-sized spherical agglomerate beads even though the small beads exist only as a cosmetic component of the abrasive coated article. It is preferred that equal-sized bead agglomerates have a nominal size of less than 45 microns when enclosing 10 micron, or smaller, abrasive particles that are distributed in a porous ceramic erodible matrix.

Another use for equal-sized non-abrasive spherical beads is for creating raised islands on a backing sheet by resin coating island areas and coating the wet resin with these beads to form equal height island structures that can be resin coated to form island top flat surfaces. Equal sized beads can also be used in many commercial, agricultural and medical applications.

Solution: A microporous screen endless belt or microporous screen sheet having woven wire rectangular openings can be used to form individual equal-sized volumes of an aqueous based ceramic slurry containing abrasive particles. The cell volumes are approximately equal to the volume of the desired spherical agglomerates or beads. Cells are filled with a slurry mixture and an impinging fluid is used to expel the cell slurry volumes into a gas or liquid environment. Surface tension forces acting on the suspended or free-travelling slurry lumps forms the liquid slurry volumes into individual spherical bead shapes that are solidified. Beads can then be collected, dried and fired to produce abrasive composite beads that are used to coat flexible sheet backing material. Box-like cell volumes that are formed by screen mesh openings have individual cell volumes equal to the average thickness of the woven wire screen times the cross-sectional area of the rectangular screen openings. Individual rectangular cell openings formed by the screen interwoven strands of wire have irregular side walls and bottom and top surfaces due to the changing curved paths of the woven screen-wire strands that are routed over and under perpendicular wires to form the screen mesh. These irregular rectangular cell openings can be made more continuous and smooth by immersing the screen in a epoxy, or other polymer material, to fully wet the screen body with the polymer, after which, the excess liquid polymer is blown off at each cell by a air nozzle directed at a angle to the screen surface. The polymer remaining at the woven wire defined rectangular mesh edges of each cell will tend to form a more continuous smooth surface shape to each cell due to surface tension forces acting on the polymer, prior to polymer solidification. Screens can also be coated with a molten metal that has excess metal residing within the rectangular cell shape interior that is partially removed by mechanical shock impact, or vibration, or air jet to make the cell wall openings more continuous and smooth. Also, screens can be coated with release agents including wax, mold release agents, silicone oils and a dispersion of petroleum jelly dissolved in a solvent, including Methyl ethyl keytone (MEK). Screen materials having precision small sized openings are those woven wire screens commonly used to sieve size-grade particles that are less than 0.002 inches (51 micrometers) in diameter. These screens can be used to form small sized abrasive agglomerates. Another open cell sheet material having better defined cell walls than a mesh screen is a uniform thickness metal sheet that has an array pattern of circular, or other shaped, perforation holes created through the sheet thickness by chemical etching, laser machining, electrical discharge machining (EDM), drilling or other means. The smooth surface of both sides of the perforated metal sheet cell-hole material allows improved hole slurry filling, slurry expelling and slurry clean-up characteristics as compared to a mesh screen cell-hole material. A endless screen or perforated belt can be made by joining two opposing ends of a very thin mesh screen, or of a perforated sheet, together to form an joint that is welded or adhesively bonded. Butt joint, angled butt joint, or lap joint belts can be constructed of the cell-hole perforated sheet material or sheet screen material. A belt butt joint that has inter-positioned serrated joint edges that are bonded together with an adhesive, solder, brazing material or welding material allows a strong and flat belt joint to be made. Butt joint bonding materials that level-fill up belt material cell holes may extend beyond the immediate borders of the two joined belt ends to strengthen the belt joint as these filled cell holes are not significant in number count compared to the remainder of open cell holes contained in the belt. The belt lap joint is practical as a 25 micron (0.001 inch) thick cell sheet material would only have a overlap joint thickness of approximately 50 microns (0.002 inches) and preferably would have a 0.5 to 1.5 inch (12.7 to 38 mm) long overlap section. This overlap section area can easily pass through a doctor blade or nip roll cell filling apparatus. Cell openings that reside at the starting and trailing edges of the joint may be smaller than the average cells but these undersized cells would be few in number compared to the large number of cells contained in the main body of the belt. Cell openings within the belt joint overlap area would typically be filled with adhesive. Extra small agglomerates produced by the few extra small cells located at the leading and trailing belt joint edges can simply be discarded with little economic impact. The endless belt can have a nominal width of from 0.25 to 40 inches (0.64 to 101.6 cm) and a belt length of from 2.5 to 250 inches (6.4 to 640 cm) or more. The belt can be mounted on two rollers and all or a portion of the rectangular or round cell openings in the belt can be filled with abrasive slurry. Belt cell holes would be filled level to the top and bottom surfaces of the belt by use of a nipped coating roll, or one or more doctor blades, or by other filling means. Two flexible angled doctor blades can be positioned directly above and below each other on both sides of the moving belt to mutually force the slurry material into the cell holes to provide cells that are slurry filled level with both surfaces of the belt. Another form of open cell hole sheet or screen that can be used to form spherical beads is a screen disk that has an annular band of open cell holes where the cell holes can be continuously level filled in the screen cell sheet with a oxide mixture solution, or other fluid mixture material, on a continuous basis by use of doctor blades mutually positioned and aligned on both the upper and lower surfaces of the rotating screen disk. The solution filled cell volumes can then be continuously ejected from the screen cells by an impinging fluid jet, after which, the cell holes are continuously refilled and emptied as the screen disk rotates. Inexpensive screen material may be thickness and mesh opening size selected to produce the desired ejected mixture solution sphere size. The screen disk can be clamped on the inner diameter and the inner diameter driven by a spindle. The screen disk may also be clamped on the outer diameter by a clamp ring that is supported in a large diameter bearing and the outer support ring rotationally driven by a motor which is also belt coupled to the inner diameter support clamp ring spindle shaft. A stationary mixture solution dual doctor blade device would level fill the screen cell openings with the mixture solution and a stationary blow-out head located at another disk tangential position would eject the mixture solution cell volume lumps from the disk screen by impinging a fluid jet on the screen. Multiple pairs of solution filler and ejector heads can be mounted on the disk screen apparatus to created the ejected solution lumps at different tangential locations on the disk screen. A disk screen apparatus can be constructed with many different design configurations including those that use hollow spindle shafts and support arms that clamp the outer screen diameter. Also, the screen cell holes located in the area of the support arms may be permanently filled to prevent filling of the cell holes with a liquid mixture solution in those areas to prevent ejected solution lumps from impacting the support arms. A cone shaped screen can also be constructed using similar techniques as those used for construction of the disk screens An abrasive particle fluid slurry can be made of a water or other solvent based mixture of abrasive particles and erodible filler materials including metal or non-metal oxides and other materials, or mixtures thereof. Equal sized spherical shaped abrasive or non-abrasive hollow or solid or porous beads can be made in open-cell sheets, disks with an annular band of open cell holes or open cell belts from a variety of materials including ceramics, organic materials, polymers, pharmaceutical agents, living life-forms, inorganic materials or mixtures thereof. Hollow abrasive beads would have a outer spherical shell comprised of a agglomerate mixture of abrasive particles, a gas inducing material and a metal oxide material. These beads would be created after forming the agglomerate mixture lumps in the open cells of the screen and ejecting these lumps from the screen body by the same type of techniques that are commonly used to form hollow ceramic spheres from lumps of a water mixture of ceramic materials. Here, the mixture of water, gas inducing material, metal oxide and abrasive particles would be substituted for the water mixture of metal oxides and other gas inducing materials used to make glass spheres. A metal oxide material used to make beads is Ludox® a colloidal silica sol, where sol is a suspension of an oxide in water, a product of W.R. Grace & Co., Columbia, Md. These beads can be used in many commercial applications including use as plastic fillers, paint additives, abrasion resistant and corrosion resistant surface coatings, gloss reduction surface coatings, organic and inorganic capsules, and for a variety of agricultural, pharmaceutical and medical capsule applications. Porous cell-sheet spheres can be saturated with specialty liquids or medications and the spheres can be surface coated with a variety of organic, inorganic or metal substances. A large variety of materials can be capsulized in equal sized spheres for a variety of product process advantages including improving the material transport characteristics of the encapsulated material or to change the apparent viscosity or rheology of the materials that are mixed with the capsule spheres.

It is preferred that the individual abrasive or other material particles have a maximum size of 65% of the smallest cross-section area dimension of a cavity cell that is formed by the rectangular opening in the wire mesh screen, or perforated belt circular holes, to prevent individual particles from lodging in a belt cell opening. A fluid jetstream, including air or other gas or water or solvent or other liquids, or sprays consisting of liquids carried in a air or gas can be directed to impinge fluid on each slurry filled cell to expel the volume of slurry mixture from each individual cell into an environment of air, heated air or heated gas or into a dehydrating liquid. A liquid or air jet having pulsating or interrupted flows can also be used to dislodge and expel the volume of slurry contained in each belt cell hole from the belt. It is desired to expel the full volume of slurry contained in a cell opening out of the cell as a single volumetric slurry entity rather than as a number of individual slurry volumes consisting of a single large volume plus one or more smaller satellite slurry volumes. Creation of single expelled slurry lumps is more assured when each slurry lump residing in a cell sheet is subjected to the same dynamic fluid pressure slurry expelling force across the full cross-sectional area of each cell slurry surface. The fluid jet nozzles can have the form of a continuous fluid slit opening in a linear fluid die header or the linear fluid jet nozzle can be constructed from a single or multiple line of hypodermic needles joined at one open end in a fluid header. The linear nozzle would typically extend across the full width of the cell sheet or belt. A fluid nozzle can also have a single circular or non-circular jet hole and can be traversed across the full width of the cell sheet or cell belt. Slurry volumes would be expelled from the multiple cell openings that are exposed to a fluid jet line where the cell sheet or cell belt is either continuously advanced under the fluid jet or moved incrementally. A fluid jet head can also move in straight-line or in geometric patterns in downstream or cross-direction motions relative to a stationary or moving cell sheet or cell belt. Further, a linear-width jet stream can be directed into the gap formed between two closely spaced guard walls having exit edges positioned near the cell sheet surface. The guard walls focus the fluid stream into a very narrow gap opening where the fluid impinges only those cells exposed within the open exit slit area. Another technique is to use a single guard wall that concentrates and directs a high energy flux of fluid toward slurry filled cell holes as they arrive under the wall edge from an upstream belt location of a moving cell belt. Other mechanical devices can be used that expose a fixed bandwidth of slurry filled cells to the impinging fluid on a periodic basis where sections of a cell belt or screen are advanced incrementally after each bandwidth of slurry lumps are fluid expelled from the cell sheet during the previous fluid expelling event.

Slurry lumps can also be expelled from cells holes by mechanical means instead of impinging fluids by techniques including the use of vibration or impact shock inputs to a filled cell sheet. Pressurized air can be applied to the top surface or vacuum can be applied to the bottom surface of sections of slurry filled cell sheets or belts to expel or aid in expelling the slurry lumps from the cell openings.

A cell belt may be immersed in a container filled with dehydrating liquid and the slurry cell volumes expelled directly into the liquid. Providing a dry porous belt that does not directly contact a dehydrating liquid reduces the possibility of build-up of dehydrated liquid solidified agglomerate slurry material on the belt surface as a submerged belt travels in the dehydrating liquid. The expelled free-falling lump agglomerates can individually travel some distance through air or other gas onto the open surface of a dehydrating liquid where they would become mixed with the liquid that is still or agitated. The agitated dehydrating liquid can be stirred with a mixing blade to assure that the slurry agglomerates remain separated and remain in suspension during solidification of the beads. The use of dehydrating liquids is well known and includes partially water-miscible alcohols or 2-ethyl-1-hexanol or other alcohols or mixtures thereof or heated mineral oil, heated silicone oil or heated peanut oil. In the embodiment where one end of the open-cell belt is submerged in a container of dehydrating liquid provides that the slurry lumps are expelled directly into the liquid without first contacting air after being expelled from the belt. The expelled free-falling agglomerates can also be directed to enter a heated air, or other gas, oven environment. A row of jets can be used across the width of a porous belt to assure that all of the slurry filled belt cell openings are emptied as the belt is driven past the fluid jet bar. The moving belt would typically travel past a stationary fluid jet to continuously expel slurry from the porous belt cell openings. Also, the belt would be continuously refilled with slurry as the belt travels past a nip-roll or doctor blade slurry filling station. Use of a moving belt where cells are continuously filled with slurry that is continuously expelled provides a process where production of spherical beads can be a continuous process. Surface tension forces, or other forces, acting on the individual ejected free-travelling or suspended slurry lumps causes them to form spherical agglomerate beads. In aqueous ceramic slurry mixtures, water is removed first from the exterior surface of the beads that causes the beads to become solidified sufficiently that they do not adhere to each other when collected for further processing. Agglomerate beads are solidified into green state spherical shapes when the water component of the water-based slurry agglomerate is drawn out at the agglomerate surface by the dehydrating liquid or by the heated air. Instead of using a slurry mixture in the open cell sheets, molten thermoplastic-type or other molten cell filling materials may be maintained in a liquid form within the sheet or belt cell openings with a high temperature environment until they are fluid spray jet ejected into a cooling fluid median to form sphere shaped beads. A flat planar section of open-cell mesh screen material or of perforated-hole sheet material can also be used in place of an open cell sheet belt to form slurry or other material beads.

Dehydrated green composite agglomerate abrasive beads generally comprises a metal oxide or metal oxide precursor, volatile solvent, e.g., water, alcohol, or other fugitives and about 40 to 80 weight percent equivalent solids, including both matrix and abrasive, and the composites are dry in the sense that they do not stick to one another and will retain their shape. The green granules are filtered out, dried and fired at high temperatures to remove the balance of water, organic material or other fugitives. The temperatures are sufficiently high to calcine the agglomerate body matrix material to a firm, continuous, microporous state (the matrix material is sintered), but insufficiently high to cause vitrification or fusion of the agglomerate interior into a continuous glassy state. Glassy exterior shells can also be produced by a vitrification process on oxide agglomerates, including abrasive agglomerates, where the hard glassy shell is very thin relative to the diameter of the agglomerate by controlling the ambient temperature, the dwell time the agglomerate is exposed to the high temperature and also by controlling the speed that the agglomerate moves in the high temperature environment. Using similar techniques glassy shells can be produced by the oxide vitrification process to produce glassy shells on hollow agglomerates. The sintering temperature of the whole spherical composite bead body is limited as certain abrasive granules including diamonds and cubic boron nitride are temperature unstable at high temperatures. Solidified green-state composite agglomerate beads can be fired at high temperatures over long periods of time with slowly rising temperature to heat the full interior of an agglomerate at a sufficiently high temperature to calcine the whole agglomerate body. Solidified agglomerates that are produced in a heated air or gas environment, without the use of a dehydrating liquid, can also be collected and fired. A retort furnace can be used to provide a controlled gas environment and a controlled temperature profile during the agglomerate bead heating process. An air, oxygen or other oxidizing atmosphere may be used at temperatures up to 600 degrees C. but an inert gas atmosphere may be preferred for firing at temperatures higher than 600 degrees C. Dry and solidified agglomerates having free and bound water driven off by oven heating can also be further heated very rapidly by propelling them through an agglomerate non-contacting heating oven or kiln. The fast response high temperature agglomerate bead surface heating can produce a hard shell envelope on the agglomerate surface upon cooling. The thin-walled hardened agglomerate envelope shell can provide additional structural support to the soft microporous ceramic matrix that surrounds and supports the individual hard abrasive particles that are contained within the spherical agglomerate shape. The spherical agglomerate heating can be accomplished with sufficient process speed that the interior bulk of the agglomerate remains at a temperature low enough that over-heating and structurally degrading enclosed thermally sensitive abrasive particles including diamond particles is greatly diminished. Thermal damage to temperature sensitive abrasive particles located internally within the spherical agglomerates during the high temperature process is minimized by a artifact of the high temperature convective heat transfer process wherein very small spherical beads have very high heat transfer convection coefficients resulting in the fast heating of the agglomerate surface. Agglomerates can be introduced into a heated ambient gas environment for a short period of time to convectively raise the temperature of the exterior surface layer while there is not sufficient time for significant amounts of heat to be thermally conducted deep into the spherical agglomerate interior bulk volume where most of the diamond abrasive particles are located. The diamond particles encapsulated in the interior of the agglomerate are protected from thermal damage by the heat insulating quality of the agglomerate porous ceramic matrix surrounding the abrasive particles. Special ceramics or other materials may be added to the bead slurry mixture to promote relatively low temperature formation of fused glass-like agglomerate bead shell surfaces.

Equal sized abrasive beads formed by open cell sheet material can be attached to flat surfaced or raised island metal sheets by electroplating or brazing them directly to the flat sheet surface or to the surfaces of the raised islands. Brazing alloys include zinc-aluminum alloys having liquidus temperatures ranging from 373 to 478 degrees C. Corrosion preventing polymer coatings or electroplated metals or vapor deposition metals or other materials may be applied to the abrasive articles after the beads are brazed to the article surface. These beads can be individually surface coated with organic, inorganic and metal materials and mixtures thereof prior to the electroplating or brazing operation to promote enhanced bonding of the beads to the electroplating metal or the brazing alloy metal. Bead surface deposition metals can be applied to beads by various techniques including vapor deposition. Metal backing sheet annular band abrasive articles having resin coated, electroplated or brazed abrasive particles or abrasive agglomerates bonded to raised flat-surfaced islands are preferred to have metal backing sheets that are greater than 0.001 inch (25.4 microns) and more preferred to be greater than 0.003 inches (76.2 microns) thickness in the backing sheet areas located in the valleys positioned between the adjacent raised islands.

It is desired to use a color code to identify the nominal size of the abrasive particles encapsulated in the abrasive equal sized beads that are coated on an abrasive sheet article. This can be accomplished by adding a coloring agent to the water based ceramic slurry mixture prior to forming the composite agglomerate bead. Coloring agents can also be added to non-abrasive component slurry mixtures that are used to form the many different types of spherical beads that are created by mesh screen or perforated hole sheet slurry cells to develop characteristic identifying colors for the resultant beads. Coloring agents used in slurry mixtures to produce agglomerate sphere identifying colors are well known in the industry. These colored beads may be abrasive beads or non-abrasive beads. The formed spherical composite beads can then have a specific color that is related to the specific encapsulated particle size where the size can be readily identified after the coated abrasive article is manufactured. The stiff and strong spherical form of an agglomerate bead provides a geometric shape that can be resin wetted over a significant lower portion of the bead body when bonding the bead to a backing surface. The wet resin forms a meniscus shape around the lower bead body that allows good structural support of the agglomerate bead body. Resin surrounding the bottom portion of a bead reinforces the bead body in a way that prevents total bead body fracture when a bead is subjected to impact forces on the upper elevation region of the bead. This resin also provides a strong bonding attachment of the agglomerate bead to a backing sheet or to an island top surface after the resin solidifies. It is desired that very little, if any, of the resin extend upward beyond the bottom one third or bottom half of the bead. A strong resin bond allows the top portion of the bead to be impacted during abrading action without breaking the whole bead loose from the backing or the island surfaces.

Composite ceramic agglomerate abrasive beads may have a nominal size of 45 or less microns enclosing from less than 0.1 micron to 10 micron or somewhat larger abrasive particles that are distributed in a porous ceramic erodible matrix. Composite beads that encapsulate 0.5 micron up to 25 micron diamond particle grains and other abrasive material particles in a spherical shaped erodible metal oxide bead can range in size of from 10 to 300 microns and more. Composite spherical beads are at least twice the size of the encapsulated abrasive particles. A 45-micron or less sized bead is the most preferred size for an abrasive article used for lapping. Abrasive composite beads contain individual abrasive particles that range from 6 to 65% by volume. Bead compositions having more than 65% abrasive particles generally are considered to have insufficient matrix material to form strong acceptable abrasive composite beads. Abrasive composite agglomerate beads containing less than 6% abrasive particles are considered to have insufficient abrasive particles for good abrading performance. Abrasive composite beads containing from 15 to 50% by volume of abrasive particles are preferred. Hard abrasive particles including diamond, cubic boron nitride and others are distributed uniformly throughout a matrix of softer microporous metal or non-metal oxides (e.g., silica, alumina, titania, zirconia, zirconia-silica, magnesia, alumina-silica, alumina and boria, or boria) or mixtures thereof including alumina-boria-silica or others.

Spherical agglomerate beads produced by use of screens or perforated sheets can be bonded to the surface of a variety of abrasive articles by attaching the beads by resin binders to backing materials, and by attaching the beads by electroplating or brazing them to the surface of a metal backing material. Individual abrasive article disks and rectangular sheets can have open cell beads attached to their backing surfaces on a batch manufacturing basis. Screen or perforated sheet beads can also be directly coated onto the flat surface of a continuous web backing material that can be converted to different abrasive article shapes including disks or rectangular shapes. These beads can be bonded directly on the surface of backing material or the agglomerates can be bonded to the surfaces of raised island structures attached to a backing sheet, or the agglomerates can be bonded to both the raised island surfaces and also to the valley surfaces that exist between the raised islands. Disks may be coated continuously across their full surface with cell sheet beads or the disks may have an annular band of abrasive beads or the disks can have an annular band of beads with an outer annular band free of abrasive. The cell sheet beads may be mixed in a resin slurry and applied to flat or raised island backing sheets or the backing sheets can be coated with a resin and the beads applied to the wet resin surface by various techniques including particle drop-coating or electrostatic particle coating techniques. Agglomerate beads may range in size from 10 microns to 200 microns but the most preferred size would range from 20 to 60 microns. Abrasive particles contained within the agglomerate beads include any of the abrasive materials in use in the abrasive industry including diamond, cubic boron nitride, aluminum oxide and others. Abrasive particles encapsulated in cell sheet beads can range in size from less than 0.1 micron to 100 microns. A preferred size of the near equal sized abrasive agglomerates for purposes of lapping is 45 micrometers but this size can range from 15 to 100 micrometers or more. The preferred standard deviation in the range of sizes of the agglomerates coated on an abrasive article is preferred to be less than 100% of the average size of the agglomerate, or abrasive bead, and is more preferred to be less than 50% and even more preferred to be less than 20% of the average size. Abrasive articles using screen abrasive agglomerate beads include flexible backing articles used for grinding and also for lapping. These cell sheet beads can also be bonded onto hubs to form cylindrical grinding wheels or annular flat surfaced cup-style grinding wheels. Mold release agents can be applied periodically to mesh screen, or perforated metal, sheet or belt materials to aid in expelling slurry agglomerates and to aid in clean up of the sheets or belts. Mesh screens and cell hole perforated sheets can be made of metal or polymer sheet materials. The mesh screens or metal perforated sheets can also be used to form abrasive agglomerates from materials other than those consisting of a aqueous ceramic slurry. These materials include abrasive particles mixed in water or solvent based polymer resins, thermoset and thermoplastic resins, soft metal materials, and other organic or inorganic materials, or combinations thereof. Abrasive slurry agglomerates can be deposited in a dehydrating liquid bath that has a continuous liquid stream flow where solidified agglomerates are separated from the liquid by centrifugal means, or filters, or other means and the cleaned dehydrated liquid can be returned upstream to process newly introduced non-solidified abrasive slurry agglomerates. Dehydrating liquid can also be used as a jet fluid to impinge on slurry filled cell holes to expel slurry volume lumps from the cell holes.

Near-equal sized spherical agglomerate beads produced by expelling a aqueous or solvent based slurry material from cell hole openings in a sheet or belt can be solid or porous or hollow and can be formed from many materials including ceramics. Hollow beads would be formulated with ceramic and other materials well known in the industry to form slurries that are used to fill mesh screen or perforated hole sheets from where the slurry volumes are ejected by a impinging fluid jet. These spherical beads formed in a heated gas environment or a dehydrating liquid would be collected and processed at high temperatures to form the hollow bead structures. The slurry mixture comprised of organic materials or inorganic materials or ceramic materials or metal oxides or non-metal oxides and a solvent including water or solvent or mixtures thereof is forced into the open cells of the sheet thereby filling each cell opening with slurry material level with both sides of the sheet surface. These beads can be formed into single-material or formed into multiple-material layer beads that can be coated with active or inactive organic materials. Cell sheet spherical beads can be coated with metals including catalytic coatings of platinum or other materials or the beads can be porous or the beads can enclose or absorb other liquid materials. Sheet open-cell formed beads can have a variety of the commercial uses including the medical, industrial and domestic applications that existing-technology spherical beads are presently used for. Commercially available spherical ceramic beads can be produced by a number of methods including immersing a ceramic mixture in a stirred dehydrating liquid or by pressure nozzle injecting a ceramic mixture into a spray dryer. The dehydrating liquid system and the spray dryer systems have the disadvantage of simultaneously producing beads of many different sizes during the bead manufacturing process. The technology of drying or solidifying agglomerates into solid spherical bead shapes in heated air is well established for beads that are produced by spray dryers. The technology of solidifying agglomerate beads in a dehydrating liquid is also well established. There are many uses for equal-sized spherical beads that can, in general, be substituted for variable-sized beads in most or all of the applications that variable-sized beads are presently used for. They can be used as filler in paints, plastics, polymers or other organic or inorganic materials. These beads would provide an improved uniformity of physical handling characteristics, including free-pouring and uniform mixing, of the beads themselves compared to a mixture of beads of various sizes. These equal sized beads can also improve the physical handling characteristics of the materials they are added to as a filler material. Porous versions of these beads can be used as a carrier for a variety of liquid materials including pharmaceutical or medical materials that can be dispensed over a controlled period of time as the carried material contained within the porous bead diffuses from the bead interior to the bead surface. Equal-sized beads can be coated with metals or inorganic compounds to provide special effects including acting as a catalyst or as a metal-bonding attachment agent. Hollow or solid equal-sized spherical beads can be used as light reflective beads that can be coated on the flat surface of a reflective sign article.

Raised island structures can be quickly and economically constructed from large equal sized beads. Solid, porous, multi-material layer or hollow beads constructed of ceramics or polymers or other materials that have an equal size can be used to construct raised island surfaces on a flexible backing sheet. Equal-sized screen-cell produced spherical beads can be used for creating the raised islands on a backing sheet by resin coating island areas and depositing equal-sized beads on the wet resin areas to form equal height island structures. Beads of a sufficient size, uniformity of diameter, and made of many materials, including metals and manufactured by a variety of bead forming processes can be used to form raised island structures on a backing sheet or backing plate. The top cobblestone surface of these island groups of beads can be resin coated to form uniform height islands having flat surfaces. Resin applied to the top surface of the beads would be somewhat thicker in the areas above individual beads that have a slightly smaller diameter than the largest beads. This resin would tend to form a common resin bond to all of the beads and would also tend to extend a common resin bond with the resin that bonds the beads to the backing sheet. When beads having diameters equal to nominal height of the raised island structures of 300 microns, or more, or less, are applied in excess to the wet resin coated areas, only those beads that are in contact with the wet resin will become attached to the backing sheet. Beads deposited on the wet resin will tend to be positioned adjacent to each other and most beads will be in physical contact with one or more adjacent beads that results in a common planar raised island surface at the top of the resin attached beads located at each island area. Adjacent near-equal-sized spherical beads can be resin bonded to flexible backing sheets or rigid plates in island shaped patterns to provide the elevated raised island structures. Beads would be screened or classified to separate them into a narrow range of sizes with all beads above a certain size eliminated from a batch quantity. In general, beads would be manufactured with the goal of forming a narrow range of bead diameters for use with a specific abrasive article. However, it is preferred that beads present in a working batch used to construct raised islands do not exceed the nominal arithmetic mean bead size by more than 10 to 20%. Also, a new grouping of slightly smaller or larger beads can be grade-selected to form raised islands on a different abrasive article backing as the absolute nominal height of the islands is not as critical as is the uniformity of the height of all of the raised islands on a given abrasive article. Wet resin island shapes can be printed on the surface of a flexible backing sheet or a continuous web using a open-cell rubber stamp resin printing device, a RTV mold plate having an array of flat surfaced raised island, a screen printer or by other resin coating methods. The backing sheet may be an individual backing sheet or the backing sheet may be a continuous web sheet material. Printing plates can be used on a web printer device to apply island shaped deposits of resin to a continuous web. An excess of equal-sized or size-limited beads can be applied to the surface of the backing where only the beads contacting the wet resin become bonded to the backing and the non-wetted loose beads are collected for reuse. Island structures having a height equal to the bead diameter can be established for many different patterns of island array sites. Additional filled or non-filled resin material can be applied to the top surface of the attached beads to form a flat surface on the top of each island. In one embodiment, resin can be applied to the top surface of the beads, the backing sheet turned over and the wet resin laid in flat contact with a flat plate during the time of resin solidification to form a uniformly flat resin surface across each and all raised island surfaces. Another method to develop a flat and uniform height of resin coated bead island surfaces is to contact a release agent coated precision flatness glass sheet with the island top coated resin that will develop a continuous flat surface on the island tops as the resin is solidifying. Resin coated flat surfaced raised islands can be solidified and abrasive particles resin bonded to these island surfaces. The top surface of continuous web resin wetted bead island can be provided with a flatness leveling action by contacting the island surface resin with a stiff and flat release liner web stock sheet that remains in contact with the island backing sheet until the island top surface resin solidifies. Bead island structures can be formed in rectangular or annular band patterns on individual backing sheets or on continuous web backing sheet material. These island surfaces can be ground or machined to increase the accuracy of the thickness of the island backing if desired and then coated with abrasive particles. The bead bonding resin can be in the uncured state, or partially cured state or fully cured state, at different stages of forming the equal-height island structures. Resin that wicks around the surfaces of individual beads tend to form a structurally strong integral mass of beads and this resin provides a stiff and stable base for abrasive particles or abrasive agglomerates that are resin bonded to the island flat top surfaces. Raised island heights can range from 0.003 inches to 0.125 inches (0.076 to 3.2 mm) and extra height islands can be constructed of alternating sandwich layers of resin and beads. Abrasive particles or agglomerates can be applied to the wet resin used to level-off the top of the bead-formed island surfaces or the abrasive can be applied in a separate resin bonding step after the island structure has partially or fully solidified. In some cases, abrasive particles or abrasive beads mixed in a resin or deposited on a resin coating, can be nested in the cavities formed between the tops of the raised island foundation bead spheres that are used to form the raised island structures, without first forming a flat island surface with resin. After a flat island has been solidified, abrasive particles can be abrasive slurry resin coated on the islands or a resin can be applied to the solidified flat surface and abrasive particles or agglomerates drop coated or electrostatically coated or otherwise propelled by means including air jets onto the wet resin coated islands. A width proportioning annular abrasive particle or abrasive agglomerate dispensing or deposition device can be used to apply abrasive particles or agglomerates to the tops of bead-formed raised islands. Beads can be purchased commercially to form raised island structures but they tend to have a wide range of sizes that prevent establishing a flat bead surface in raised island shapes where they are coated on a backing sheet. Example of commercially available hollow glass or ceramic beads are 3M Scotchlite™ Glass Bubbles or 3M Zeeospheres™ Ceramic Microspheres available from the 3M Company (Minnesota Mining and Manufacturing Co.).

A process where rectangular arrays or annular band arrays of raised islands are attached to a continuous web backing by a continuous web coating machine can be quite simple, efficient and easy to use in the production of precise height raised islands from inexpensive materials. Web backing can be routed through a resin island shape printing process where array patterns of island shapes are continuously printed on the web backing surface. An excess of beads can be applied to the wet resin islands as the web continues to move through the coater machine. The web can be routed so that beads not attached to the island site wet resin falls away from the web and the resin can be solidified as the web moves with a variety of energy sources including oven heaters. Another coating station located downstream of the resin dryer oven can apply a resin layer to the tops of the adjacent beads located at each island site, on the same moving web. A second release liner web can be brought into contact with the resin wetted islands to provide a flat surface to the island-surfaced resin that will establish a flat raised island surface while the island bead top resin is solidifying. After resin solidification, the release liner would be separated from the web backing having the attached raised bead-structure islands. Abrasive particles can then be resin bonded to the tops of the raised islands. This whole process of producing rectangular or annular band abrasive coated raised island web backing can be accomplished with a single web coater machine with web backing entering the coater and abrasive coated raised island web leaving the machine. Abrasive articles can be cut out of the continuous web by a number of converting machine processes. If desired, the process can be completed in separate process steps where the web is rolled on a roll and stored or otherwise processed between abrasive article manufacturing process events.

Figure 55:
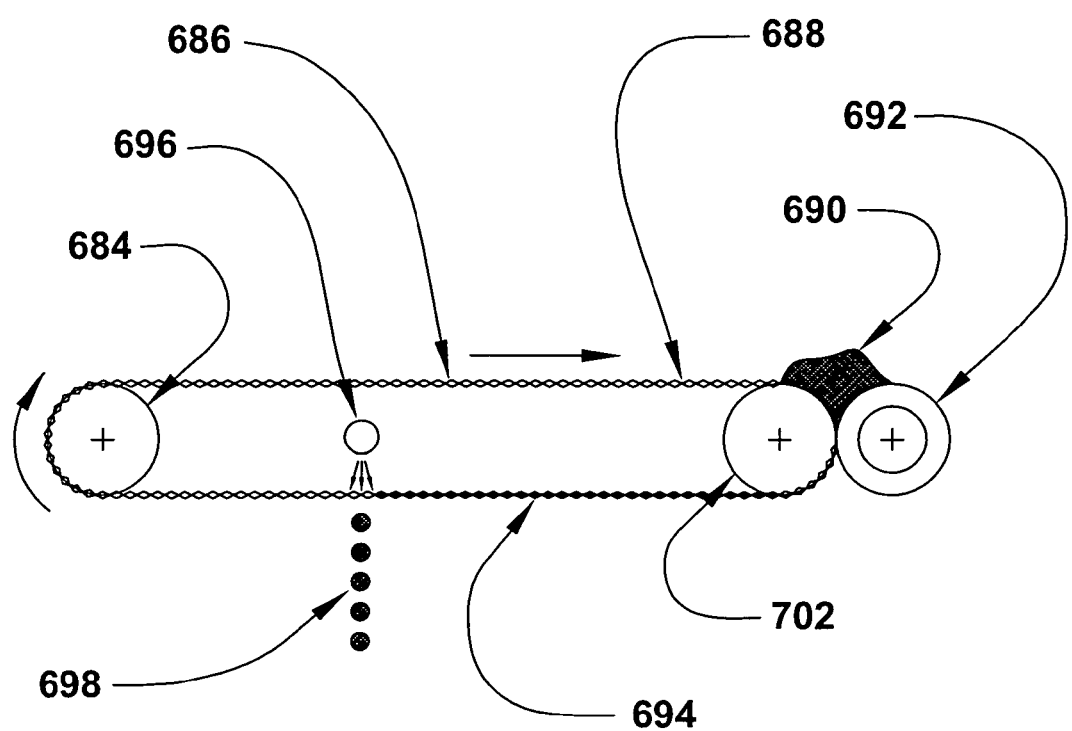
FIG. 55 is a cross-section view of a screen belt abrasive agglomerate forming system.
Figure 56:
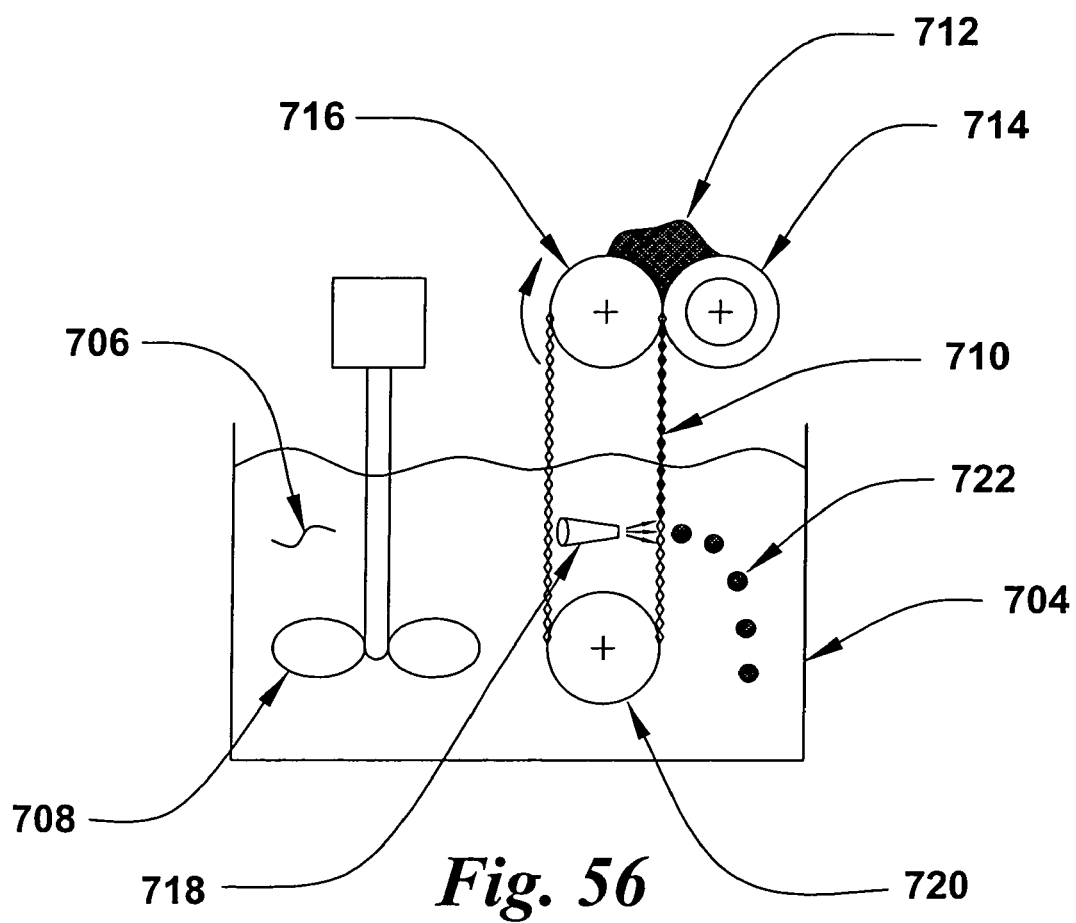
FIG. 56 is a cross-section view of an abrasive agglomerate screen belt in a solvent container.
Figure 57:
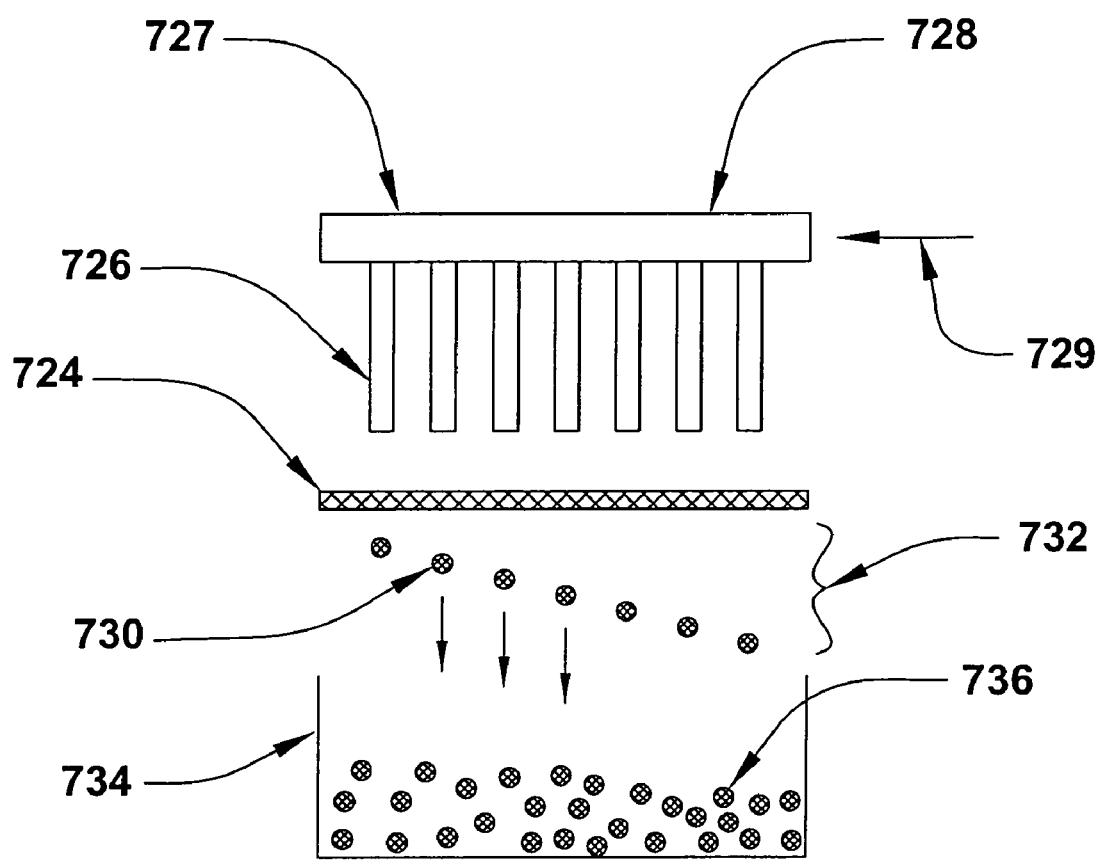
FIG. 57 is a cross-section view of screen belt agglomerates ejected into an air dryer device.
Figure 75:
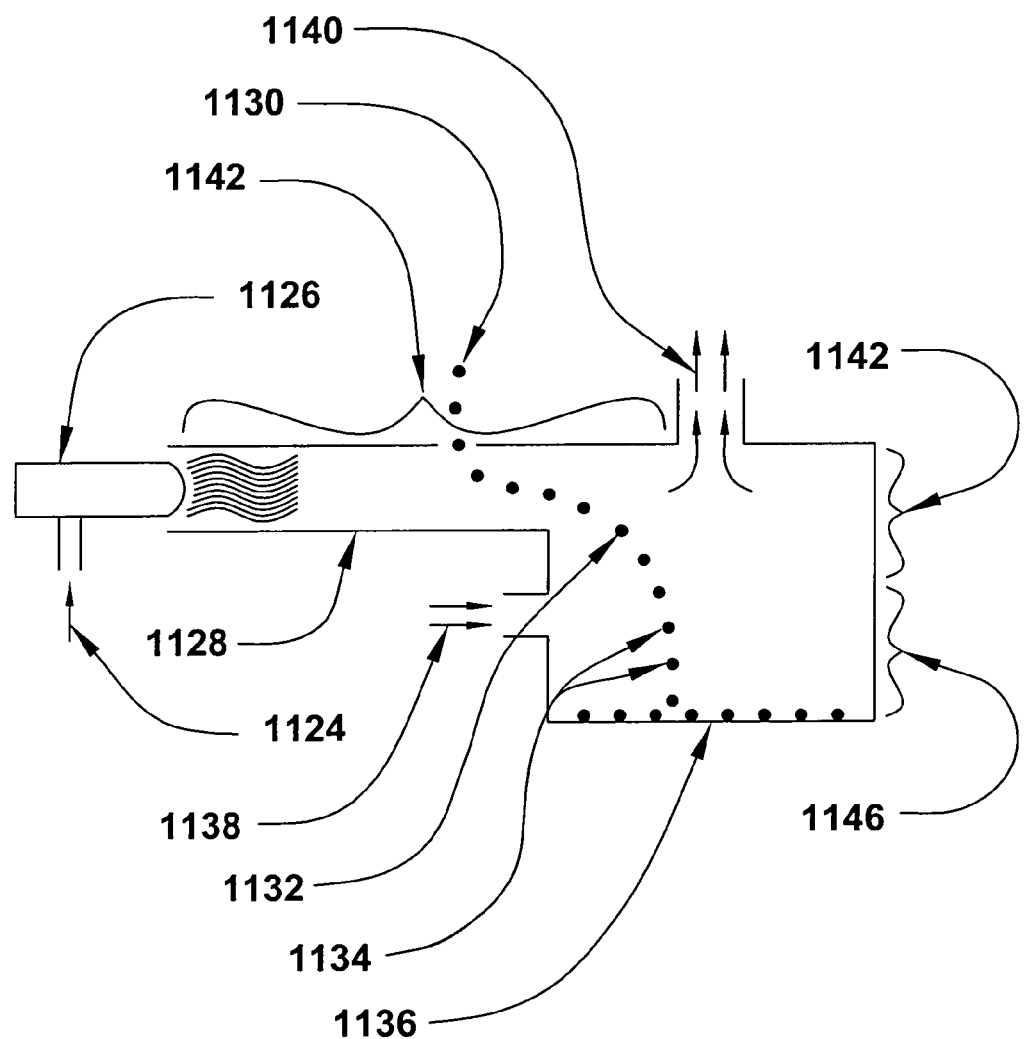
FIG. 75 is a cross-section view of a duct heater system that heats solidified agglomerates.
Figure 79:
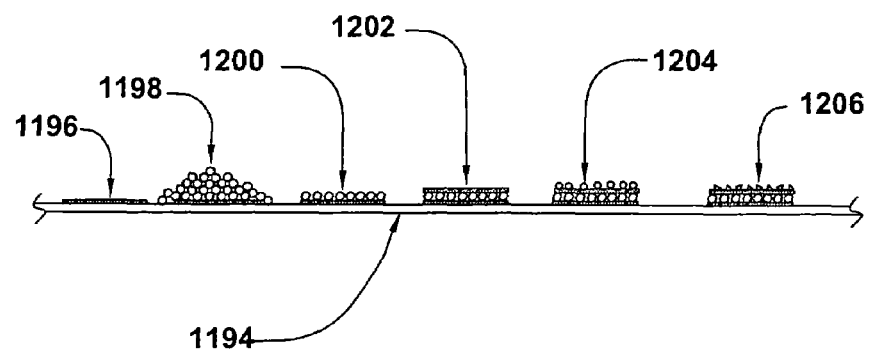
FIGS. 79 and 79A are cross-section views of raised islands constructed of spherical beads.
Figure 79A:
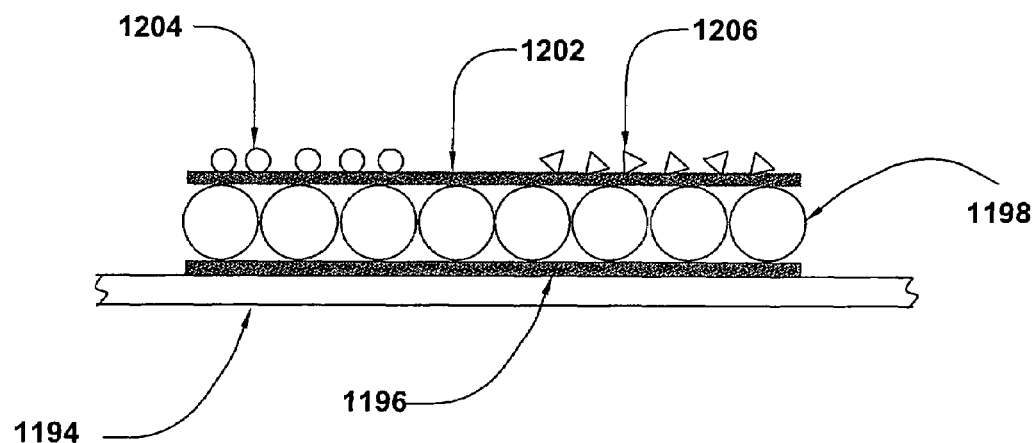
Figure 103:
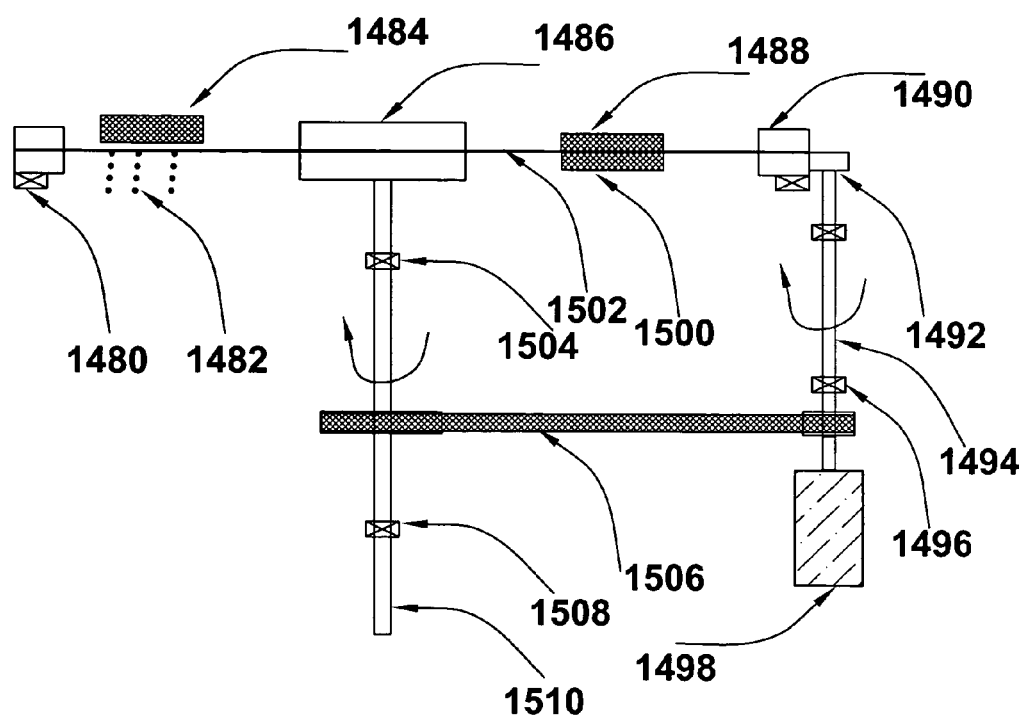
FIG. 103 is a cross-sectional view of a screen disk agglomerate manufacturing system.

FIG. 55 is a cross-section view of a screen belt used to form spherical agglomerates of an abrasive particle filled ceramic slurry. A screen belt 686 having a multitude of microporous through-holes is mounted on and driven by a drive roll 702 and is also mounted on an idler roll 684. Abrasive slurry 690 is introduced into the unfilled portion 688 of the screen belt 686 mesh opening holes by use of a stiff or compliant rubber covered nip roll 692 supplied with bulk abrasive slurry 690 to produce a section of slurry filled screen belt 694 that is transferred by the belt motion to a fluid-jet blow-out bar 696. High speed air exiting from the jet bar 696 ejects the abrasive slurry contained in each belt 686 mesh opening to create ejected agglomerates 698 that assume a spherical shape due to surface tension forces acting within the ejected agglomerates 698 as they travel in free space independently from each other in an oven or furnace heated air or gas environment (not shown) or dehydrating liquid that is adjacent to the belt. The spherical agglomerates 698 will each tend to have a similar volumetric size as the volume of each of the screen mesh openings are equal in size. FIG. 56 is a cross-section view of a solvent tank having an immersed abrasive slurry filled screen belt and fluid blowout jet bar. Abrasive slurry is provided as a slurry bank 712 contained in the top area common to a rubber covered driven nip roll 714 and a screen belt idler roll 716 mounted above a liquid container 704 where the slurry is forced into the screen belt pore holes by the slurry pressure action of the nipped roll 714. The screen belt 710 mounted on the idler roll 720 transfers the slurry filled pores downward into a liquid solvent 706 filled container 704 past a fluid jet 718 that blow-ejects individual agglomerates in a trajectory away from the screen belt into the volume of solvent 706. The agglomerates 722 form into spherical shapes due to surface tension forces while in a free state in the solvent 706 fluid that has been selected to dry the spherical agglomerates 722 by drawing water from the agglomerates 722 as they are in suspension in the solvent 706. The spherical agglomerates 722 will each tend to have a similar size, as each of the screen openings is equal in size. A solvent stirrer 708 can be used to aid in suspension of the agglomerates 722 in the solvent 706. FIG. 57 is a cross-section view of an air-bar blow-jet system that ejects ceramic abrasive agglomerates from a screen into a heated atmosphere of air or different gasses. The cell screen belt 724 or cell screen segment 724 can be filled with a slurry mixture comprised of water based abrasive particles and ceramic material and individual wet agglomerates 730 can be blow-ejected by an air-bar 728 into a heated gas atmosphere 732 that will dry the agglomerates 730 that are collected as dry agglomerates 736 in a container 734. The free travelling individual agglomerates 730 form spherical shapes due to surface tension forces as they travel from the cell screen belt 724 or cell screen segment 724 to the bottom of the container 734. The air bar 728 can be constructed of a line of parallel hypodermic tubes 726 joined together at one end at an air manifold 727 that feeds high pressure air or other gas 729 into the entry end of each tube 726. FIG. 103 is a cross-sectional view of a screen disk agglomerate manufacturing system. A screen disk 1502 is clamped with a inner diameter clamp 1486 that is mounted on a spindle shaft 1510 that is supported by shaft bearings 1504 and 1508. The disk 1502 is also supported by an outside-diameter ring clamp 1490 that is supported by a ring bearing 1480 and the clamp 1490 is also rotated by a gear 1492 that is mounted on a shaft 1494 that is supported by shaft bearings 1496. The shaft 1494 is driven by a drive motor 1498 and the shaft 1494 is drive belt 1506 coupled with belt pulleys to the disk spindle shaft 1510 to allow the screen disk 1502 to be rotated mutually by the drive motor 1498 at both the inner and outer disk 1502 diameters to overcome friction applied to the screen surface by the mixture solution application devices 1488 and 1500. The stationary upper mixture solution application device 1488 introduces the solution mixture into the rotating screen disk screen cells and a doctor blade portion of the application device 1488 levels the solution contained in the screen cells to be even with the top surface of the screen 1502. The stationary lower doctor blade device 1500 is aligned axially with the upper doctor blade device 1488 to allow the lower device 1500 to level the solution mixture contained within the moving cells to be even with the lower surface of the screen resulting in screen cells that are completely filled with a mixture solution level with both the upper and lower surfaces of the screen disk. The filled cells rotationally advance to a blow-out or ejector head 1484 where the fluid is ejected from the screen cells by a jet of fluid from the ejector head 1484 to form lumps 1482 of mixture solution material where each lump has a volume approximately equal to the volume of the individual screen cells. FIG. 75 is a cross-section view of a duct heater system that heats green state solidified ceramic abrasive agglomerates introduced into the duct hot gas stream. A hydrocarbon combustible gas 1124 is burned in a gas burner device 1126 to produce a flow of temperature controlled gaseous combustion products inside a heat duct 1128 that exit the container 1136 as exhaust stream 1140. Green-state solidified agglomerates 1130 are introduced into the duct 1128 wherein the agglomerates are heated by the hot gaseous products as the agglomerates 1130 are carried along the length of the duct high temperature zone 1142 before falling into a low temperature zone 1146. Cooling air introduced at the air inlet duct 1138 into the agglomerate bead container 1136 chills the surface of the fused glassy-surface agglomerates 1132 that are collected as chilled agglomerate beads 1134. FIG. 79 is a cross-section view of a backing sheet having raised islands constructed of spherical beads. A backing sheet 1194 is coated with island shaped deposits of resin 1196 that are covered with an excess of equal-sized spherical beads 1198 to form a bead monolayer 1200 where the beads 1198 are attached to the wet resin 1196. Another layer of wet resin 1202 is deposited on the top surface of the beads 1200 after which, a sparse monolayer coating of spherical abrasive agglomerates 1204 or a monolayer of individual abrasive particles 1206 are deposited into the wet resin 1202. FIG. 79A is a cross-section view of an abrasive coated raised island structure constructed of equal sized large diameter spherical beads that are resin bonded to a backing sheet. Both spherical shaped composite abrasive beads 1204 and individual abrasive particles 1206 are shown bonded with a top layer of resin 1202 to the top surface of large diameter hollow or solid or porous structural beads 1198 that are bonded in an island shape with a layer of resin 1196 to a backing sheet 1194. The structural beads 1198 are preferred to have a diameter of at least 0.005 inches (127 microns) while the composite abrasive beads 1204 have a size of approximately 0.0015 inches (38 microns). It is preferred that only abrasive particles or equal-sized composite spherical agglomerates are bonded to the top surface of a raised island but a mixture of individual abrasive particles and composite abrasive beads can be coated together on the island top surfaces. Beads having different sized abrasive particles enclosed together in the individual composite bead bodies can be coated on the raised islands. Also, different beads, with each bead having the same sized encapsulated abrasive particles, but where the encapsulated particles are different sizes in the different beads, can be bonded together on the raised islands. Abrasive articles that can be coated with these equal-sized abrasive agglomerates include disks, disks having annular bands of abrasive, articles that have abrasive coated raised island structures, abrasive strips, endless belts and articles having patterns of abrasive coated areas.

Surface Conditioning of Annular Coated Abrasive Articles

Problem: It is desired that ceramic spherical or block shaped agglomerates are coated in a single or monolayer on a abrasive article backing sheet or on the top island surfaces of an raised island abrasive article. It is desirable that stray double layered abrasive particles inadvertently coated on raised islands be removed. Also, it is desired that the outer exterior surfaces of individual abrasive particle agglomerates be initially abraded to expose abrasive particles contained within the sphere surfaces prior to abrading use of an abrading article.

Figure 58:
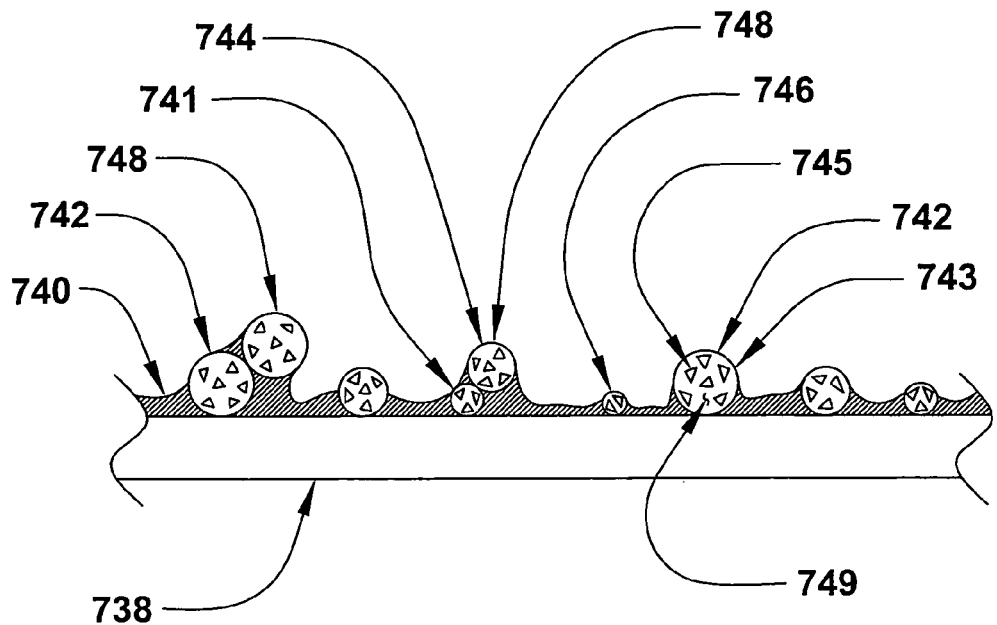
FIG. 58 is a cross-section view of different sizes of spherical stacked abrasive agglomerates.
Figure 59:
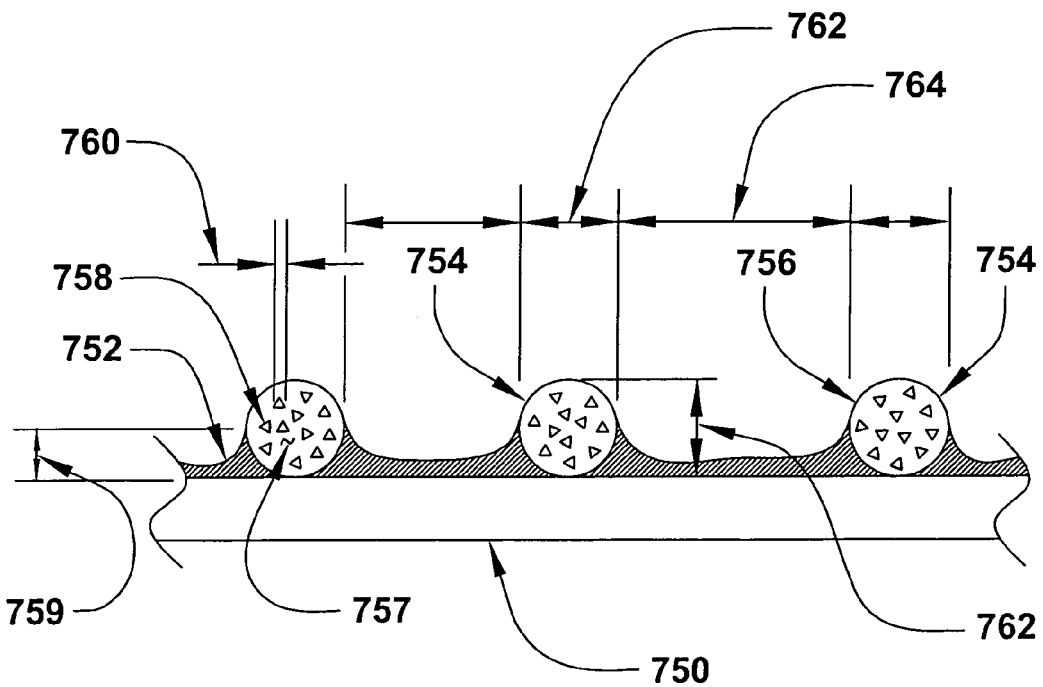
FIG. 59 is a cross-section view of mono or single layer equal-sized spherical agglomerates.
Figure 61:
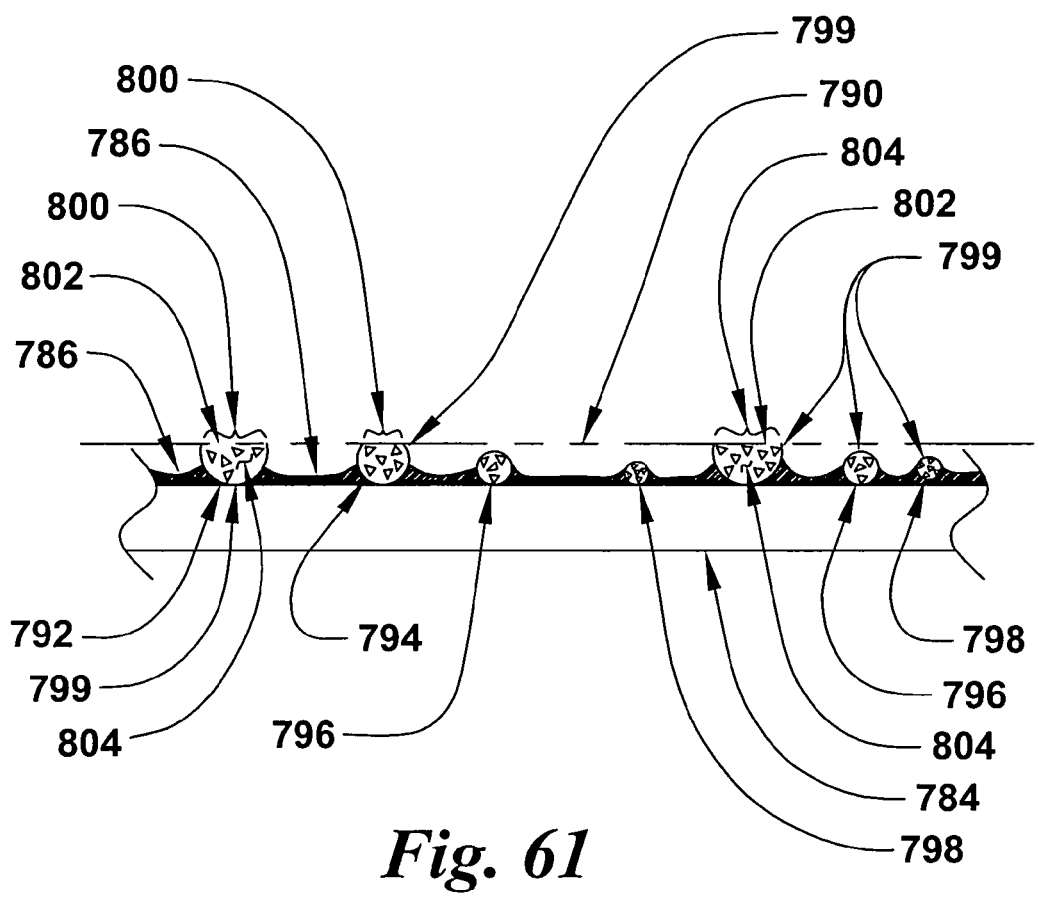
FIG. 61 is a cross-section view of different sized worn spherical abrasive agglomerates
Figure 62:
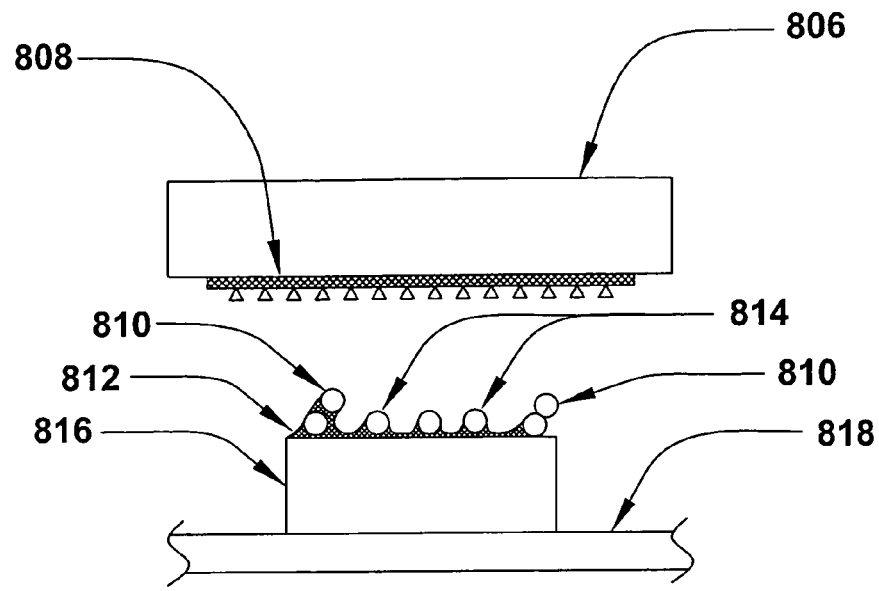
FIG. 62 is a cross-section view of a plate used to grind off elevated abrasive agglomerates.
Figure 63:
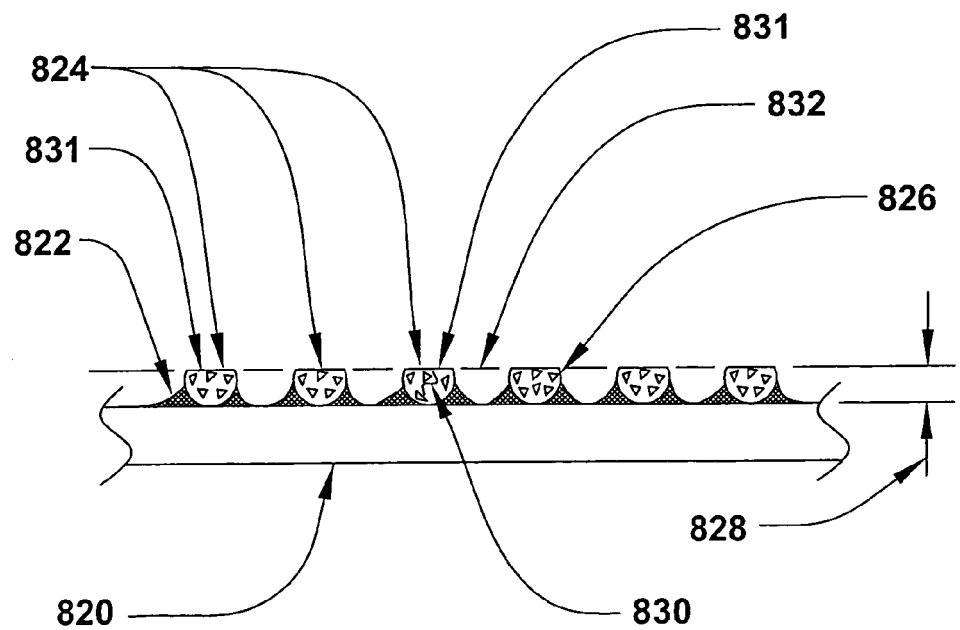
FIG. 63 is a cross-section view of equal sized agglomerates worn-down to the same level.

Solution: After an abrasive article having an annular band of coated abrasive agglomerates or single abrasive particles or an abrasive article having agglomerate coated raised islands is manufactured, the article can be surface conditioned to remove stray double-level agglomerates. The article can also be surface conditioned to remove the upper portion of the agglomerate enclosure exterior surfaces. The surface conditioning process comprises pre-grinding or conditioning the abrasive article by contacting the moving or stationary surface of a newly manufactured abrasive article with a moving or stationary abrading device including a rigid block or a abrasive surface prior to using the newly manufactured abrasive article to abrade a workpiece surface. The abrasive article would be mounted on a rotatable platen and another abrading surface would be brought into abrading contact with the surface of the annular band abrasive article that is to be preconditioned. Either the contacting abrading surface can be moved relative to the annular article or the annular article can be moved relative to the contacting abrading surface while contact pressure is maintained during the abrading contact. Only enough abrading action is provided to knock off or wear down unwanted second-level particles or agglomerates thereby developing a single depth particle surface. Some additional grinding is further applied to grind away only the upper portion of the agglomerate encapsulating exterior surface to expose the very top-surface particles enclosed in the spherical composite agglomerates. Abrasive particle agglomerates may be spherical agglomerates or composite agglomerates having shapes other than spherical shapes and the agglomerates may include ceramic matrix material or other erodible abrasive particle support matrix material. FIG. 58 is a cross-section view of different sizes of spherical stacked abrasive particle agglomerates on a backing sheet. Spherical abrasive particle composite agglomerates including large agglomerates 742, medium sized agglomerates 744, medium-small agglomerates 741 and small sized agglomerates 746 are bonded with a polymer resin 740 to a backing sheet 738. Each of the spherical agglomerates 741, 742, 744 and 746 have an agglomerate exterior surface 743 that encloses small abrasive particles 745 surrounded and fixed in position by an erodible porous ceramic matrix 749. Raised second-level abrasive agglomerates 748 are shown attached with resin 740 to the upper surfaces of agglomerates 742 and 741 that are bonded directly to the backing surface 738. It is desirable to remove the stacked agglomerates 748 from their elevated second-level positions where they are resin 740 bonded to the single-layer agglomerates 741 and 742. The stacked agglomerates 748 can be broken off their resin 740 moorings on top of agglomerates 741 and 742, or, the agglomerates 748 can be worn down to expose the top apex surface of agglomerates 741vand 742 agglomerates. FIG. 59 is a cross-section view of mono or single layer equal-sized spherical composite agglomerates having gap spaces between agglomerates that are resin bonded to a backing sheet. Agglomerates 754 having a agglomerate exterior surface 756 enclosing individual abrasive particles 758 held in an erodible porous ceramic matrix 757 are resin 752 bonded to a backing sheet 750 with a defined space 764 between agglomerates 754 having a agglomerate diameter 762. Individual composite agglomerates 754 having approximate 3-micron size 760 individual abrasive particles enclosed in the agglomerates 754 that have an approximate 30-micron diameter size 762. The agglomerates 754 are sparsely positioned on the backing 750 with a particle space gap size 764 having a range from 60 to 1000 microns, or more, and where the gap size 764 distance is measured parallel to the surface of the backing 750 between each adjacent agglomerate 754. Grinding debris and swarf generated by the abrading action on a workpiece (not shown) surface travels in the gap space 764 between the agglomerates 754. The resin 752 is shown as having a resin 752 height or thickness 759 that is approximately 0.33 the agglomerate 754 diameter 762 where the resin 752 provides structural support to the agglomerate 754 but does not impede the removal of the debris or grinding swarf (not shown) generated by abrading a workpiece (not shown). When a solvent filled slurry coating, comprising a mixture of spherical abrasive agglomerates 754 or other block shaped abrasive particles and a resin 752 having a solvent component, is coated on a backing sheet 750, the slurry resin height 759 can equal or exceed the agglomerate 754 diameter 762 when the coating 752 is first applied to the backing 750. After the solvent is removed by evaporation from the resin 752 by partial or full drying of the slurry resin 752 coated backing 750, the volume of the slurry coating resin 752 is reduced from its original coated volume that fully exposes the upper surface of agglomerates 754. The resin 752 remaining after solvent evaporation tends to form a meniscus-shaped resin 752 structural support of the agglomerates 754. Another technique used to obtain the meniscus-shaped resin 752 support of agglomerates 754 is to level-coat a backing 750 with a resin 752 and drop or propel agglomerates 754 into the thickness depth of the coated resin 752 thereby forming a meniscus-shape resin 752 support of the agglomerates 754. An additional resin size coat can be applied to increase the structural support of the agglomerates 754. FIGS. 60A, 60B, 60C and 60D are cross-section views of full sized abrasive particles composite agglomerates attached to a backing sheet at different stages of wear-down. FIG. 60A is a cross-section view of a spherical agglomerate unground agglomerate 770. FIG. 60B is a cross-section view of a partially worn-down agglomerate 778. FIG. 60C is a cross-section view of a half worn-down agglomerate 780. FIG. 60D is a cross-section view of a fully worn-down agglomerate 782. Agglomerates 770, 778, 780 and 782 having a exterior surface 772 enclosing an erodible porous ceramic matrix 774 holding individual abrasive particles 776 are all resin 768 bonded to a backing sheet 766. The wear experienced by the agglomerates 770, 778, 780 and 782 occurs progressively from the start of the abrading life of an flexible backing abrasive article to the end of the useful life of the article. The resin 768 must bond the agglomerates, having different wear-down geometric configurations as represented by the agglomerates 770, 778, 780 and 782, to the backing with sufficient strength to resist abrading forces resulting from abrading contact with a workpiece from the initiation of abrading to the final use of the abrasive article. FIG. 61 is a cross-section view of a monolayer or a single layer of partially worn spherical composite abrasive agglomerates having different agglomerate sizes. Large agglomerates 792, medium agglomerates 794, small agglomerates 796 and very small agglomerates 798 are resin 786 bonded to a backing sheet 784. Agglomerates 792 and 794 are partially worn-down where a portion of the agglomerate exterior surface 799 is removed, thereby exposing an area 800 of individual abrasive particles 802 and a erodible ceramic matrix 804. The wear-down line 790 defines the common elevation location of the partial removal of the upper portions of the agglomerates 792 and 794 caused by the abrading contact with a workpiece (not shown). Agglomerates 796 and 798 lie below the wear-down line 790 indicating they have escaped contact with the workpiece and thus have not been useful in the workpiece abrading process. FIG. 62 is a cross-section view of a surface conditioning plate having a abrasive sheet article used to grind off elevated second-level abrasive agglomerates attached with a resin to raised island structures attached to a backing sheet. A grinding plate 806 having an attached abrasive covered abrasive sheet article 808 is brought into abrading contact with the elevated second-level abrasive agglomerates 810 that are resin 812 bonded to the upper surfaces of first-level abrasive agglomerates 814 resin 812 bonded to a raised island 816 that is attached to a flexible backing sheet 818. Abrading action continues until the elevated second-level agglomerates 810 are removed. This conditioning plate 806 can be used on non-monolayer agglomerates attached to raised islands, or, the conditioning plate 806 can be used on annular bands of abrasive particles or agglomerates coated directly on the backing surface of a non-raised island abrasive article. A flat wear-plate or other hard abrading surface articles can be used in place of the abrasive sheet article attached to the conditioning plate 806 to perform the function of removing second-level agglomerates or can be used for abrading away the upper portion of agglomerate exterior surfaces to expose enclosed abrasive particles. Spherical agglomerates are shown in FIGS. 58, 59, 60A, 60B, 60C, 60D, 61 and 62 illustrate issues related to agglomerate bead coatings and wear-down including the removal of second level abrasive beads but all of the factors of the existence of these issues and the corrective techniques for them are described. These issues and their corrective techniques can also be applied to abrasive articles having individual abrasive particles rather than composite spherical or block shaped agglomerates. Stray oversized individual particles can also be removed or worn-down to the level of the average sized particles by use of a conditioning plate 806. The conditioning plate 806 can be moving or stationary. FIG. 63 is a cross-section view of equal sized abrasive agglomerates worn-down to the same level. Equal-sized abrasive agglomerates 824 resin 822 bonded to a backing sheet 820 have an outer exterior surface 826 with small abrasive particles 830 held in a porous ceramic matrix 831. All of the equal-sized worn agglomerates 824 having substantially the same size original non-worn diameters are positioned in a single layer or monolayer in direct proximity on the top surface of a backing sheet 820 and are resin 822 bonded to the backing sheet 820. The wear of each abrasive agglomerate 824 contacting a workpiece (not shown) is substantially equal at the position indicated by the wear line 832. The wear line 832 also indicates the equal wear down of agglomerates 824 to a height 828 above the backing 820 as workpiece abrading wear occurs. The top portion of an agglomerate outer exterior surface located at the wear line 832 is shown partially removed to expose new sharp abrasive particles 830 and the porous ceramic matrix 831 as the ceramic matrix 831 is eroded away and ejected from the agglomerate 824 exterior surface 826 enclosure.

Air Bearing Block with Vacuum Abrasive Sheet Mounting Surface

Problem: It is desirable to align an abrasive sheet holding block having a very precise flatness to the surface of a platen and then to use this block to mount an abrasive sheet to grind or polish the surface of the platen as it rotates. Also, it is desirable to grind flat the upper surface of an annular band of raised island foundations attached to a circular sheet that is vacuum mounted to the rotating platen.

Figure 64:
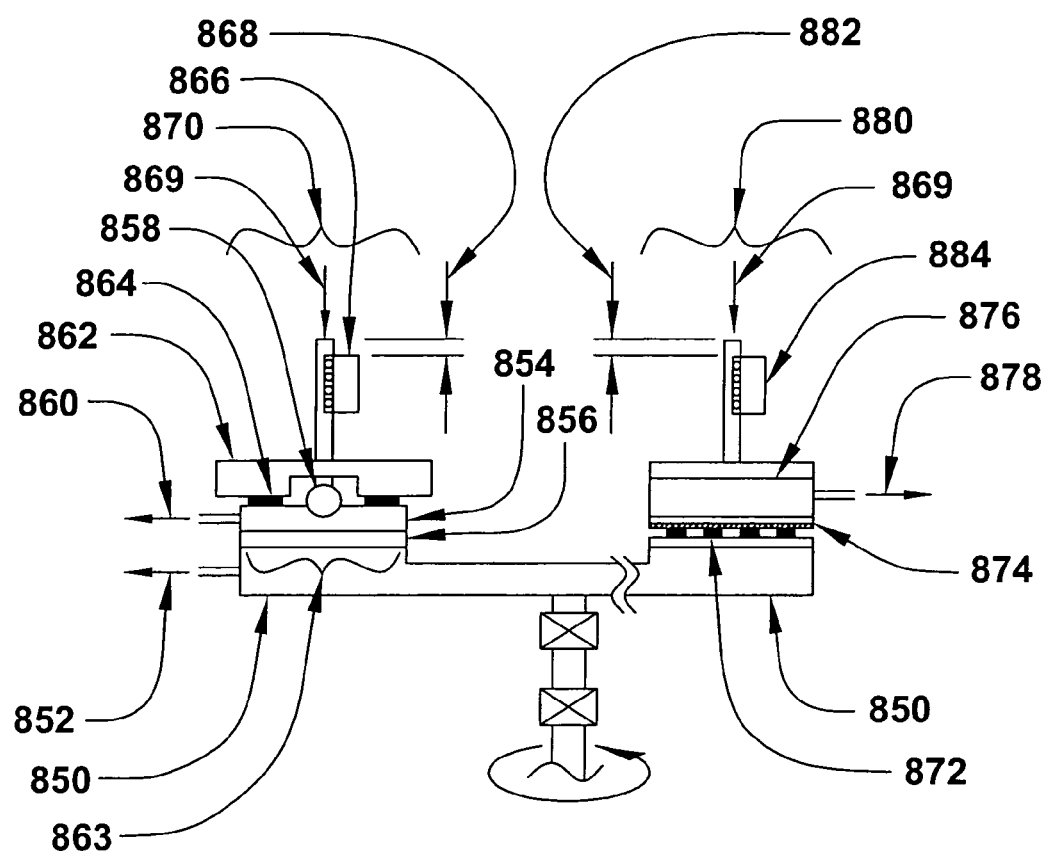
FIG. 64 is a cross-section view of a vacuum block in abrading raised island foundations.

Solution: A New Way Machine Components, Inc located at Aston, Pa. precision flatness porous carbon surface air bearing block can be forced against the flat surface of a bare exposed platen by use of a spherical ball that assures the full face of the air bearing block is held flat to the platen surface during the time an adhesive cement is solidifying to bond the air bearing block in a fixed and aligned position to a vertical slide structure. After the adhesive is solidified, a sheet of abrasive can be attached to the air bearing block surface by applying a vacuum instead of positive air pressure to the air bearing block. The vacuum disk sheet chuck allows the abrasive sheet to be held in force contact to either grind the surface of the platen or to level grind the top surface of each island of an annular array of islands attached to a backing sheet that is mounted to the platen that is rotated at speeds ranging from 5 to 5000 RPM. The inertia mass of the abrasive block assembly creates high localized abrading forces on high spots located either on the surface of the platen or on the surface of islands that are attached to a backing sheet mounted on the platen surface. FIG. 64 is a cross-section view of a vacuum block with an attached abrasive sheet in abrading contact with raised island foundations attached to a backing sheet. A platen 850 having a vacuum source 852 can be contacted by a air block 854 while the platen 850 and the air bearing block 854 are both stationary and in mutual flat surface contact. The air block 854 can have a porous carbon faceplate 856 or a non-porous carbon faceplate 856 can have an array of vacuum orifice holes in a hard surface material. The air block 854 has a vacuum negative pressure applied at its central region instead of the positive air pressure normally used to supply a film of pressurized air on the surface of the air bearing block 854. The negative pressure (vacuum) 852 or 878 applied internally to the block 854 or block 876 can be used to attach an abrasive sheet article 874 to the block 854 or 876 surface. The blocks 854 and 876 have a relatively small size that is sufficient to cover the outer annular band radial width 863 of the platen 850 that allows a precisely flat surfaced block 854 or 876 to be purchased or fabricated at a low cost relative to a block 854 or 876 having sufficient size to cover a whole platen 850 diameter. The block 854 would be pressed into face contact with the platen 850 by use of a spherical ball 858 and the epoxy adhesive 864 would be introduced into the gap opening between the block 854 and the slide bracket 862. After the epoxy had solidified, the face surface of the block 854 would be precisely aligned with the platen 850 surface and the block 854 would be rigidly mounted to a vertical slide 866 that is part of the slide assembly 870. The slide 866 allows the block 854 or 876 to be moved vertically a controlled distance 868 or for the slide 866 to hold the block 876 against the platen 850 surface with a force 869. An abrasive sheet 874 can be attached to the block 876 by vacuum means 878 or 860 and the abrasive 874 advanced in abrading contact with the surface of a raised island sheet 872 through a controlled distance 882 or, the abrasive 874 can be held by a force 869 against the raised island sheet 872. The vacuum block apparatus 880 is moved in a vertical direction by use of the slide 884.

Platen and Island Flattening Techniques

Problem: It is desired to grind or machine the annular band surface of a platen flat or to grind or machine the surface of raised annular band islands flat to a common, but variable height, or for periodically establishing or maintaining a flat platen surface during the abrading life of a grinding machine.

Figure 65:
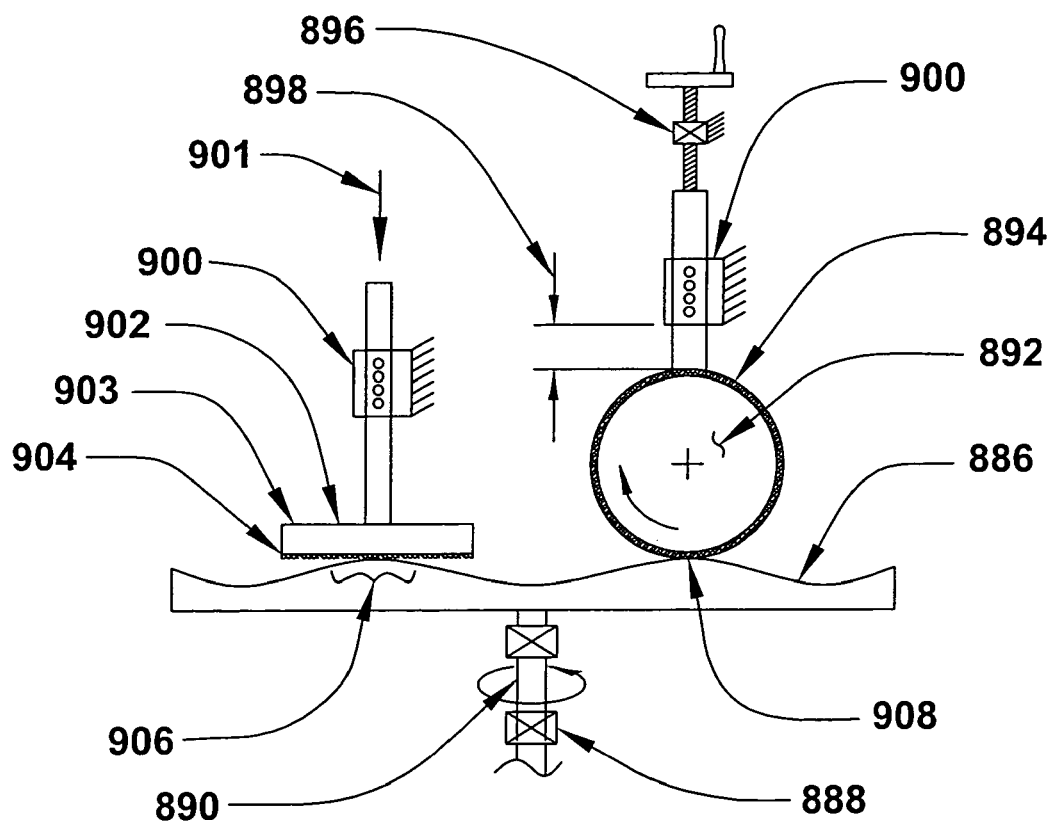
Figure 65:
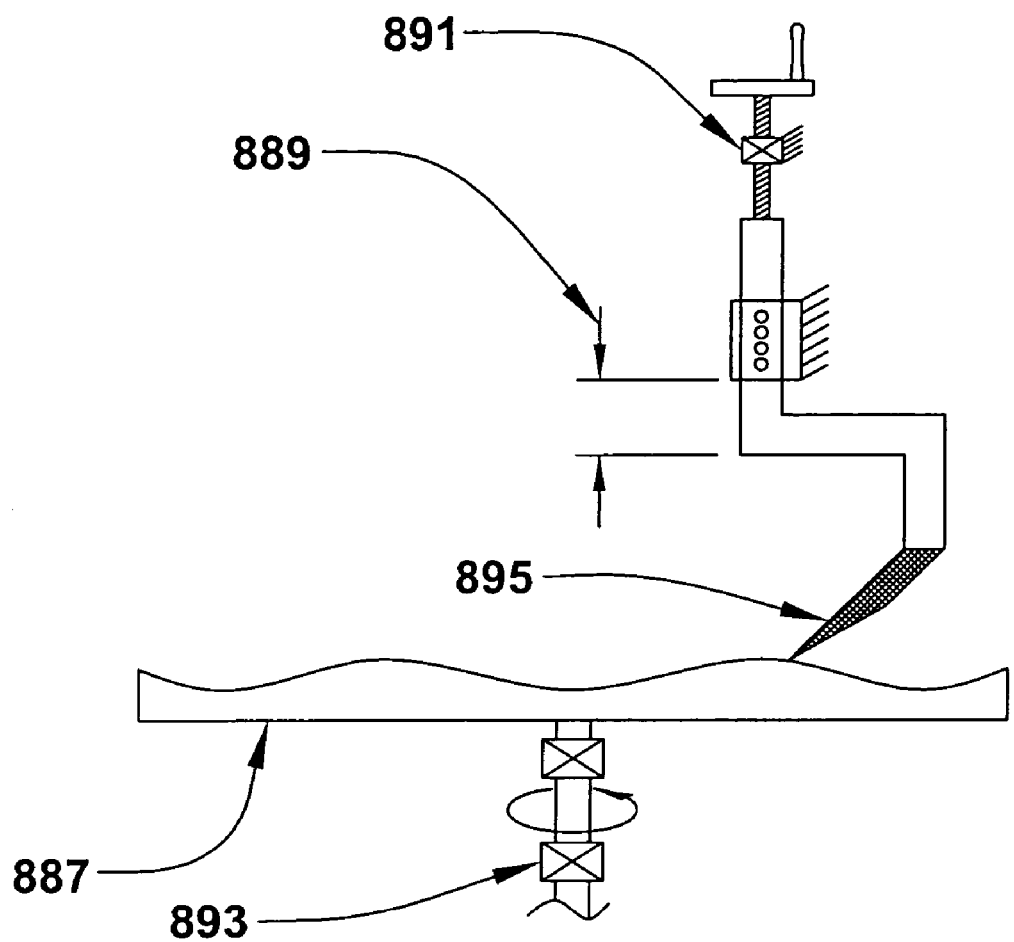

Solution: Different techniques can be used to level-grind the surface of a platen or a backing sheet with attached raised islands. In one technique, a stationary block, having the block contact face covered with a sheet of abrasive grit, can be held in contact with the annular surface of the rotating platen. The abrasive block having an abrasive width greater than a platen raised annular band width or a width greater than the width of the annular band of raised islands would have a weight mass sufficient to prevent vertical block excursions preventing the block from conforming easily to the variations in the surface height of the platen as the platen is rotated. High spots or high areas of the platen will contact the abrasive with more force and material removal than low areas during grinding block abrading contact that will tend to level-grind the platen. Different grit abrasive sheets can be used on the vacuum chuck block that has a precise flat surface that is aligned flat with the platen surface. A second grinding technique uses a rotating abrasive wheel having a narrow face surface of abrasive where the rotating grinding wheel is moved radially across the surface of the annular area to grind the platen surface flat. A third grinding technique uses a cup-wheel grinder in place of the abrasive block to grind the full annular area without radial motion of the cup-wheel across the width of the annular band. A conventional abrasive cup-wheel having an annular band of abrasive particles formed into a cup-lip extending down from the central body of the cup-wheel hub can be mounted on a rotatable spindle above the annular disk or platen in a manner where the abrasive cup-lip is in flat contact with the raised annular band. Another technique that can be used to flatten an annular band surface of a rotatable platen or to flatten the top surfaces of a islands attached in a annular band pattern to a flexible backing sheet mounted on a rotating platen is to use a sharp lathe cutting tool and perform a lathe-like cutting pass across the radial surface of the rotating annular bands. FIG. 65 is a cross-section view of a platen raised annular surface grinding apparatus showing both a rotating grinding wheel device and a stationary abrasive plate device. A raised annular surface rotating platen 886 having a platen shaft 890 supported with bearings 888 is shown with a non-flat surface that is contacted by a rotating wheel 892 having a abrasive 894 surface. The abrasive wheel 892 is mounted on a screw 896 attached to a slide 900 that allows the wheel 892 to be moved in distance increments 898 to increase or decrease the amount of material abraded from the surface of the platen 886. Rotation of the abrasive wheel 892 during abrading action provides even wear of the abrasive 894 over the full surface area of the abrasive wheel 892 that makes abrasive line 908 contact with the platen 886 surface where the abrasive line 908 is parallel to the surface of the platen and is preferred to be parallel to a platen surface radial line. Translation of the abrasive wheel 892 across the radial width of the annular band of the rotating platen 886 provides even wear across the full abraded surface of the rotating platen 886. An inertia plate 902 having an attached abrasive sheet 904 provides an abrading area 906 of contact between the abrasive 904 and the platen 886. The abrasive 904 is held in forced contact with the platen 886 by a force 901 applied to a slide 900 member. Abrasion of the highest portions of the platen 886 surface is provided by the dynamic stabilizing of the flat abrasive 904 due to the mass of the inertia plate 902 that prevents the inertia plate from following the irregular surface of the rotating platen 886. After the rotating platen 886 has been ground flat, a flexible backing sheet having attached raised island foundations (not shown) can be mounted to the platen 886 surface and the islands can be ground flat using either a flat abrasive 904 apparatus or the abrasive wheel 892 apparatus. A rotating abrasive cup-wheel 903 can be brought into abrading contact with a rotating platen 886 either by forcing a high mass grinder (not shown) having a cup-wheel 903 against the surface of the platen 886 or by incrementally advancing the cup-wheel 903 into contact with the platen 886. FIG. 65A is a cross-section view of sharp lathe tool held in contact with an annular band platen. A rotating raised annular band platen 887 supported by bearings 893 is surface machined by a sharp solid diamond, or other material, lathe tool bit 895 held by screw-thread advancement mechanism 891 that provides the capability for the tool bit 895 to advance in position increments 889 to remove a layer of platen 887 surface material as the tool bit 895 is translated in a radial direction across the width of the platen 887 annular band. The flatness accuracy of a machined or ground platen when it is stationary, operated at slow rotational speeds or operated at high rotational speeds can be established within 0.000010 inch (0.25 microns) by use of a capacitance measurement gage available from Lion Precision Company located at St. Paul, Minn. The capacitance gage can be used to profile the high areas of the platen, that can be removed by hand lapping, using a slurry of loose abrasive particles or a sheet having fixed abrasives to achieve the desired accuracy. Also, the platen structural stability and resistance to construction material long term or rotational induced creep geometric dimensional changes can be identified and correlated to abrading process operational factors by analysis of capacitance gage measurement data.

Grinding Annular Band Raised Islands

Problem: It is desirable to level-grind the top surfaces of raised islands attached to a backing sheet within a height variation of from 0.0001 inch to 0.001 inch (2.5 to 25.4 microns) of the arithmetic mean height measured from the backside of the backing in preparation to resin bond abrasive particles or agglomerates to the island surfaces. The raised islands are formed in annular pattern arrays on the backing.

Figure 66:
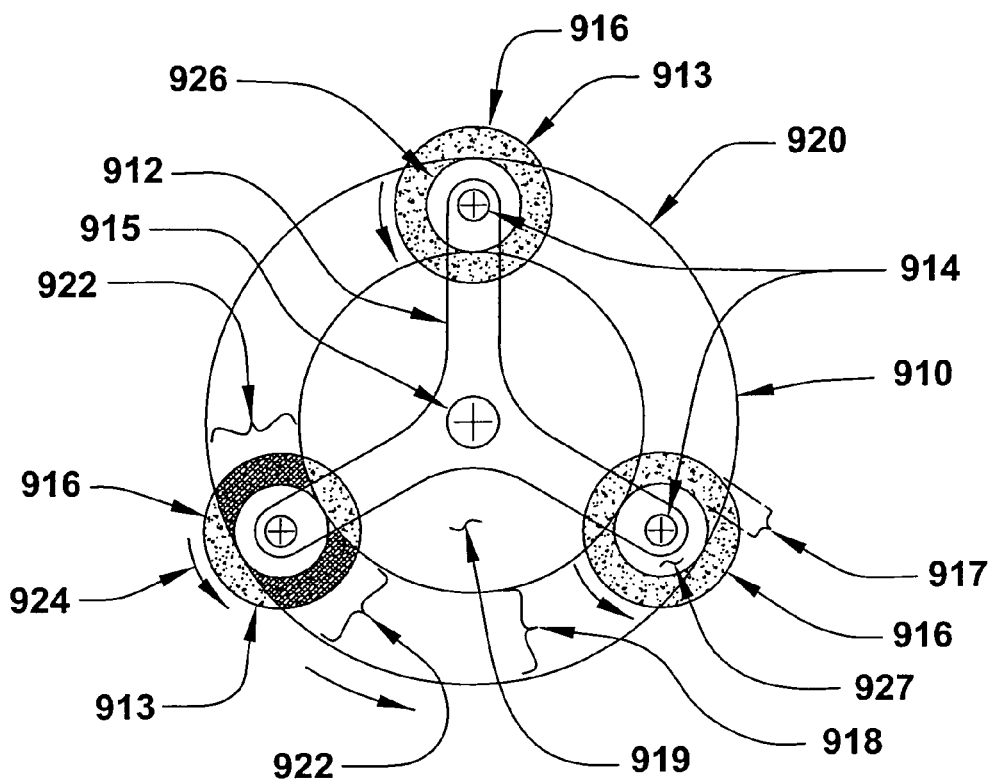
FIG. 66 is a top view of a three-point arm grinder of a raised island annular disk.
Figure 67:
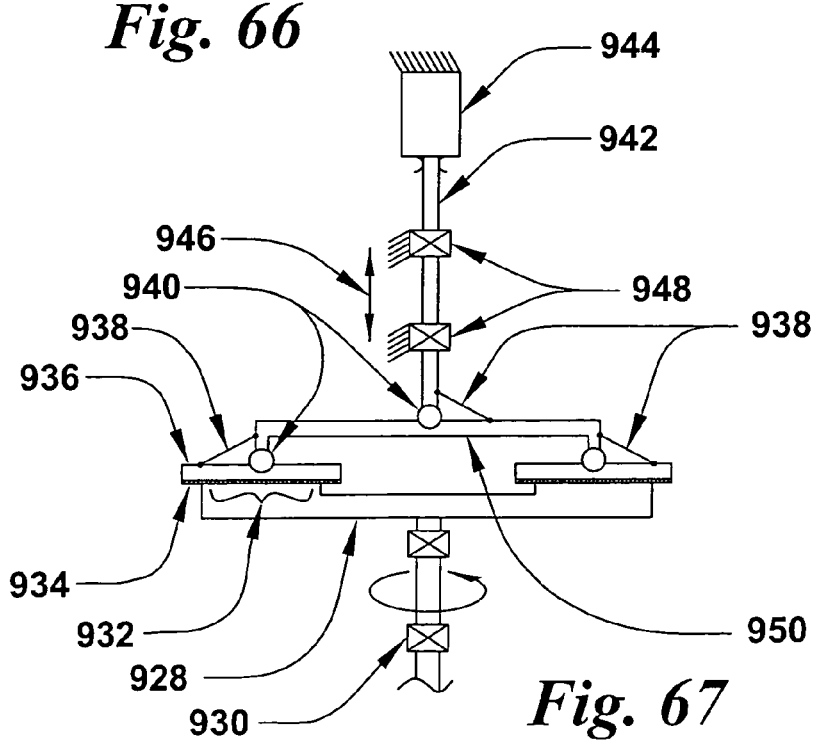
FIG. 67 is a cross-section view of a link-arm platen or island annular band grinder.
Figure 68:
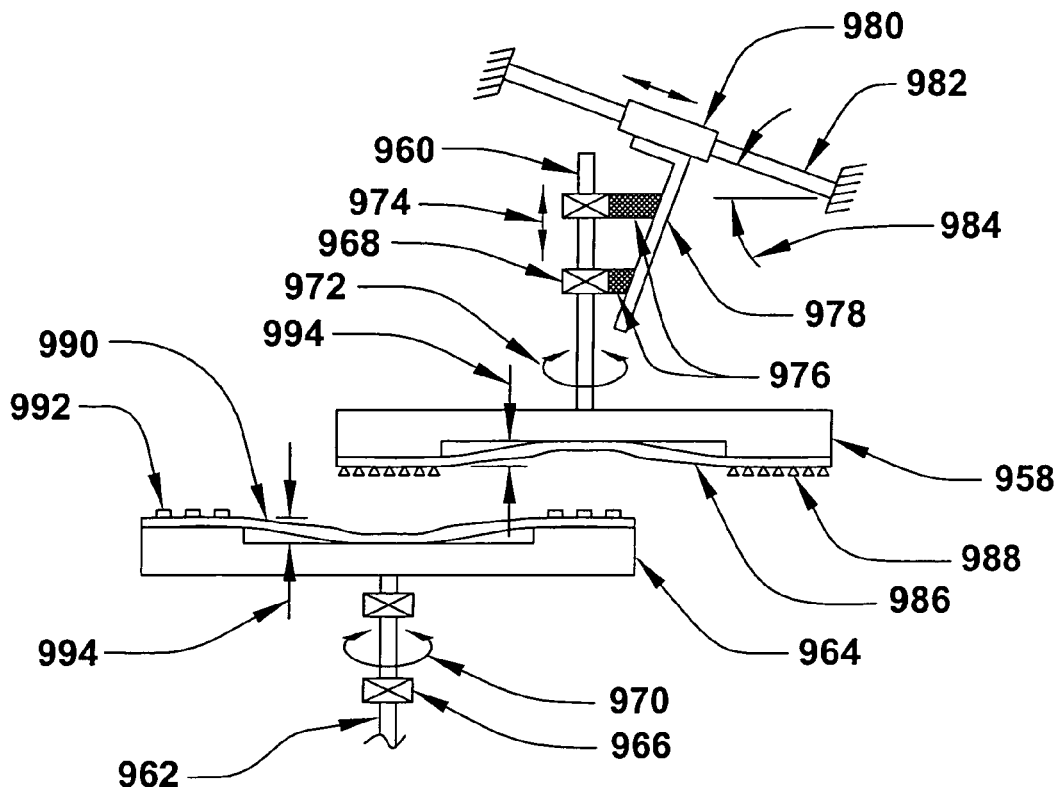
FIG. 68 is a cross section view of an offset raised island grinding apparatus.

Solution: When a platen or raised island surfaces or a workpiece is flattened on a annular surface by grinding or by machining it is important that the abrading material or cutting tool wear at a sufficiently slow rate that the cutter device does not change dimensionally from wear more than the allowable flatness dimension tolerance of the processed article during a single grinding or machining process step. After any one material removal step is completed, the cutting device can be position reset to compensate for the cutting tool wear. In some instances, the cutting or grinding media can be allowed to wear continually with little accuracy effect on the ground article if the grinder is also continually advanced, that is the case for pressure force contact of abrasive media with a moving ground surface. Material removal rates can be easily changed by making process changes including changing the abrasive contact pressure at different times in the process operation and changing the surface contact speed of the abrasive. More material is removed at higher contact pressures and at higher surface speeds. Excessive material removal at specific areas that can cause low spots can also be reduced by increasing the rotational speed of the ground article that has the effect of spreading the total amount of surface material removed more evenly across the full tangentially long annular area. Aggressive material removal rates shorten the grinding process cycle time but it also increases the likelihood of producing low spots in a ground surface. Use of process techniques where fast material removal rates occur only during times of high speed ground article rotation allows fast product cycle times but retains the capability of producing precision ground parts. A number of machine configuration grinding apparatuses can have machine components that are abrasively machined and mutually aligned with a series of precision set-up process steps. In one machine configuration, flexible disks having an annular pattern of raised island foundations attached to the disk backing can be mounted flat to the precision flat surface of an island platen attached to the rotatable head of a precision bearing spindle by means of a vacuum chuck disk hold down system. An abrasive particle coated abrasive article flexible disk sheet can be attached by vacuum means to an abrasive spindle mounted platen that is positioned above the island spindle in a manner that the abrasive can contact the island surfaces. The abrasive spindle having precision sleeve-type air bearings can allow the abrasive platen to be moved in a vertical direction for the removal of the abrasive sheet, and also, to rotate that provides the capability to mutually grind-in the abrasive platen raised annular abrasive sheet supporting area with a similar island platen raised annular island backing support area. The upper abrasive spindle is mounted on a horizontal slide that will allow the bare-surfaced abrasive platen to be concentrically brought in matching diameter size contact with the bare-surfaced island platen to initially position the abrasive spindle parallel with the island spindle after both the abrasive spindle and the island spindle have been surface ground precisely perpendicular with their respective spindles. Then an epoxy structural adhesive can be used to bond the abrasive spindle bearings to the abrasive spindle framework when the abrasive and island platens are in flat concentric work surface contact. The epoxy can be applied between release-liner sheets that are attached to the matching abrasive spindle bracket support members. The brackets are bolted together after the alignment epoxy has solidified which allows future periodic corrective repositioning of the island spindle bearings as the brackets can be separated because of the release liners. After curing the bearing alignment epoxy the abrasive spindle is moved laterally in a horizontal direction approximately one half the diameter of the abrasive annular band average diameter. An abrasive sheet is then vacuum attached to the surface of the island platen and used to grind-in the exposed surface of the abrasive spindle after which the abrasive sheet is removed. Then an unground raised island backing is attached to the island platen and an abrasive sheet is vacuum attached to the abrasive platen, the abrasive platen lowered and the top surface of the island ground flat. An alternative abrasive spindle bracket alignment mechanism having one member trapped in a annular container bowl filled with hot wax or other heat softened material can be used to reposition the abrasive spindle by heating the wax until molten that allows free motion of one bracket member relative to the other bracket member during the concentric contact alignment of the two platens. Solidifying the wax by cooling locks together the two members commonly immersed in the solidified wax volume thereby maintaining the relative alignment of the abrasive spindle and the island spindle during abrading process action. Low melting temperature eutectic and other alloy mixtures including tin and lead mixtures can be used in place of heat softening or melting waxes to fix the positions of elements of a spindle shaft alignment system. Another adjustable or repetitively changeable concentric-platen shaft alignment system having a two-point, three-point, or four-point clamp band bolt-down apparatus can also be used. The mounting members are loosely connected to allow free motion of the upper abrasive platen when it is placed in concentric platen-face contact with the lower fixed spindle mounted island platen prior to joining the two alignment joint members together using threaded fasteners. FIG. 66 is a top view of a three-point arm that positions three annular abrasive disks in surface contact with the surface of a raised island annular disk backing mounted on a rotating platen. The annular raised island disk 910 having a raised annular band 918 and a lower central area 919 mounted to a rotating platen 920 is contacted at three positions by rotationally driven annular abrasive disks 916 having raised annular bands 917 and abrasive-free areas 927. The three abrasive disks 916 have spherical joint 914 mounts attached to a three-point arm 912 having a spherical joint 915 at the center of the arm 912 that allows each of the abrasive disks 916 to contact the annular island disk 910 forming abrading contact areas 922. A conventional abrasive cup-wheel 913 having an annular band of abrasive particles formed into a cup-lip extending down from the central body of the cup-wheel 913 hub 926 can be mounted on a rotatable spindle above the annular disk 910 or platen 920 in a manner where the abrasive cup-lip is in flat contact with the raised annular band 918. Rotation of a erodible abrasive cup-wheel 913 having a larger cup-lip diameter than the radial width of the annular band 918 while the cup-wheel 913 is in flat abrading contact with the annular band 918 provides constant and even wear of the cup-wheel 913 lip during the process of grinding the surface of the annular band 918. The cup-wheel 913 would have an equivalent annular abrasive configuration to the annular abrasive band disk article 916 and the contact area of the cup-wheel 913 abrasive lip with the annular band 918 would also be represented by the abrading contact area 922. Sharp new abrasive particles would be presented continuously on the abrading surface of the cup wheel 913 as an erodible abrasive particle binder wears away during the abrading process. Abrading action is provided by the relative motion 924 between the island disk 910, or the platen 920, and the abrasive disks 916 or the cup-wheel 913. A single cup-wheel 913 or abrasive disk 916 can be used, or a set of two cup-wheels 913 or two abrasive disks 916, can be used as an alternative to the use of three abrasive articles 913 or 916 as shown. The platen 920, or raised island annular band 910, is preferred to be operated at high speeds of up to 10000 rpm or more to minimize the variations in circumferential flatness of the annular band 918 during periods of aggressive grinding when substantial amounts of material is removed from the annular island band 910 or the platen 920 surface, particularly during the time period when the abrasive article 913 or 916 is held in contact with the annular band 918 with a substantial contact force. All of the abrasive particles contained on the narrow lip surface of an abrasive article 913 or 916 sweep across the full annular width of the annular band 918 having the effect of mutually and continuously self-leveling both the surface of the abrasive articles 913 and 916, and also, the surface of the raised island disk 910 or platen 920 surface annular band 910. Item 910 represents both the annular raised surface of the platen 920 and the annular band of raised islands on a disk backing. Using an abrasive article 913 or 916 to first flat-grind the surface of the annular platen 920 and then to use the same grinding machine aligned set-up to flat-grind the raised island band disk article 910 having a surface-conforming flexible backing assures that the tops of the islands are ground flat with the same overall thickness as measured from the top of the islands to the bottom of the backing material. A small deviation of approximately 0.001 inch (25.4 microns) in the absolute nominal thickness measured from the island surface to the backing top surface is not critical to achieve good abrading performance of a typical flat surfaced raised island abrasive article as the island platform surfaces are elevated a relatively large distance of approximately 0.020 inches (508 microns) above the surface of the backing sheet simply to provide channel paths between raised islands for the passage of abrading coolant water that prevent hydroplaning of the workpiece. However, it is important to accurately control the island-to-island elevation variations measured from the nominal island top surface elevation plane to the backside of the island article backing. It is necessary that the dimensional tolerance of the island top surface to backing bottom surface thickness is accurately controlled to provide the uniform height abrasive particle plateau platform required to assure the presentation of all, or most, of the very small abrasive particles or agglomerate sizes of only 0.001 inches (25.4 microns), to a workpiece surface at very high rotational speeds of 3000 rpm or more. A low inertia mass workpiece holder assembly can follow the changes in surface elevation produced when a abrasive article having a non-flat surface attached to a flat platen is rotated slowly and the workpiece can then be brought into contact with abrasive particles located in low elevation areas. If the same platen is rotated at very high speeds, a workpiece will only contact the particles located at high elevation areas. To assure effective particle utilization, the coated particles attached to island surfaces are positioned at a uniform elevation in a plane that is parallel to the bottom side of the backing sheet that is mounted flat to a rotatable platen surface. The practical allowable elevation positional variation of individual particles from a flat parallel plane formed by all of the particles bonded to a raised island abrasive article is related to the dimensional size of the particles. A large abrasive particle or particle agglomerate can have a larger elevation position deviation than can a smaller particle as an abrasive article product design objective is to consume by abrasion most of each individual particle-body during an abrading wear process operation. Small particles having a large elevation position deviation below the flat particle plane can result in a portion of the small particles not being utilized as those particles located in low-elevation particle coated areas would not contact a workpiece surface at high article rotation speeds. Likewise, groups of small particles lying above the abrasive particle plane will tend to be impacted and become dislodged from the abrasive article surface during a high surface speed abrading action operation. It is preferred to present the top-surface of unground 0.001 inch (25.4 micron) diameter individual abrasive particles, or 0.001 inch (25.4 micron) diameter equal-sized individual abrasive particle agglomerates, to within less than 0.0002 inches (5.1 microns) of the arithmetic mean height of the particle-body top surfaces of all the abrasive particles or agglomerates attached to a flexible backing sheet for the best utilization of all the abrasive particles in high speed abrasive grinding or high speed abrasive lapping. The overall thickness and the thickness variation of an non-abrasive coated article having attached, or integral, raised island structures formed in annular band patterns on a circular configuration disk backing can be easily and accurately measured with the use of C-shaped micrometer device where the article thickness is measured from the non-abrasive coated island surfaces to the backside of the backing sheet. For an uncoated flat surfaced raised island article, the desired variation of the average thickness of the article is related to the size of the abrasive particles selected to be attached to the article. The standard deviation in article thickness is preferred to be within less than 50% of the arithmetic mean diameter, or arithmetic mean equivalent diameter, or arithmetic mean equivalent size, of all of the individual abrasive particles or of the abrasive composite agglomerates, that are to be resin bonded in a subsequent article manufacturing process step to the top exposed surface of the islands; and it is more preferred that the non-abrasive coated article thickness standard deviation to be within less than 30% and even more preferred to be within less than 20% or of the diameter, or size, of the abrasive particles or abrasive agglomerates. For resin bonded abrasive particle or agglomerate coated flexible backing articles, it is preferred that the thickness standard deviation from the arithmetic mean thickness measured from the top exposed surface of the abrasive particles to the backside of the backing sheet to be within less than 60% of the arithmetic mean diameter, or the arithmetic mean particle size, of the abrasive particles or agglomerates; and it is more preferred that the abrasive particle coated article thickness standard deviation to be within less than 40% and even more preferred to be within less than 30% of the arithmetic mean particle diameter or particle agglomerate size. For pre-ground surface conditioned resin bonded abrasive particle articles, it is preferred that the thickness standard deviation from the arithmetic mean thickness measured from the surface of resin bonded particles or agglomerates to the backside of an flexible backing sheet to be within less than 40% of the arithmetic mean diameter, or the arithmetic mean size, of the abrasive particles or agglomerates; and it is more preferred that the thickness standard deviation be within less than 30% and even more preferred to be within less than 20% of the arithmetic mean particle diameter, or particle size. Abrasive articles having less precise control of the thickness of raised island surface-to backing backside than described are still very useful for abrading at low abrading surface speeds and for abrasive disk articles having abrasive particles having sizes greater than 0.001 inches (25.4 microns). Abrasive particles larger than 30 microns can be coated directly on flat surfaced raised islands and most of the whole particle-bodies can be progressively worn off when the particles are coated on a precision height ground raised island article mounted on a precision flat ground platen. Abrasive particles smaller than 10 microns or particles smaller than 0.1 microns can be enclosed in erodible agglomerates and the agglomerates can be coated on raised islands. Abrasive particles ranging in size from 10 to 30 microns may be either coated directly on raised islands or they can be first encapsulated in erodible agglomerates that are coated on to the raised islands. There are practical limits on the size of abrasive particles that can be enclosed within agglomerate spheres with a preferred ratio of agglomerate sphere diameters to be approximately 10 times greater than the diameter of enclosed individual abrasive particles. A 0.001 inch (25.4 micron) diameter agglomerate encapsulating 3 micron particles is a reasonably good match for abrasive sheet articles having the thickness controlled within 0.0001 to 0.0002 inches (2.5 to 5.1 microns) mounted on a platen having a surface flatness controlled within 0.0001 to 0.0002 inches (2.5 to 5.1 microns). Using a 10 to 1 size ratio of agglomerates to individual abrasive particles, it would be desired to use 50-micron agglomerates to encapsulate 5-micron particles and to use 100-micron agglomerates to encapsulate 10-micron particles. However, it would also be desirable to use agglomerates having a diameter less than 100 microns for 10 micron abrasive particles as uneven abrading wear of the large 100 micron diameter agglomerates can negatively affect the flatness of a workpiece. Coating abrasive particles smaller than 10 microns directly on the surface of raised islands does not provide sufficient wear-down capability for individual particle-bodies when used with abrasive articles having 0.0001 to 0.0002 inch (2.5 to 5.0 micron) thickness variations and platens having 0.0001 to 0.0002 inch (2.5 to 5.0 micron) surface height variations. Agglomerates having a range of larger sizes of from 30 to 150 microns can be used to encapsulate abrasive particles from 5 to 25 microns. Individual abrasive particles having sizes ranging from 0.1 to 30 microns can also be resin mixed with an erodible material and coated in a single layer directly on the surface of raised islands. A flexible abrasive sheet disk article can have an outer annular band array of raised island structure shapes including cylinders, radial bars or chevron shapes where it is preferred that the island shapes have tangential space gaps between the top edges of adjacent islands of from 0.010 to 0.20 inches (0.25 to 5.1 mm) and the island shapes have top surface area lengths measured in a tangential direction of from 0.010 to 0.375 inches (0.25 to 9.5 mm). The disk article can have an outer annular band of abrasive particles or erodible abrasive agglomerates resin bonded directly onto the surfaces of the raised islands attached to a polymer material disk backing sheet having a sheet thickness of from 0.0015 to 0.015 inches (38.1 to 381 microns) or 0.125 (3.2 mm) or more inches where the disk article has a disk sheet diameter of from 0.75 to 72.0 inches (1.91 to 182.9 cm). The inner radius of the abrasive coated annular band is greater than 20% or preferably greater than 30% of the outer annular band radius and at least a monolayer of gap-spaced abrasive particles or gap-spaced erodible abrasive agglomerates is resin bonded directly onto the surface of the disk backing sheet. Gap spaces would exist between individual resin bonded adjacent abrasive particles or between individual adjacent erodible abrasive agglomerates that are sufficient to provide sparse particle coatings where the collective area of all the abrasive article bonded particles comprise a particle density of from 5 to 65% of the particle or agglomerate coated annular band surface area. It is desired that an outer annular border gap area located between the outer radius of the coated abrasive annular band of coated abrasive and the outer radius of the disk article is free of coated abrasive particles or agglomerates where the annular abrasive-free outer disk radius border gap area has a radial width of either from 0.010 inches to 0.500 inches (0.25 12.5 mm) or alternatively, from 0.2 to 10.0% of the abrasive disk article outside diameter. The abrasive particles or agglomerates are preferred to have diameters or sizes of from 0.1 to 400 microns and the composite erodible abrasive agglomerates enclosing abrasive particles including diamond or cubic boron nitride bound in a porous ceramic matrix material have all of the composite agglomerate mixture components capsulized into a near-spherical shape. The abrasive particles having sizes less than 25 microns are preferred to be capsulized together with ceramic materials and processed to form erodible composite agglomerates having near-spherical shape agglomerate diameter sizes of 75 microns or less and the abrasive particles having sizes less than 10 microns are capsulized together with ceramic materials and processed to form erodible composite agglomerates having near-spherical shape agglomerate diameter sizes of 45 microns or less. Flat surfaced raised islands can be coated with an layer of abrasive composite coating comprised of individual abrasive particles mixed with an erodible material and a binder resin to provide a uniform thickness erodible abrasive coating on the surfaces of the raised islands. FIG. 67 is a cross-section view of a link arm supporting abrasive plates in abrading contact with a platen having a raised annular band. The abrasive plates can be used to grind flat the platen raised annular band or can be used to grind flat the annular band of raised island foundations attached to a flexible backing sheet. A platen 928 mounted with platen shaft bearings 930 has a raised annular band 932 surface in abrading contact with flat abrasive sheets 934 attached to flat plates 936 held in force contact by spherical ball joints 940. The plates 936 are attached to a bearing slide 942 supported by slide bearings 948 by use of a support arm 950 having a spherical joint member 940. Anti-rotation link arms 938 prevent rotation of the support arm 950 and the abrasive plates 936 in reaction to the rotational movement of the platen 928. An air cylinder 944 attached to a slide 942 provides a downward force 946 to the abrasive plates 936 acting against the platen 928 surface. The support arm 950 may mount two or three abrasive plates 936 thereby developing equal plate 936 abrading contact pressure on the platen 928 surface. An flexible backing sheet (not shown) having attached raised island structures will conform to the precision flat ground annular band surface portion 932 of the platen 928 that allows the islands top surfaces to be precision flat ground by the same apparatus using the abrasive 934 attached to the abrasive plates 936. FIG. 68 is a cross section view of an offset raised island grinding apparatus. An abrasive platen 958 is mounted on an abrasive spindle using abrasive spindle bearings 968 that allow the abrasive spindle 960 to be rotated in either a clockwise or counter clockwise direction 972. The abrasive spindle 960 can also have a vertical motion 974 provided by abrasive spindle bearings 968 that allow both rotational motion 972 and linear vertical motion 974. Spindle bearings 966 include sleeve-type porous carbon shaft bearings supplied by New Way Bearing Company. An abrasive sheet backing 986 having an annular band pattern of abrasive particles 988 is attached to the abrasive platen 958 by a vacuum attachment system (not shown). The abrasive spindle bearings 968 are attached to an abrasive spindle slide bracket 978 with epoxy 976. The slide bracket 978 is mounted to a horizontal slide 980 traveling on a slide rail 982 in an approximate horizontal direction parallel to the surface of the island spindle platen 964 where the horizontal slide 980 has an angle error 984 representing the actual horizontal slide 980 motion relative to the true plane of the island platen 964 surface assuming the island platen 964 surface is precisely perpendicular to the rotational axis of the island spindle bearings 966. The island spindle 962 is supported by fixed precision shaft air or mechanical roller bearings 966 and rotates in either a clockwise or counter clockwise direction 970. An island backing sheet 990 having an annular band pattern of raised island structures 992 is attached to the island platen 964 by a vacuum mounting system (not shown). A circular disk abrasive article sheet or an annular pattern abrasive disk article 986 or an annular pattern raised island abrasive article disk can also be attached by vacuum means to the abrasive platen 958. Both the abrasive platen 958 and the island platen 964 can have an outer raised annular band area portion that is raised from the inside radial platen area by a distance 994 to concentrate grinding of platens 958 and 964 and the annular raised island 992 only at the annular areas thereby eliminating grinding platen 958 and 964 areas located at radii less than the inside radii of the annular areas. The abrasive platen 958 may be held stationary, incremented to a new rotational position or may be rotated in a clockwise or counterclockwise direction 972 at a low speed of 10 rpm to a high speed of 5,000 rpm and more. The island platen 964 may be rotated in a clockwise or counterclockwise direction 970 at speeds ranging from 10 to 5000 rpm.

Figure 69:
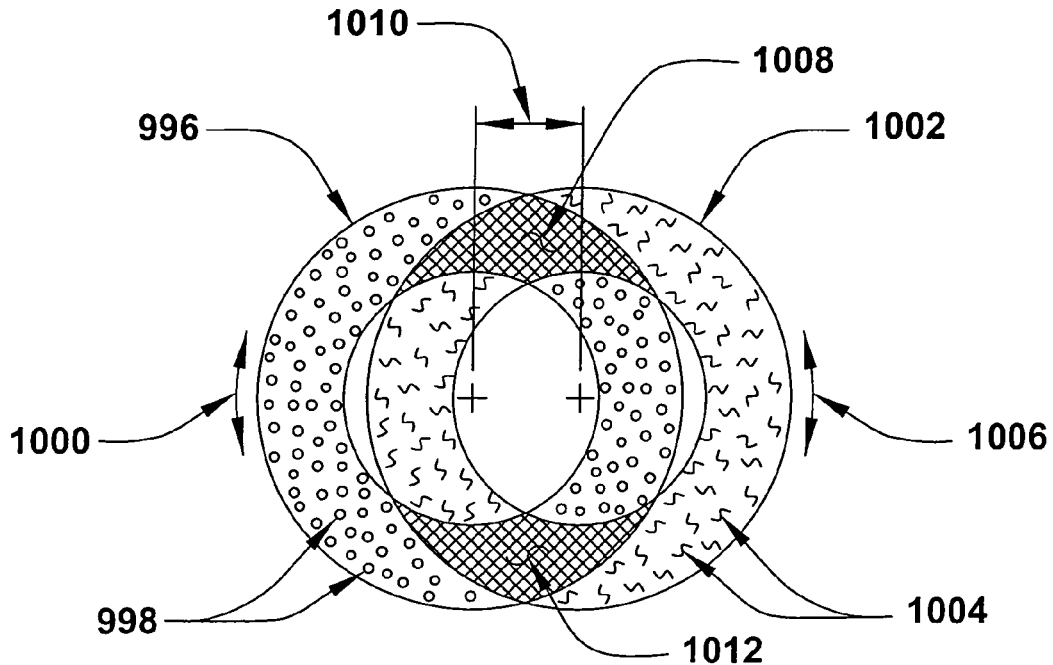
FIG. 69 is a top view of an offset raised island grinding apparatus.

A overlapping annular band disk workpiece article thickness grinding process can be used to thickness grind a wide range of disk shaped articles including solid annular band workpieces, flat polymer or metal plates having raised annular bands, disk articles having annular bands of non-abrasive coated raised islands attached to a disk backing and disk articles having annular bands of abrasive particle coated raised islands attached to a disk backing. The grinding apparatus has an annular band shaped workpiece disk article mounted on a rotatable platen and an annular band coated abrasive disk article mounted on another rotatable platen. The abrasive platen is positioned offset-concentrically to grind or lap the workpiece flat face surface with the abrasive media. The abrasive band outside diameter is preferred to be approximately equal to the outside diameter of the workpiece. Also, it is desirable that the radial width of the abrasive annular band is approximately equal to the radial width of the workpiece annular band. Both of the match-ups of the outside diameters and radial widths of the abrasive and workpiece have a wide range of relative sizes that will allow both the full surface of the abrasive and the workpiece to be evenly worn during the abrading action. The process of concentric offset flat grinding annular workpieces with an annular abrasive article allows both the full surfaces of the workpiece and the abrasive to be completely and uniformly worn at even rates by the abrading action. The grinding machine initial set-up is critical to perform accurate workpiece grinding. This set-up is best accomplished by aligning the machine components prior to attaching abrasive media articles or workpieces to eliminate inaccuracies introduced by the size variations in both the abrasive and workpiece articles. Alignment can be made by contacting the bare-faced platens together. A description of the grinding machine, the machine set-up and the grinding action is as follows. An abrasive platen is mounted on a rotatable spindle attached to a two-dimensional slide system having the capability to move in two perpendicular directions. The slide has an adjustable mount that allows the abrasive platen to be concentrically positioned in flat surface area contact with the annular face surface of a workpiece platen mounted on a rotatable spindle. The abrasive platen is then positioned in concentric flat area-contact with the workpiece platen and the abrasive platen slide mount alignment is established in this aligned position where the slide will maintain this mutual alignment. After alignment, the abrasive platen surface will remain parallel to the workpiece platen surface when the abrasive platen is moved in a direction perpendicular to the workpiece platen surface or when the abrasive platen is moved in a direction parallel to the workpiece platen surface or when the abrasive platen is moved in both a perpendicular and parallel direction relative to the workpiece platen. Then, an annular workpiece disk article is concentrically mounted on the rotatable workpiece platen surface. An abrasive disk article having an annular band of coated abrasive, where the abrasive band outside diameter is within 50% of the outside annular band diameter of the workpiece and the abrasive annular band radial width is within 50% of the workpiece annular band radial width, is attached concentrically to the surface of the abrasive platen. The annular abrasive platen is then moved parallel to the workpiece platen surface to a position that is concentrically offset from the workpiece platen by at least 5% of the radial width of the workpiece annular band. The abrasive disk article is then positioned to allow parallel abrading force contact between the abrasive surface and the workpiece surface where the contacting surfaces creates at least one, and preferably two, mutual abrading contact areas. All of the contacting annular band abrasive surface area and all of the annular band workpiece surface area are abrasively contacted when both the workpiece and abrasive platens are rotated. During abrading, the abrasive disk is incrementally advanced in a rotary direction and held stationary when the abrasive is in contact with the workpiece that is rotated to provide abrading action to the workpiece surface. It is preferred that the annular abrasive is offset concentrically from the workpiece by at least 5% of the radial width of the abrasive annular band. It is also preferred that the offset distance is less than the outer radius of the workpiece annular band even though the platen can be offset a distance greater than the workpiece outer radius. Contact between the abrasive surface and the workpiece surface creates at least one abrading contact area where all of the contacting annular band abrasive surface and all of the annular band workpiece surface are abrasively contacted when both the workpiece and abrasive platens are rotated. If the abrasive is offset a significant amount, two abrading areas may be created. Even if most of the abrading action occurs at the site of only one of the two abrading areas, all of the surface areas of both the abrasive media and the workpiece will be worn during the abrading action when both of the platens are rotated. In one mode of operation, the abrasive disk is incrementally advanced in a rotary direction and held stationary when the abrasive is in contact with the workpiece to provide abrading action to the rotating workpiece that is in contact with the rotating abrasive. In another mode of operation, the abrasive platen can be continuously rotated during the workpiece abrading operation. A high speed of rotation is preferred for the workpiece platen to prevent the abrasive platen moving conformably to follow the surface contour of the initially non-flat workpiece as the workpiece is rotated. The workpiece disk can be a backing sheet having an annular band of attached raised island structures attached to a backing sheet that is island-surface ground to provide a uniform workpiece thickness measured from the raised island top surface areas to the bottom of the backing. The thickness grinding apparatus can be configured to adjust the position where the abrasive contacts the workpiece, in a direction perpendicular to the workpiece surface. This position adjustment can be used: to control the wear rate of the abrasive or workpiece; or to provide a uniform workpiece thickness; or to provide a uniform raised island article thickness measured from the raised island top surface areas to the bottom of the backing. The thickness grinding process can also be used to provide ground parallel surfaces to a workpiece. Here, a workpiece is ground flat on a first surface, is turned over to mount the first ground surface on the workpiece platen and the opposite-side second workpiece surface is ground flat parallel to the first ground surface. FIG. 69 is a top view of an offset raised island grinding apparatus. A raised island annular disk 996 rotated in a clockwise or counterclockwise direction 1000 having raised islands 998 is contacted on the surface of the islands 998 by an annular abrasive disk 1002 rotated in a clockwise or counterclockwise direction 1006 having abrasive particles 1004 coated to the surface of the abrasive disk 1002. The abrading contact areas 1008 and 1012 are located where the annular bands of the abrasive disk 1002 contacts the island disk 996. More abrading action may occur at the first abrading contact area 1008 than at the second abrading contact area 1012 depending on a number of abrading process factors including the directions of rotation of the disks 996 and 1002 and the relative alignment of the abrasive disk 1002 spindle and the raised island disk 996 spindle. The mutual abrading areas 1008 and 1012 allow the full surface of both the abrasive disk 1002 and the raised island disk 996 to be continuously wear-abraded during the abrading process. The abrasive disk 1002 and the raised island disk 996 are offset concentrically by a distance 1010.

Surface Grinding Continuous Web with Annular Abrasive Bands

Problem: It is desirable to level-grind portions or all of the top surfaces of the full web width of a wide continuous moving flexible web backing surface using a disk article having a annular band of coated abrasives where the abrasive is continuously worn evenly across the full annular band during abrading. These wide webs are wider than the axial surface of a web supporting idler roll that can be contacted along its surface length by an annular abrading disk. Web sheet material having attached raised islands in annular or rectangular array patterns are to be ground to a precise thickness.

Solution: A web surface grinding system employing two idler rolls can be used in place of a system having a single wide idler roll. Two idler rolls both of which span the web width can be positioned parallel to each other along the web length to compensate for the circular curvature of an annular abrading disk. All of the abrading surface of the disk is actively engaged in the abrading process, that tends to result in even wear of the full disk abrasive surface. Here, a continuous flexible web can be routed over the two precisely parallel low friction idler rolls and a abrasive disk having an annular band of coated abrasive can be positioned where the abrasive contacts the web at three contact lines. One long contact line is present on the surface of a web entry idler roll and two other short abrading contact lines are present at the opposing ends of the second idler roll positioned downstream of the entry roll. The two idler rolls would be positioned and spaced relative to the annular abrasive band to create slight overlap of the long abrading line and each of the two short abrading lines. The full width surface of the continuous web can be thickness-ground using an abrasive annular band that is somewhat wider than the web width. All of the abrasive area of the annular band is in abrading contact with the web surface as the abrasive disk is mounted on a platen that is maintained at a controlled distance relative to the surface of the two idler rolls during the time that the platen is rotated. The idler rolls can be mounted in stiff and precise sleeve-type air bearings having very low friction. The abrasive annular band can also be used to finish-grind the localized roll surface regions located at the abrading contact lines. The idler rolls can have stepped-diameter roll surfaces to present a raised roll surface only at the regions of the abrading contact lines and the roll surfaces can be ground by traversing the rotating abrasive platen along the idler roll axis. Both annular and rectangular arrays of raised islands attached to a continuous web can be height ground to provide a precision web article thickness where the thickness is measured from the top of the island to the backside of the backing sheet. A similar web or raised island thickness grinding apparatus set-up using a rotating annular band platen aligned with two support idler rolls and a similar grinding technique can be applied to individual sheets of raised island articles. Various web materials including polymer, paper, composite, or metal continuous flexible sheet films or sheets or individual sheet articles can be thickness surface ground using a similar grinding apparatus and grinding technique. Multiple platen-idler roll apparatus thickness grinding stations can be used sequentially along a web length to provide rough-grind and finish-grind operations to web or sheet material.

The web surface grinding process uses a number of procedures and apparatus features described here that utilize the capability of the multiple roll grinding apparatus. A moving continuous flexible web backing is routed over a first web entry long idler roll positioned at the web cross-width center and the web is also routed over another web-downstream idler roll that is positioned whereby the axes of the two idler rolls axes are in close proximity, preferably less than 6 inches from each other. The axes of the two idler rolls are mutually aligned parallel to each other and the circumferential top flat-line surface of both rolls lie in the same plane and the rolls are of sufficient length to provide that the full span width of the web bottom surface is contacted by the top flat-line surface of the downstream idler roll. An abrasive disk article having an annular band of coated abrasive where the abrasive band outside diameter is greater than the web width is mounted on the surface of a rotatable platen. The abrasive platen is mounted on a spindle attached to a vertical slide that allows the annular abrasive to be positioned in flat line-contact with the upper surface of the web at the three locations where the bottom surface of the web is in flat-line contact with both of the idler rolls. Contact between the abrasive and the upper web surface creates a single central abrading contact line on the upper surface of the central portion of the web at the location where the bottom side of the web is in flat-line contact with the first web entry idler roll. Contact between the abrasive and the upper web surface also creates two abrading contact lines at the upper surface of the web outside edge portions at the locations where the bottom side of the web is in flat-line contact with the downstream idler roll. The abrasive disk is rotated when the abrasive is in contact with web that is moved at a controlled speed over the web entry and the web downstream rolls to provide abrading action to the moving web surface at the three abrading contact line positions as the web passes the rotating abrasive. Abrading action at the three independent abrading line positions creates an overlap of the two abrading downstream roll contact lines with the first web entry idler roll contact line wherein abrasion is provided across the full width of the moving web surface. One or more of the idler rolls can be driven rolls to overcome idler roll friction. A continuous web backing having attached raised island structures can be routed over the rolls and the island-surfaces can be ground to provide a uniform web thickness measured from the raised island top surface areas to the bottom of the web backing.

Figure 70:
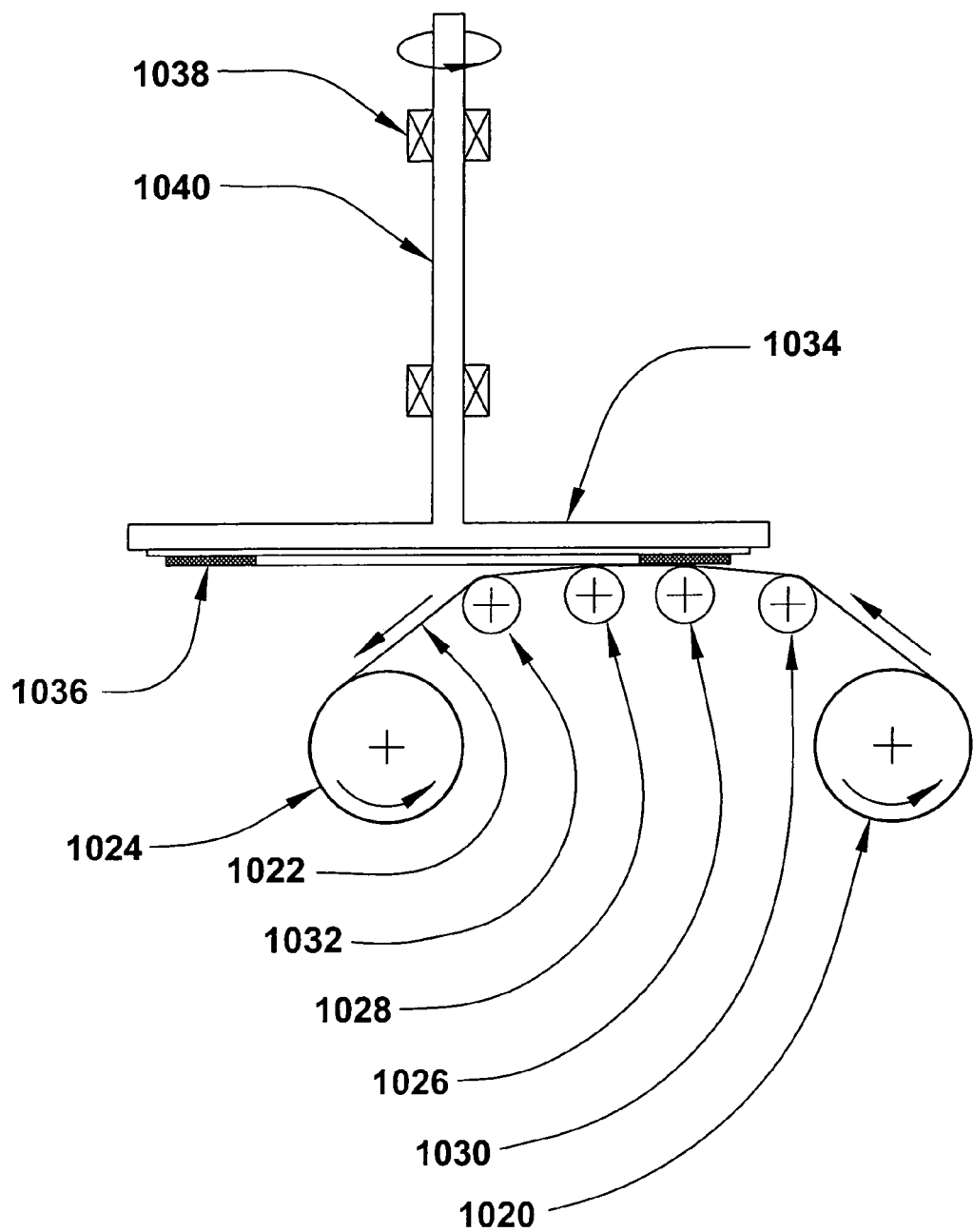
FIG. 70 is a cross-section view of a continuous web thickness grinding apparatus.
Figure 71:
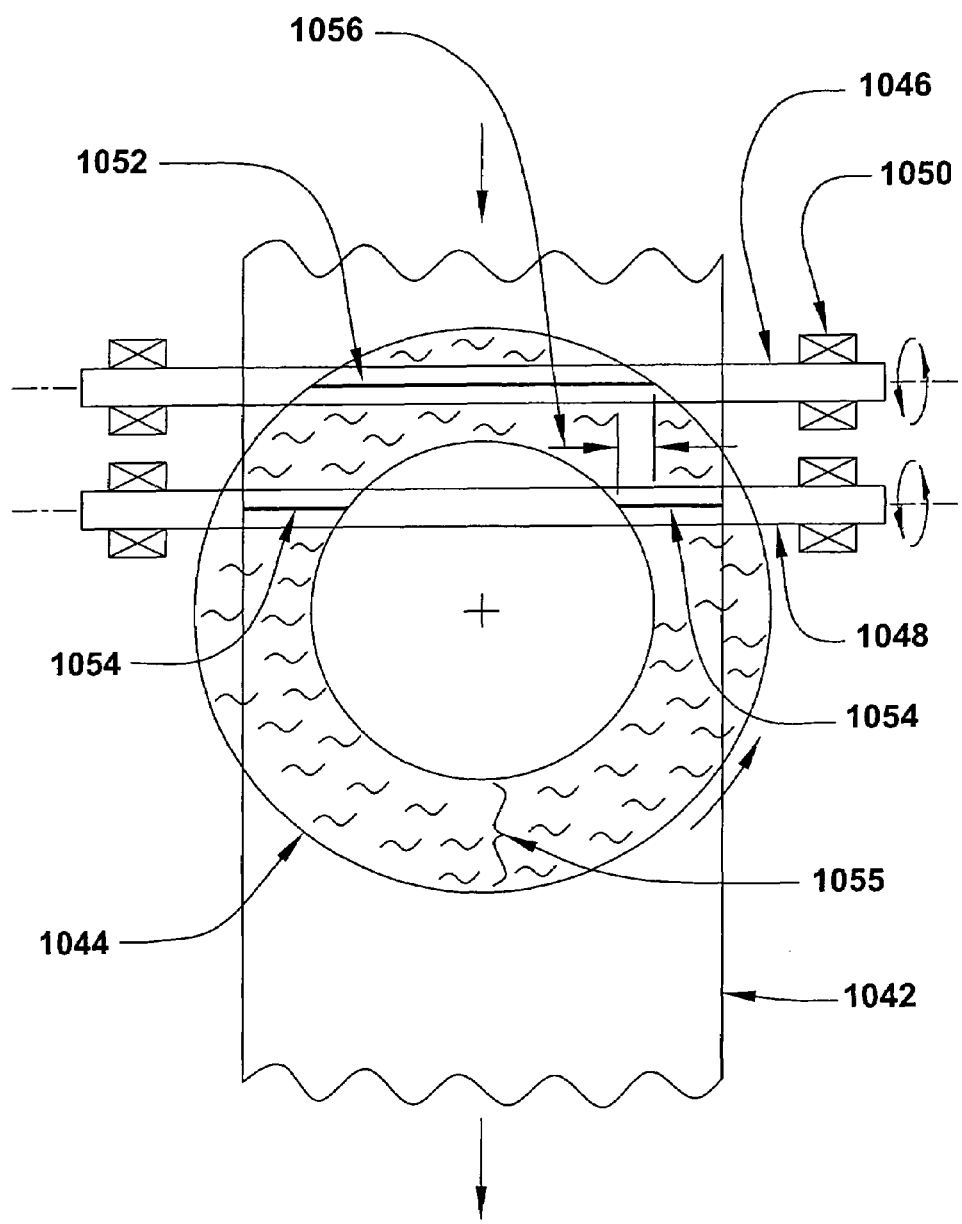
FIG. 71 is a top view of a continuous web thickness grinding apparatus.
Figure 72:
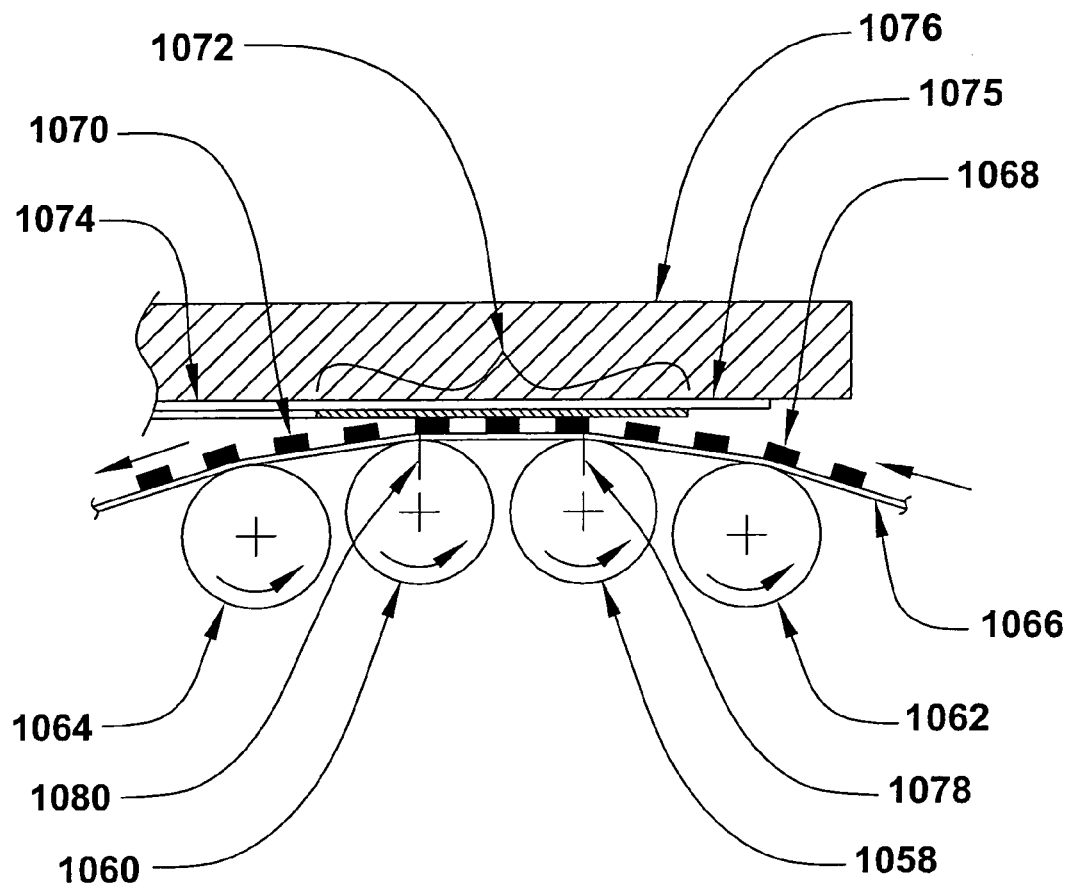
FIG. 72 is a close-up cross-section view of a continuous web thickness grinding apparatus.

FIG. 70 is a cross-section view of a continuous web thickness grinding apparatus. An unwind roll 1020 supplies continuous web 1022 that is routed to a series of rolls including an entry roll 1030, a web abrading support entry idler roll 1026, a downstream abrading support idler roll 1028 and a exit roll 1032 after which the web 1022 is wound on a wound roll 1024. The web 1022 is in abrading contact with an annular band abrasive sheet article 1036 that is attached to a rotating platen 1034 mounted on a platen shaft 1040 that is supported by two shaft bearings 1038. FIG. 71 is a top view of a continuous web thickness grinding apparatus. A continuous web 1042 is routed over web entry idler roll 1046 and a downstream idler roll 1048 and a abrasive disk article 1044 having an annular abrasive width 1055 is positioned wherein the rotating abrasive 1044 is in abrading contact with the surface of the moving web 1042. The idler rolls 1046 and 1048 are each supported by two shaft bearings 1050. The web 1042 at the web entry roll 1046 location contacts the abrasive 1044 at a abrading contact line 1052 and the web 1042 at the downstream roll 1048 location contacts the abrasive 1044 at the two abrading contact lines 1054. There is an overlap in the abrading contact lines 1052 and 1054 shown by the overlap distance 1056 showing that two cross-width sections of the web 1042 are in abrading contact with the abrasive 1044 on both rolls as the web passes through the web thickness grinder apparatus. FIG. 72 is a cross-section view of a continuous web thickness grinding apparatus. An abrasive sheet article 1075 having an annular band area of abrasive 1072 bonded to a backing sheet 1074 is attached to a rotating platen 1076 where the abrasive 1072 contacts unground raised islands 1068 attached to a web backing sheet 1066 at the top surface of the web entry idler roll 1058 shown by the abrading line location line marker 1078. The abrasive 1072 also contacts unground raised islands 1068 at the top surface of the downstream idler roll 1060 shown by the abrading line location line marker 1080. Ground islands 1070 attached to the web backing 1066 are routed out of abrading contact with the abrasive 1072 by routing the web backing 1066 over the exit roll 1064. Web backing 1066 is routed over the entry roll 1062 into the web thickness grinder apparatus.

Large Diameter Lapping Platen

Problem: It is desired to use large diameter platens with annular band abrasive media sheets that have diameters ranging from 18 inches up to 72 inches (45.7 up to 182.9 cm) or more where the flatness of the platen is maintained less than 0.001 inch (25.4 micron) at localized abrading stations while the platen is rotated to provide surface speeds of from 3,000 to 10,000 surface feet per minute abrading speeds. It is difficult to achieve this flatness accuracy on large diameter platens using mechanical roller bearing spindles.

Figure 76:
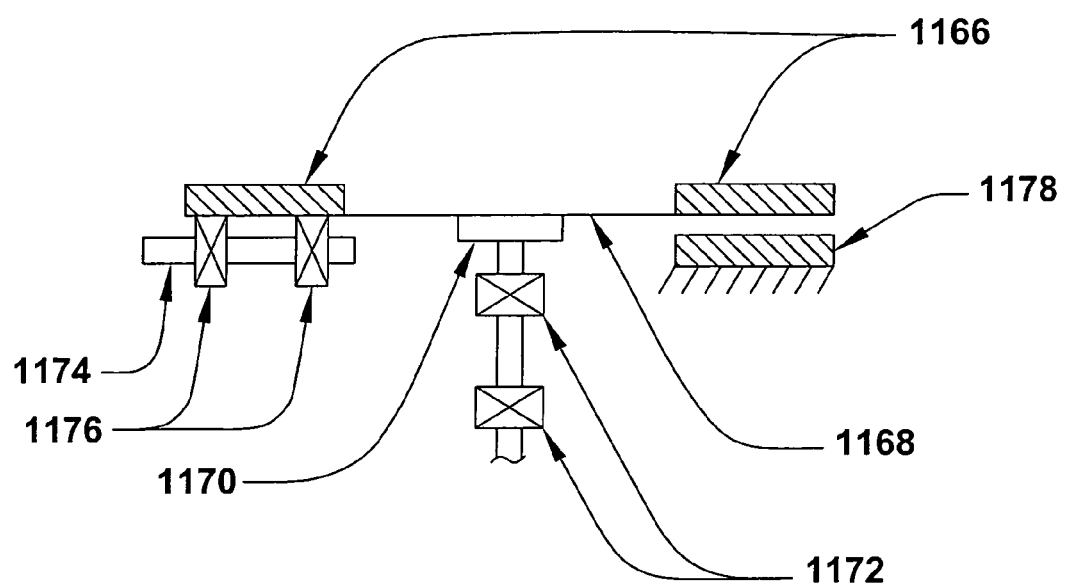
FIG. 76 is a cross-section view of an annular lapping platen with outboard bearing supports.
Figure 77:
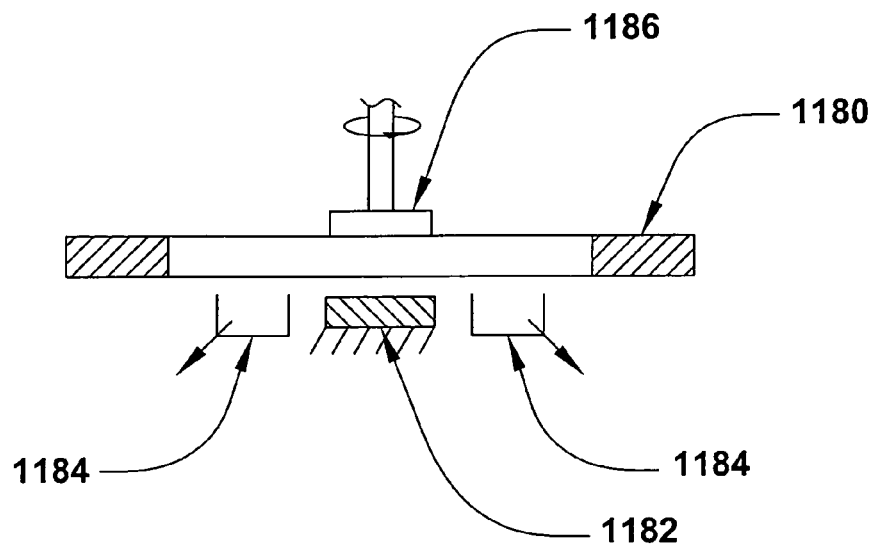
FIG. 77 is a cross-section view of an annular lapping platen with vacuum box supports.
Figure 78:
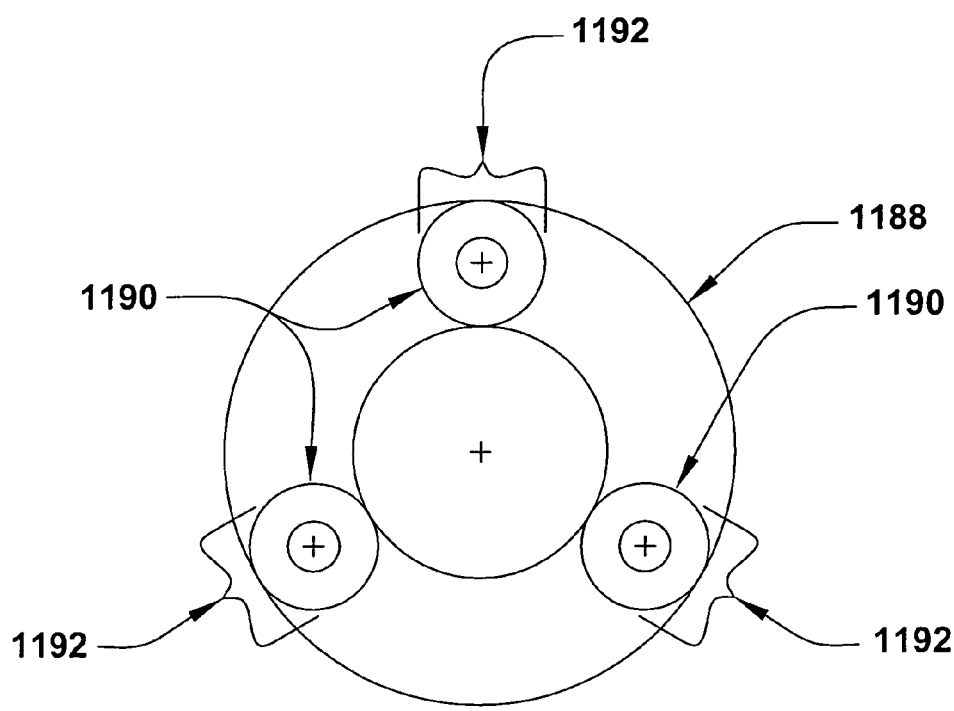
FIG. 78 is a top view of an annular ring lapping platen with outboard workpiece stations.

Solution: A sandwich-construction annular band platen having a flexible diaphragm disk that is attached to a central spindle where the diaphragm allows torque to be applied to the annular platen and restrains the annular platen radially. A precision roller bearing platen support spindle generally has multiple precision stacked and mutually pre-loaded bearings that are less than 8 inches (20.3 cm) in diameter and have run-out accuracy's measured at the outside bearing diameter of preferably 0.00002 inches (0.5 microns) that is marginal for the accuracy required for precision lapping or surface grinding raised islands at a diameter that is eight or more times larger than the roller bearing diameter. Air bearing spindles having sufficient accuracy can be very expensive. The annular sandwich design provides a simple attachment means to join the flexible diaphragm and the outer annular ring and it also provides a separable upper annular ring containing vacuum hold-down holes that can be used to attach abrasive sheet disk articles to the platen surface. The rotational inertia mass of the platen is minimized with this configuration. Inexpensive and small platen support bearings can be positioned at a minimum of three positions, that are equidistant tangentially, around the circumference of the platen annular band to vertically support the platen that is positioned to have a horizontal planar face. The support bearings can be surface contacting mechanical roller bearings or surface contacting air bearing rollers or non-surface contacting flat-surface air bearing pads that are separated from the bottom surface of the platen by a film of high pressure air. The platen weight can hold the platen tight to the bearing supports or non-contacting suction air boxes can be mounted adjacent to the bearing supports to draw the platen body against the surface of the bearing supports. The size of the vacuum boxes and the level of vacuum suction pressure can be changed to provide the desired platen hold-down forces acting on the bearing supports. The bottom support bearings can each have one or more adjacent vacuum suction boxes in close proximity to the bottom platen surface that apply a vacuum of from 100 to 700 mm hg to the surface of the platen to force the platen to be in contact with the adjacent platen support bearing. Mounting vacuum suction boxes symmetrically on both tangential sides of a bearing support minimizes the bending deflection of the annular abrasive support ring at the location of the lapping station. Use of vacuum boxes mounted adjacent to flat air bearing support pads having adjustable air pressure allows a vibration-damped, position-stable support of the rotating platen at each bearing support station. The low inertia flexible platen diaphragm allows misalignment of the center spindle, or spindle bearing inaccuracies, as the dynamic effects originating in the bearings are not translated to the high inertia annular band portion of the platen when the platen is rotated. Large diameter platens do not need to be rotated at the same high speeds as do small platens to achieve satisfactory surface speeds required for efficient lapping using diamond abrasives. Dynamic out-of-balance forces are less of a problem as these forces are generally proportional to the square of the rotational speeds. Workpieces can be ground or lapped by mounting an abrasive article to the platen surface and holding a workpiece in contact with the abrasive material that is rotated by the platen. Very large workpieces including semiconductor wafers having 12 inch or 304 mm diameters can be easily processed on large annular diameter abrasive sheet disks having a radial width nearly equal to the workpiece diameter. Multiple workpiece lapping stations can exist around the circumference of the annular platen, typically at each bearing support station. Six or more workpieces could be processed at the same time using a single annular band abrasive disk article. Further, both sides of the platen annular band can be abrasively ground flat at one or more of the support stations to initially establish the accuracy of the annular platen, generally by lapping one side of the platen, remounting the platen to lap the opposite side and continuing this process until satisfactorily accuracy is achieved. This lapping can be done initially on a new platen or it can be done periodically to maintain the platen surface accuracy during the life of the lapping machine. FIG. 76 is a cross-section view of an annular ring lapping platen with outboard bearing supports. An annular ring 1166 is center supported by a flexible diaphragm 1168 that is mounted to a spindle 1170 that is supported by spindle bearings 1172. The annular ring 1166 is also supported by outboard bearings 1176 that are mounted to a bearing shaft 1174 or is separated by air bearing flat surfaced pads 1178. FIG. 77 is a cross-section view of an annular ring lapping platen with outboard bearing supports and vacuum boxes. An annular platen 1180 is supported by an air bearing pad 1182 that is tangentially surrounded by vacuum boxes 1184. A workpiece holder 1186 is shown in contact with the upper surface of the annular ring 1180 at a position directly above the air support pad 1182. FIG. 78 is a top view of an annular ring lapping platen with outboard workpiece stations. An annular ring platen 1188 has three tangentially positioned workpiece stations 1192 with a workpiece 1190 at each station 1192.

Braze Agglomerates to Brass Shim Stock

Problem: It is desired to attach abrasive particles and abrasive agglomerates to brass or other precision thickness metal shim stock materials to create durable, precision thickness and inexpensive abrasive articles using a continuous metal web production process.

Solution: Abrasive particles or abrasive agglomerates can be rigidly bonded to a backing plate or backing sheet having raised islands with a metal alloy by using brazing techniques. Attaching the abrasive particles to a metal backing with a metal solder or brazing alloy can provide a much faster, simpler and less expensive process than bonding the particles using an electroplating process. Some metal alloys are stiffer than other alloys but an abrasive particle metal attachment bond is comparatively far stronger than a polymer resin bond. Also, the metal backing sheet is far stronger than a comparative polymer backing sheet that makes the abrasive article having solder or brazing alloy bonded abrasive particles more useful for aggressive abrading applications. Monolayers of abrasive particles or abrasive agglomerates can be attached to the metal backings. Commercial metal shim stock sheet material can be readily purchased that has very accurate thickness control that makes the abrasive coated abrasive article useful for high speed grinding.

Solidified abrasive agglomerates having abrasive particles enclosed in a ceramic matrix can be mixed into a water or other solvent base slurry containing a low temperature brazing alloy particles including zinc-aluminum alloys that have liquidus temperatures ranging from 373 degrees C. to 478 degrees C. Other brazing or soldering alloys that have liquidus temperatures that range up to 600 degrees C. and up to degrees C. can also be used. Solder alloys that can also be used include tin-silver-copper and tin-copper lower liquidus temperatures of approximately 260 degrees C. The slurry can also contain a fluxing agent. These liquidus temperatures are well below the thermal degradation temperature of diamond abrasive particles. The agglomerate slurry can be continuously coated directly on the surface of a web sheet of precision thickness brass or other metal shim stock material that is then routed through a heated oven or is subjected to another energy source to bond the agglomerates to the metal shim stock material. Fine particles of copper or zinc or other materials can be mixed into the abrasive particle and ceramic material slurry prior to solidification of the agglomerate to provide attachment sites at the surface of the agglomerates where some of the metal particles are exposed for the zinc-aluminum brazing alloy or other brazing alloys to bond individual abrasive agglomerates to the metal sheet. A wide variety of powdered metals, or metal alloys, or inorganic materials including brazing fluxing agents can be encapsulated along with abrasive particles within the abrasive agglomerate spherical shapes to enhance the bonding of the agglomerates to the metal backing. The slurry of solidified abrasive agglomerates, a brazing filler material and fluxing agent can be continuously coated on a 12 inch wide, or wider, web of brass shim stock material that is routed through an oven or other energy source where the slurry is dried on the surface of the metal web sheet backing. Then, in another heating process step, the metal and agglomerates or abrasive particles can be heated to a temperature sufficiently high to melt the brazing alloy and fuse-bond the agglomerates to the surface of the moving brass web. After cooling, the abrasive particle coated brass web can be wound on a roll, after which, the web can be converted into desirable shaped abrasive articles. The agglomerates can be coated in annular band or other geometric patterns on one surface of the shim stock. A metal web having annular band patterns or rectangular patterns of integral raised islands can also be coated with abrasive particles or abrasive agglomerates that are brazed to the surface of the metal web. Abrasive agglomerates containing metal particles can also be electroplate bonded to metal backings or to polymer backings having metallized surfaces where the plated metal will attach to the exposed metal particles on the surface of the agglomerates and mutually bond the agglomerates to the surface of the backing.

Abrasive particles or abrasive agglomerate particles (that are referred to herein as "collectively abrasive particles") can be coated directly on the flat surface of a metal flexible backing sheet or they can be coated directly on the surface of a rigid metal substrate plate. Abrasive particles or agglomerates can be conformably coated to the complete surface of a metal web having integral raised islands where both the top flat surfaces of the islands are coated with abrasive and the valleys that exist between adjacent raised islands are also coated with brazed abrasives. Metal sheet material having precise height raised islands can be produced from precision thickness continuous web sheet where the web is chemically milled or etched in a continuous web process to create the integral raised islands on the sheet backing. The island surface areas will have the same precision thickness characteristics as the original shim stock metal web material. Raised island arrays having abrasive particles or agglomerates coated only on the island top surfaces can be produced by a number of coating techniques including the process of transfer coating the agglomerate brazing slurry from a coated transfer sheet to the island tops prior to heating the metal backing. Islands shapes may be located in rectangular or annular array patterns. The copper particles mixed in an abrasive agglomerate can be 0.2 microns, or smaller, or they can be larger. Copper particle-abrasive particle agglomerates may be formed into spherical shapes by a number of processing techniques including using a dehydrating liquid, using open cell belts or by other means.

Metal, including copper and copper alloys, or other coatings, including organic and inorganic, may be applied to the exterior surface of both individual abrasive particles and to individual abrasive composite agglomerates to enhance their affinity to the solder or brazing alloys that are used to bond them to the flexible metal sheet or plate material. Metal coatings can be applied to particles or agglomerates by a variety of techniques known in the abrasive industry, including by vapor deposition processes. Individual abrasive particles, including diamond particles or diamond particles pre-coated with inorganic or metal coatings, can be bonded to brass or other metal shim stock by the same brazing techniques presently used in the abrasives industry for braze bonding abrasive agglomerates to solid metal objects. These metal coated abrasive particles and abrasive agglomerates can also be electroplate bonded to metal backings or to polymer backings having metallized surfaces.

A number of process techniques can be employed to bond abrasive particles or abrasive agglomerates to the surface of a metal flexible web or a rigid metal plate. One simple and effective technique is to "tin" coat a thin layer of solder or brazing alloy on the surface of a metal web or plate where the thickness of the solder or brazing alloy is less than one half the size of the abrasive particles or agglomerates. Metal coated abrasive particles or agglomerates can be deposited onto the solder or alloy surface of the metal web or plate before or during the time that the solder or alloy is in a wetted molten state. Deposition of particles during a time when an unheated web or plate has a rigid solder or brazing alloy coating. If a coating is not molten, the web or plate having a coating of abrasive particles or agglomerates would then be heated to bring the solder or alloy into a molten state to create an attachment bond between the solder or agglomerate wetted particles or agglomerates and the web or plate. Solder or brazing fluxes can be applied to the backing metal or to the solder or brazing alloys. Fluxes can also be applied to individual abrasive particles prior to brazing.

Plated Diamond Abrasive Shim Stock

Problem: It is desirable to economically manufacture abrasive articles that have diamond or other abrasive particles electroplated to the surface of a precision thickness flexible metal backing having raised island structures that is corrosion resistant to allow the articles to be used with water. The abrasive articles can be formed into rectangular pieces, circular disks, or endless belts. Diamond particles can be electroplate-bonded to a continuous flat-surface shim stock web or to a metal shim stock web having patterns of raised islands that are formed as an integral part of the shim stock web sheet.

Figure 80:
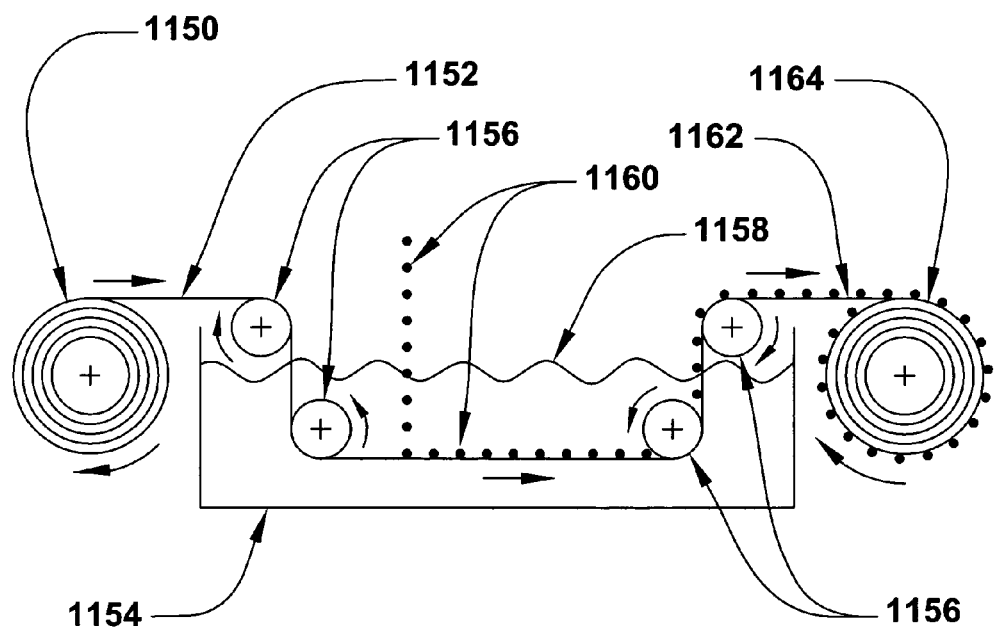
FIG. 80 is a cross-section view of a plating tank used to attach particles to a metal web.

Solution: Brass, stainless steel, steel, aluminum or titanium, or other metal sheet stock material having a precisely controlled thickness in a large variety of thickness sizes and widths is readily available commercially. Commercial shim stock material is readily available and has a very precisely controlled thickness. A web stock roll of this non-corrosive shim stock material can be routed into an electrolyte liquid filled electroplating tank where abrasive particles can be continuously dropped in a distributed particle-spaced pattern onto the surface of the submerged metal web as the web moves horizontally along the length of the plating tank. The metal web can be conveniently connected electrically to act as a cathode in conjunction with cathodes immersed in the electrolyte. Metal deposited by the electroplating process on the surface of the continuously moving electrically conductive shim stock web bonds the abrasive particles to the surface of the web. The shim stock web can have a flat surface or the web can be chemically etched or chemically milled to produce a pattern of flat-topped raised island structures where the island tops are elevated above the etched base of the web. Production of the island shapes as an integral part of the metal backing web sheet can be done on a continuous web processing basis by routing the web through a tank filled with a chemical etching liquid using techniques and processes suitable to develop the island structures. As the top surfaces of the raised islands are protected from the etching material removal action, the original precision web thickness, as measured from the island surface top to the backside of the metal web is maintained. These raised islands would not typically require machining or grinding to establish a uniform island height as measured from the backside of the metal sheet as the original thickness of the commercial sheet material is precisely controlled. After the islands are etched into the metal shim stock, the shim stock can be wound on a roll for temporary storage and subsequent processing. The valley gaps between raised islands may be coated with a temporary or permanent non-electrically conductive organic or inorganic material that has a thickness much less than the height of the raised islands. The valley coating allows only the island top surfaces to be covered with distributed abrasive particles during the process of bonding individual abrasive particles or individual composite abrasive agglomerates with deposited metal to the metal web surface by use of an electroplating process. The valleys can also be temporarily coated with a thick non-electrical coating that is removed after abrasive particles are plated to the island surfaces. Also, abrasive particles can be plated onto the full surface of the metal web having raised islands, including plating the small abrasive particles in the relatively deep valleys that exist between the island structures. Here, the height of the particles would be only a small fraction of the raised height of the island structures, which assures free water passage of coolant water in the abrasive coated valleys during abrading use. Individual abrasive articles can be converted from the plated abrasive web to form hand-lap tools, rectangular sheets, disks or endless belts which are made by welding or brazing the two ends of a web strip together. Raised islands can be in rectangular or annular band shapes. Abrasive particles can be plated directly onto the non-raised-island surface of a metal backing sheet web uniformly across the full surface of the web or the particles can be directly coated on the web sheet in rectangular or annular band island array patterns. Metals including steel can be used as a backing material and these web metals can be plated or coated with various materials for corrosion protection, or for other reasons, either before, or after, or before and after, the electroplating attachment of abrasive particles or composite abrasive agglomerates. The excess double thickness raised elevation abrasive particles can be removed or ground down by surface conditioning abrading contact to assure a monolayer of abrasive particles is plated on an abrasive article. Concentric annular bands of raised island disks can be produced from a web of sheet metal and individual annular disks not having a inner diameter backing material area can be cut out from the web sheet after the islands have been formed using a water jet cutter, a laser cutter or other machining or die cut punch equipment or processes. The annular disks can be individually separated before or after abrasive particles are attached to the top surface of the individual islands. Each individual annular raised island disk is preferred to be made of metal sheet material that is 0.003 inches (76.2 microns) or more thick in the island valley backing areas that do not have raised island structures. The metal annular ring backing would be stiff enough as a annular abrasive article to be used on a grinding or lapping machine with only reduced concerns about installing it flat on the surface of a platen and subjecting the metal backing article to aggressive abrading forces. These same abrading forces would typically cause problems when a weak annular disk made of thin flexible polymer backing material was used. A putty, grease or other sealing material can be applied to the annular disk inner radial edge after the stiff metal disk is installed flat on a platen to prevent grinding swarf from becoming lodged under the disk inner radius during a water lubricated abrading action. FIG. 80 is a cross-section view of a continuous metal web electroplating tank used to metal bond attach abrasive particles to the surface of a metal web. A wound roll 1150 of metal web 1152 is routed over idler rolls 1156 to traverse the length of an electrically insulated tank 1154 filled with an electrolyte 1158. Abrasive particles or abrasive agglomerates 1160 are introduced into the electrolyte 1158 and are deposited on the surface of the metal web 1152 where they become bonded to the web 1152 by electroplated metal to form abrasive particle coated web 1162 that is wound into a wound web roll 1164.

Deposited, Flattened Resin Drop Raised Islands on Backing

Problem: It is desired to create raised island structures on a surface of backing sheet materials, where the flat top surface of the island can be surface coated with abrasive particles to form an abrasive article having a flexible backing sheet. A simple method is desired to make mold masters of raised islands that can be used to make RTV rubber island cavity molds. Depositing adhesive island structure material on the surface of a backing sheet can be done with a method that establishes a flat top surface on each individual island where all islands have a uniform surface height from the backing sheet surface. It is also preferred that all of the islands have an equal height as measured from the backside of the backing sheet. Individual islands may have variations in island site locations, relative to idealized locations in an array pattern, and these islands may have variations in surface area sizes relative to idealized surface area sizes with little effect on the abrading performance of the final configuration abrasive article. However, it is critical that each island is firmly anchored to the backing sheet as an island structure breaking loose from a backing sheet can cause significant scratches on the surface of a workpiece during abrading action. Only insignificant forces should be applied to the island structures during the island backing sheet manufacturing process to prevent weakening of the island bond to the backing or creating stress weakness in the island mass. Solidified island structural materials need to be stiff, heat resistant, have a strong adhesive attachment to a backing material and must provide a surface to which abrasive particle resins can readily bond to with good particle attachment strength.

Figure 81:
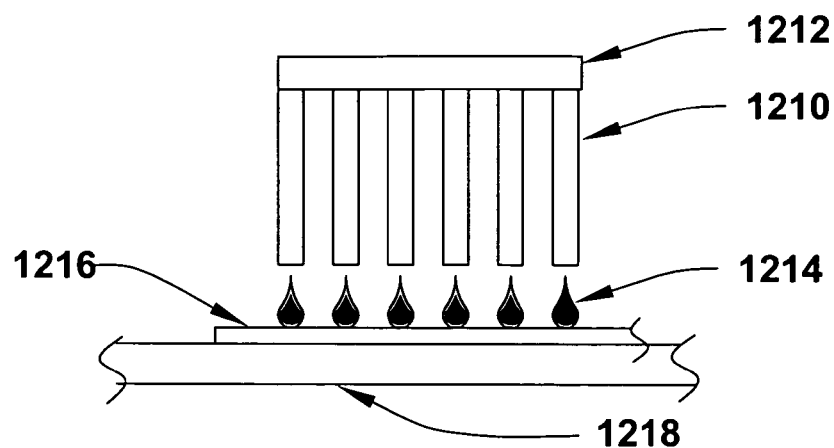
FIG. 81 is a cross-sectional view of tube-dispensed drops of island structure material.
Figure 82:
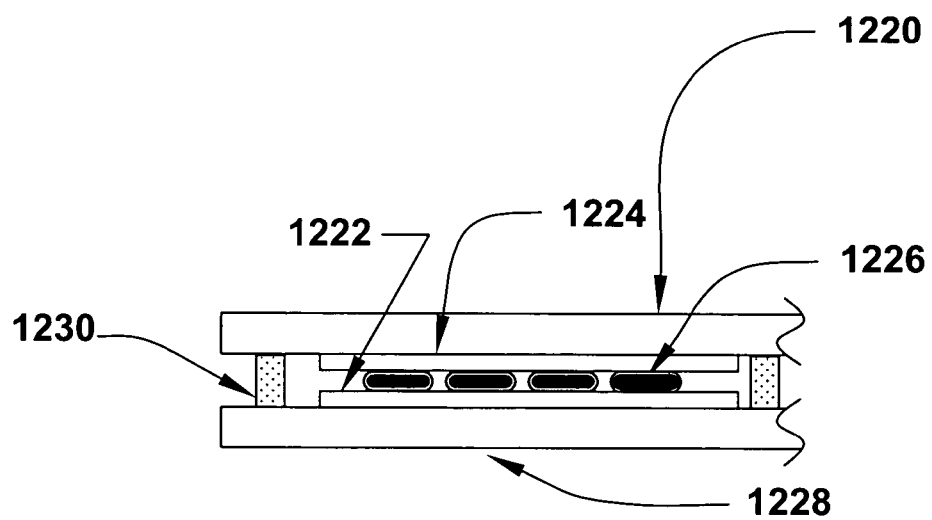
FIG. 82 is a cross-sectional view of flattened drops of island structure material.
Figure 83:
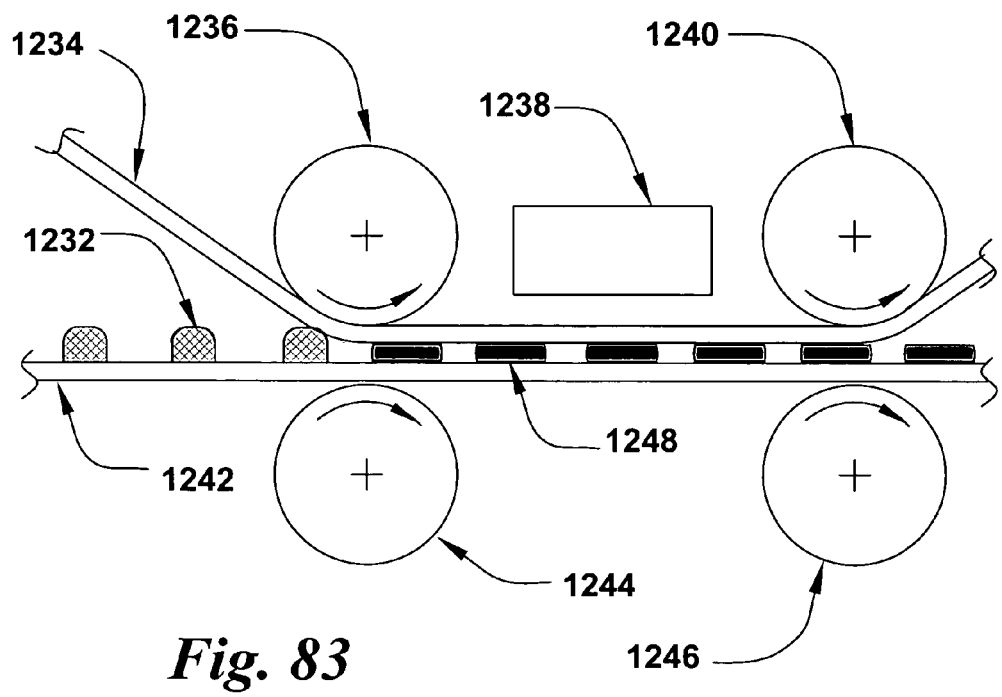
FIG. 83 is a cross-sectional view of island structure drops flattened with rolls.

Solution: Polymer resin materials such as epoxy resins, silicon resins, polyamides, polycarbonates, polyethylenically unsaturated resins (e.g., especially acrylate and methacrylate polymers) can be deposited in large drops at an array of island sites on a backing sheet where the height of the deposited liquid polymer drops exceeds the desired thickness of the formed islands. The resin would have sufficiently high viscosity that the resin drop shapes, or other island shaped resin forms, would substantially hold their free shapes after deposition on the backing (e.g., not lose more than 25% of their height within one minute or until the materials are further hardened as by heating, drying, photocuring, photohardening, etc.). After drop deposition, the backing sheet can be flat mounted on a precision flat surfaced backing support plate. Three or more equal-thickness gap spacers can be mounted at non-island sites on the backing surface, or the spacers can be mounted directly on the surface of the mounting plate at locations adjacent to the island polymer resin deposit sites. The spacers can be used to evenly support the distributed weight of a second plate when contacted by the plate. The second precision flat plate can be positioned in alignment with the spacers whereby the individual liquid polymer resin drops contact the flat surface of the second mounting plate when the second plate is brought in parallel close proximity to the backing support plate. The weight of the second plate will drive the top surface of the resin drops downward and also spread the individual liquid drop top surfaces locally along the plate horizontal flat surface. Spreading the polymer resin of each island included in the array of deposited drops results in flat island surfaces being formed along the contacting plate surface as the plate progressively compresses the drops. Flat island formation continues until the second plate surface is supported by the spacers. Spacers mounted on the backing surface provide a method to establish a uniform height above the backing sheet surface for all of the individual resin islands where the height is equal to the thickness of the gap spacers. A large drop of resin will produce a large surface area island and a small drop will produce a small surface area island using the same thickness height spacer. The rheological characteristics of the resin are important. If the resin has a significant thixotropic character, the elastic behavior of the resin fluid provides a spring force that has to be overcome by the flattening plate. The collected spring force of the full array of islands can minutely bend the plate flat surface that results in some of the islands having unequal heights due to the plate distortion. If the resin is fully Newtonian, the flattening plate will contact the spacers after a period of island formation time without plate distortion stresses. Solidification of resins is a process where the resin makes a transition from a fully plastic-flow character to a fully elastic-stiffness character so the plate flattening of the islands should take place prior to the island resin developing significant stiffness. As the islands are nominally low in elevation and the resin quite viscous, surface tension fluid forces will tend to prevent island shape distortion prior to island solidification. Vibration can be imposed on the plates or the plates can be oscillated to enhance the island leveling process prior to solidification. Upon partial or full solidification of the polymer, the second (upper) metal or glass mounting plate can be removed, leaving independent islands having the same thickness and flat top surfaces where the islands are adhesively bonded to the backing sheet. A mold release agent can be coated on the surface of the upper mold plate surface to prevent the island structure resin from adhering to the mold plate. Also, a thin release liner sheet having a uniform thickness may be positioned between the liquid island resin and the upper mold plate where the release liner sheet is separated from the islands after the upper mold plate is removed. It is necessary to use precision flat plates, precision thickness height spacers and precision thickness mold release coatings or release liners to achieve uniform heights of all the islands. The island heights can also be established relative to the backside of the backing sheet by placing the height spacers directly on the surface of the backing mounting plate. If the height spacers are mounted directly on the surface of the backing sheet, it is necessary to use precision thickness backing material to achieve equal heights of the islands relative to the backside of the backing. The release liner sheet material must be selected to minimize the surface contamination of island surfaces by the release liner that can impede adhesion of abrasive particle resin binders to the island surfaces. Deflection of the plate surfaces can be minimized with the use of structurally stiff plates. Island polymer resin may be unfilled or may be filled with glass beads, glass (or other) fibers, organic filler (e.g., wood flour) or other filler, reinforcing or modifying solid materials. The resin may be cured or solidified by chemical reaction to complete resin polymerization or by the application of energy, including heat, light, radiation or electron beam energy to solidify the resin by a polymerization reaction, or the resin solidification may be the result of a combination of chemical and energy induced reactions. Each island shape will tend to have smooth walls and a backing attachment base can tend to be slightly larger in area than the island top surface area. Island forming resin can be applied to form arrays of islands by individual resin application devices used repetitively to deposit controlled quantities of resin at individual island sites, or, by use of multiple resin deposition devices that simultaneously deposit many resin island deposits on a backing sheet surface. Resin deposit devices include resin fed individual hypodermic-type needle tubes sized to produce the desired resin drop size. Arrays of individual tubes that are resin fed by a common resin source can be used to produce arrays of resin island sites. Multiple tube sets can be used to deposit a annular segment of a annular band of resin islands and the group of island depositions repeated on the same disk backing to produce a full annular array pattern of islands. A full set of tubes may be used to deposit all of the annular bands of isles in a single deposition process. Each resin tube contained in a tube-set would have equal lengths and equal diameters to create equal sized island deposit drops at each deposition site when all of the tubes are resin fed from a common resin manifold source. Resin flow rates would be equal in all tubes as the flow resistance is the same in equal inside diameter and equal length tubes. A controlled quantity of resin would be injected into the common resin feed manifold to assure that the island sizes would be the same for all backing disks using the same resin deposition tube set. Island shapes include circular shapes with typical islands having cross sectional diameters of 0.125 inches (3.18 mm) and heights, measured above the backing surface, of 0.025 inches (0.64 mm). Radial bar shaped islands typically would have cross section widths of 0.125 inch (3.18 mm), radial lengths of 2.0 inches (51 mm) and heights, measured above the backing surface, of 0.025 inches (0.64 mm). Arrays of islands can also be formed on a continuous web backing and the island resin drops leveled in thickness relative to the back side of the web backing using one or more stations of space gapped calender rolls that contact a release liner web placed in contact with the liquid polymer resin islands. Each calender roll set would have precision ground roll diameters and the gap between the rolls adjusted evenly across the roll length that establishes a uniform height to all the islands relative to the backside of the backing. After partial solidification of the islands, the release liner web sheet can be separated from the islands that remain attached to the web backing. Rectangular arrays of islands can be attached to a continuous web by the simple incremental deposition of a line of resin island drops across the width of the web prior to the web entering the calender roll station. Annular band patterns of raised resin islands can also be deposited on continuous web material by controlling the resin drop pattern as the web backing advances under the resin deposition station. In the process of forming individual resin drops, small tubes having an inside diameter of approximately 0.030 inches (0.76 mm), that are 1.0 inch (25.4 mm) long can be used to form islands having a 0.125 inch (3.2 mm) cross-section diameter would be first brought into close proximity with the backing sheet to wet the backing sheet with resin as the resin is first injected onto the backing. The tubes would then be withdrawn upward from the backing surface as the resin continues to flow whereby the resin drop continuous to grow in size without resin build-up on the outside diameter of the resin tubes. When resin flow is interrupted, the tubes would continue to travel upward from the backing surface for some fixed distance. A filament strand of resin may be formed between the resin island drop and the end of the deposition tube, depending on the rheological characteristics of the resin material. Compressed air can be supplied to a small diameter tube and the air stream directed at the filament strand whiskers of web resin that are formed to either break them or separate them from either the tube end or the resin island drop. The high speed air jet from the air tube causes fracture of the resin filaments that, in turn, causes withdrawal of one end of the resin filament strand back toward the resin tube deposition end prior to the next resin drop deposition event. The island end of the filament will either withdraw into the island or will contact the backing sheet at another location with little effect on the performance of the final abrasive article as the filaments are very small volumetrically in comparison to the volumetric size of the islands. Curvature of the wall surface of a compression formed island of resin presents a rounded transition from the vertical wall to the horizontal island flat surface at the top of the island and another curvature from the island vertical wall to the backing surface at the base of the island. The amount of island wall transition curvature is a function of many variables including the viscosity and the surface wetting characteristics of the resin. The curvature can be minimized or maximized as desired by a number of methods including the selection of the resin material, controlling the temperature of the resin during the island formation process, and by applying vibration or other relative motion to the plates prior to resin solidification. FIG. 81 is a cross-section view of a group of tubes depositing drops of island structure material on a backing sheet. Hollow tubes 1210 joined in a tube manifold 1212 deposit island structure material drops 1214 on a backing sheet 1216 mounted to a plate 1218. FIG. 82 is a cross-section view of drops of island structure material that is flattened by compressing the drops between two flat plates. Flattened drops 1226 of island structure material deposited on a backing sheet 1222 are covered by a release liner sheet 1224 that is contacted by a flat plate 1220. The backing sheet 1222 is mounted on a flat plate 1228 and the top plate 1220 is forced downward until contacting spacers 1230 that are mounted on the lower plate 1228. FIG. 83 is a cross-sectional view of drops of deposited islands structure material flattened to a precision height by sets of gap-set calender rolls. Deposited structure material drops 1232 are located on the top surface of a backing sheet 1242 that is routed into a first roll set comprised of a top roll 1236 and a bottom roll 1244. The backing sheet or backing web sheet 1242 also is routed past a energy source device 1238 that supplies energy including heat, light or other resin solidification energy to the roll flattened island drops 1248. The web 1242 continues into a second calender roll set comprised of an upper roll 1240 and a lower roll 1246 that applies surface contact forces to the partially solidified islands 1248 to establish or reestablish the height of the islands 1248. A release liner sheet or web sheet 1234 contacts the upper surface of the deposited islands drops 1232 and flattened islands 1248. The release liner sheet 1234 prevents contact of the upper rolls 1236 and 1240 with the liquid resin islands 1232 and 1248. The height of the raised islands 1248 is established from the bottom side of the backing sheet 1242. Additional' sets of calender rolls may be used in sequence to establish the island heights but they are not shown.

RTV Raised Island Cavity Mold Masters and RTV Cavity Molds

Problem: It is desired to create RTV rubber raised island cavity molds with a simple, accurate and economical manufacturing process. These molds would be used to produce backing sheet articles having precisely shaped molded raised island structures that are attached to backing sheet surfaces. It is desirable that the island shapes be precise enough that the top surfaces of the raised islands do not have to ground flat in a separate process step prior to the coating application of abrasive particles to produce an abrasive sheet article. A simply constructed and accurate cavity mold master can be used to create a reverse replication RTV rubber island cavity mold having an array of island shaped cavity indentations on the surface of the rubber cavity mold. It is necessary to create a RTV cavity mold where the island shapes have precisely flat island topside surfaces and where the island shape flat surfaces are positioned at an exact depth in the mold cavity from the localized regional surface area of the mold that is located directly adjacent to each individual island shaped cavity. When an precision thickness backing sheet is held in flat conformable surface contact with this RTV cavity mold having island cavities filled with a liquid resin island structure material until the resin solidifies, the backing sheet article produced by this island molding process has raised island shapes integrally attached to the surface of the backing sheet.

Figure 84:
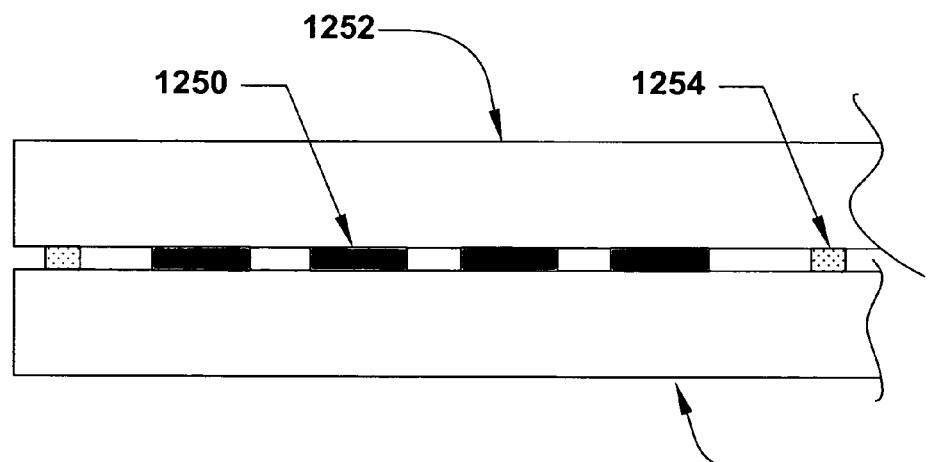
FIG. 84 is a cross-sectional view of flattened drops of island material on a mold master.

Solution: In one embodiment, mold masters of raised island structures can be created with a process of depositing individual drops of island resin materials on the surface of a first flat plate and flattening these islands to a uniform height by contacting the liquid resin islands with a second flat plate that is separated from the first plate by precision thickness spacers. Resins, polymers, polymer resins and resin polymers used in the specifications, claims and description sections of this document are descriptions used interchangeably and are defined as organic and inorganic resins that can change from a liquid to solid state due to polymerization reactions accelerated by energy sources or chemical reactions or a combination thereof or are organic materials that can be changed from solid to liquid states by heating and from liquid to solid states by cooling. After the resin has solidified and the second plate is removed from the contact with the islands, a RTV rubber mold may be cast of the raised islands attached to the first plate. The cast RTV rubber mold may then be used to create polymer resin island structures that are adhesively bonded to the surface of backing sheets by a number of manufacturing processes. This technique of forming island structures on the surface of a flat plate is exceedingly simple, economical and can be accomplished in a short period of time with non-sophisticated production equipment. First, a set of structurally stiff mold plates, preferably made of metal, are prepared that have precision flat surfaces that are flat relative to each other preferably within 0.0001 inches (2.5 microns) at any location on the plates where the plate will contact an array of island structure drops. It is not necessary that each of the two plates, the first plate or the second plate, are flat across their whole island array surface area within 0.0001 inches (2.5 microns). If one plate has some out-of-flatness areas in the island array area, it is only necessary that the other matching plate has a matching surface distortion that duplicates the first plate. These local area distortions are allowable as the flexible backing sheets that are used with the cavity molds will typically conform to the plate surface distortions but the parallelism between the plates is important as the variation in the equal height of individual island structures is determined by the precision of the matching plate parallelism. It is desired that both plates have smooth surface finishes in the island deposition areas. Drops of liquid island structure resin material is preferably controlled in volume to within 15% of a average value are deposited at island array sites on the precision flatness surface of a first plate. The precision flatness surface of a second plate is brought into contact with the surface of the deposited resin drops thereby squeezing the resin into island areas having a prefered area size and area height. The island area heights are established in this resin compressing process by the use of spacers that are positioned between the two matching plate surfaces where the island heights are equal to the thickness of the plate gap spacers. A mold release agent can be coated on the island resin contacting area of the second surface or a release liner sheet may be positioned between the second plate and the contacting island resin material to prevent adhesion of the resin to the surface of the second mold plate. Contamination of the island contacting surfaces by a mold release agent is not a problem as this master mold is used only to create a RTV cavity mold. If desired, the solidified island top surfaces can be cleaned of residual release liner agent material with the use of solvents or other cleaning agents or by abrasive island material removal action. The release agent material is also prevented from becoming transferred to the RTV mold cavity internal surfaces by the reverse replication RTV rubber molding process where the final RTV mold is formed of the mold master having attached raised island structures. Elimination of the mold release agent from the cavities prevents weakening of the bonding strength of abrasive particles that are attached to the island tops when the island tops are resin coated with abrasive particles in a subsequent abrasive article production step. A wide variety of resin materials can be used to form the master island shapes including epoxy, polyester, phenolics, RTV silicone rubber and other materials and the polymer materials may be unfilled or they may be filled with glass spheres, or other filler materials. After the resin has solidified, the second mold plate is separated from the islands and the release liner sheet, if used, is removed. Raised island solidified resin structures are now attached to the surface of a mold plate having a precision flat and smooth surface that results in the formation of a mold master. This mold master having raised island structures attached to its surface can be used to create molds having island cavities indentations on its surface. A RTV rubber mold can be cast of the mold master raised islands to form a island cavity mold that has an array of open cavity void island shapes that are present on the surface of the RTV cavity mold. After separation of the newly cast solidified RTV island cavity mold from the mold master, the mold casting process can be repeated using the same master mold and other RTV cavity molds can be produced. The combined use of a precision thickness backing sheet and careful mold filling and resin curing procedures can result in the production of a raised island sheet article where the variation in the average thickness of the island sheet article as measured from the top surface of the islands to the back non-island side surface of the backing sheet is less than 50% of the size of the abrasive particles or agglomerate particles that are coated on the island flat upper surfaces when an abrasive sheet article is produced from the island sheet article. The process of forming a precise RTV cavity mold master as described here can provide a mold cavity forming process that produces mold formed islands of sufficient precision to allow avoiding the top surface grinding of the raised island surfaces on a island structure backing sheet to develop a uniform height of each island. The island grinding process of the mold master backing plate requires that both surfaces of the backing plate be very precisely parallel in addition to being precisely flat across the full island-site surface area of the plate. FIG. 84 is a cross-section view of drops of island structure material that are compression flattened on the surface of a mold master plate. Flattened drops 1250 of island structure material are deposited on a mold master plate 1256 where the drops 1250 are contacted by a upper flat plate 1252. The upper top plate 1252 is forced downward until contacting spacers 1254 that are mounted on the lower mold master plate 1256.

In another embodiment, a flexible backing sheet having attached raised island structures can be used as a master to produce a RTV rubber island cavity mold. If desired, raised islands not having precision heights can be deposited on the surface of a flexible backing sheet having a precise thickness and all of the islands then ground to a precision thickness measured from the back (non-island) side surface of the backing sheet. As the backing sheet has a precision thickness, the height of the islands measured from the island side of the backing sheet is also a precision height. A RTV rubber cavity mold can be constructed from this backing sheet having attached raised islands by RTV molding process techniques. Raised islands can be formed on the surface of backing sheets with the use of this RTV cavity mold. Raised island backing sheets that have a sufficient height accuracy after island surface grinding can be produced by a variety of techniques including the deposition of resin drops or resin bars on a backing, injection molding resin into island shapes on a backing, by the use of RTV or solid material island cavity molds or by the use of RTV molds produced using thin island-hole font sheets. Backing materials that have thickness variations of less than 0.0001 inch (2.54 microns) are sufficiently precise for this application. Flat molding plates can be constructed of relatively inexpensive materials by use of precision flat glass that is commonly used in the semiconductor industry. Thin glass plates can be fabricated into structurally stiff sandwich plate members by bonding a thin glass plate to a stiff backing plate by applying drops of adhesive to the surface of the glass plate, standing the glass plate vertically on one edge adjacent to the backing plate until the adhesive drops that are commonly bonded to both plates solidify. The vertical position of the thin glass plate minimizes the glass out-of-plane gravity induced distortion that can occur during the plate sandwich bonding of the glass plate to the backing plate. Significant glass plate distortion can occur if the glass plate is positioned in horizontal contact with the backing plate during the solidification of the bonding adhesive when the flat sandwich plate is constructed in the horizontal position.

Figure 85:
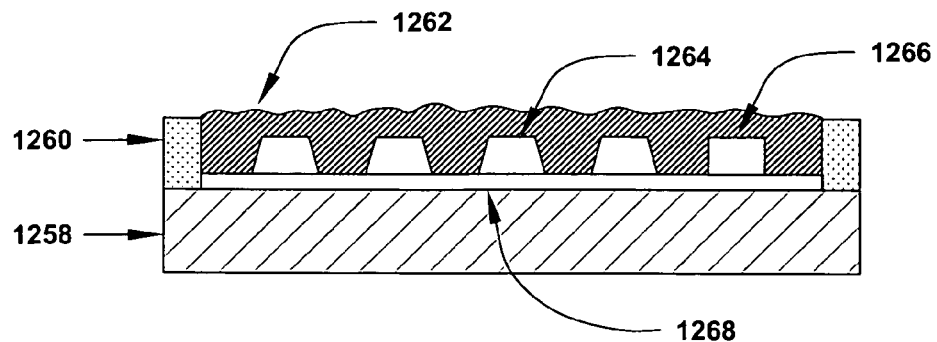
FIG. 85 is a cross-sectional view of a RTV mold of a master sheet with raised islands.
Figure 86:
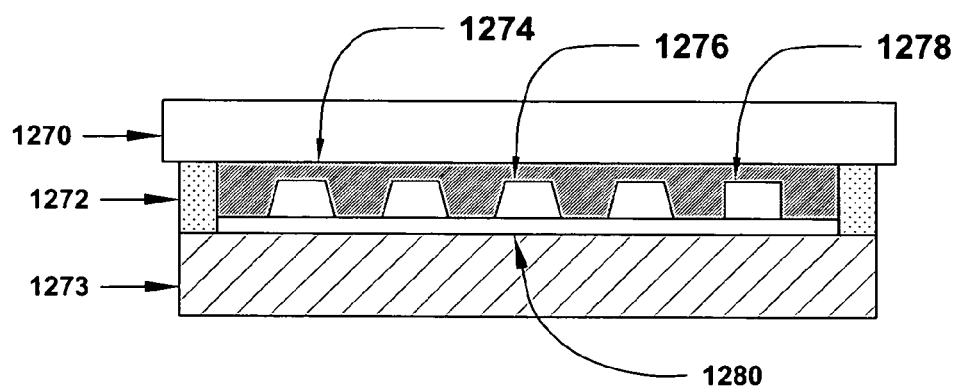
FIG. 86 is a cross-sectional view of a flat-based RTV mold of a sheet with raised islands.
Figure 87:
FIG. 87 is a cross-sectional view of a flat-based RTV rubber island cavity mold.
Figure 88:
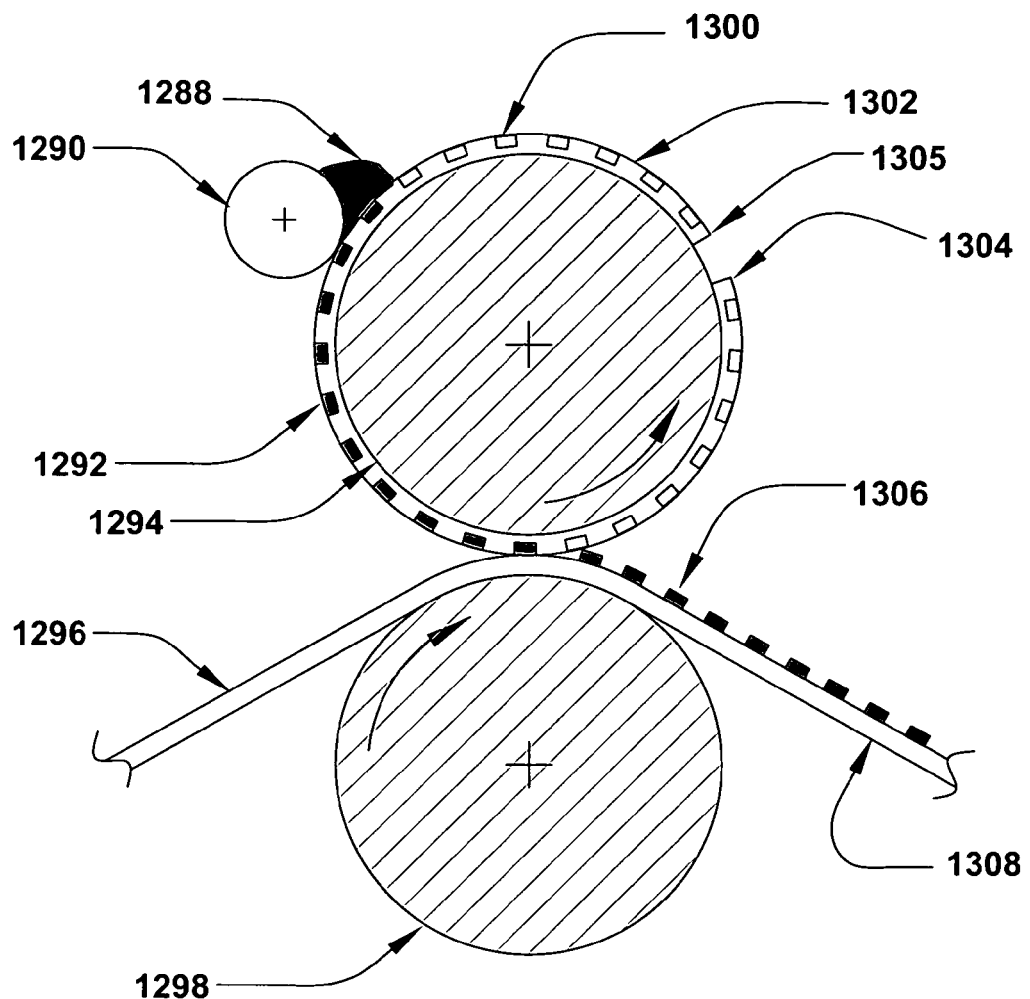
FIG. 88 is a cross-sectional view of a flat RTV cavity mold on a molding cylinder.
Figure 89:
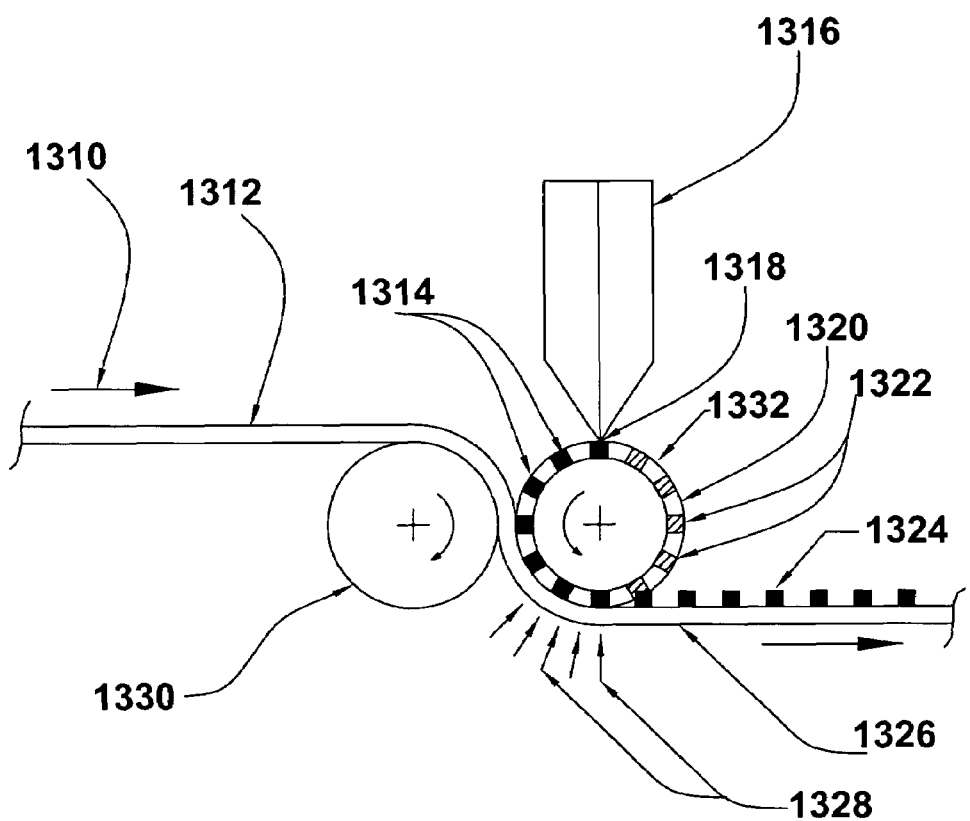
FIG. 89 is a cross-sectional view of a flat RTV cavity mold on an extrusion roll.

In addition to flat RTV molds that can be used on a batch basis to produce individual backing sheets having raised island structures, a similar RTV mold production process can be used to produce a thin flat bottomed cavity mold that can be attached to the surface of a roll to produce array patterns of raised islands on a continuous web backing material. The RTV cavity mold can also be attached to a thin metal, plastic, or other non-metal flexible backing sheet that can be attached to a roll surface similar to the mounting of a printing plate to a printing roll. As RTV rubber does not readily bond to a metal or plastic sheet, a woven mesh screen material may be first adhesively bonded or brazed to the backing sheet after which the RTV rubber can be molded to the screen surface. The RTV material contacting the screen would become entrapped by the woven screen wires that provides a mechanism to bond the RTV mold form to the backing sheet. Also, a RTV cavity mold can be prepared as a continuous-surface cylindrical mold sleeve that can be mounted on the cylindrical surface of the mold roll. The island cavity array pattern may be continuous around the circumference of the roll that allows a continuous pattern of raised island arrays to be attached to a continuous web backing sheet. A RTV covered roll can be constructed where a continuous island array or patterns of island array exist on the RTV roll surface by coating the roll radial face surface with liquid RTV material, also coating a flexible mold backing sheet having raised islands on the island side surface, wrapping the island backing sheet on the surface of the roll and holding the island sheet in place until the RTV solidifies. Then the island mold backing sheet is removed from the roll surface. The raised islands on the mold backing sheet provide island cavity indentations on the surface of the RTV rubber that covers the roll. Small diameter and rigid circular shaped mold islands will tend to hold their island flat surfaced shapes when the backing sheet is wrapped around the roll. Flexible materials can be used to form the island shapes that allow the islands attached to the mold backing sheet to conform to the roll diameter as the backing sheet is wrapped around the roll. Island cavity mold shapes that have curved island top-surfaces that conform to the roll cylindrical surface can provide non-curved flat island surfaces of the islands that are attached to a flexible backing sheet that is separated from the island casting mold roll. The backing sheet having curve shaped attached islands can be mounted in a flat surface position prior to full solidification of the island shapes wherein the island top surfaces tend to develop the same flatness as the backing sheet support plate. Resin material may be introduced into the surface cavities of a cavity roll by a number of different techniques including a resin nip roll system and a resin extruder system. FIG. 85 is a cross-sectional view of a RTV mold of a master sheet having attached raised island structures. A backing sheet 1268 having attached tapered wall raised island structures 1264 and straight wall island structures 1266 is mounted flat on a mold plate 1258. RTV rubber material 1262 is constrained by mold edge dams 1260 that are mounted to the mold base plate 1258. FIG. 86 is a cross-sectional view of a flat based RTV mold of a backing sheet having raised island structures. A backing sheet 1280 having attached tapered wall raised island structures 1276 and straight wall island structures 1278 is mounted flat on a mold plate 1273. RTV rubber material 1274 is constrained by mold edge dams 1272 that are mounted to the mold base plate 1273. A upper flat mold plate 1270 contacts the edge dams 1272 and forms a flat top surface of the RTV material 1274. FIG. 87 is a cross-sectional view of a flat based RTV rubber island cavity mold. A RTV flat bottomed rubber island cavity mold 1282 has tapered wall cavities 1284 and straight wall cavities 1286. FIG. 88 is a cross-sectional view of a flat RTV cavity mold mounted on a molding cylinder. A continuous web sheet 1296 is routed through the roll nip area between a upper cavity plate roll 1294 having a flexible RTV island cavity plate 1302 mounted on its surface and a lower nip roll 1298. As the rolls 1294 and 1298 mutually rotate, island structure resin material 1288 is pressed into the island cavities 1300 by a resin nip roll 1290 to create resin filled cavities 1292. One cavity plate end 1304 is shown close to the other cavity plate 1302 end 1305. Solidified raised island structures 1306 are attached to the out-going backing sheet section 1308. Both rolls 1294 and 1298 may be heated or cooled (not shown) and external energy sources (not shown) may have their energy directed at one or both rolls 1294 and 1298 or energy sources (not shown) may be directed at the web sections 1296 or 1308 or the energy sources may be directed at a combination of the rolls 1294 and 1298 and the webs 1296 and 1308. The separation between the plate ends 1304 and 1305 may be quite small as the plate ends 1304 and 1305 may be butted together. Island cavities 1300 can be located some distance from the plate ends 1304 and 1305. FIG. 89 is a cross-sectional view of a RTV cavity mold on an extrusion roll. A continuous web 1312 travelling in the web direction 1310 is routed into a roll nip area formed between the nip roll 1330 and island cavity roll 1332 that has open island cavities 1322 on the roll 1332 surface that is covered with a RTV cavity plate 1320. A resin extrusion die 1316 injects resin 1318 into the non filled cavity holes 1322 to produce resin filled cavities 1314. Solidified raised island structures 1324 are attached to the out-going web 1326. A energy source 1328 directs energy toward the web material 1326.

Injection Molded Raised Islands

Problem: It is desired to attach raised island structure material on a backing sheet where the islands have consistent height shapes and are strongly bonded to either individual disks or rectangular sheets. These raised islands can be coated with abrasive particles to create an abrasive sheet article.

Figure 93:
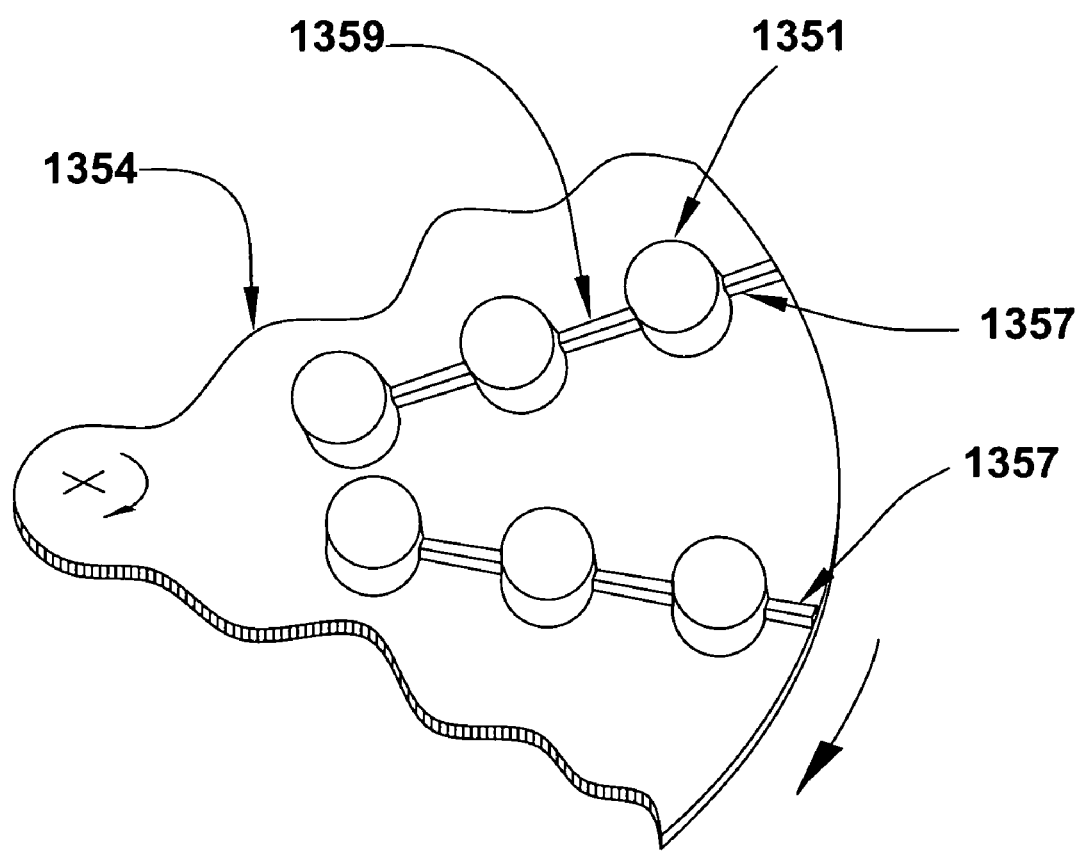
FIG. 93 is an isometric view of injection molded raised islands on a backing sheet.

Solution: Individual raised island structures can be attached directly to the surface of a backing sheet in an annular array pattern by injection molding a resin into mold island-shaped cavities located on the surface of a RTV rubber mold that is covered on its surface with a disk backing sheet. The backing sheet is held in pressurized flat contact with the mold plate during the resin injection process. Polymer island resin material is injected into the mold cavities is also in resin wetted contact with the backing surface. The resin can flow freely from one island mold cavity to an adjacent mold cavity via open trench passageways that connect each of these cavities that are positioned in a radial line. A number of radial line strings of interconnected island cavities located in evenly spaced tangential positions collectively form an annular array pattern of island cavities. When the resin is solidified, the raised island shapes formed by the cavities are adhesively attached to the backing sheet that is removed from the mold and the island molding process is repeated. If a coating of resin is applied to the backing sheet prior to the backing sheet being mounted in this resin contact with the flat mold plate surface, variations in the applied resin thickness can introduce a corresponding change in the height of locally positioned islands. These island height variations occur as any excess coated resin fluid can become trapped between the flat surfaces of the backing sheet and the mold plate thereby increasing the height of the islands located at the position of the excess resin. Increasing the total thickness of the island backing sheet article as measured from the backside of the backing to the top of the island increases with an excess thickness of the flat sheet resin coating as the resin coating thickness is added to the cavity depth to establish the total sheet thickness. Excess resin thickness can also result from an excess of resin contained in a mold cavity shape prior to placement of the backing sheet in contact with the cavity mold surface. Chemical or energy solidified polymer resins including epoxy, polyester, acrylic or phenolic resins can be used to form raised island structures. The resin can be an uncured liquid or a molten polymer. Resins must have good adhesive qualities to create a strong bond with the backing sheet and epoxy resin, that is well known for its superior adhesive qualities, is preferred. Glass fiber, wood flour, glass beads or other filler material can be added to the island polymer to increase the modulus of elasticity and, or, the heat distortion temperature of the resin formed islands. A island cavity mold can be constructed of metal or other materials including room temperature vulcanized (RTV) rubber that has a service temperature of 500 degrees F. As rubber is nearly incompressible when volumetrically constrained by a mold cover plate and a conforming rubber mold support body, the rubber mold will not deflect substantially under the modest mold clamping forces that are required to hold the mold system components in intimate flat contact during the time the resin is injected at low pressure into the mold cavities. The dimensional structural stability performance of the RTV rubber will be similar to a stiff metal mold during the time of resin injection but the RTV mold will provide superior adhesive release characteristics that are important when the resin island shapes are separated from the mold cavities. Island shapes can be injection molded to individual rectangular backing sheets, to circular disk sheets or to continuous web backing material. A large clamping force can be applied, if desired, to the backing sheet flat surface during the time of injection of the resin to minimize leakage of the resin out of the cavity shapes and onto the backing surface adjacent to individual cavities. Mold backing sheet clamping forces can be reduced during the final portions of the resin injection process to reduce mold island shape distortion. The only critical island shape dimension is the distance between the island flat surface and the backing sheet surface as this distance establishes the height of the island above the backing surface. To produce an annular band array of raised islands, an RTV circular shaped rubber mold can be contained in a metal housing, a oversized disk backing sheet can be mounted on the RTV mold cavity surface, a flat top plate mounted on the backing sheet and the whole assembly force clamped together when the polymer resin material is injected at one or more tangential points on the outer circumference of the RTV mold. The polymer resin can travel in narrow and shallow runner radial passageways to each island cavity, filling each cavity, wetting the surface of the backing sheet and progressing to the next cavity via another runner. The runners would be less than one half the height of the island cavities. Other tangential polymer passageway segments can be used to feed resin to each radial set of island cavities. Air pushed out of the line of cavities by the resin progressively entering the cavities can be exhausted from inner radius of the RTV mold by use of a central vent tube. After solidification of the resin, the backing sheet having attached raised island structures can be separated from the RTV mold. The outer passageway ring of solidified resin and any resin feed sprues can be removed from the backing disk by cutting the outer perimeter of the backing disk away from the disk central portion, thereby leaving a backing disk having integral raise island shapes attached to the backing sheet. Rectangular or annular band arrays of islands can be attached to backing sheets or to a continuous web using RTV rubber mold plates or RTV rubber continuous mold belts and other similar methods to produce disks having annular patterns of raised island structures. Rectangular backing sheets can be held in pressurized flat contact with a RTV cavity mold and resin can be injected into mold cavities that are interconnected with shallow resin runners that feed resin into the mold cavities. The resin also contacts the surface of the backing material that is held in force contact with the mold surface during the time of injection of resin into the cavities. Resin can be simultaneously fed into all the separate lines of interconnected cavities on one side of the backing sheet until all of the cavities in each cavity-line is filled with resin. After solidification of the resin the rectangular sheet having integral attached raised islands can be separated from the mold and the island molding process repeated on a new sheet of backing material. Portions of the backing having unwanted resin sprues or resin feed bands can be cut off from the backing and discarded, leaving a backing material sheet having attached raised island structures. The resin sprues would comprise a vertical cylinder of resin that is formed when the resin contained inside the vertical resin feed tubes is solidified. The sprues would be attached to the island backing sheet. A cut-off knife that is suitable for trimming off the outside annular portion of the disk can be a section of razor blade material that is formed into a end-butted circular cut-off rule-die. Other methods can be used to cut off the unwanted exterior annular ring includes a water jet cutter, a circular punch and die set or a razor blade held in contact with the backing as the backing sheet is rotated. The sprues, that extend above the height of the raised island structures, remains with the discarded outer annular ring. FIG. 90 is a cross-sectional view of raised island structures injection molded on the surface of a backing sheet. A disk backing sheet 1354 is held in force contact by a upper flat plate 1356 acting against a RTV rubber cavity mold 1372 that is in contact with a disk spacer sheet 1368 that is supported by a mold body 1370. The spacer sheet 1368 may be a resilient material that allows the backing sheet 1354 to fit tightly against the mold 1372 surface to compensate for dimensional variations in the flatness of the contacting members including the sheet 1354, the plate 1356, the RTV mold 1372 and the mold body 1370. A clamp plate 1352 used to apply a mold assembly clamping force to a clamp ring 1360 that is forced against the plate 1356. Island foundation resin material is forced into resin feed tubes 1362 positioned at the outer diameter of each radial row of island cavities 1350 that are joined together by resin slot runner passageways 1358. Pressurized air can be injected into a combination exhaust and air injection tube 1366 that is located at the radial center of the mold 1372 to aid in separation of the backing sheet 1354 from the mold 1372. Air pushed out of the island cavities 1350 can be exhausted from the area between the backing sheet 1354 and the surface of the mold 1372 by the dual-purpose exhaust vent and air injection tube 1366. FIG. 91 is a cross-sectional view of an outer periphery section of a circular backing sheet having integral injection molded raised island structures. Solidified resin raised islands 1351, resin raised island runner lines 1359 and island resin sprues 1363 are all attached to a circular disk backing sheet 1354. A cut-off knife 1374 is shown positioned at the location where an outer periphery annular band is to be cut off from the inner portion of the backing disk 1354. The knife blade 1374 penetrates the backing 1354 and the runner line 1359. FIG. 92 is a cross-sectional view of a section of a trimmed backing sheet having integral raised islands and shallow depth runner lines. The backing sheet 1354 has raised island structures 1351 and raised elevation resin runner lines 1357 and 1359, all of which are adhesively bonded to the backing sheet 1354. FIG. 93 is an isometric view of injection molded raised islands that are adhesively bonded to a backing sheet. Raised island structures 1351 and resin runner lines 1357 and 1359 are attached to a backing sheet 1354. The runner line 1357 is shown shorter than the runner line 1359 as the original runner line 1359 was cut during the trimming operation that removed the outer periphery annular ring portion of the original injection molded backing sheet to leave a backing sheet without attached high elevation resin sprues.

Radial Injection Molded Raised Islands

Problem: It is desired to produce disk backing sheets having an annular pattern of raised island structures that can be surface coated with abrasive particles to create an abrasive sheet article.

Figure 94:
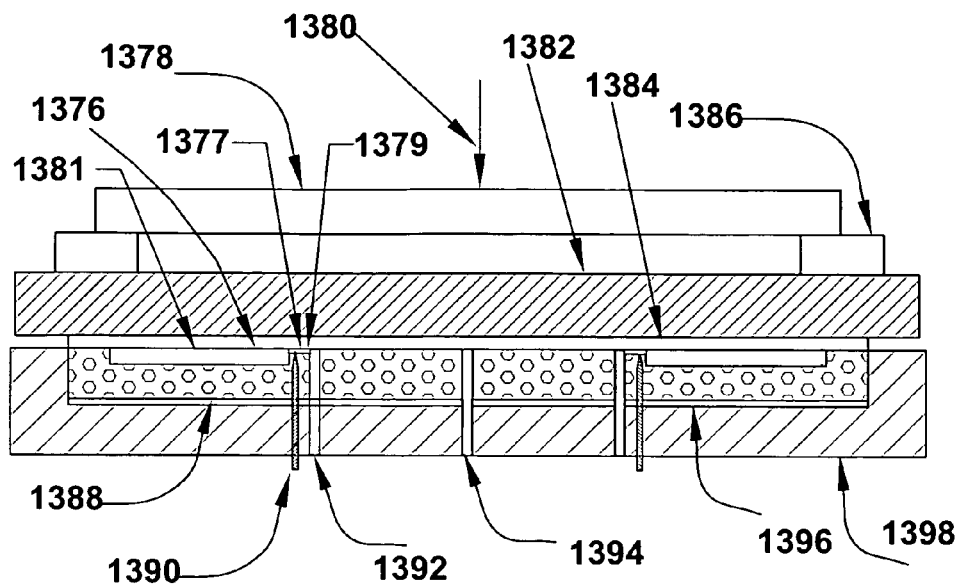
FIG. 94 is a cross-sectional view of islands injection molded on a backing sheet.
Figure 95:
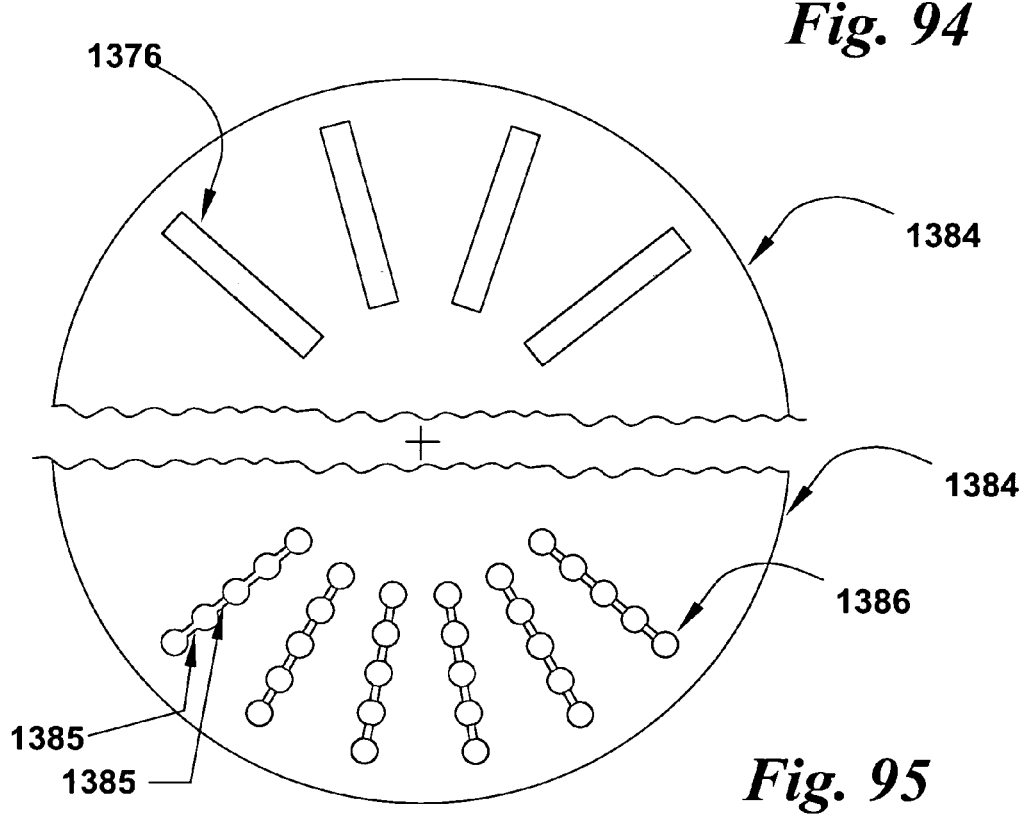
FIG. 95 is a top view of radial bar and circular islands injection molded on backings.

Solution: Array patterns of raised islands can be injection molded in a single operation on the surface of a flexible or rigid backing disk to form an annular band of raised islands with each island having an equal height measured above the island-side surface of the backing sheet. Polymer resin can be fed into the inner radius end of a radial island shaped mold cavities until the individual radial island cavities are full of resin and the resin also is in wetted contact with the backing sheet surface. Entrapped air that is pushed out of the island cavities by the incoming resin is exhausted at the outside diameter position of the radial aligned cavities. Raised island shapes include a aligned string of interconnected circular islands and single entity radial bar shaped islands. Resin can be introduced into the inner radial end of the island shapes through a shallow-height resin runner passageway and the resin can travel the full length of the radial island until it reaches the outer radial end of the island shape. The backing disk sheet is clamped flat to the cavity mold with sufficient force to prevent passage of the highly viscous resin from the cavity at the backing sheet surface. Pressurized trapped air having a very low viscosity compared to the resin viscosity is exhausted from the cavities by allowing the air to pass in the in the contact area between the backing and the cavity mold flat surface. Exhaustion of the entrapped island cavity air is similar to that which occurs with the passage of air from plastic injection mold cavities during the process of injection molding plastic articles. A island-free and runner-line free gap will exist at the outside diameter border of the raised island backing disk sheet. If desired, narrow and shallow air exhaust runner passageways can be provided in the mold at the ends of each radial island. Resin that fills the runners solidifies and develops solid-resin runner lines which will leave a small raised radial lines of resin in the outer radius island-free gap that are attached to the backing sheet and connected to the raised island structures. The small fluid runner lines that originate in the runner passageways used to transport resin into cavities and from cavity to cavity and passageways used to bleed air from the cavities have very little effect on the performance of the finished abrasive particle coated raised island product when the article is used at high rotating speeds during abrading action. A typical runner would be 0.010 inches (0.254 mm) deep and 0.030 inches (0.76 mm) wide when used with circular island shapes having cross sectional diameters of 0.125 inches (3.18 mm) and heights, measured above the backing surface, of 0.025 inches (0.64 mm). The solid-resin runner lines are narrow, shallow in depth, and are aligned radially with the raised islands. These raised resin runner lines will have little effect on the hydroplaning performance of the final-product abrasive disk article as sufficient fluid clearance gap will exist between the radial runner line and the workpiece surface to allow free coolant water or other coolant fluid passage without developing a significantly thick localized fluid boundary layer that will tend to raise the workpiece from the surface of the abrasive. Coolant used in the rotational abrading process can pass freely between radial island structures in a outward radial direction as the shallow raised runner lines are aligned in the center position of the radial islands and therefore do not block the radial coolant flow. Resin can be fed into the radial cavities by individual feed tubes positioned at the inside diameter of each radial island cavity. Also, resin can be fed into all the radial cavities with the use of a common annular resin manifold feed ring having independent radial resin gap openings for each radial island. The resin manifold can be positioned in flat contact with the backing sheet and can use a single central resin supply pipe. After injection of resin into the radial cavities, the annular resin manifold can be withdrawn from contact with the backing, either before or after solidification of the resin. Molds can be fabricated from a variety of materials including RTV rubber, aluminum, steel or from a number of polymer materials including polyethylene. Island shapes include narrow radial bars and a radial string of islands joined with narrow and shallow fluid cavity-to-cavity passageways that are one half or less the depth of the raised island cavities. A number of design features can be included in the injection island molding system to improve the quality of the island shapes or to increase the production rate of a single island injection molding system. The island injection mold system is basically a very low pressure molding system, particularly as compared to a plastic injection molding system. The corresponding mold plate clamping forces are quite low and the molding equipment component parts do not all require very precision component parts to achieve close enough matching surface fits to successfully contain the injected resin. RTV mold materials conform to matching surfaces under low clamping forces. RTV is attractive as a island cavity mold material as it is durable and tough, it can be used to produce precisely accurate multiple copies of a single mold master and the mold can be readily modified to add features such as resin runners. Furthermore, the RTV material has exception mold release characteristics that is useful for the separation of the backing sheets having attached raised islands without damage to the mold or damage to the island structures and the adhesive bond of the island structure to the backing sheet is not weakened by the resin adhering to the mold. The portion of the mold plate that contacts the backing in the annular area can be independently heated to accelerate the solidification of the injected resin at the island sites. The central area can also be independently cooled to extend the fluid characteristics of the resin contained in the resin distribution system during the time that the deposited islands are solidifying by slowing down the resin polymerization process. The resin contained in the inlet trench resin feeders, or runners, that span the heated outer area and the cooled inner area may not be fully solidified when the backing sheet containing the deposited islands is separated from the mold surface. However, the uncontrolled shape formation of the resin remaining in these runner areas is not significant to the performance of the finished product abrasive article as the runners are small in size and do not have the same raised height elevation as the adjacent and connected raised island structures. A number of mold resin flow design techniques can be utilized to limit the quantity of non-solidified resin that is left in the runners when the backing sheet is separated from the mold. Resin runner fluid flow techniques include the use of a movable knife blade that collapses the flexible RTV rubber in the runner area prior to resin solidification to provide separation of the resin inlet fluid from the island cavities during the mold cavity resin solidification process. Tubes can be incorporated into the inner diameter portion of the mold system to allow pressurized air to be injected between the backing sheet and the cavity mold surface to aid in separating the backing sheet from the mold after solidification of the island resin material. Cycle rates may be less than one minute for the batch production of individual backing sheets having attached injection mold raised island shapes from a single 12.0 inch (30.5 cm) diameter annular mold system. Resins can be solidified or cured by a chemical reaction or the resins can be solidified by the use of an energy source including heat or light or electron beam or by a combination of both chemical reaction and energy polymerization. Resin materials include epoxy, polyester, phenolics, acrylics, and others and may be unfilled or filled with materials including glass spheres, glass fibers, wood flour, and other materials. Epoxy resins are desirable for their adhesive qualities but they are typically more expensive than other resins. Solvents can be used with different resins and the island shrinkage that occurs upon evaporation of the solvent is not significant to the performance of a abrasive sheet article as all of the islands would shrink the same amount. The backing sheet can be removed from the mold upon resin solidification and the process repeated within a short time. Production equipment can be designed using this injection molding technique to allow islands to be molded on a continuous web sheet. Abrasive particles can be coated onto the top surfaces of the islands in the as-injection-molded form where they are attached to the surface of the backing sheets. Island height variations can be minimized by rollers prior to coating the island surfaces with abrasive particles. Also, the islands can be ground to the same height and then coated with abrasive particles. FIG. 94 is a cross-sectional view of islands that are injection molded on a backing sheet. A backing sheet 1384 is held in flat contact with a flexible RTV rubber mold 1388 that has island shaped mold cavities 1376. The mold 1388 is supported by a spacer sheet 1396 that is mounted in a mold body 1398. A top mold plate 1382 is held by clamp force 1380 contact with the backing sheet 1384 by the clamp force 1380 acting upon a clamp ring 1378 that transfers force to a annular ring 1386. Resin 1379 is introduced into the radial island cavities 1376 through a resin feed tube 1392 that injects resin 1379 into a resin runner 1377 that can be collapsed by a movable flow control blade 1390 to interrupt the flow of resin 1379 into the mold cavity 1376. Compression of the runner 1377 by the resin control blade 1390 also separates the resin 1379 contained in the resin feed tube 1392 from the resin 1379 contained in the cavity 1376 from the mold 1388. Pressurized air can be injected into the air tube 1394 to aid in extracting the backing sheet 1384 having solidified resin island structures 1381 from the cavity mold 1388. FIG. 95 is a top view of radial bar and circular shaped island structures injection molded on the surface of sections of backing sheets. The backing sheet 1384 has radial bar shaped islands 1376 and a radial string of circular shaped islands 1386. The circular islands 1386 are commonly joined with low elevation resin runners 1385.

Other techniques can be used to fill the island cavity shapes with resin including filling the cavities by a spin-molding process where the resin is introduced at the mold center of a rotating mold and the resin is forced into the island cavities by the centrifugal forces generated by the rotation of the mold. Island cavity filling techniques also include the use of vacuum to draw resin into the mold cavities. Furthermore, vacuum can be used to draw RTV rubber liquid into a mold to form RTV rubber cavity molds. Vacuum can be applied at one end of a mold cavity to draw the typical high viscosity resin or rubber into the cavities with sufficient negative air pressure (greater than 400 mm Hg pressure) to substantially reduce the occurrence of air bubbles in the liquid resin. The vacuum can be released prior to or during the time of resin solidification to reduce the out-of-plane distortion of the mold plates due to the external plate forces that are induced by the vacuum. Different combinations of the RTV and resin island molding techniques described can be used to create island cavity molds and raised island structures on backing sheets or on backing plates.

Parallel Surface Island Plates

Problem: It is desired to have rectangular plates or circular platens that have flat surfaces that are parallel to each other, preferably within 0.0001 inches, to provide the capability to flatten liquid resin deposited islands on a backing sheet. When the resin island sheet is contacted between the two flat surfaces, the height of the top surface of the islands is controlled relative to the backside surface of the backing sheet. Providing a plate surface having good adhesive release characteristics allows the plate to be separated from the solidified island resin material. The primary use of parallel mold plates is for flexible backing sheets used for abrasive articles.

Solution: Because the island height molding operation is done when the mold plates are stationary, during the time period when the resin is solidifying, and the backing is flexible, it is not necessary that either of the matching mold plates are flat across their full surface to within the preferred 0.001 inches. It is only important that the plates not have discontinuities in surface flatness as the flexible backing sheet can be mounted to be in flat conformal contact with the mold plate surface. A set of mold plates having near-perfect mutual parallelism when one plate is positionally registered relative to the other plate can be easily constructed. A first mold plate having a flat surface is flat surface coated with an adhesive or a room temperature vulcanizing (RTV) silicone rubber and a second flat surfaced plate is brought into contact with the liquid RTV, or adhesive, and the second plate is maintained in this position until the adhesive or the RTV solidifies in bonded attachment to the first plate. The adhesive or RTV mutually conforms to the flat surfaces of both plates. When the second plate is separated from the first plate, the adhesive or RTV that is bonded to the second plate may be a very thin or a thick coating thickness. Provision is made where the adhesive or RTV does not bond to the first plate by applying a mold release agent to the first plate surface prior to the application of the plate adhesive or RTV surface coating. In a like fashion, a backing sheet may be mounted on the first plate prior to the application of an adhesive to the second plate. The backing sheet materials may include RTV silicone rubber, silicone rubber sheet, polyethylene, Delrin® polycarbonate, Teflon® and other materials. Plates can be covered with adhesive coated Teflon® sheet material. A wire mesh screen may be adhesively bonded to a second plate to provide an anchor for RTV silicone rubber that has superior mold release properties. Hot melt adhesives or molten polyethylene or other mold release agent materials may be used as a conformable second plate coating that is used to establish a second plate surface that is parallel to the surface of the first plate surface at all first plate surface local areas.

Wax Island Font Grid

Problem: It is desired to form raised island structures on the surface of a flexible or rigid backing sheet in an annular array or rectangular array pattern.

Solution: A disposable island structure shaped grid sheet made of wax or polyethylene can be thermally or other technique bonded to the surface of a backing sheet and the open-cell raised island shapes that exist between the intersecting grid lines can be level filled with a liquid island structure polymer resin material. After solidification of the resin, the wax grid sheet can be separated from the backing sheet leaving an array of resin material raised island structures that are adhesively bonded to the surface of the backing sheet. If desired, the wax or polyethylene from the separated grid sheet can be melted and reused to form new grid network island mold sheets. The backing sheet or backing plate can be rigid or flexible. Melt bonding the intersecting grid lines to the backing prevents movement of the grid laterally on the backing surface or away from the backing surface during the process of filling the grid openings with resin. Resin material used to form island structures can be unfilled or filled with a variety of materials including powdered metal glass or phenolic or other polymer microspheres or wood flour. The thickness of the mold grid lines establishes the heights of the islands. Each grid sheet can be disposable or the grids can be separated from a backing sheet and reused on another backing sheet. The surface of a low temperature (melting at less than 300° F.) wax grid may be heated into a molten state to allow a hot-melt bonding of the grid to a backing sheet. Also, a semi-rigid open-celled grid sheet may be mounted flat to contact the surface of a backing sheet for filling the grid cells with resin. The open-cell grid may be removed from the backing before the island structure resin has solidified to leave an array of liquid resin islands deposited on the backing sheet. Island shapes may be hexagon, circular, quadrangular or other shapes. Wax grids would not adhere to the island structure resin and because wax is inert, the wax would not contaminate the resin or impede chemical reactions that take place during polymerization of the island structure resin during resin solidification. The wax grid sheets may be formed in a grooved metal or RTV silicone rubber or non-metal mold plate where molten wax is deposited into the grid grooves, leveled to the top surface of the mold and allowed to cool and solidify. A backing sheet can be placed in flat contact with the mold plate prior to solidification of the molten wax thereby effecting an adhesive bond of the wax grid to the backing sheet. After wax solidification, the backing sheet having an attached network of island grid lines may be separated from the grid mold plate. The grid mold plate may be reused to produce more grid patterns on backing sheets. A island shape forming grid may be attached to a continuous web backing material by the use of a web contacting roll having a grid patterned surface that is filled with a molten wax type material where the grid wax material solidifies upon contact with the web backing. This roll may provide a continuous web backing having a continuous surface pattern of wax grid lines that form island shapes and these shapes may be filled with resin materials to form raised islands that are attached to the web backing.

Raised Island Structures on Backing

Problem: It is desired to create raised island structures on flexible backing sheets or on continuous web backing material.

Solution: Thin RTV silicone rubber island-hole font sheets can be molded from rigid metal perforated sheet material. The RTV hole font sheet can be mounted flat on a backing sheet and liquid polymer resin island foundation structure material can be used to fill the font sheet through holes where the resin adhesively wets the backing sheet and the island shaped holes are filled level with the surface of the font sheet. After the resin has partially or wholly solidified, the RTV font sheet is separated from the backing leaving an array of resin island sites on the backing sheet as little, if any, of the resin will adhere to the RTV silicone rubber font sheet surface. The backing sheet having adhesively attached resin islands can then be pressed between two flat precisely parallel lab grade AA granite surface plate surfaces that are separated by gap spacers where the top surfaces of the islands are forced into a uniform height position as measured relative to the backside of the backing. The RTV rubber font can be reused. The resin may be in a non-liquid state or partially solidified prior to application of the flat plate pressing action or plate vibration action or plate impact force action. Less pressing force is required to clamp the top plate in contact with the gap spacing tabs if the resin is not substantially solidified. A release liner coating can be applied to the plate surface that contacts the liquid resin or a uniform thickness Teflon® or silicone coated or non-coated polyethylene terephthalate (PET) or polyester release liner sheet can be used to contact the resin. A non-release material coated divider sheet can be used to contact the resin and protect the resin press-plate from resin contamination and this thin divider sheet can be stripped from the island top surfaces prior to full solidification of the resin. Also the resin contact plate can be surface coated with a RTV silicone rubber covering that is molded to provide a RTV surface that is precisely flat and parallel with the bottom press-plate.

Gap Spacers for Flat Blocks

Problem: It is desired to precisely separate matching rectangular pressing blocks when using circular disks having non-solidified resin islands deposited on a backing sheet where a thin separator sheet is in contact with the liquid state resin using gap separators.

Solution: A precision thickness PET or polyester or Teflon® film can be used with a pair of square or rectangular lab grade AA precision granite surface plates flat within ±0.000025" that are separated by equal thickness gap spacers located at the four corners of each surface plate. The separator film can be trimmed at the four corner locations to allow the granite surface plates to be in direct contact with the rigid gap spacers. If desired, the separator film can be left untrimmed and mounted over the full surface of the surface plate, in which case, the spacers can contact the separator film surface. It is preferred to avoid spacer contact with the film as the variance in film thickness is eliminated if the spacers do not contact the film. Also, soft films such as Teflon® may creep under the weight of the heavy granite blocks being subjected to a localized area of the gap spacers. PET, polyethylene terephthalate, has a higher compressive strength than Teflon® and is available in thickness tolerances that provide a more uniform thickness than commercially available Teflon®. Teflon® has a superior release character compared to most polymer sheet materials for separating the sheet from the resin after the resin has solidified. PET film with a silicone release agent coating is available but transfer of some of the silicone to the resin islands can occur with this product and contamination of the resin may occur due to this transfer. When the island back sheet is circular, the backing sheet does not contact the four corners of the granite surface plates where the gap spacers are located. Oversized rectangular granite blocks can be used to level-form raised island structures attached to rectangular sheets of backing by placing the gap spacers outboard of the backing during the time of press-forming the islands. Separating the release liner film sheet may be made easier by heating the island top surfaces prior to the sheet separation procedure.

Flat and Parallel Plate Fabrication

Problem: It is desired to fabricate plates that are precisely flat, are structurally stiff, are lightweight and that have vacuum port holes on their surface to allow attachment of flexible backings to the plate surface. Pairs of flat plates may be used to mold flat surfaced raised islands that are adhesively bonded to a backing sheet. Flat plates may be covered with an abrasive sheet and used to grind flat a circular rotating platen having a raised annular ledge. Mold plates or flat plates can be rectangular, circular or annular in shape. Inexpensive mold plates may be used to create flat raised island sites that are attached to a backing sheet by manual labor in a lab area and these islands may be manually coated with abrasive particles.

Solution: A Grade AA granite surface plate having a flatness tolerance of ±0.000025" or a Grade AAA plate with a tolerance of ±0.0000123" can be used to replicate a polymer or metal surface on another plate to provide a second plate that has a flat surface that is a duplicate of the first mold plate. First, a sheet of flexible polyester or film or brass shim stock ranging in thickness from 0.001 to 0.005" may be placed on the flat surface of the first granite plate. Then the surface of another second metal or polymer or other material plate may be coated with a low viscosity polyester or epoxy or other resin and the second plate may be placed in flat resin contact with the polyester film mounted on the granite plate. After solidification of the resin, the second plate having the sheet of polyester bonded to its surface is separated from the granite plate where the smooth polyester sheet forms a precisely flat surface that is a replication of the granite precisely flat surface. The surface replication process can be repeated using the polyester covered second plate as a pattern to create another polyester sheet covered plate that has a surface replication of the first polyester second plate thereby forming a set of two plates that have precisely flat and precisely parallel flat surfaces. Patterns of grooved fluid passageway lines can be scribed or cut into the surface of the plates to provide resin fluid flow from areas of high resin contact force induced pressure to areas not mutually contacted with the matching contact areas of the two plates to create a 3-point contact of the plate surfaces. Localized resin pressure is relieved by the scribe lines that prevent deformation of the plates prior to solidification of the resin. The pressure of the upper plate on the fluid resin drives the flexible sheet into conformal contact with the granite plate surface. Vacuum or positive pressure air passage holes may be drilled in the plate and they can be partially filled with wax to prevent resin entry into the drilled holes. After resin solidification, the vacuum holes can be re-drilled through the wax, or other techniques may be employed to remove the wax to reopen the vacuum holes. Pressurized air can be used to separate disk or rectangular sheets from the surface of the plates. These mutually flat and stiff surface plates can be very inexpensive to construct. The mold plate sets can be used to manufacture raised island abrasive articles by a manual process without the use of expensive motor driven and sensor controlled capital equipment. Precision thickness controlled raised island sheets may be produced using non-skilled inexpensive labor using the mutual-parallel mold plates and simple island site resin molding techniques. The backings having attached raised islands may then be coated with resin and abrasive particles or coated with an abrasive resin slurry by further inexpensive simple manual production techniques to form raised island abrasive articles having precise article thicknesses.

Island Forming Parallel Plates

Problem: It is desirable to have matching pair sets of parallel plates that are stiff, of modest weight, are inexpensive and maintain parallelism with ambient temperature changes.

Solution: Granite surface plates having precision flat surfaces are readily available but they are heavy because it is necessary to make them thick to compensate for the low material stiffness of granite compared to metals. Cast iron is also available in limited size selections but is prone to rust and corrosion. Granite blocks are mounted on 3-point pads during surface scraping, which is the procedure used to create precision flat surfaces, and must be maintained on these pads to retain the surface flatness. Therefore, some of the surface flatness of a granite plate is lost when a granite plate is turned upside down to form a matching pair of parallel plates that can be used to form height controlled resin raised islands. Use of square matching parallel plates with circular island disk backings allows four gaps spacers to be used at the plate corners where the spacers do not contact the disk backing. The upper compression plate needs to be flexible enough that all four gap-spacers are contacted but yet it is sufficiently stiff that a precise gap spacing is maintained over the full annular island area of a disk. The upper plate has sufficient weight to initially press-form fluid resin material islands into flat-topped shapes. The upper plate applies compression force loads on the islands at locations inboard of the gap spacers. This weight force tends to distort the original flat surface of both the upper and lower plates. Due to the plastic-creep-flow characteristics of the island structure liquid resin, most, if not all of the compressing top plate weight force is equally supported at the four outboard gap spacers. However, the sag of the upper plate surface at the locations of the plate inboard of the gap spacers tends to distort the upper plate from its original non-upside-down flat plane. A simple method may be used to create a matching pair of plates having parallel matching surfaces in their island-molding orientation positions. The plates used must be dimensionally stable but neither one of the plates initially has to have a precision flat surface. One method is to support a first lower plate on a rigid surface by four corner springs that provide equalized plate support similar to the typical 3-point plate pads. Then the surface of the first plate can be covered with a layer of resin and a sheet of polyester applied in flat contact to the applied liquid resin. A flat plate of glass is temporarily laid flat on the surface of the polyester sheet to provide a flat surface to the polyester covered lower plate. The glass is free to slide horizontally on the polyester sheet that eliminates problems of different thermal expansion rates of the glass and the plates during process temperature changes. After the resin has solidified the glass plate is separated from the lower plate. Then a second matching upper flat plate is prepared in a similar fashion with resin applied to the surface of the second plate and this resin covered with a polyester sheet. The second upper plate is brought into flat contact with the first lower plate and contact between the plates is maintained until the resin solidifies thereby creating matching parallel surfaces on both plates. The polyester covered plates are easily separated from each other as neither of the contacting polyester sheets are adhesively bonded to each other as they are only bonded to their respective mold plates. It is necessary to maintain the matching original orientation of the two plates when they are used as a mold plate-set as the plates have parallel surfaces only in this original relative position. The mutual parallel plate surfaces are not necessarily in a common plane but that is not necessary, as the flexible island backing sheets will flat conform to the mold plates. The mold plates will provide a uniform gap between them over the full mutually surface molded area which is the only characteristic required to flat-mold raised islands on a backing sheet. If desired, temperature controlled fluid may be pumped into the plate bodies to maintain a uniform temperature within the plates to reduce plate distortions due to changes in ambient temperatures.

Matching Parallel Island Forming Plates

Problem: It is desired to produce a set of surface plates that have precision parallel surfaces when a heavy upper plate is mounted in flat contact at four corner gap spacers to a lower plate that is mounted on 3-point pads. Distortion of both the upper plate and the lower plate can occur due to the total weight of the upper plate being applied at the four corner positions and the central section of the upper plate block sags due to the distributed plate weight. The lower plate is distorted due to the weight of the upper plate being applied at the outboard four corners, which are force point locations, that are some distance from the 3-point mounts located at the bottom of the lower plate. Granite or cast iron surface plates are mounted on 3-point bases and their flat surfaces are scraped without any force load on the plate top surface. Application of weight or other force loads to a granite surface plate will distort the top surface of the surface plate. When a disk backing sheet having an annular band of raised wet resin islands is acted upon by the two parallel plates, the upper plate weight load is first concentrated on the island resin sites that are located in an annular band. Over a process time period the liquid resin flows outward at each site to form flat surfaced islands of resin and the upper plate comes to rest on the four corner gap spacers where are outboard of the annular band. Thus the weight force of the upper plate that is initially located at the inner area portion of the upper plate flat area is transferred to the four corner locations of the gap spacers.

Solution: A granite or cast iron or cast aluminum or other material lower flat surface rectangular plate can be mounted on the 3-point pad system that assures the bottom surface plate is consistently supported on any non-flat support surface. Plates of dissimilar materials are allowed to slide horizontally so materials having different thermal expansion rates can be used. A thin flexible 0.002 to 0.010 inch thick polyester sheet can be mounted to the lower plate surface using vacuum evacuation to improve surface conformance of the sheet to the surface of the lower plate. Four flat support pads made of metal or other material can be placed in contact with the polyester sheet at the four corners of the surface plate. Epoxy, polyester or other polymer resin can be applied to the exposed surface of the support pads and also to the exposed surface of the lower plate polyester sheet. This resin is applied with a thickness that is greater than the height of the support pads. Then an upper mold plate can be applied flat to the resin coated surfaces in a manner that the excess resin is extruded to the outer edges of the matching surface area rectangular plates until the upper plate comes to rest on the four pads with no central force support of the upper pad before the resin solidifies. The resin contacts the surface of the upper mold plate. Both the upper and lower plates distort but the polyester sheet non-resin coated surface is forced flat to the slightly bowed surface of the lower plate, thereby producing a parallel fit of the upper plate to the lower plate. After resin solidification, the upper plate now has a resin attached polyester surface that can easily be separated from the lower plate as this polyester sheet was held to the lower plate by vacuum. The two plates now have matching surfaces that have a precise gap between their surfaces even when the plates are distorted due to their own distributed mass weight forces. A liquid resin island-site covered backing can be inserted between the two plates, four gap spacers inserted at the same location of the resin imbedded spacers and the island height molded. The mold height gap spacers can be located between the plate body imbedded spacers or the mold height gap spacers can be located to contact the island sheet backing material during the island height molding operation. If the island backing is made from a precision thickness material, then the mold height gap spacers can contact the backing to create islands that have a precision thickness measured from the top of the islands to the backside of the backing.

Glass Plate Surfaced Island Molds

Problem: It is desired to create island height controlled matching parallel surface mold plates using one smooth surfaced plate and resin casting the surface of a second mold plate placed in close proximity to the first mold plate where resin pressures in the common matching surface area do not distort either of the plates due to early solidification of the resin in some area regions, thereby trapping resin flow from the regions adjacent to the solidified regions. Precision height molding of raised islands eliminates island grinding and establishes a uniform height to each sheet.

Solution: A second parallel plate surface can be formed that is essentially a replication of the first plate surface by casting a resin based material on the surface of the first plate. The resin may be filled with materials including granite chips or metal or ceramic particles. If a thick layer of resin is applied to the first plate to form the second mold plate, all the weight of the resin is uniformly distributed across the surface of the first plate and when this plate is used with outboard corner gap spacers with molding backing sheet islands the mold plate will distort from its weight, preventing a uniform height of each island. It is preferred to apply a resin coating to a structurally stiff plate that is supported by spacers located in the same positions as the spacers used in molding resin islands deposited on a backing sheet as both the upper and lower island mold plates will independently deflect from their individual material distributed weights and the resin will uniformly fill the flat volume located between the surfaces of the two plates. Excess resin is applied and it is important that the excess resin can flow out from the area regions between the plates before the resin solidifies. Gap spacers located adjacent to the raised island bands of annular disks or outboard of rectangular arrays of islands can maintain free resin passageways for trapped excess resin until the excess resin is extruded sometimes over long gap distances by the weight of the upper plate. It is desired that all excess resin by exhausted from the mutual plate surface area prior to resin solidification to prevent the localized resin pressure in regions of the plate surface area to prevent unwanted distortion of one or both plates due to this pressure. Use of parallel mold plates with the same thickness gap spacers to mold raised resin flat-topped islands assures that each backing sheet has islands of the same height as opposed to grinding islands mutually flat where all of the islands can be of different heights from one sheet to another sheet. Use of thicker resin-gap spacers can minimize the existence of significant high pressure areas of resin flowing outward from the parallel surface areas as excess resin will have less fluid flow resistance. A thick glass plate of about 0.25" thickness can be used to provide a smooth and flat surface for the lower plate. Distortion of the glass plate can be minimized by applying resin in an array of resin drops or in a grid of resin lines so that the resin only has to travel short distances to extrude the excess from each drop or line.

Vibrating Head Island Height Device

Problem: It is desired to form array patterns of resin material raised islands attached to backing sheets or backing continuous web where all of the islands have equal thicknesses relative to the backing backside.

Solution: A vibrating head that spans the width of the backing sheet or the backing web can be used to flatten liquid or non-hardened individual resin drops or bars that are deposited on the surface of the backing sheet that is moved incrementally or continuously under the vibrating head that is located at a fixed position. A gap spacer can be positioned at each end of the vibrating head where the maximum downward travel of the angled vertically optional spring-mass natural frequency oscillating head is limited by contact of the head ends with the gap spacers. Other vibrating head excitation means can be used that do not require gap spacers including rotary shaft systems having eccentric rotators and feedback controlled electromechanical or electro-hydraulic vibration systems. Vibration can range from 5 to 25,000 cycles per second. Vibration impact may be applied directly to the top surface of the liquid or partially solidified resin islands or the island can be covered with a Teflon® sheet or backing or a silicone or other material coated release liner sheet or web. The vibrating head may be designed with a low mass but structurally stiff configuration using lightweight aluminum or titanium flat-plate materials that will provide a uniform flat surface across the full web span width of the head. A flat base can be provided that spans the web width and the vibrating head can be provided with an island contact surface that precisely flat-matches the flat base by coating the contact surface of the vibrating head with a thin layer of polymer resin, including epoxy, covering the epoxy or other resin with a polymer tape, including Teflon®, bringing the tape covered vibrating head into flat contact with the cross-web base until the resin solidifies. The temperature of either or both the base and the heat can be controlled by various means including the use of a temperature controlled fluid to reduce thermal distortion of either the vibrating head or the matching base. The leading edge of the vibrating head can be tapered or rounded to accommodate high islands entering the head system. As the vibrating travels up and away from the islands during each vibration excursion, the continuous backing web can be pulled at a low web tension force during the island flattening process. Energy sources including heat, radiation and electron beam radiation can apply energy to promote solidification of the island resin. One, two, three or more vibration stations can be used.

Abrasive Bead Screen Plunger

Problem: It is desired to create abrasive particle or other material spherical beads that have an equal size by applying a consistent controlled pressure fluid ejection on each liquid bead material cell resulting in uniform sized ejected beads.

Solution: A mesh screen having a screen thickness and open cells where the volume of an open cell thickness and cross-sectional area is approximately equal to the desired volume of a material sphere can be filled with a liquid mixture of abrasive particles and a binder material, including a ceramic sol gel or a resin binder. Nonabrasive material may be used to fill the screen cells also to produce nonabrasive beads. After the screen is surface level filled with the liquid bead material, the liquid in the cells can be ejected from the cells with the use of a plunger plate that traps a fluid between the plate and the screen surface as the plate is rapidly advanced towards the surface of the screen from an initial position some distance away from the screen. The fluid trapped between the plate and the screen can be air, another gas, or preferably a liquid including water, oil dehydrating liquid or a solvent, or mixtures thereof. The screen is rigidly supported at the outer periphery of the plate cross section area thereby leaving the central portion of the screen open in the screen area section corresponding to the plunger area that allows the individual screen cell material to be ejected from each of the individual cells at the side of the screen opposite of the plunger plate. The fluid material lumps are ejected into hot air or a dehydrating liquid. An enclosure wall positioned on the outer periphery of the plunger plate is held in contact with the screen surface and acts as a fluid seal for the plunger and results in a uniform fluid pressure being applied to the material in each cell whereby the ejection force is the same on each cell material. Air is compressible so the fluid ejecting pressure will build up as the plunger advances until the cell material is ejected. A liquid fluid is incompressible and has more mass than air so the speed that the cell material is ejected is controlled by the plunger plate advancing speed and a uniform fluid pressure would tend to exist even when a few cells become open in advance of other cells. The plunger plate can be circular or rectangular or have other shapes. Cell material may be ejected into either an air environment or ejected when the material is submerged in a liquid vat. In either case, surface tension on the ejected material lump produces a spherical material shape.

Screen Drum Spherical Bead Former

Problem: It is desirable to form spherical beads from various liquid materials with a continuous manufacturing process where all the beads are of equal size. Drops of liquid material are separated from each other after formation during which time surface tension forces form spherical drop beads prior to solidification of the beads by hot air or a dehydrating liquid bath.

Solution: A rotatable drum having one side partially open can have a drum circumference formed of silicone rubber coated mesh screen or a perforated metal strip. The drum can have a nonporous solid radial back plate to which plate is attached a bearing supported rotatable shaft. The drum front plate can be a solid nonporous solid material wall that has an annular shape that allows the continuous introduction of a stream of liquid material that can be formed into equal sized drops of liquid, the liquid material can include water based sol gels of oxides and abrasive particles may or may not be mixed with the sol gel. Drops of other materials including fertilizers, hollow sphere forming mixtures, chemicals, medicinal material and glass beads may be formed with the same process. After liquid material is introduced into the open end of the screen drum, the drum is rotated and a set of internal and external flexible wipers force the liquid into the open cells of the mesh screen circular drum band. The cell hole openings in the mesh screen or perforated metal are small enough and the viscosity of the liquid material is high enough that the pool of liquid, which remains on the bottom area of the drum as the drum is rotated, does not freely pass through the screen mesh openings. Wiper filled mesh holes pass upward out of the liquid pool until they arrive at a cell blow-out head that spans the longitudinal width of the screen where an air, gas, or liquid is applied under pressure uniformly across the contacting surface area of the blow-out head that is hydraulically sealed against the drum inner surface of the drum screen. The drum may be rotationally advanced or continuously rotated to present liquid filled screen cells to the blow-out head that ejects drops of liquid material into an environment of heated air or into a vat of dehydrating fluid. Surface tension forces on the drop will form a drop spherical shape prior to drop solidification. The spherical bead drop formed from the material contained in a individual screen cell will have approximately the same volume as the volume of the liquid trapped in a screen cell. The shape of the ejected fluid material lump is changed from an irregular lump shape to a spherical shape by surface tension forces acting within the material lump after the lump is ejected but before the lump is solidified. Once the spherical shape is formed, the sphere or bead shape becomes solidified and the shape retains its spherical shape throughout further sphere processing events. Air or liquid fluid can be fed in pressure or volume pulses or fed at a continuous rate to the sealed blow-out head that can be held stationary through the drum opening.

Open Cell Raised Island Font Sheet

Problem: It is desired to form raised island resin structures on the surface of a backing sheet or continuous web where the islands have equal heights using a hole font sheet. It is important that the font sheet can be separated from the formed islands after the island resin has partially solidified without disturbing the adhesion of the islands to the backing sheet.

Solution: An open cell perforated metal sheet or a woven or welded mesh screen font sheet can be cut into desirable shapes including circular or rectangular or into long rectangular strips that are joined together at the ends to form a continuous belt. The font sheet can be taper hole reamed, ground or machined to have an equal thickness across the full surface. Also, one or both surfaces of the font sheet can be abrasively bead blasted to round off the edges of the font sheet through-holes to provide a tapered base at the support of the raised islands formed with the sheet. The rounded holes also tend to improve separation of the sheet from partially solidified formed resin islands. The perforated sheets and mesh screens may have circular, square, diamond-shape or other shapes and the sheets or screens can be fabricated from metal, polymer material and braided polymer filaments. A paraffin wax, beeswax, polyethylene, Teflon®, silicone rubber, silicone oil, silicone grease, fluropolymer or other coatings can be applied to the surface of the font sheet. These coatings can also fill in void areas of the font screens to prevent trapping or resin-lock sites for the resin. Perforated metal or polymer sheets, or formed belts, can be immersed in a vat of molten coating material one or more times to build up a coating thickness on the font sheet or the excess coating material may be blown off preferentially from one side of the font sheet or blown off both surfaces of the font sheet by directing the flow air jet at right angles to the font sheet or at an angle to the font sheet. An array of raised islands of resin can be bonded to an individual backing sheet or to a continuous web backing sheet material where the backing material is flexible using the hole font by placing the font sheet in flat contact with the flexible backing, filling the font hole cells level to the surface of the font with liquid resin and then separating the font sheet from the back either before or after partial solidification of the resin thereby leaving liquid or partially solidified resin island sites adhesively bonded to the backing sheet. The backing sheet having the attached liquid resin island sites can then be pressed, sandwich fashion, between two gap spaced parallel island mold plates to create an array of islands, all having the same height measured from the backside of the backing. A precision thickness release liner sheet may be placed between the top of the liquid island tops and the upper mold plate and the mold plate and the release liner separated from the islands after the resin is partially solidified where the resin is of a rheological elastic character and having a reduced viscoelastic character. The partially solidified resin results in geometrically stabilized island shapes that retain the equal island heights and flat-topped island surfaces after either, or both, the upper mold plate and the release liner are separated from the array of resin islands. Likewise, a continuous belt can be constructed from mesh screen or perforated metal and the belt may be coated with a wax or other release agent. The belt may be routed over two rolls and the open belt cells continuously filled with liquid resin to allow the resin to be deposited on a continuous web that is routed into surface contact with the belt where the resin contained in the belt cells adhesively contacts the web backing surface. The belt-cell resin material that is in wet contact with the web backing is drawn from the individual belt cells as the web is separated from the belt and these cell material lumps become deposited on the web surface to form an array of liquid resin islands on the backing material. The open cell belt can be separated from the backing before or after partial solidification of the resin. The resin may be solidified by various chemical or energy means or with electron beam radiation or other heat or energy sources. After separation of the open cell font belt, a calendar roll can be positioned a gap-spaced distance from a rotating backing roll where the surface of the calendar roll contacts the resin islands directly or contacts a precision thickness release liner web that is routed between the calendar roll surface and the resin island top surfaces. One or more of these calendar rolls may form all the islands to an equal height measured from the backside of the island backing. Island array patterns can be formed into the island hole font belts and font sheets to form abrasive articles of many different configurations on backing sheets or on continuous web materials including circular disks having arrays of islands positioned across the full continuous surface of the disk. Islands may be formed as an annular band of islands or sheet articles may have rectangular island arrays on rectangular sheets or on long web strips or on strips that are joined together at both ends to form an endless belt.

Resin Island Hole Font

Problem: It is desired to form geometric shaped liquid resin shapes from a hole font sheet on the surface of a continuous web or on individual flexible backing sheets where the transferred island shape retains its geometric island features.

Solution: An island-hole font sheet or endless belt having array patterns of through holes in the font sheet that can be held in contact with backing material wherein liquid resin is forced into the through holes thereby contacting the surface of the contacting backing sheet. The font sheet or belt may have a uniform thickness across its whole surface to create liquid resin island shapes of equal heights for each island. The island shapes include circular, rectangular bar, serpentine, curved crescent shapes and other shapes that are arranged in rectangular or annular array patterns to form circular disks or rectangular sheets or rectangular strips or endless belts of backing having raised island structures ranging in heights above the backing sheet from 0.002 inches to 0.375 inches. The flexible or rigid hole font can be made of materials including but not limited to polymer, wax, silicone rubber, fluropolymer, metal or other materials such as woven or braided fiber or polymer threads. The hole font may be coated or saturated with adhesion release materials including wax, silicone rubber, silicone or fluropolymer oils, silicone grease, other greases and oils or other release agents commonly used in the plastic injection mold industry. Successful transfer of the liquid resin from the font cell holes to the backing sheet depends on a number of factors. It is desired to have good adhesion of the resin to the backing sheet and have poor adhesion of the resin to the font to allow the backing sheet to be separated from the font sheet wherein the liquid resin contained in the font hole cells is drawn out of the font cells by the gradual separation motion of the backing sheet away from the font sheet. A gradual separation is preferred due to the liquid shear forces being applied to the individual cell volumes of resin by the relative movement of the backing sheet as it is moved away from the font sheet. A fast separation motion can shear the resin thereby leaving a portion of it adhering to the font rather than transferring the whole resin lump contained in a font cell hole to the backing as a single entity shape. A paraffin wax coating on the font cells prevents adhesion of the liquid resin when a shallow separation angle of less than 30 degrees is used to separate the font from the web or sheet backing. Also, it is preferred to maintain the same forward velocity of both the font and the backing to prevent skewing of the island shapes which may occur when there is a relative lineal velocity between the backing web or backing sheet and the font. Further, it is desirable that the font and backing become separated at a slow speed to prevent separation of resin cell volumes due to fluid inertia effects. When part of a cell volume becomes separated from the cell volume bulk lump this may result in a distorted or reduced size island shape being deposited on the backing sheet surface. The rheological characteristics of the resin are important to make a transfer of island shapes to the backing. Resin having a high viscosity is more stable geometrically than low viscosity resin but high viscosity resin is more difficult to extract from a cell. Resin having a thixotropic character where the shape is only distorted by fluid shear action may be helpful to transfer a resin island volume as an intact lump shape. Filler agents including various organic or inorganic materials can aid in maintaining island cell shapes but yet allow sufficient fluid shear forces to be active in transferring resin cell shapes from the font cell holes to the backing sheet. After the liquid resin island shapes are transferred to the backing sheet, the island shapes can be flattened by various methods including the use of two parallel surface plates where all of the islands in a rectangular array or an annular array are provided with flat top surfaces and the islands have equal heights as measured from the backside of the backing. Continuous web island backings may have arrays of liquid resin island shapes controlled-height surface flattened by the use of calendar rolls or by the use of a vibrating bar acting against a flat reference surface with or without the use of release liner sheet material positioned between the island resin and the rolls or bars.

Island Height Vibrating Head

Problem: A simple process is desired to form precision height raised island structures on the surface of backing sheets or continuous web backing.

Solution: Perforated sheet material can be formed to create rectangular or quadrilateral or skewed rectangular or trapezoid hole arrays that are used to form raised islands in rectangular array sheets or in annular bands where the resin raised islands are adhesively attached to a backing material. Annular bands of raised resin islands can be constructed from rectangular sheets of perforated material having a continuous surface of perforated through-holes by filling-in or sealing some of the perforated holes, leaving only an annular array pattern of open cell holes. The hole filler material used to seal off undesired holes may be a polymer, a metal or other material. The through holes in the perforated sheet can be larger or smaller than 0.125 inches diameter and the sheet material can be thicker or thinner than 0.020 inches. A round or circular shaped island may be created from a perforated sheet having circular holes and the island resin height is equal to or less than the thickness of the perforated hole sheet. A metal perforated sheet can be ground or machined thinner to thicknesses less than 0.005 inches to form attached islands that are less than 0.005 inches high above a backing sheet. The islands may have other shapes than circular. The perforated hole font sheet is brought into flat contact with a backing material, liquid polymer resin, that can be filled with solid particles or solid materials, is introduced into the cell holes flat to the font sheet surface, the font sheet separated from the backing material, leaving an array of deposited resin island shapes on the surface of the backing material. The liquid resin is then flattened on the top surface with the use of a vibrating head acting downward on a flat stationary anvil surface or contacting the surface of a rotating platen to level the height of each liquid island deposition to an equal height as measured from the back surface of the backing sheet. The variation in the height of the island is controlled to less than 30% of the size or diameter or equivalent diameter of the abrasive particles or abrasive agglomerates that are to be coated, in a later process, on the top surface of the flat islands to form an abrasive article. An annular band of resin raised islands can be equal-height flattened by a vibrating head acting on a stationary anvil by mounting the circular disk on a platen having a platen diameter less than the inside diameter of the island annular band, then rotating the platen whereby the annular band of resin islands travels over the stationary anvil. A continuous web backing having resin islands can be island flattened by use of a vibrating head and stationary flat surfaced anvil where the matching surface of the vibration head is precisely flat matched to the surface of the anvil. A release liner sheet or web can be placed on the surface of the liquid resin islands to prevent resin contamination of the surface of the vibrating head or a release liner material or release agent can be applied to the surface of the head. The resin material may be fully liquid or it may be partially solidified when the vibrating height leveling action is imposed on the resin island shapes. There may be a single or multiple vibrating head station. Island resin solidification energy may include heat or electron beam radiation. A simple electromechanical device, including units used for manual woodworking sanding operations, can be used to perform the vibration function to control the height excursion precisely. The attached vibrating head may be loosely positioned in vertical contact with one or more position adjustable stops, the vibration energized at from 5 to 25,000 cycles per second and the body of the vibrator allowed to rise upward to an equilibrium position where the head consistently travels to anvil stops in the downward travel extreme in each vibration oscillation. This vibration island leveling action may establish a uniform heights of each island that travels freely between the head and anvil due to the head rising away from the islands on the upward motion travel on each vibration oscillation excursion during the time that the island backing sheet travels under the vibrating head. A spring can support the vibrator partially. An air cylinder can allow the vibrating force to be changed at different process event times and a damper can dynamically stabilize the vibrating head.

Abrasive Edge Band Free Abrasive Articles

Problem: Flexible abrasive articles of many shapes and configurations that have edge bands free of abrasive particles are desired to avoid problems with particle shelling where particles break loose during abrading use from the edge of an abrasive article that has been cut-out from abrasive sheet continuous web material.

Solution: Abrasive articles may be cut out from abrasive web backing material and the outer edge bands of abrasive particles may be removed from the edges by a number of process methods including skiving and abrading. However, these methods tend to leave structurally weakened particles attached at the abrasive edges and these particles may become prematurely loosened during abrasion and cause scratches on a workpiece. Instead, abrasive articles may be formed with abrasive coatings that are only deposited at the central area location of the article and the article edges left free of abrasive particles during the abrasive coating process. The abrasive may be attached directly onto the surface of flexible backing sheet material or the abrasive coating may be attached to the top flat surface areas of raised island structures that are attached at a central area location on the backing sheet. The abrasive articles may include, but are not limited to, continuous circular disks, circular disks having annular bands of abrasive coating, rectangular sheets, long abrasive strips or continuous belts and all of these abrasive articles may or may not have raised island structures. Array patterns of rectangular shaped abrasive islands can be coated on continuous web backing material by a variety of coating processes. One process includes the use of a resin extruder die that interrupts resin flow periodically across the width of the web and the die also separates the resin coating into bands that run lengthwise on the web, thereby creating rectangular coated areas. Abrasive particles can be deposited on the coated resin to form array patterns of flat-coated abrasive islands on a continuous web surface where there is an separation distance between each island and there is also a abrasive free border area between the islands and the edge of the web. Individual abrasive sheets or long abrasive strip articles can be cut from this island coated continuous web material. Resin material or abrasive resin slurry material can also be applied in island patterns to a web surface with the use of a gravure roll that has discrete island areas of knurling that transport the resin or slurry to the web surface.

Figure 96:
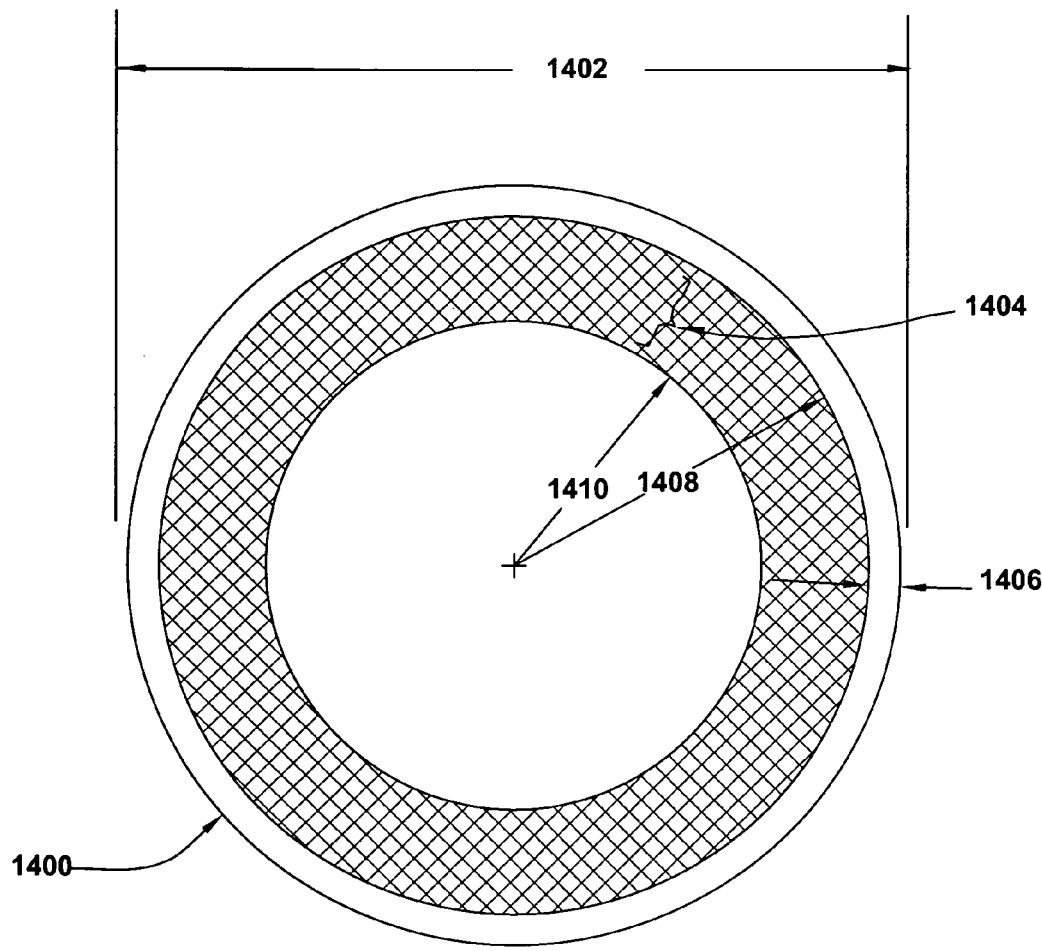
FIG. 96 is a top view of a non-island annular disk with an abrasive free outer band area.
Figure 97:
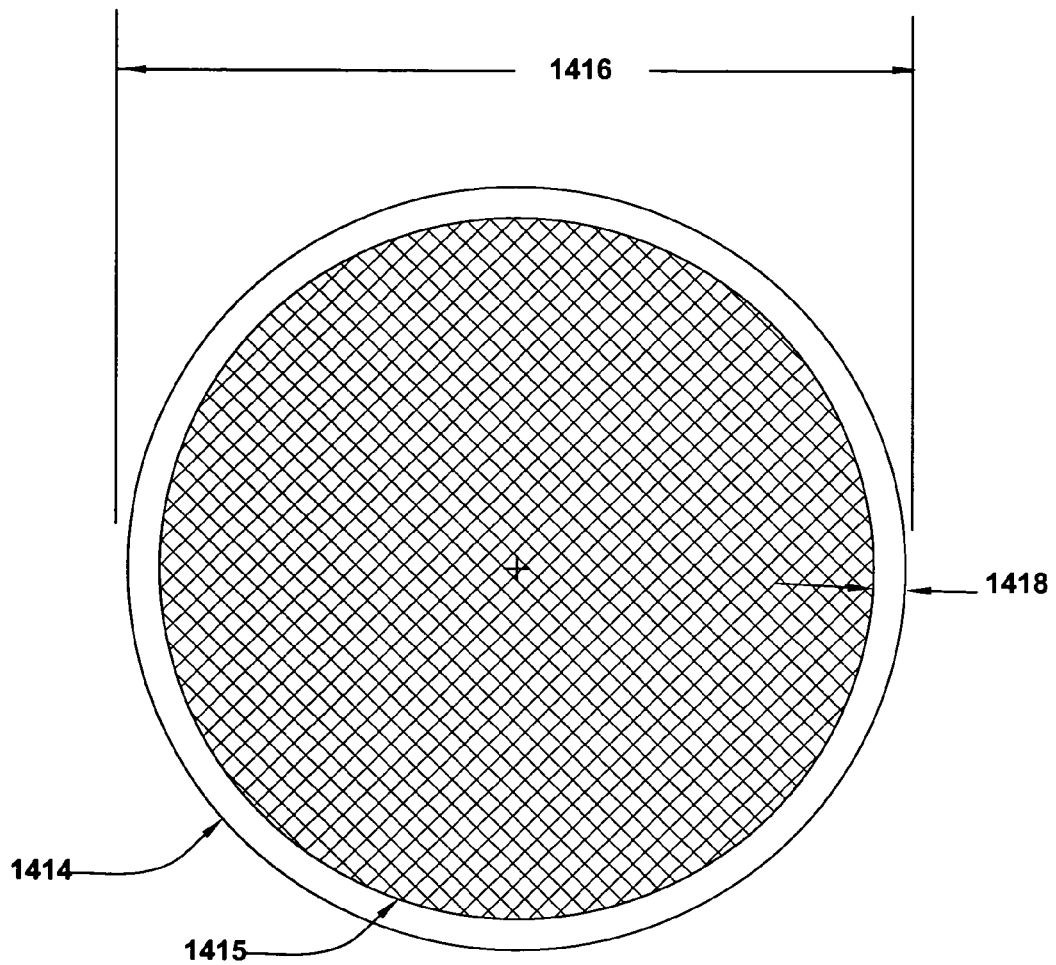
FIG. 97 is a top view of a non-island circular disk with an abrasive free outer band area.
Figure 98:
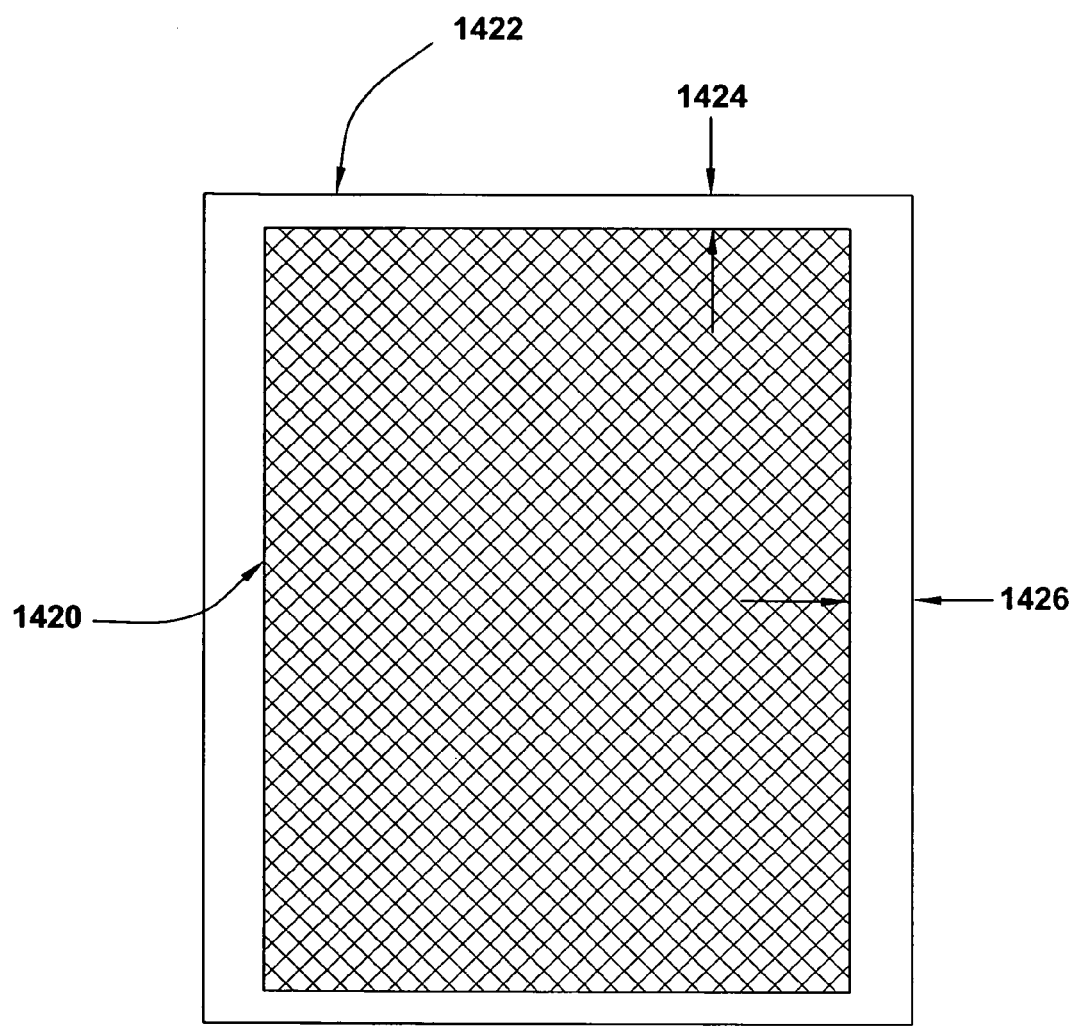
FIG. 98 is a top view of a non-island rectangular sheet with an abrasive free outer band area.
Figure 99:
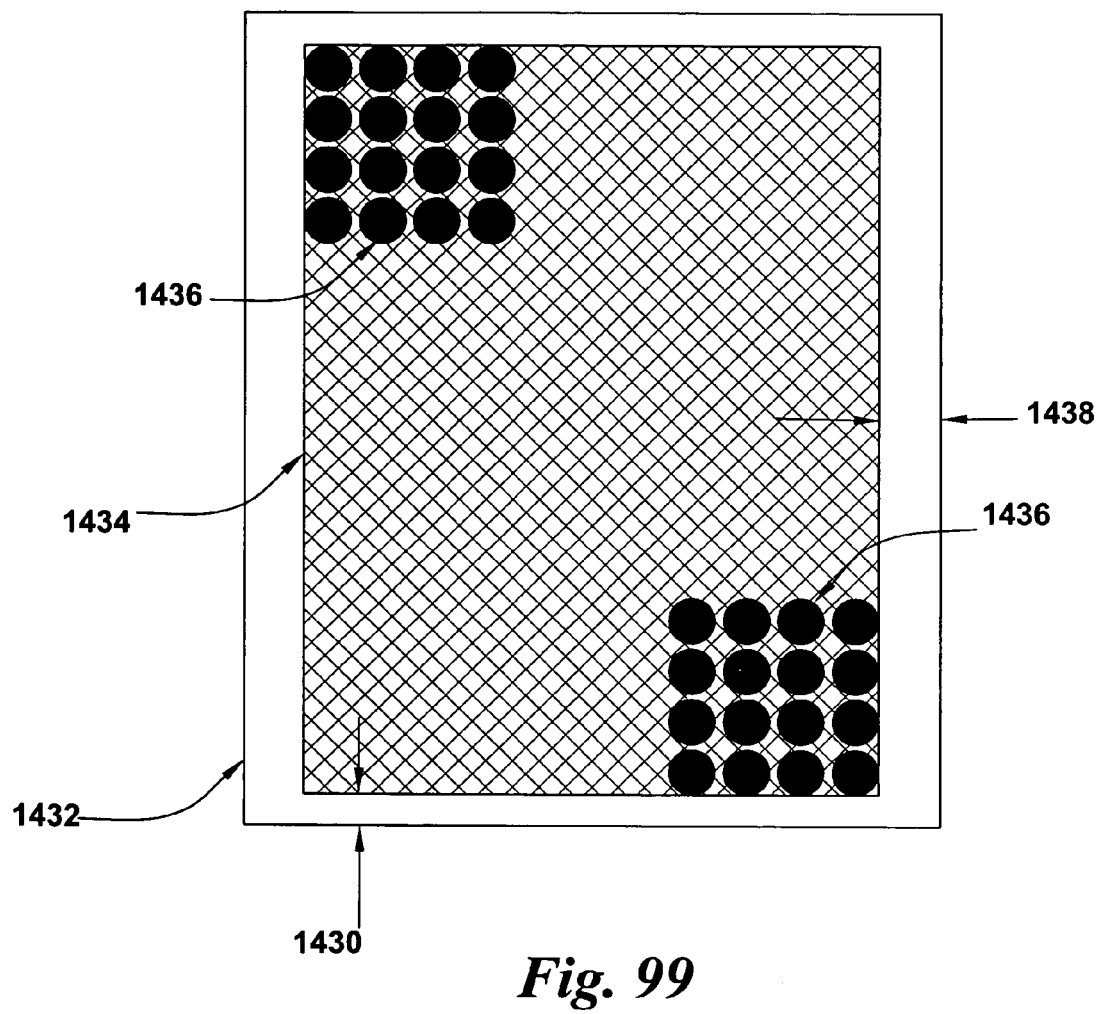
FIG. 99 is a top view of a island type rectangular sheet with an abrasive free outer band area.
Figure 100:
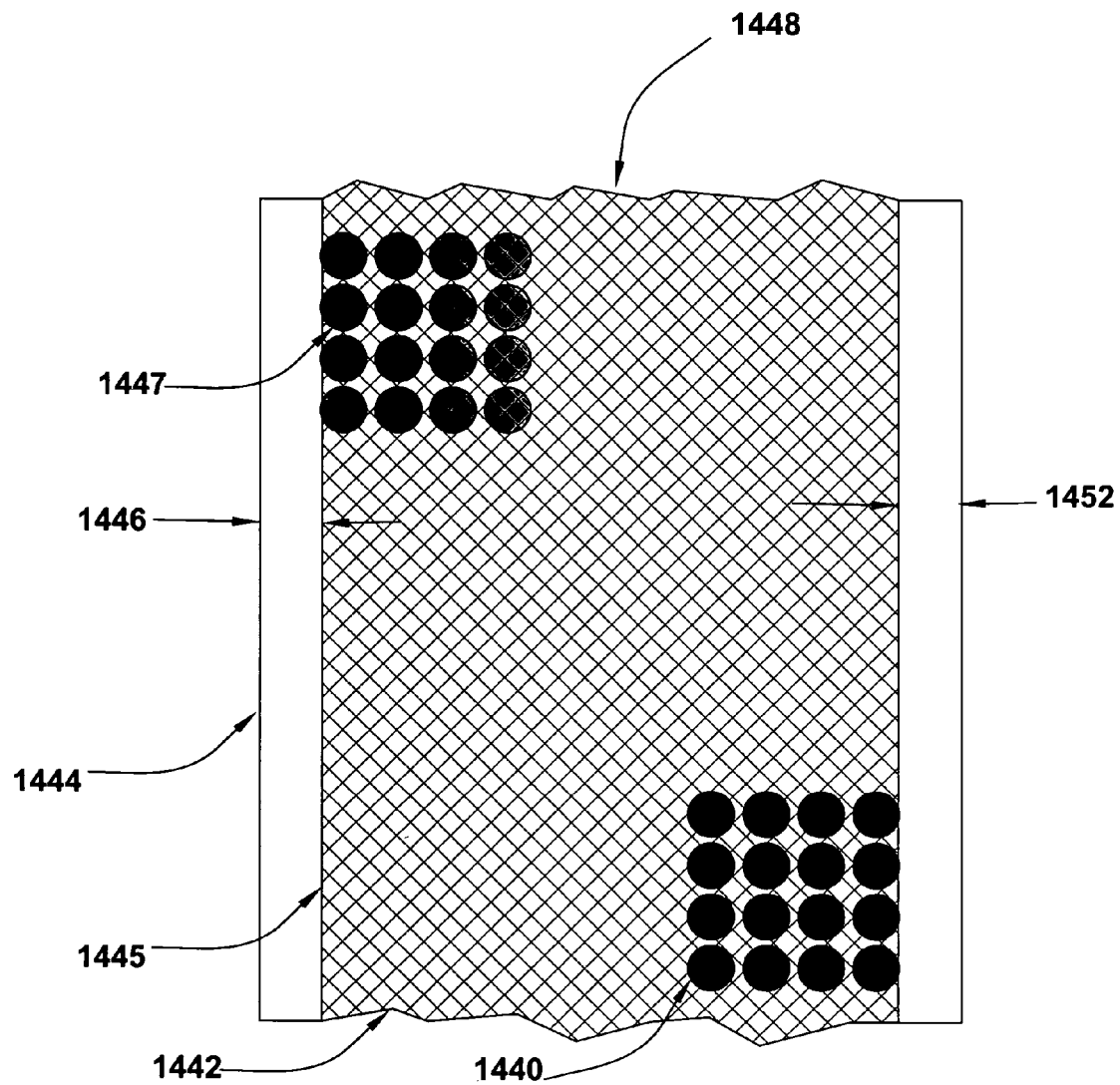
FIG. 100 is a top view of an abrasive strip with an abrasive free outer band area.
Figure 101:
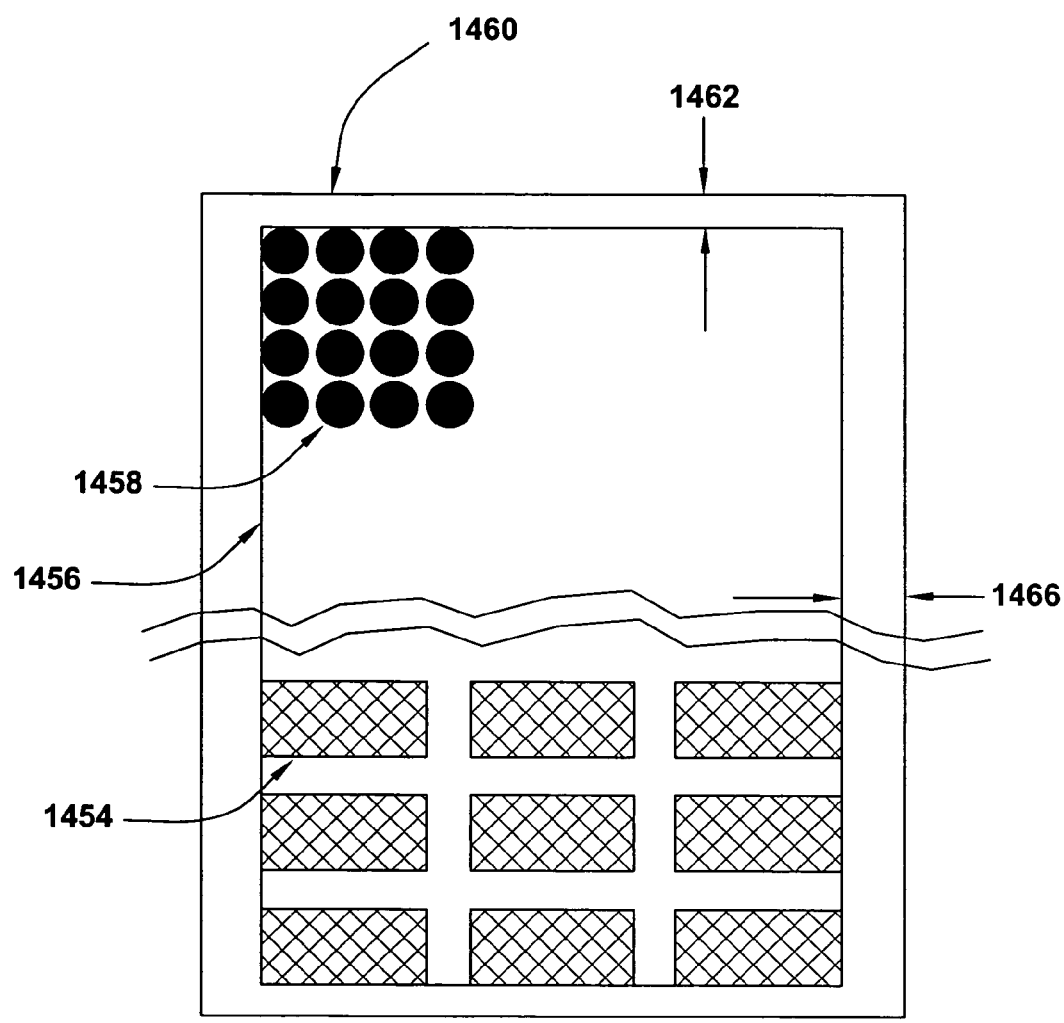
FIG. 101 is a top view of a patterned rectangular sheet with an abrasive free outer band area.
Figure 102:
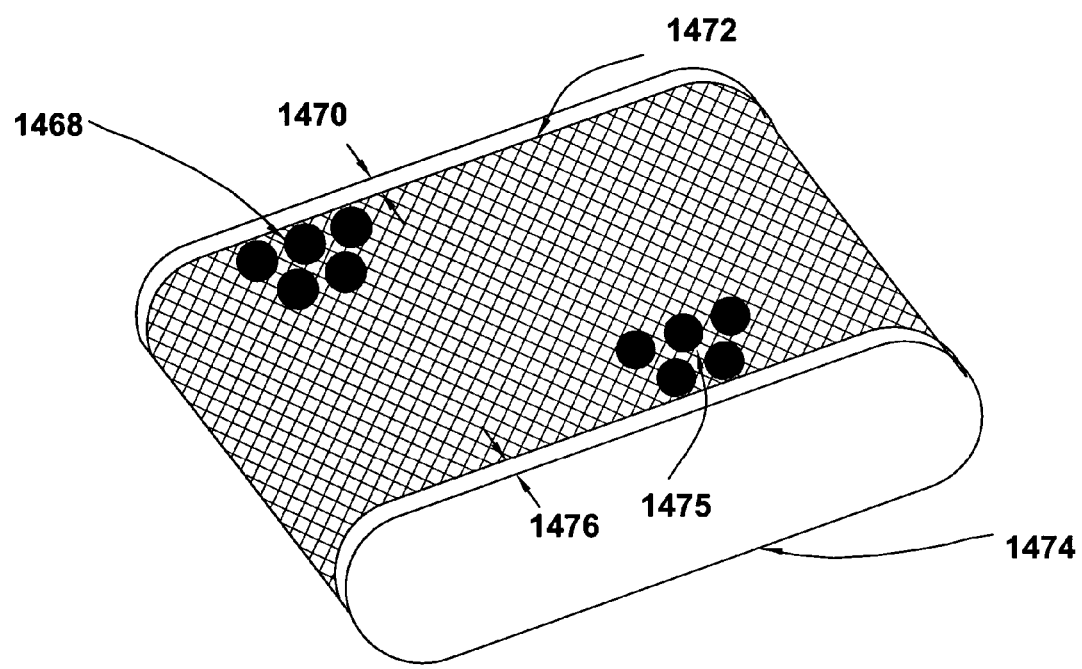
FIG. 102 is an isometric view of a continuous belt with an abrasive free outer band area.

FIG. 96 is a top view of a non-island annular disk with an abrasive free outer band area. A continuous flexible backing disk 1400 that has a annular band 1404 of abrasive particles coated directly on the surface of the disk 1400 where the annular band of abrasive 1404 has a annular band inner radius 1410 and a outer annular radius 1408. The disk 1400 has a disk diameter 1402 and an outer band area has a annular band width 1406 that is free of abrasive particles. FIG. 97 is a top view of a non-island circular disk with an abrasive free outer band area. The continuous disk 1414 has a continuous inner abrasive coated disk area 1415 where the abrasive is coated directly onto the flat surface of the disk 1414 and where the inner disk area 1415 forms a abrasive free outer band area having a outer band width 1418 and the disk 1414 has a disk diameter 1416. FIG. 98 is a top view of a non-island rectangular sheet with an abrasive free outer band area. The rectangular sheet 1422 has a inner abrasive coated area 1420 where the abrasive is coated directly onto the flat surface of the sheet 1422. The inner area 1420 forms abrasive free borders on all four sides of the sheet 1422 where the width of the abrasive free top border is shown by 1424 and the sheet 1422 abrasive free side border is shown by 1426. FIG. 99 is a top view of a abrasive coated raised island rectangular sheet with an island free outer band area. The rectangular sheet 1432 has a inner abrasive coated island area 1434 where the abrasive is coated onto the flat top surfaces of the circular islands 1436 which islands cover the whole surface area 1434. Circular island shapes 1436 are shown but many other island shapes may be used. The inner area 1434 forms abrasive free borders on all four sides of the sheet 1432 where the width of the abrasive free bottom border is shown by 1430 and the sheet 1432 abrasive free side border is shown by 1438. FIG. 100 is a top view of an abrasive strip with an abrasive free outer band area. The abrasive strip 1444 has an inner abrasive area 1445 where abrasive particles may be attached as a continuous abrasive central area directly to the flat surface of the strip 1444 or the inner area 1445 may have an array of non-raised abrasive islands 1447 or the inner area 1445 may have an array of raised islands 1440 where abrasive material is coated to the flat top surfaces of the abrasive islands 1440. Circular island shapes 1440 are shown but many other island shapes may be used. The strip 1444 has one strip end 1448 and another strip end 1442. The inner area 1445 forms a abrasive free border on one strip 1444 side having a border width 1452 and another abrasive free border on the opposite side that has a border width 1446. FIG. 101 is a top view of a patterned abrasive rectangular sheet with abrasive coated directly on the flat surface of the sheet and the outer border of the sheet is abrasive free. The abrasive sheet 1460 has a inner area 1456 that has an array pattern of abrasive non-raised islands including circular island shapes 1458 and rectangular shapes 1454 of abrasive coatings but the sheet may have a mixture of more than one island shape on a single abrasive sheet. Non-raised islands may have a variety of other shapes that are not shown. The location-paced abrasive shapes 1458 and 1454 would cover the whole inner area 1456 to form abrasive free borders on all sides of the sheet 1460 where the top free border width is shown by 1462 and the width of a side free border is shown by 1466. FIG. 102 is an isometric view of a continuous belt with an abrasive free outer band area. The belt 1474 has inner abrasive area 1472 where the abrasive may be coated directly on the surface of the belt 1474 or the inner area 1472 may have an array of abrasive coated raised islands 1468 or non-raised abrasive coated islands 1475. The inner area 1472 forms an abrasive free border on both sides of the belt 1474 where the width of the abrasive free border on one side of the belt 1474 is shown by 1476 and the width of the abrasive free border on the opposite side of the belt 1474 is shown by 1470.

Abrasive Bead or Particle Deposition

Problem: It is desired to deposit spaced spherical abrasive agglomerate beads or abrasive particles by a controlled method on an annular band area of a circular backing disk sheet or on a annular band of raised island structures that are attached to a backing sheet where all he individual beads are separated by nominal equal spaces.

Figure 104:
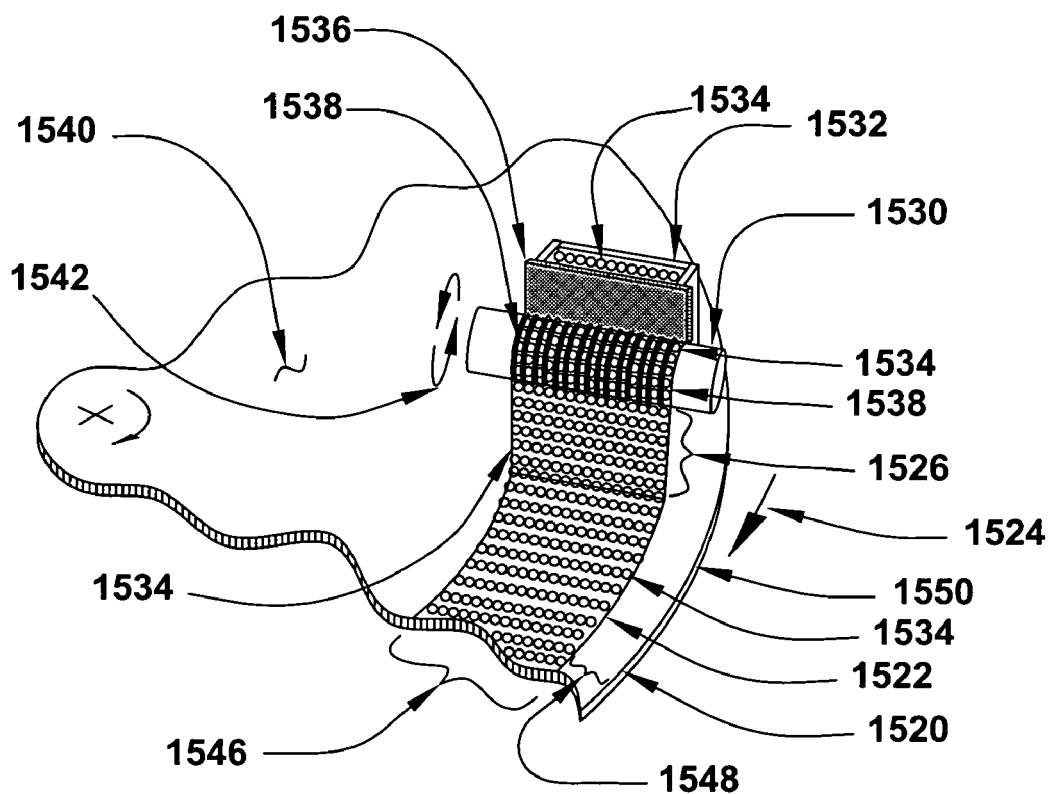
FIG. 104 is an isometric view of a rotating metering drum abrasive bead distribution device.
Figure 105:
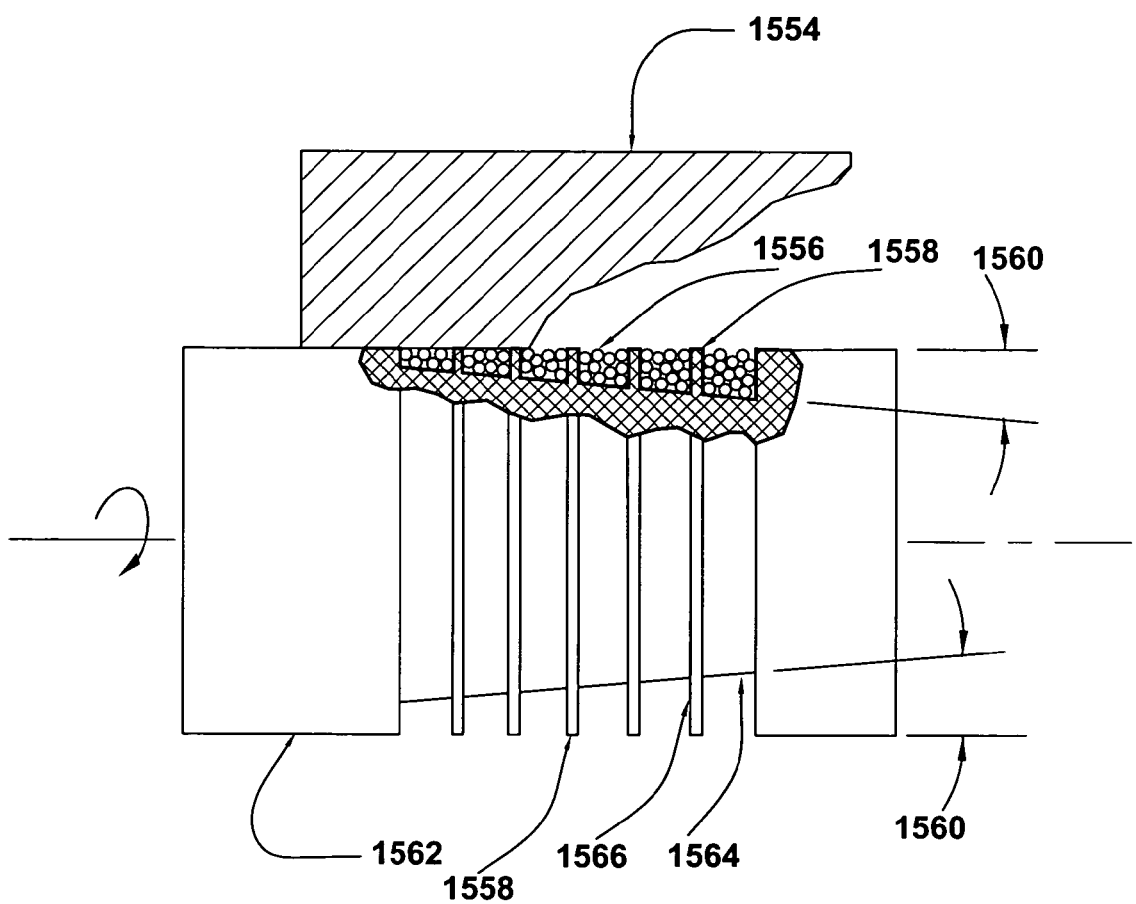
FIG. 105 is a cross-section view of a metering drum abrasive bead distribution device.
Figure 106:
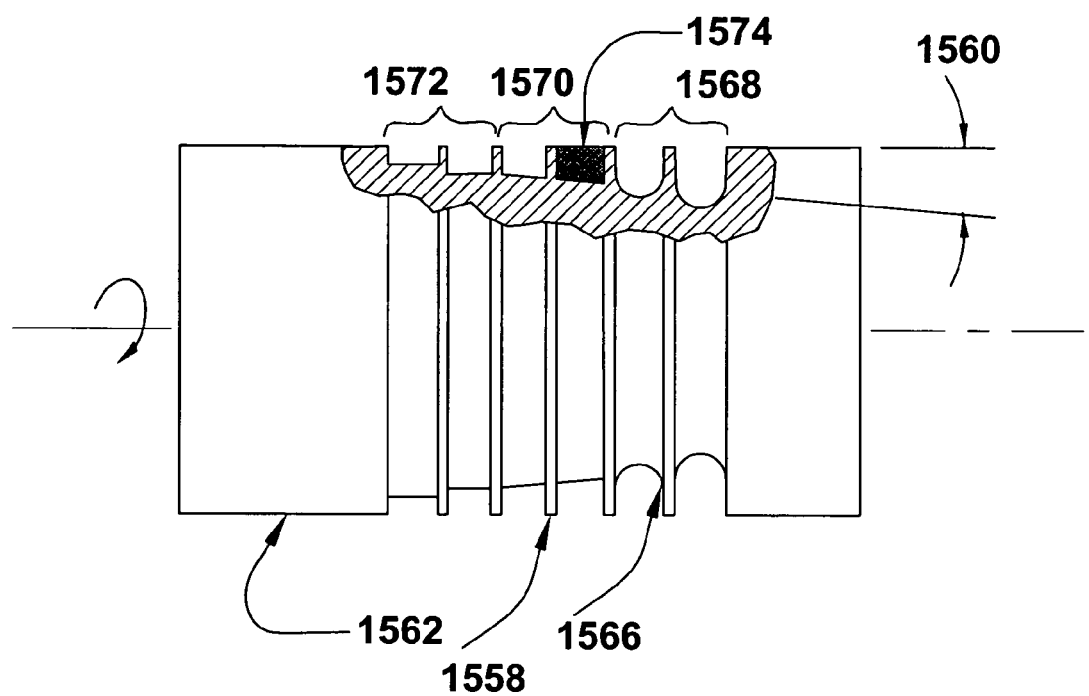
FIG. 106 is a cross section view of an abrasive bead metering drum device.

Solution: A circular drum wheel having a face width greater than the radial width of a annular band on a backing sheet can have shallow parallel grooves cut into the cylindrical surface of the drum wheel where the grooves are proportionally deeper from one end of the drum cylindrical face surface to the opposed drum end of the drum face surface. The total face width of the drum groove section is equal to the radial width of the desired annular band. Each groove can have flat, angled, or circular bottoms where the individual grooves sequentially have a groove cross section area that increases proportionally across the face width of the drum wheel. The bead metering drum wheel can be positioned above a horizontal surface platen holding a disk backing sheet where the axis of the drum wheel can be aligned radially with the disk platen and the grooved portion of the drum wheel is positioned directly above the disk annular band area. A abrasive particle or bead hopper can supply beads to the upper surface of the drum wheel and a doctor blade can be used to fill each groove level to the top drum surface of each groove as the drum wheel is rotated. Beads trapped in the grooves at the upper portion of the drum wheel will be carried over the apex of the drum wheel and they will fall off the wheel surface in a bead-line that will deposit the beads on the surface of the backing disk. When the disk platen is rotated, the deposited beads are spread out on the annular band surface with a nominal spaced distance between the individual beads. The bead deposition procedure is to rotate the disk at a defined speed and then slowly increase the rotational speed of the grooved bead drum where the first deposited beads cover the annular band with a sparse deposited-bead density where there are large tangential gap distances between individual beads which prevents the occurrence of a defined "start-line" of beads at the start of the bead application process. Approximately 10% of the beads are preferred to be deposited during the start-up portion of the bead deposition process. Then the speed of the bead drum would be increased to a defined speed and approximately 80% of the beads would be deposited during this portion of the deposition process as the backing disk platen is preferred to be rotated at a defined constant speed. In the slow-down portion of the bead deposition process, the bead drum wheel would be slowed down and it is preferred that approximately 10% of the beads would be sparsely deposited which prevents the occurrence of a bead "stop-line" of deposited beads. It is preferred that the backing disk be rotated many revolutions during the bead deposition process, from 10 to 20 or 50 or 100 or even more revolutions during the bead deposition process to assure that a bead "start-line" or "stop-line" containing a significant number of beads concentrated to form the "bead line" does not occur and also, that all the beads have uniform gap spaces between the distributed individual deposited beads over the full annular area. Beads can be deposited on the surface of a bead transfer sheet that can have a tacky surface to temporally hold the spaced beads in position on the transfer sheet. Then, another wet-resin coated abrasive-article sheet can be placed in face contact with the stabilized beads located on the flat surface of the transfer sheet to effect a transfer of the beads from the transfer sheet to the resin coated areas on the abrasive-article sheet. In the same way that the beads can be transferred from a tacky surfaced transfer sheet to the flat surface of a abrasive-article backing sheet, the beads can be transferred to wet-resin coated raised island structure surfaces that are attached to a backing sheet. Excess beads located on the transfer sheet that are not transferred can be collected and processed again. The individual walls between adjacent bead drum wheel grooves prevent the lateral movement of individual beads across the face width of the drum. These walls can be very small, approximately 0.005" (0.127 mm) to prevent separation lines between falling streams of beads that exit the individual grooves as the drum is rotated. The grooves can range from slightly larger in cross-section depth and width measurements than the bead diameters up to depths and widths where many individual beads can reside in the cross-sectional area of individual grooves. Beads falling from the drum wheel can also impact a stationary or rotating or axially oscillating bead spreader bar, prior to the beads contacting the backing surface, to diminish the effect of beads stream separation between bead grooves as individual beads would be spread apart laterally in a direction along the length of the bar when contacting the surface of the bead spreader bar. The total quantity of deposited beads in one bead deposition process operation is equal to the volume of beads contained in the portion of the grooves of the bead drum that is rotated over a defined drum angle that is measured from the drum angular position at the start of the bead deposition to the drum angular position at the end of the bead deposition. The drum angle can be measured by use of a bead drum encoder device that is attached to the bead drum to assure that the desired quantity or volume of beads is deposited on a specific annular disk article. Another method to control the quantity of beads deposited on an annular disk is to pre-measure the beads and then introduce this measured quantity of beads into the drum grooves for bead deposition on a specific backing article. The beads dropping from the grooved drum can also be directed into a air jet device that would pick up individual beads and propel them at increased speed to the surface of a wet-resin coated annular abrasive article. Abrasive beads or abrasive particles can also be deposited on a rectangular backing sheet or a continuous web by using a particle metering drum wheel that has adjacent grooves that have the same groove cross sectional areas across the face width of the drum wheel. The gap spacing between adjacent abrasive beads described here for annular abrasive bands on circular disks is also desired for rectangular or continuous belt or strip or other shaped abrasive articles and these gap-spaced beads can also be provided by a number of industry standard abrasive coating techniques that are commonly employed for abrasive coating including those used for coating continuous web backing material. FIG. 104 is an isometric view of a rotating metering-drum abrasive bead distribution device. Abrasive agglomerate spherical beads or abrasive particles 1534 contained in a bead hopper 1532 apply an excess of beads 1534 to a metering drum 1530 that has circular drum grooves 1538 that extend across the drum 1530 face surface. The drum 1530 is rotated in the direction 1542 to carry beads 1534 within the drum grooves 1538 past a stationary doctor blade 1536 that contacts the cylindrical face of the drum 1530 as the drum 1530 is rotated which results in the drum grooves 1538 being filled level to the top of the grooves 1538 with abrasive beads 1534. As the drum 1530 is rotated the beads 1534 trapped in the drum grooves 1538 fall off the drum 1530 surface to form a vertical line-wall of beads 1526 where the beads 1534 contact the flat surface 1540 of a rotating horizontal mounted circular backing sheet 1520 rotating in a direction 1524 to form an annular band 1522 of deposited beads 1534 on the backing 1520. The annular band 1522 of beads has a band radial width 1546 that is equal to the face width of the drum grooves 1538 portion of the drum 1530. An outer border gap 1548 exists between the outer edge 1550 of the backing 1520 and the annular bead band 1522. The abrasive beads or abrasive particles 1534 are shown deposited on the flat surface 1540 of a circular backing 1520 but the same beads 1534 can be deposited on an annular band of raised islands attached to a backing sheet (not shown). FIG. 105 is a cross section view of a rotating metering-drum abrasive bead distribution device. The abrasive bead metering drum 1562 has a series of parallel grooves 1566 that extend around the circumference of the drum 1562 where the grooves 1566 can have angled bottom surfaces 1564 that have a common groove bottom 1564 angle 1560. The individual grooves 1566 have divider groove walls 1558 that prevent the flow of abrasive spherical beads or abrasive particles 1556 along the axial surface of the drum 1562. Each groove 1566 is filled level with the top of the groove 1566 with abrasive beads or particles 1556 by the use of a stationary doctor blade 1554, shown in a cut-away view, that extends across the full width of all the grooves 1566 where the doctor blade 1554 is in contact with the cylindrical surface of the drum 1562 as the drum 1562 rotates. The grooves 1566 are filled with beads 1556 by use of a bead hopper device (not shown). The cross section area of each groove 1566 increases proportionally from one side of the drum 1562 toward the opposite end side of the drum 1562 as defined by the groove bottom 1564 angle 1560 where the angle is defined by the radial width and radius of the annular band of the backing (not shown) to be coated with abrasive beads 1556. The metering drum 1562 can be used to deposit either spherical abrasive agglomerate beads or abrasive particles on an annular band area of a backing sheet (not shown) or on an annular band of raised island structures that are attached to a backing sheet (not shown). FIG. 106 is a cross section view of a metering-drum abrasive bead distribution device. The abrasive bead metering drum 1562 has a series of parallel grooves 1566 that extend around the circumference of the drum 1562 where the grooves 1566 can have flat bottom surfaces 1572, or can have angled bottom surfaces 1570, or can have circular bottom surfaces 1568. Each of the drum 1562 grooves 1566 has a cross-sectional area 1574 that increases from one end of the grooved portion of the drum 1562 to the opposite end of the grooved portion of the drum 1562 as indicated by the groove depth angle 1560 where the cross-sectional area 1574 of the grooves 1566 increases proportionally from one end of the drum 1562 to the other end of the drum 1562. FIG. 107 is a top view of spaced abrasive beads deposited on a backing. FIGS. 107A, B, and C all have different gap spacings between adjacent abrasive bead agglomerates which result in different surface area bead deposition densities. FIG. 107A is a array of spherical abrasive agglomerate beads 1580 deposited on a backing (not shown) that is made up of individual beads 1582 having spherical diameters of 0.002 inches (51 micrometers) with vertical bead center to bead center distances 1584 of 0.003 inches (76 micrometers) and vertical gap distances 1586 between adjacent beads of 0.001 inches (25 micrometers) and horizontal gap distances 1588 between adjacent beads of 0.001 inches (25 micrometers). The surface area density of the abrasive beads with this array distribution is approximately 35%, where the composite projected area of all the individual spherical beads represents approximately 35% of the total bead covered area. FIG. 107B is a array of spherical abrasive agglomerate beads 1590 deposited on a backing (not shown) that is made up of individual beads 1592 having spherical diameters of 0.002 inches (51 micrometers) with vertical bead center to bead center distances 1594 of 0.004 inches (102 micrometers) and vertical gap distances 1596 between adjacent beads of 0.002 inches (51 micrometers) and horizontal gap distances 1598 between adjacent beads of 0.002 inches (51 micrometers). The surface area density of the abrasive beads with this array distribution is approximately 19%, where the composite projected area of all the individual spherical beads represents approximately 19% of the total bead covered area. FIG. 107C is a array of spherical abrasive agglomerate beads 1600 deposited on a backing (not shown) that is made up of individual beads 1602 having spherical diameters of 0.002 inches (51 micrometers) with vertical bead center to bead center distances 1604 of 0.005 inches (127 micrometers) and vertical gap distances 1606 between adjacent beads of 0.003 inches (76 micrometers) and horizontal gap distances 1608 between adjacent beads of 0.003 inches (76 micrometers). The surface area density of the abrasive beads with this array distribution is approximately 13%, where the composite projected area of all the individual spherical beads represents approximately 13% of the total bead covered area.

A flexible abrasive sheet disk article is described, the article comprising:

a) a backing sheet comprising a polymer;

b) the backing sheet having a disk shape, the disk shape having an outer radius;

c) the disk shape having an annular distribution of abrasive on a surface, the annular distribution having an inner radius of an abrasive coated annular band that is less than 85% of an outer radius of the abrasive coated annular band;

d) the annular distribution of abrasive comprising at least a monolayer of abrasive particles or composite erodible abrasive agglomerates, the at least a monolayer being resin bonded onto the surface of the disk backing sheet; and e) an outer annular border gap area located between the outer radius of the coated abrasive annular band of coated abrasive and an outer radius of the disk article, the gap area being free of coated abrasive wherein the border gap area has a radial width of from 0.1% to 10.0% of the abrasive disk article radius.

Also a process of making spherical beads is described, the process comprising:

a) using a cell sheet wherein the cell sheet has a array of cell sheet through holes;

b) the cell sheet through holes each have a cross sectional area;

c) the cell sheet having a nominal thickness;

d) the cell sheet holes form cell sheet volumes wherein a cell sheet volume is equal to the cell sheet through hole cross sectional area multiplied by the cell sheet thickness;

e) mixing materials into a solution, the mixture solution comprising an oxide, or a combination of oxides, and water or solvents or a combination thereof;

f) filling the cell sheet holes with the mixture solution to form mixture volumes wherein the volume of mixture solution contained in each mixture volume is equal to the cell sheet volume;

g) ejecting the mixture volumes from the cell sheet by subjecting the mixture solution contained in each cell to an impinging jet of fluid wherein the impact of the impinging jet of fluid dislocates the mixture volumes from the cell sheet thereby forming independent mixture solution lump entities;

h) wherein the ejected independent mixture solution lump entities are shaped into independent spherical entities by mixture solution surface tension forces or other forces acting on the lump entities;

i) the independent spherical entities are introduced into and subjected to a solidification environment wherein the independent spherical entities become solidified to form loose green beads;

j) firing the green beads at high temperatures to produce beads. This process where the solidification environment comprises elevated temperature air or other gas and where the solidification environment is a dehydrating liquid, the cell sheet is a woven screen, and the cell sheet is joined at two opposing ends to form a cell sheet continuous belt. Further, this process where the cell sheet comprises a disk shape having an annular pattern of cell sheet holes, the green beads are fired at a temperature sufficiently high to vitrify the bead exterior surfaces, wherein the vitrified bead surfaces are glassy surfaces and where the mixture solution comprises chemical agents thereby providing spherical shaped hollow beads. Also, where the spherical shaped hollow beads are fired at a temperature sufficiently high to vitrify the agglomerate exterior surfaces, wherein the vitrified bead surfaces are glassy surfaces.

A process is described of making spherical abrasive agglomerates, the process comprising:

a) using a cell sheet wherein the cell sheet has a array of cell sheet through holes;

b) the cell sheet through holes each have a cross sectional area;

c) the cell sheet having a nominal thickness;

d) the cell sheet holes form cell sheet volumes wherein a cell sheet volume is equal to the cell sheet through hole cross sectional area multiplied by the cell sheet thickness;

e) mixing materials into a solution, the mixture solution comprising abrasive particles, an oxide, or a combination of oxides, and water or solvents or a combination thereof;

f) filling the cell sheet holes with the mixture solution to form mixture volumes wherein the volume of mixture solution contained in each mixture volume is equal to the cell sheet volume;

g) ejecting the mixture volumes from the cell sheet by subjecting the mixture solution contained in each cell to an impinging jet of fluid wherein the impact of the impinging jet of fluid dislocates the mixture volumes from the cell sheet thereby forming independent mixture solution lump entities;

h) wherein the ejected independent mixture solution lump entities are shaped into independent spherical entities by mixture solution surface tension forces or other forces acting on the lump entities;

i) the independent spherical entities are introduced into and subjected to a solidification environment wherein the independent spherical entities become solidified to form loose green agglomerates;

j) firing the green agglomerates at high temperatures to produce spherical abrasive agglomerates. This process, where the solidification environment comprises elevated temperature air or other gas, the solidification environment is a dehydrating liquid, the cell sheet is a open cell woven screen, the cell sheet is joined at two opposing ends to form a cell sheet continuous belt, where the cell sheet comprises a disk shape having an annular pattern of cell sheet holes and where the green agglomerates are fired at a temperature sufficiently high to vitrify the agglomerate exterior surfaces, wherein the vitrified agglomerate surfaces are glassy surfaces. Also, in this process, the mixture solution material includes at least one metal oxide or non-metal oxide selected from the group consisting of silica, alumina, titania, zirconia, zirconia-silica, magnesia, alumina-silica, alumina-boria-silica, alumina and boria, boria and mixtures thereof, where the spherical abrasive agglomerates comprise diamond or cubic boron nitride particles bound in an erodible matrix material, where the spherical abrasive agglomerates having number average abrasive particle diameter sizes less than 10 micrometers are encapsulated together with oxide materials to form erodible composite agglomerates having spherical abrasive agglomerate number average diameter sizes of 60 micrometers or less and where the abrasive agglomerates comprise coloring agents, and also, where coloring agents are used to identify the size of the abrasive particles contained in a abrasive agglomerate where a specific color correlates to specific contained particle size. Also, a flexible abrasive sheet article comprises a flexible backing sheet having a flat surface area coated with at least a monolayer of the abrasive agglomerates supported in a polymeric resin, and where the abrasive sheet article is a lapping film, where the workpiece includes an optical device, and also where the optical device includes a fiber optic component. This flexible abrasive sheet article having abrasive agglomerates attached to the flexible backing sheet has an initial average height of abrasive agglomerates can be subjected to a process of surface conditioning the abrasive surface which comprises providing relative motion between the abrasive article abrasive surface and a surface conditioning apparatus, the surface conditioning apparatus having a flat contact surface, wherein the surface conditioning apparatus flat contact surface is in pressure contact with the article abrasive surface and where the surface conditioning apparatus flat contact surface dynamically contacts and breaks away individual coated abrasive agglomerates that are resin bonded in a position elevated above the initial average height of the abrasive agglomerates from the surface of the abrasive article, thereby providing approximately a monolayer of abrasive agglomerates resin bonded to the abrasive article, and also, where the surface condition apparatus flat contact surface comprises an abrasive surface. A flexible abrasive sheet article is described, the article comprising a flexible backing sheet having an array of spaced, shaped, raised abrasive coated island foundation structures, the abrasive coated island foundation structures comprises islands of a first structure material having a raised top surface, the raised island top surface having at least a monolayer of the described equal sized spherical abrasive agglomerates supported in a polymeric resin and a process of surface-conditioning these abrasive articles where the surfaces of abrasive agglomerates supported by resin on the island structures having an initial average height of abrasive agglomerates, the process comprises providing relative motion between the abrasive article abrasive surface and a surface conditioning apparatus, the surface conditioning apparatus having a flat contact surface, wherein the surface conditioning apparatus flat contact surface is in pressure contact with the article island abrasive surfaces and where the surface conditioning apparatus flat contact surface dynamically contacts and breaks away individual coated abrasive agglomerates that are resin bonded in a position elevated above the initial average height of the abrasive agglomerates from the surface of the abrasive article, thereby providing approximately a monolayer of abrasive agglomerates resin bonded to the article raised islands. Also described is an abrasive article wherein the standard deviation of the average size of the spherical abrasive agglomerates is less than 50% of the average abrasive agglomerate size.

What is claimed is:

1. A process of making spherical beads comprising:
   a) using a cell sheet wherein the cell sheet has a array of cell sheet through holes;
   b) the cell sheet through holes each have a cross sectional area;
   c) the cell sheet having a nominal thickness;
   d) the cell sheet holes form cell sheet volumes wherein a cell sheet volume is equal to the cell sheet through hole cross sectional area multiplied by the cell sheet thickness;
   e) mixing materials into a liquid solution, the mixture solution comprising an inorganic oxide or a combination of inorganic oxides, and water, solvents or a combination thereof;
   f) filling the cell sheet holes with the liquid mixture solution to form mixture volumes wherein the volume of mixture solution contained in each mixture volume is equal to the cell sheet volume;
   g) ejecting the liquid mixture volumes from the cell sheet by subjecting the liquid mixture solution contained in each cell to an impinging jet of fluid wherein the impact of the impinging jet of fluid dislocates the liquid mixture volumes from the cell sheet thereby forming independent mixture solution lump entities;
   h) wherein the ejected independent liquid mixture solution lump entities are shaped into independent spherical entities by force comprising liquid mixture solution surface tension forces;
   i) the independent spherical entities are introduced into and subjected to a solidification environment wherein the independent spherical entities become solidified to form loose, green, spherical beads; and
   j) firing the loose, green, spherical beads at high temperatures to produce beads.

2. The process of claim 1 wherein the solidification environment comprises elevated temperature air or other gas.

3. The process of claim 1 wherein the solidification environment is a dehydrating liquid.

4. The process of claim 1 wherein the cell sheet is a woven screen.

5. The process of claim 1 wherein the cell sheet is joined at two opposing ends to form a cell sheet continuous belt.

6. The process of claim 1 wherein the cell sheet comprises a disk shape having an annular pattern of cell sheet holes.

7. The process of claim 1 wherein the green beads are fired at a temperature sufficiently high to vitrify the bead exterior surfaces, wherein the vitrified bead surfaces are glassy surfaces.

8. The process of claim 1 wherein the mixture solution comprises chemical agents selected from the group consisting of gas inducing material thereby providing spherical shaped hollow beads.

9. The process of claim 8 wherein the spherical shaped hollow beads are fired at a temperature sufficiently high to vitrify the agglomerate exterior surfaces, wherein the vitrified bead surfaces are glassy surfaces.

10. A process of making spherical abrasive agglomerates comprising:
    a) using a cell sheet wherein the cell sheet has a array of cell sheet through holes;
    b) the cell sheet through holes each have a cross sectional area;
    c) the cell sheet having a nominal thickness;
    d) the cell sheet holes form cell sheet volumes wherein a cell sheet volume is equal to the cell sheet through hole cross sectional area multiplied by the cell sheet thickness;
    e) mixing materials into a liquid solution, the liquid mixture solution comprising abrasive particles, an inorganic vitrifiable oxide or a combination of inorganic vitrifiable oxides, and water or solvents or a combination thereof;
    f) filling the cell sheet holes with the liquid mixture solution to form mixture volumes wherein the volume of mixture solution contained in each mixture volume is equal to the cell sheet volume; i) ejecting the liquid mixture volumes from the cell sheet by subjecting the mixture solution contained in each cell to an impinging jet of fluid wherein the impact of the impinging jet of fluid dislocates the liquid mixture volumes from the cell sheet thereby forming independent liquid mixture solution lump entities;
    g) wherein the ejected independent liquid mixture solution lump entities are shaped into independent spherical entities by at least mixture solution surface tension forces;
    h) the independent spherical entities are introduced into and subjected to a solidification environment wherein the independent spherical entities become solidified to form loose green agglomerates; and
    i) firing the green agglomerates at high temperatures to produce spherical abrasive agglomerates.

11. The process of claim 10 wherein the solidification environment comprises elevated temperature air or other gas.

12. The process of claim 10 wherein the solidification environment is a dehydrating liquid.

13. The process of claim 10 wherein the cell sheet is a open cell woven screen.

14. The process of claim 10 wherein the cell sheet is joined at two opposing ends to form a cell sheet continuous belt.

15. The process of claim 10 wherein the cell sheet comprises a disk shape having an annular pattern of cell sheet holes.

16. The process of claim 10 wherein the green agglomerates are fired at a temperature sufficiently high to vitrify the agglomerate exterior surfaces, wherein the vitrified agglomerate surfaces are glassy surfaces.

17. The process of claim 10 wherein the mixture solution material includes at least one metal oxide or non-metal oxide selected from the group consisting of silica, alumina, titania, zirconia, zirconia-silica, magnesia, alumina-silica, alumina-boria-silica, alumina and boria, boria and mixtures thereof.

18. The process of claim 10 wherein the spherical abrasive agglomerates comprise diamond or cubic boron nitride particles bound in an erodible matrix material.

19. The process of claim 10 wherein the spherical abrasive agglomerates having number average abrasive particle diameter sizes of from 0.1 to 10 micrometers are encapsulated together with oxide materials to form erodible composite agglomerates having spherical abrasive agglomerate number average diameter sizes of from 20 to 60 micrometers.

20. The process of claim 10 wherein the abrasive agglomerates comprise coloring agents, wherein the coloring agents are used to identify the size of the abrasive particles contained in a abrasive agglomerate wherein a specific color correlates to specific contained particle size.

\* \* \* \* \*